(12) United States Patent
Sus et al.

(10) Patent No.: US 7,303,776 B2
(45) Date of Patent: Dec. 4, 2007

(54) AUTOMATED FOOD PROCESSING SYSTEM AND METHOD

(75) Inventors: Gerald A. Sus, Frankfort, IL (US);
Glenn Schackmuth, Montgomery, IL (US); Craig Conley, Oswego, IL (US); Ron Dorsten, Oak Brook, IL (US); Henry T. Ewald, Roselle, IL (US); Jenny M. Hong, Palatine, IL (US); David Bone, Nashville, TN (US); Brian Rudesill, Hudson, WI (US); Mario G. Ceste, Wallingford, CT (US); John M. Corliss, Lynn, MA (US); Andrew Courier, Mansfield, MA (US); William Day, New Port Richey, FL (US); Doug Christian Greening, Calgary (CA); Doug Jones, New Port Richey, FL (US); Kevin Keough, Canton, MA (US); Steven Konold, Hayward, CA (US); James Lozouski, Marlborough, MA (US); John Meisner, New Richmond, WI (US); Richard Montafi, Daly City, CA (US); Roberto Nevarez, Hudson, FL (US); Benny Nunley, Half Moon Bay, CA (US); Curtis Clarence Pinnow, Libertyville, IL (US); Charles E. Rose, Hayward, CA (US); Keith Stanger, New Port Richey, FL (US); John A.J. Wedel, Stillwater, MN (US); Joseph A. Goodwin, Shreveport, LA (US); Chris Coul, Glendale Heights, IL (US); Mike Zizas, Bloomingdale, IL (US); Dusan Ivancevic, Carol Stream, IL (US); Gregery M. Billman, Schaumburg, IL (US); Steve Yagla, Bloomingdale, IL (US)

(73) Assignee: Restaurant Technology, Inc., Oak Brook, IL (US)

( * ) Notice: Subject to any disclaimer, the term of this patent is extended or adjusted under 35 U.S.C. 154(b) by 388 days.

(21) Appl. No.: 10/419,523

(22) Filed: Apr. 21, 2003

(65) Prior Publication Data
US 2004/0020555 A1 Feb. 5, 2004

Related U.S. Application Data

(63) Continuation-in-part of application No. 10/127,202, filed on Apr. 22, 2002, which is a continuation-in-part of application No. 10/127,203, filed on Apr. 22, 2002, now Pat. No. 6,869,633, which is a continuation-in-part of application No. 10/127,309, filed on Apr. 22, 2002, now Pat. No. 6,960,157, which is a continuation-in-part of application No. 10/127,311, filed on Apr. 22, 2002, now abandoned, which is a continuation-in-part of application No. 10/127,369, filed on Apr. 22, 2002, which is a continuation-in-part of application No. 10/127,390, filed on Apr. 22, 2002, now abandoned, which is a continuation-in-part of application No. 10/127,398, filed on Apr. 22, 2002, now Pat. No. 6,871,676, which is a continuation-in-part of application No. 10/127,400, filed on Apr. 22, 2002.

(51) Int. Cl.
*B65B 19/34* (2006.01)
(52) U.S. Cl. ........................ 426/413; 99/356; 141/109
(58) Field of Classification Search ................ 426/392, 426/413; 99/352, 355, 356; 141/108, 109; 294/55; 623/57–65
See application file for complete search history.

(56) References Cited

U.S. PATENT DOCUMENTS

| | | | |
|---|---|---|---|
| 535,847 A | 3/1895 | Mertz | |
| 1,755,699 A | 4/1930 | Loehr | |
| 1,927,318 A | 9/1933 | Mcentee | |
| 2,466,386 A | 4/1949 | Curioni | ........................ 198/52 |
| 2,780,148 A * | 2/1957 | Pearson et al. | ............. 493/137 |
| 2,807,203 A | 9/1957 | Buechele et al. | ............. 99/404 |
| 2,906,850 A | 9/1959 | Meletio | ........................ 219/43 |
| 3,012,697 A | 12/1961 | Rouse, Jr. et al. | .......... 222/181 |

| Patent No. | | Date | Inventor | Class |
|---|---|---|---|---|
| 3,183,856 | A | 5/1965 | Jolly | 107/1 |
| 3,200,737 | A | 8/1965 | Ferenc | 99/355 |
| 3,227,313 | A | 1/1966 | Morena | 222/57 |
| 3,237,804 | A | 3/1966 | Bardy et al. | 221/81 |
| 3,347,152 | A | 10/1967 | Congelli et al. | 99/334 |
| 3,369,479 | A | 2/1968 | Oppenheimer | 99/325 |
| 3,391,633 | A | 7/1968 | Boosalis | 99/357 |
| 3,427,780 | A * | 2/1969 | Bock | 53/506 |
| 3,442,423 | A | 5/1969 | Cozad | 222/70 |
| 3,448,677 | A | 6/1969 | Dexters | 99/336 |
| 3,456,425 | A | 7/1969 | Pezza | 53/236 |
| 3,474,891 | A | 10/1969 | Kamila | 198/33 |
| 3,505,072 | A | 4/1970 | Rullman | 99/1 |
| 3,525,299 | A | 8/1970 | Gouwens | 99/336 |
| 3,558,086 | A | 1/1971 | Kraly | 244/118 |
| 3,574,270 | A | 4/1971 | Rosendahl | 53/236 |
| 3,577,704 | A | 5/1971 | Lense | 53/386.1 |
| 3,591,045 | A | 7/1971 | Sturrock | 221/175 |
| 3,611,984 | A | 10/1971 | Angold | 118/19 |
| 3,633,245 | A | 1/1972 | Partos | 17/32 |
| 3,641,263 | A | 2/1972 | Rhoads et al. | 178/6 |
| 3,645,196 | A | 2/1972 | Johnston et al. | 99/404 |
| 3,653,540 | A | 4/1972 | Offutt | 221/75 |
| 3,653,541 | A | 4/1972 | Crum | 221/150 |
| 3,685,432 | A | 8/1972 | Hoeberigs | 99/357 |
| 3,690,247 | A | 9/1972 | Van Cleven et al. | 99/355 |
| 3,693,840 | A | 9/1972 | Starr | 222/193 |
| 3,716,383 | A | 2/1973 | Yamamura | 99/353 |
| 3,717,127 | A | 2/1973 | Porterfield | 119/52 |
| 3,734,355 | A | 5/1973 | Yamada | 222/167 |
| 3,797,710 | A | 3/1974 | Soodalter | 222/219 |
| 3,828,971 | A | 8/1974 | Offutt et al. | 221/75 |
| 3,830,264 | A | 8/1974 | Billett et al. | 141/1 |
| 3,861,561 | A | 1/1975 | Wittern et al. | 221/75 |
| 3,883,039 | A | 5/1975 | Wittern et al. | 221/75 |
| 3,896,715 | A | 7/1975 | Mascret | 99/356 |
| 3,908,531 | A | 9/1975 | Morley | 99/356 |
| 3,935,966 | A | 2/1976 | Pitel et al. | 221/75 |
| 3,946,702 | A | 3/1976 | Mazzini | 119/51.13 |
| 3,952,915 | A | 4/1976 | Pitel et al. | 221/75 |
| 3,972,419 | A | 8/1976 | Short | 211/78 |
| 4,028,024 | A | 6/1977 | Moreland | 425/133.1 |
| 4,038,433 | A | 7/1977 | Manser et al. | 426/615 |
| 4,061,245 | A | 12/1977 | Lotspeich | 221/75 |
| 4,089,299 | A | 5/1978 | Suchowski | 119/51 |
| 4,095,723 | A | 6/1978 | Lerner | 222/56 |
| 4,104,958 | A | 8/1978 | Manser et al. | 99/355 |
| 4,109,835 | A | 8/1978 | Castro | 222/449 |
| 4,110,958 | A | 9/1978 | Stevens | 53/381.6 |
| 4,148,412 | A | 4/1979 | Lotspeich | 221/75 |
| 4,149,653 | A | 4/1979 | Lennartson | 221/75 |
| 4,159,611 | A | 7/1979 | Russell | 53/569 |
| 4,165,823 | A | 8/1979 | Olsson | 222/252 |
| 4,171,067 | A * | 10/1979 | Faulkner et al. | 222/1 |
| 4,228,730 | A | 10/1980 | Schindler et al. | 99/329 |
| 4,240,563 | A | 12/1980 | Lennartson | 221/75 |
| 4,247,019 | A | 1/1981 | Lerner | 222/56 |
| 4,258,860 | A | 3/1981 | Boettcher | 221/75 |
| 4,266,691 | A | 5/1981 | Wolwowicz | 222/77 |
| 4,270,669 | A | 6/1981 | Luke | 221/13 |
| 4,271,656 | A | 6/1981 | Russell | 53/381.6 |
| 4,312,460 | A | 1/1982 | Boettcher | 221/75 |
| 4,359,014 | A | 11/1982 | Molaug et al. | 119/51 |
| 4,369,896 | A | 1/1983 | Boettcher | 221/75 |
| 4,382,527 | A | 5/1983 | Lerner | 222/56 |
| 4,385,713 | A | 5/1983 | Boettcher | 221/75 |
| 4,388,793 | A | 6/1983 | Kunne | 53/381.5 |
| 4,436,194 | A | 3/1984 | Hanley | 194/63 |
| 4,438,683 | A | 3/1984 | Bartfield | 99/330 |
| 4,446,775 | A | 5/1984 | Reed | 99/353 |
| 4,460,054 | A * | 7/1984 | Inkmann et al. | 177/149 |
| 4,478,140 | A | 10/1984 | Bullock | 99/404 |
| 4,489,647 | A | 12/1984 | Stamps et al. | 99/336 |
| 4,499,818 | A * | 2/1985 | Strong | 99/483 |
| 4,502,372 | A | 3/1985 | Mariotti | 99/330 |
| 4,505,193 | A | 3/1985 | Mariotti | 99/330 |
| 4,506,802 | A * | 3/1985 | Lotspeich | 221/75 |
| 4,529,107 | A | 7/1985 | Morine et al. | 222/314 |
| 4,553,222 | A | 11/1985 | Kurland et al. | 364/900 |
| 4,554,955 | A | 11/1985 | von Lersner et al. | 141/1 |
| 4,558,804 | A | 12/1985 | Keck | 222/130 |
| 4,560,088 | A | 12/1985 | Tan | 221/75 |
| 4,561,453 | A | 12/1985 | Rothchild | 131/304 |
| 4,574,558 | A | 3/1986 | Utsumi | 53/128 |
| 4,580,696 | A * | 4/1986 | Moore et al. | 221/61 |
| 4,580,698 | A | 4/1986 | Ladt et al. | 222/55 |
| 4,582,023 | A | 4/1986 | Zumbahlen et al. | 119/53.5 |
| 4,582,353 | A * | 4/1986 | Alvernhe | 294/64.1 |
| 4,589,571 | A | 5/1986 | Sykes | 221/75 |
| 4,619,637 | A * | 10/1986 | Jones | 493/175 |
| 4,627,785 | A | 12/1986 | Monforte | 414/730 |
| 4,646,627 | A | 3/1987 | Bartfield et al. | 99/330 |
| 4,655,862 | A | 4/1987 | Christoff et al. | 119/51.11 |
| 4,694,742 | A | 9/1987 | Dover | 99/404 |
| 4,700,617 | A | 10/1987 | Lee et al. | 99/327 |
| 4,712,272 | A | 12/1987 | Soodalter | 17/32 |
| 4,719,850 | A | 1/1988 | Sowell | 99/404 |
| 4,722,267 | A | 2/1988 | Galockin et al. | 99/357 |
| 4,742,455 | A | 5/1988 | Schreyer | 364/400 |
| 4,748,902 | A | 6/1988 | Maurantonio | 99/326 |
| 4,757,915 | A | 7/1988 | Albright et al. | 221/75 |
| 4,803,921 | A * | 2/1989 | Nuss | 99/483 |
| 4,809,881 | A | 3/1989 | Becker | 221/224 |
| 4,852,471 | A | 8/1989 | Lansing | 99/330 |
| 4,874,049 | A | 10/1989 | Kee et al. | 177/59 |
| 4,883,508 | A | 11/1989 | Lansing | 55/322 |
| 4,889,077 | A | 12/1989 | Possis | 119/51.11 |
| 4,911,068 | A | 3/1990 | Koether et al. | 99/325 |
| 4,922,435 | A | 5/1990 | Cahlander et al. | 364/513 |
| 4,930,663 | A | 6/1990 | Ficken | 221/75 |
| 4,934,892 | A | 6/1990 | Smith et al. | 414/412 |
| 4,973,492 | A | 11/1990 | Gibson | 426/461 |
| 4,976,376 | A | 12/1990 | Williams | 221/24 |
| 4,979,864 | A | 12/1990 | Cahlander et al. | 414/421 |
| RE33,580 | E | 4/1991 | Fraioli | 426/242 |
| 5,052,168 | A | 10/1991 | DeWitt et al. | 53/492 |
| 5,052,288 | A | 10/1991 | Marquez et al. | 99/407 |
| 5,083,897 | A * | 1/1992 | Hand et al. | 414/746.4 |
| 5,085,138 | A | 2/1992 | Fehr et al. | 99/450 |
| 5,104,002 | A | 4/1992 | Cahlander et al. | 222/1 |
| 5,106,239 | A | 4/1992 | Krebsbach | 406/63 |
| 5,132,914 | A | 7/1992 | Cahlander et al. | 364/478 |
| 5,134,927 | A | 8/1992 | McCarthy, III. et al. | 99/427 |
| 5,142,968 | A | 9/1992 | Caron et al. | 99/404 |
| 5,148,737 | A | 9/1992 | Poulson | 99/327 |
| 5,160,068 | A | 11/1992 | Fishman et al. | 222/352 |
| 5,172,328 | A | 12/1992 | Cahlander et al. | 364/478 |
| 5,186,355 | A | 2/1993 | VonDelinde et al. | 221/75 |
| 5,189,944 | A | 3/1993 | Rasmussen et al. | 99/334 |
| 5,191,918 | A | 3/1993 | Cahlander et al. | 141/1 |
| 5,197,376 | A | 3/1993 | Bird et al. | 99/330 |
| 5,199,381 | A | 4/1993 | Masopust | 119/51.04 |
| 5,224,415 | A | 7/1993 | McFadden et al. | 99/357 |
| 5,230,279 | A | 7/1993 | McFadden et al. | 99/334 |
| 5,241,899 | A | 9/1993 | Kuhlman | 99/355 |
| 5,246,118 | A | 9/1993 | Mosher | 209/592 |
| 5,247,810 | A | 9/1993 | Fenty | 62/374 |
| 5,263,437 | A | 11/1993 | Murphrey | 119/53.5 |
| 5,272,961 | A | 12/1993 | Campbell et al. | 99/353 |
| 5,275,093 | A | 1/1994 | Chiu | 99/408 |
| 5,282,498 | A | 2/1994 | Cahlander et al. | 141/129 |
| 5,305,615 | A | 4/1994 | McFadden et al. | 62/378 |
| 5,314,954 | A | 5/1994 | Ohishi et al. | 525/132 |
| 5,319,939 | A | 6/1994 | McFadden et al. | 62/63 |
| 5,322,283 | A | 6/1994 | Ritchie et al. | 273/177 |
| 5,353,847 | A | 10/1994 | Cahlander et al. | 141/1 |

| | | | | | | |
|---|---|---|---|---|---|---|
| 5,353,959 A | 10/1994 | Center et al. ............... 222/66 | 6,121,566 A | 9/2000 | Biquez et al. ............... 218/7 |
| 5,365,831 A | 11/1994 | Kuhlman .................... 99/355 | 6,125,894 A | 10/2000 | Fritze et al. ................. 141/83 |
| 5,367,949 A | 11/1994 | Nitschke et al. ........... 99/334 | 6,131,622 A * | 10/2000 | Fritze et al. ............... 141/196 |
| 5,380,957 A | 1/1995 | Giles ........................ 177/16 | 6,131,766 A | 10/2000 | King et al. ................ 222/1 |
| 5,386,762 A * | 2/1995 | Gokey ....................... 99/326 | 6,135,120 A | 10/2000 | Lofman et al. ........... 131/112 |
| 5,400,838 A | 3/1995 | Schjerven et al. ......... 141/174 | 6,138,552 A | 10/2000 | Baillieul et al. .......... 99/331 |
| 5,403,056 A * | 4/1995 | Wallace .................... 294/98.1 | 6,145,699 A | 11/2000 | Pollock ...................... 221/75 |
| 5,404,796 A * | 4/1995 | Campbell et al. .......... 99/357 | 6,145,708 A | 11/2000 | Schmidt .................... 222/196 |
| 5,405,059 A | 4/1995 | Wadell ...................... 222/306 | 6,158,332 A | 12/2000 | Nothum, Sr. et al. ...... 99/494 |
| 5,413,454 A * | 5/1995 | Movsesian ................. 414/729 | 6,165,525 A | 12/2000 | Rolle et al. ............... 426/238 |
| 5,431,201 A * | 7/1995 | Torchia et al. ............. 141/98 | 6,170,229 B1 | 1/2001 | Kim ......................... 53/155 |
| 5,466,894 A | 11/1995 | Naef ......................... 177/59 | 6,179,206 B1 | 1/2001 | Matsumori ................ 235/383 |
| 5,469,988 A | 11/1995 | Huang ...................... 222/1 | 6,192,654 B1 | 2/2001 | Georgitsis et al. ........ 53/234 |
| 5,473,866 A | 12/1995 | Maglecic et al. .......... 53/511 | 6,196,393 B1 | 3/2001 | Kruk, Jr. et al. .......... 209/630 |
| 5,514,068 A | 5/1996 | Calvert et al. ............. 493/315 | 6,199,351 B1 | 3/2001 | Mount ....................... 53/563 |
| 5,553,736 A | 9/1996 | Healis ....................... 221/62 | 6,202,888 B1 | 3/2001 | Pollock ..................... 221/75 |
| 5,554,221 A | 9/1996 | Center et al. .............. 118/19 | 6,210,727 B1 | 4/2001 | Miller et al. .............. 426/231 |
| 5,580,598 A | 12/1996 | Benson et al. ............. 426/438 | 6,216,418 B1 * | 4/2001 | Kim ......................... 53/131.5 |
| 5,586,486 A | 12/1996 | Nitschke et al. ........... 99/330 | 6,250,207 B1 | 6/2001 | Hansen ...................... 99/286 |
| 5,588,394 A | 12/1996 | Balistreri .................. 119/51.11 | 6,256,963 B1 | 7/2001 | Kim ........................ 53/155 |
| 5,590,586 A * | 1/1997 | Ulfig et al. ................ 99/339 | 6,276,517 B1 | 8/2001 | Peterson et al. .......... 198/716 |
| 5,605,091 A | 2/1997 | Garber ...................... 99/330 | 6,305,573 B1 | 10/2001 | Fritze et al. ............... 222/58 |
| 5,607,712 A | 3/1997 | Bourne ..................... 426/321 | 6,321,802 B1 | 11/2001 | Weeks et al. ............. 141/362 |
| 5,639,995 A | 6/1997 | Mosher ..................... 177/64 | 6,367,231 B1 | 4/2002 | Yamamoto ............... 53/469 |
| 5,690,018 A | 11/1997 | Hansen ..................... 99/330 | 6,367,777 B1 * | 4/2002 | Fritze et al. ............... 254/98 |
| 5,706,976 A | 1/1998 | Purkey ...................... 221/6 | 6,484,067 B1 * | 11/2002 | Kinoshita et al. ......... 700/245 |
| 5,720,428 A * | 2/1998 | Jensen ....................... 229/104 | 6,505,534 B2 | 1/2003 | Robertson et al. ........ 83/13 |
| 5,721,000 A | 2/1998 | Center et al. .............. 426/289 | | | |
| 5,735,192 A | 4/1998 | Paez ......................... 99/342 | | | |
| 5,767,454 A | 6/1998 | Mosher ..................... 177/64 | | | |
| 5,769,281 A | 6/1998 | Bates ....................... 222/196 | | | |
| 5,778,767 A | 7/1998 | Rudesill .................... 99/407 | | | |
| 5,780,780 A | 7/1998 | Ahmed ..................... 177/119 | | | |
| 5,794,816 A | 8/1998 | Pliler et al. ................ 221/203 | | | |
| 5,799,822 A | 9/1998 | Rudewicz et al. .......... 221/150 | | | |
| 5,800,572 A * | 9/1998 | Loveall ..................... 623/63 | | | |
| 5,863,086 A * | 1/1999 | Christenson .............. 294/106 | | | |
| 5,875,824 A | 3/1999 | Atwell et al. .............. 141/67 | | | |
| 5,899,169 A | 5/1999 | Jenson ....................... 119/51.13 | | | |
| 5,901,640 A * | 5/1999 | Castlebury ................ 99/330 | | | |
| RE36,241 E | 6/1999 | Phelps et al. .............. 53/247 | | | |
| 5,908,007 A | 6/1999 | Duin ........................ 119/51.11 | | | |
| 5,915,589 A | 6/1999 | Lim ......................... 221/3 | | | |
| 5,934,516 A | 8/1999 | Strycharske et al. ....... 222/158 | | | |
| 5,960,990 A | 10/1999 | Radosevich ............... 222/1 | | | |
| 5,996,838 A | 12/1999 | Bayer et al. ............... 221/75 | | | |
| 6,006,946 A * | 12/1999 | Williams et al. ............. 221/9 | | | |
| 6,058,373 A | 5/2000 | Blinn et al. ................ 705/26 | | | |
| 6,067,899 A | 5/2000 | Caridis et al. ............. 99/404 | | | |
| 6,070,539 A | 6/2000 | Flamme et al. ............ 111/177 | | | |
| 6,101,483 A | 8/2000 | Petrovich et al. .......... 705/26 | | | |

* cited by examiner

*Primary Examiner*—Drew Becker
(74) *Attorney, Agent, or Firm*—Ryndak & Suri LLP

(57) ABSTRACT

An automated food processing system and method that allows food to be dispensed, fried and packaged in a suitable container, such as an individual portion-sized container. The system includes separate automated modules for dispensing, frying and packaging the food. The food is fried and thereafter it is dispensed from the fry device to an automated packaging device. The automated packaging device dispenses food to a container that may be an individual portion-sized container that is retrieved, erected and filled by an automated container handling and filling system. After a food container is filled, an automated device transports the filled container to a suitable pick-up location.

48 Claims, 64 Drawing Sheets

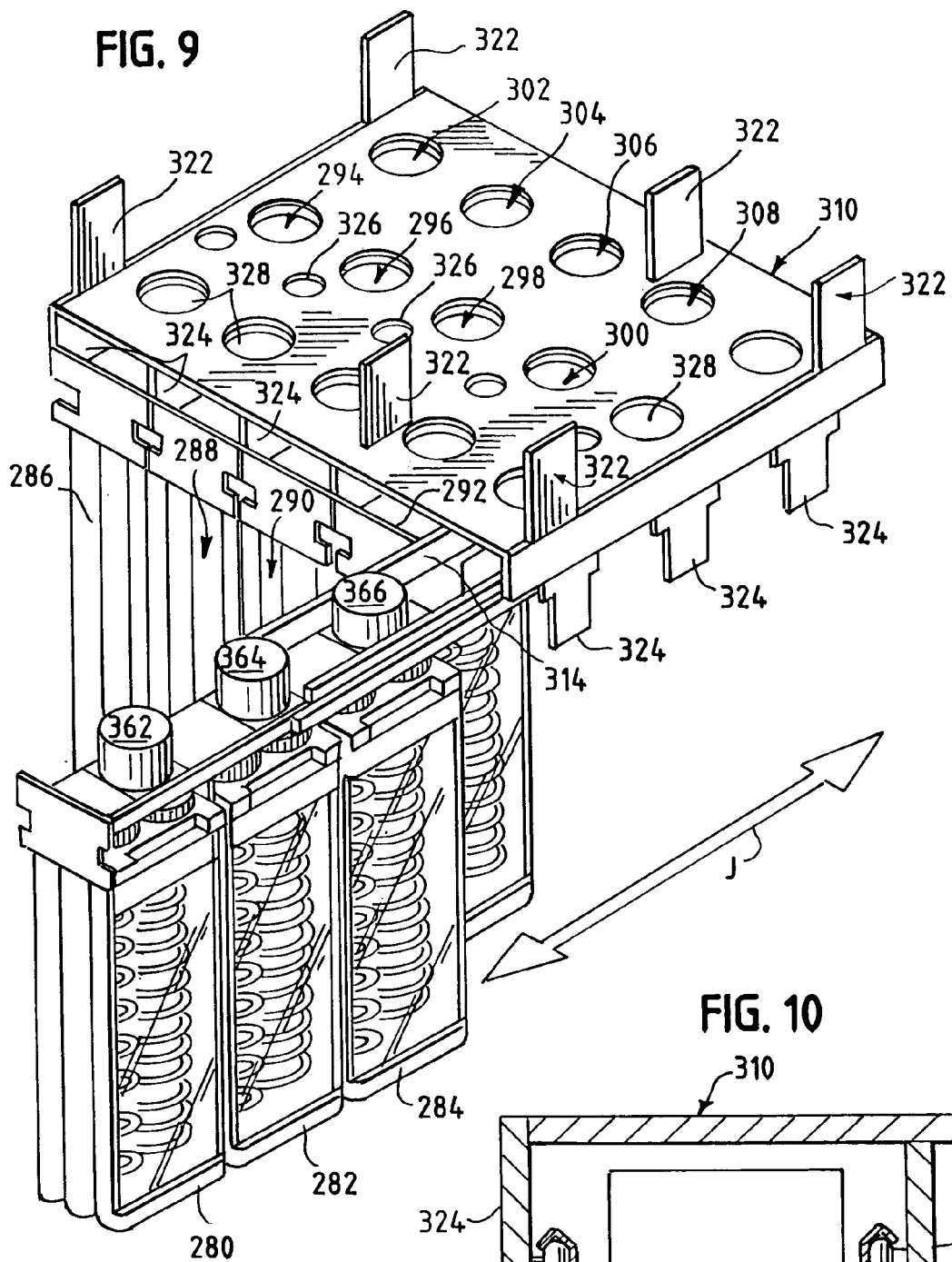
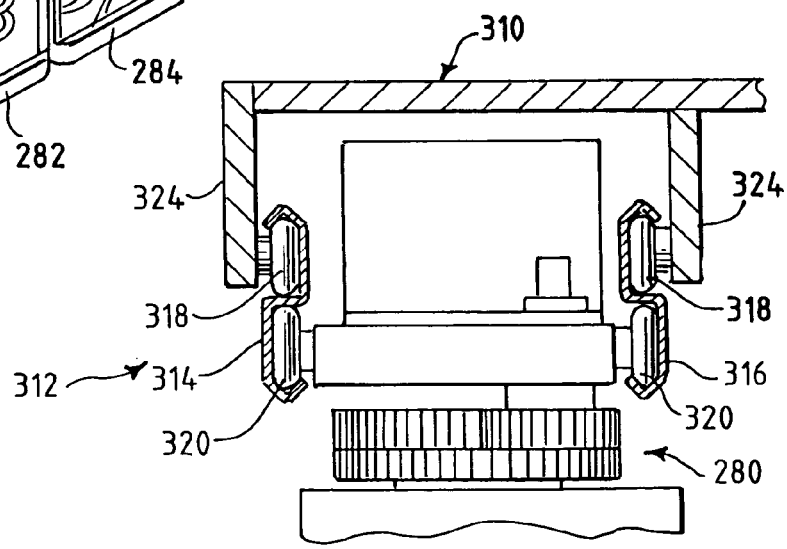

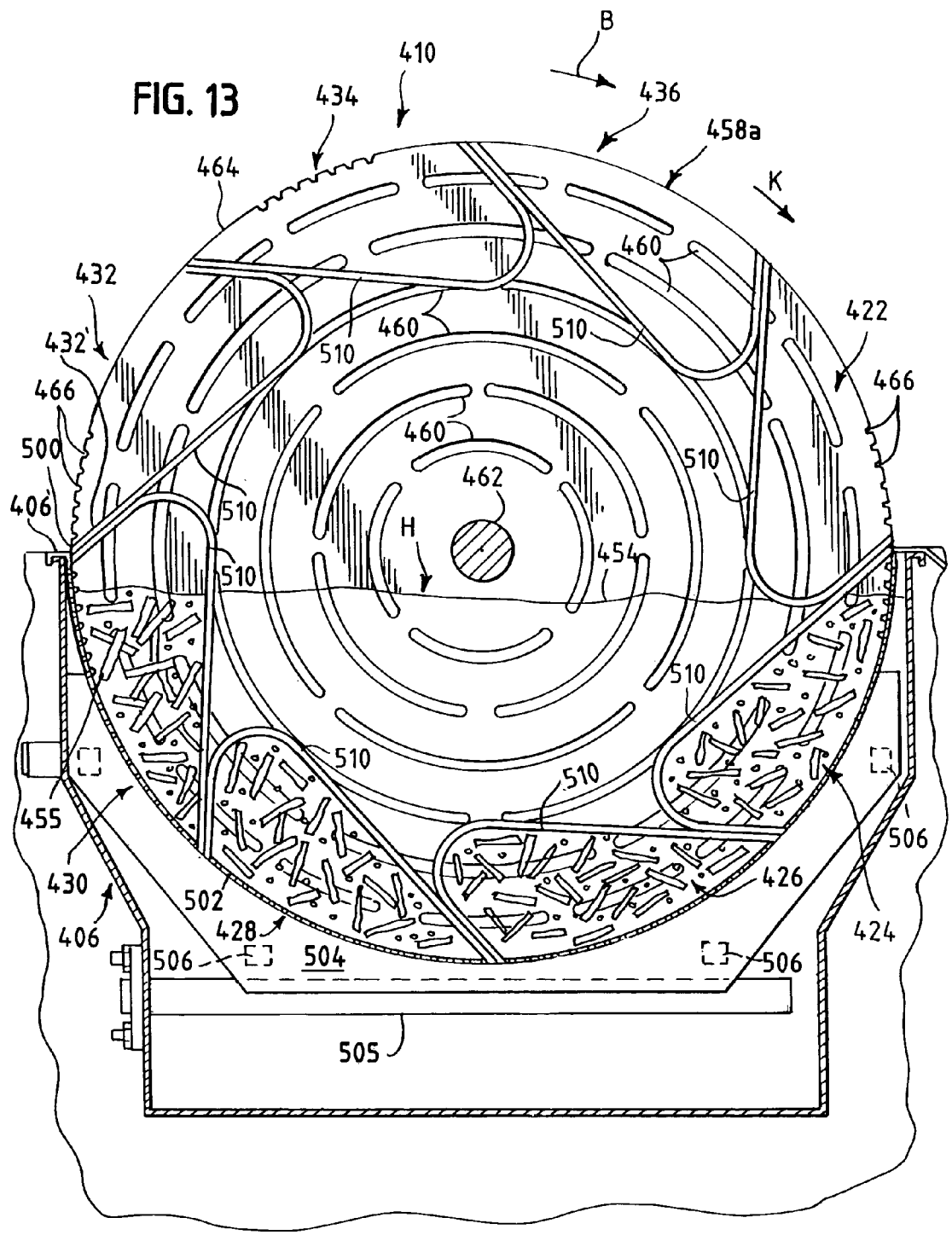

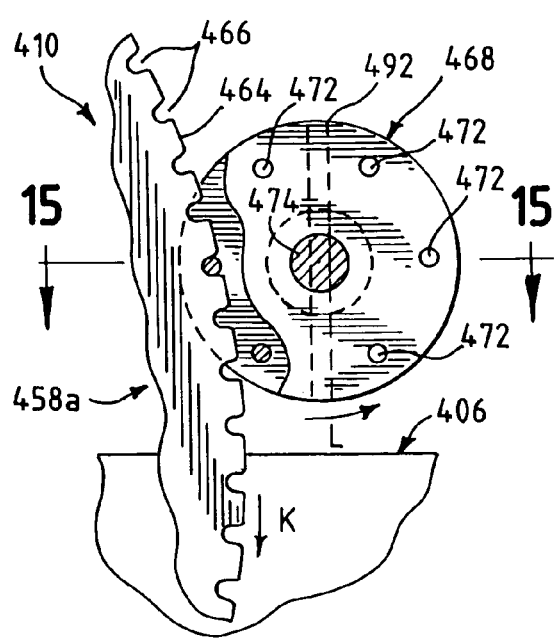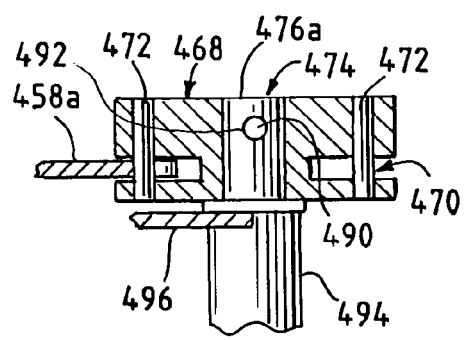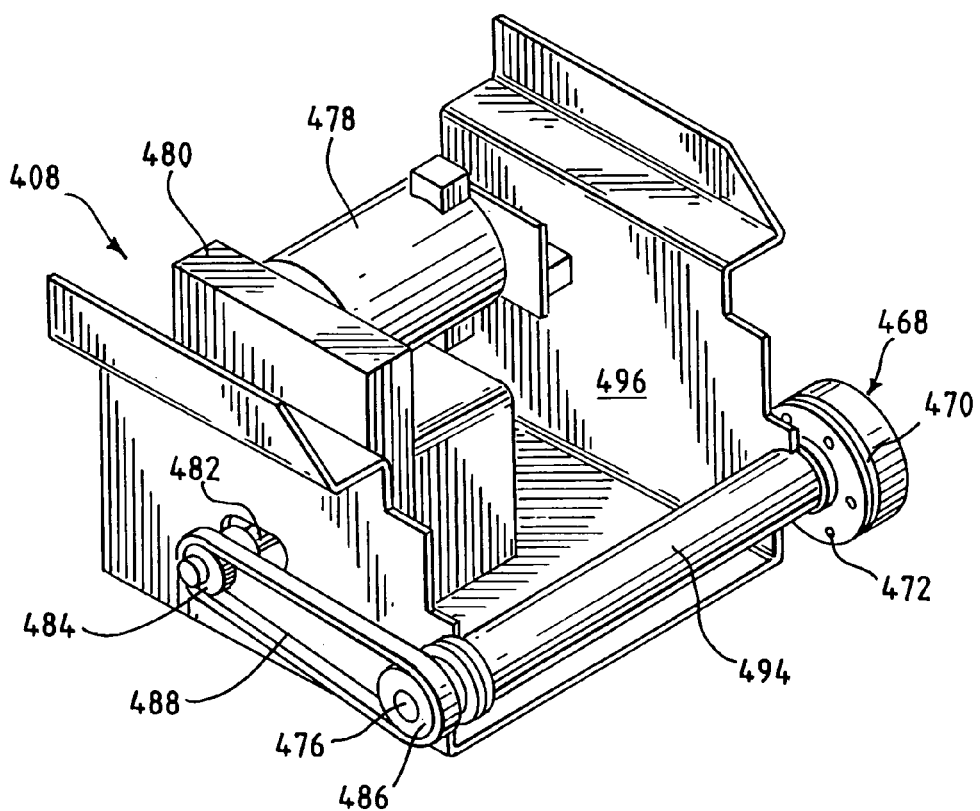

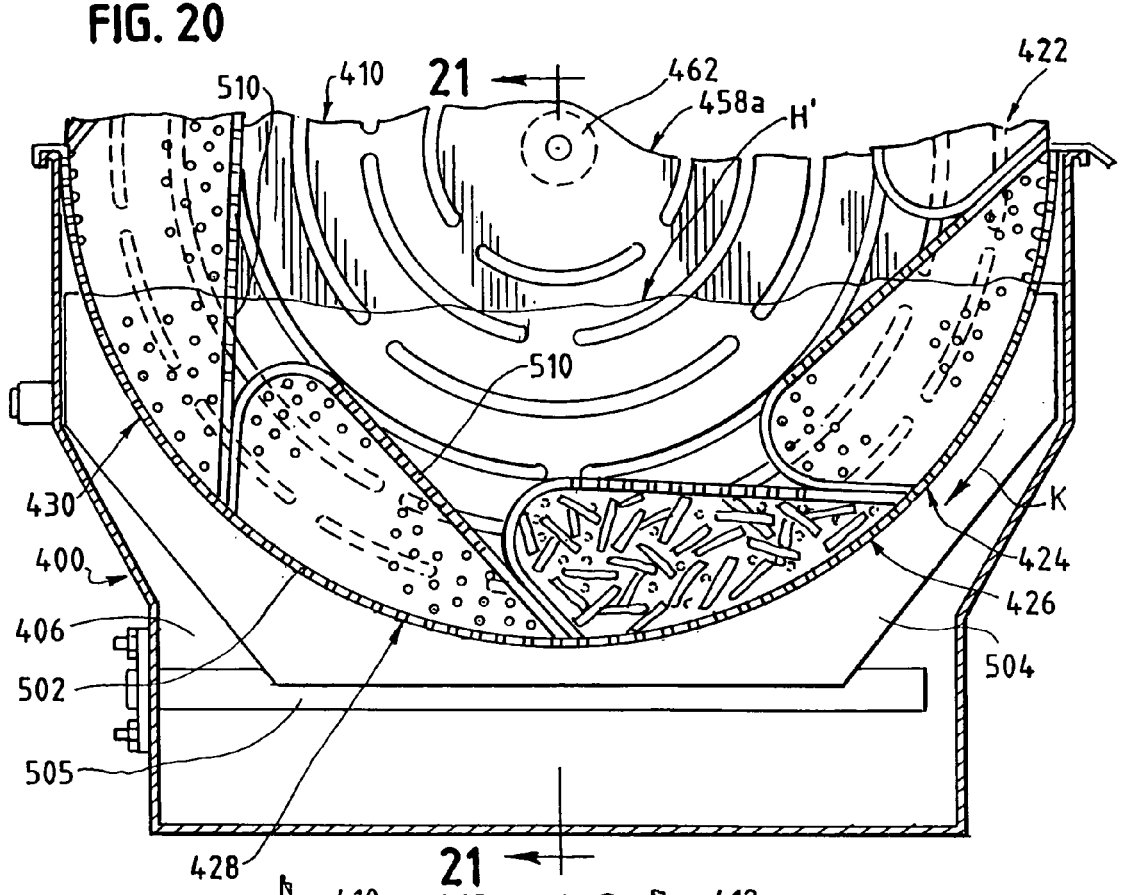
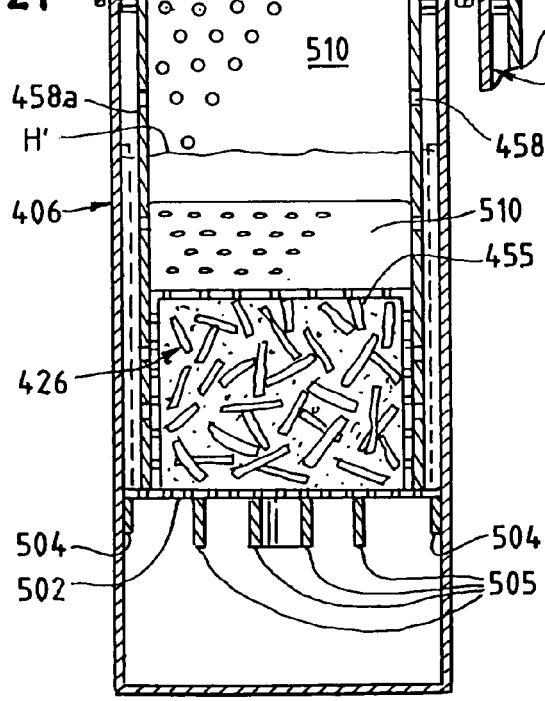
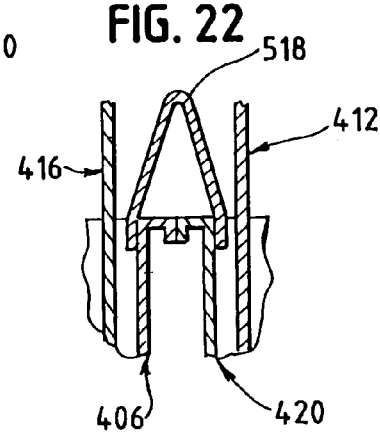

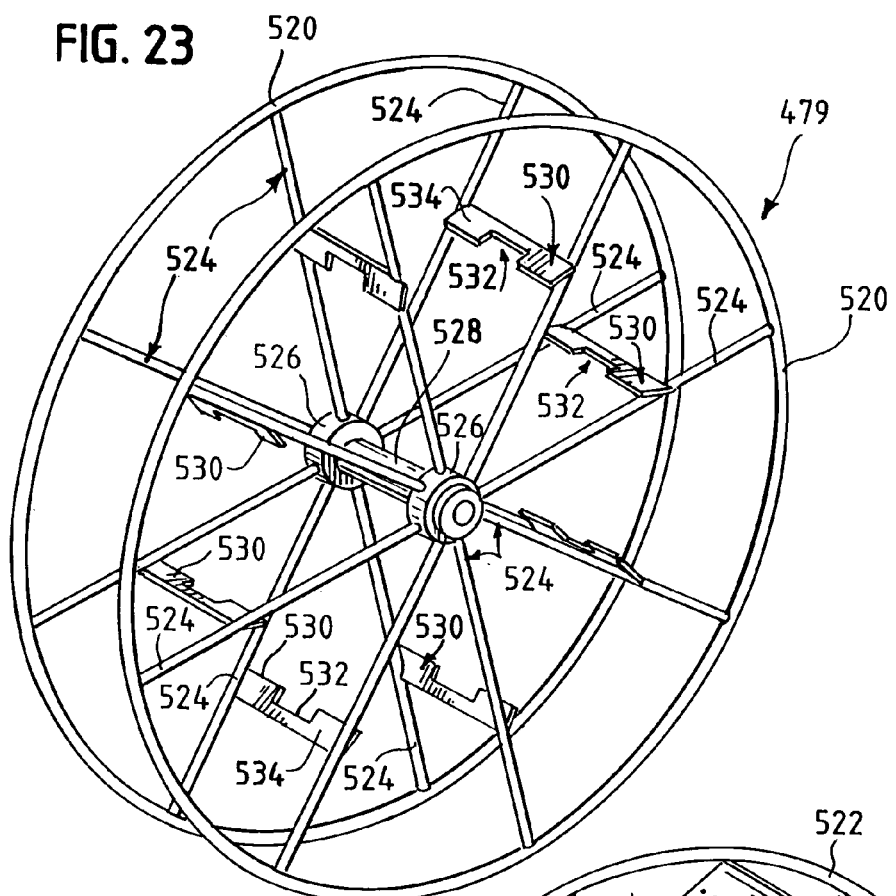
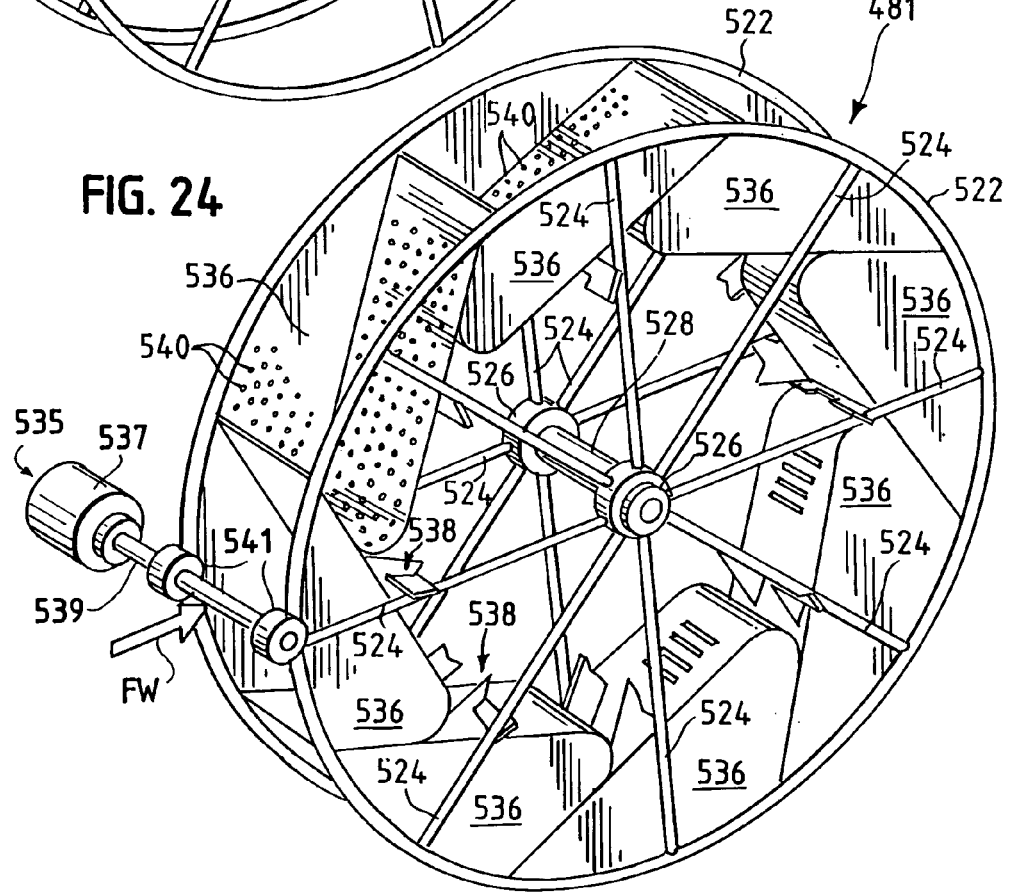

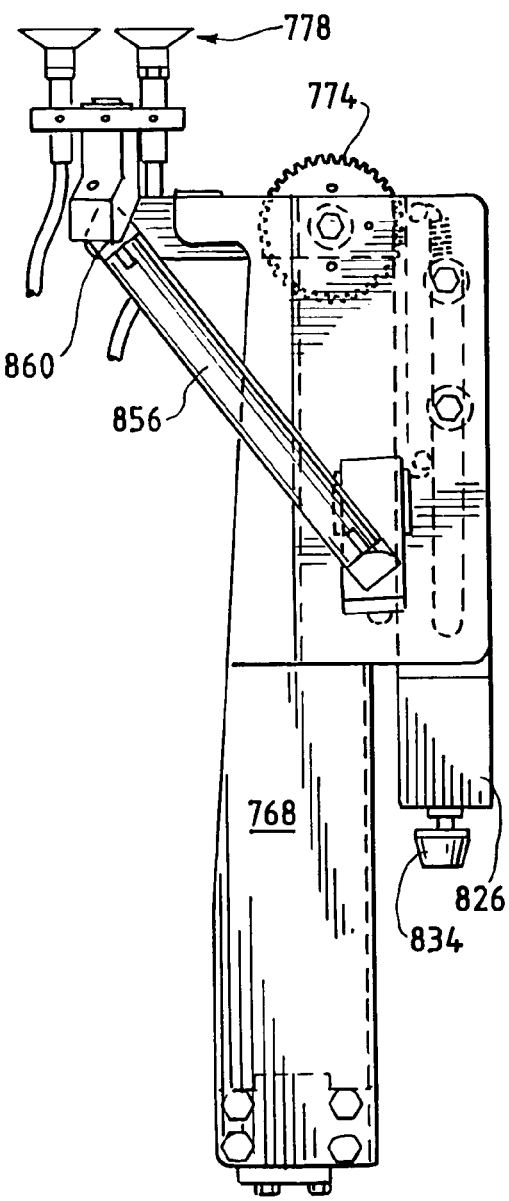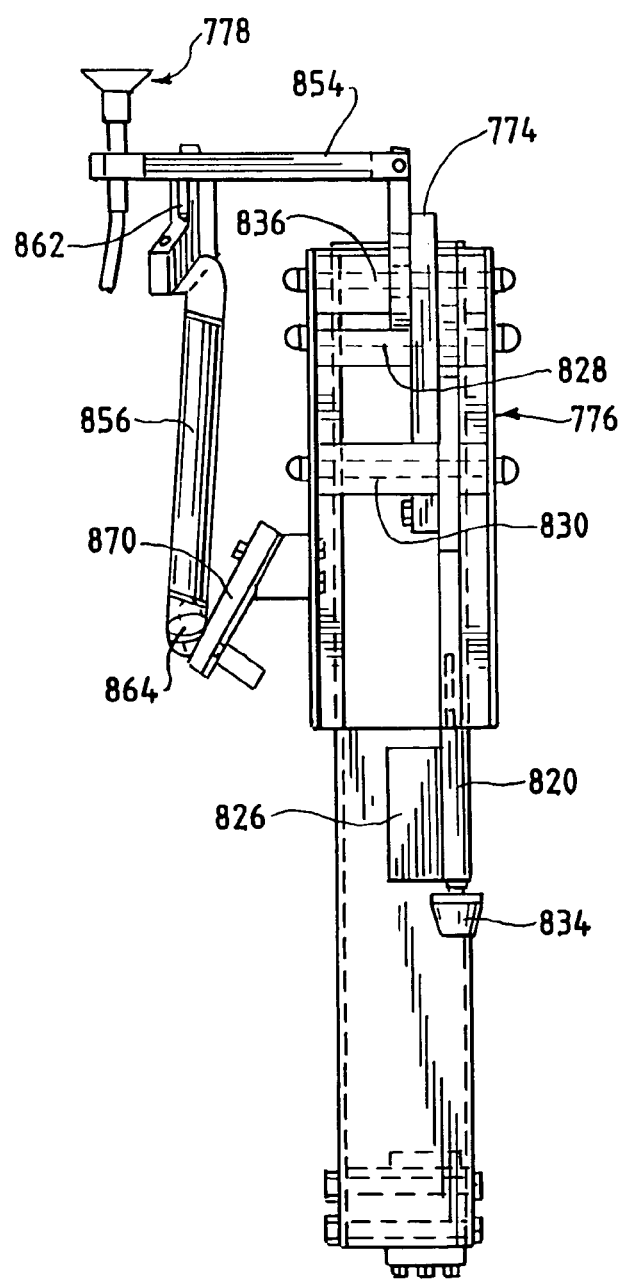

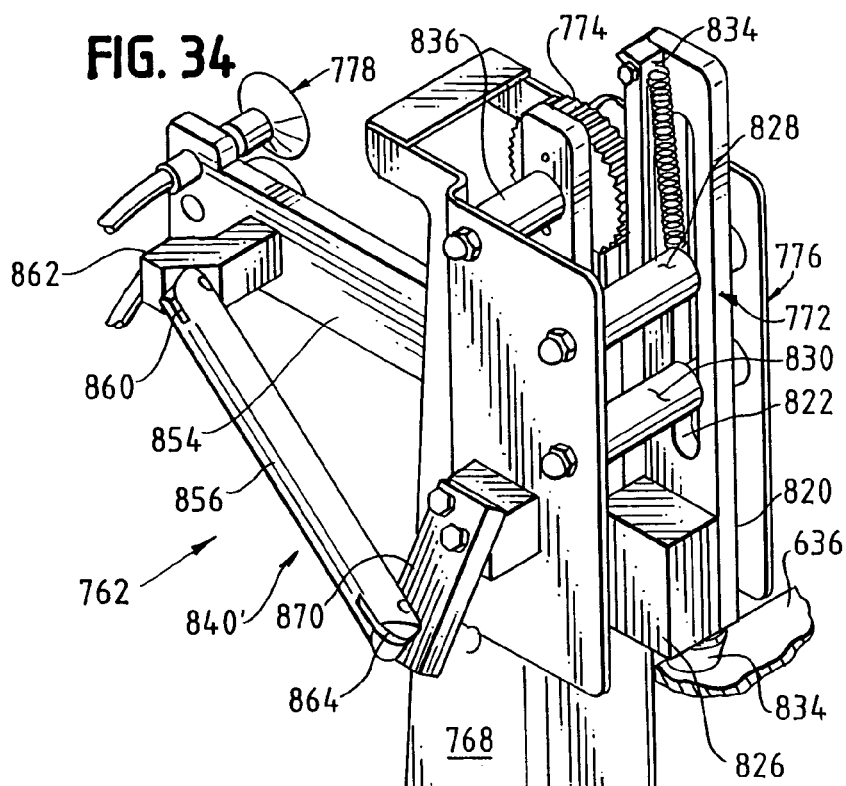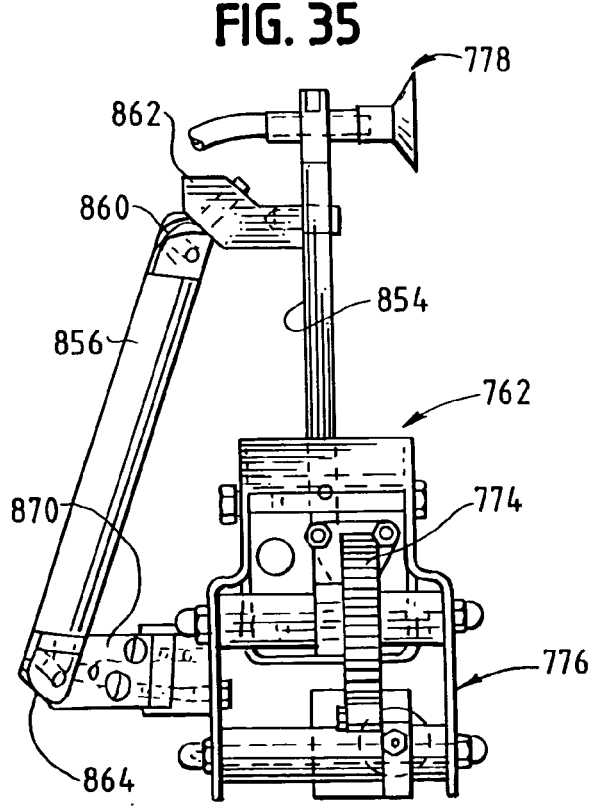

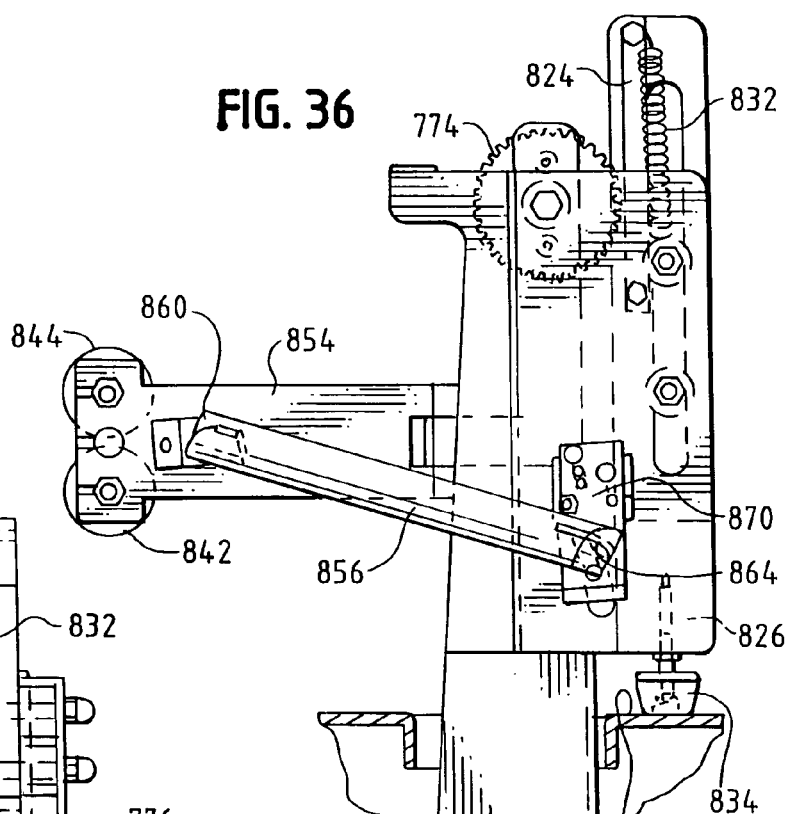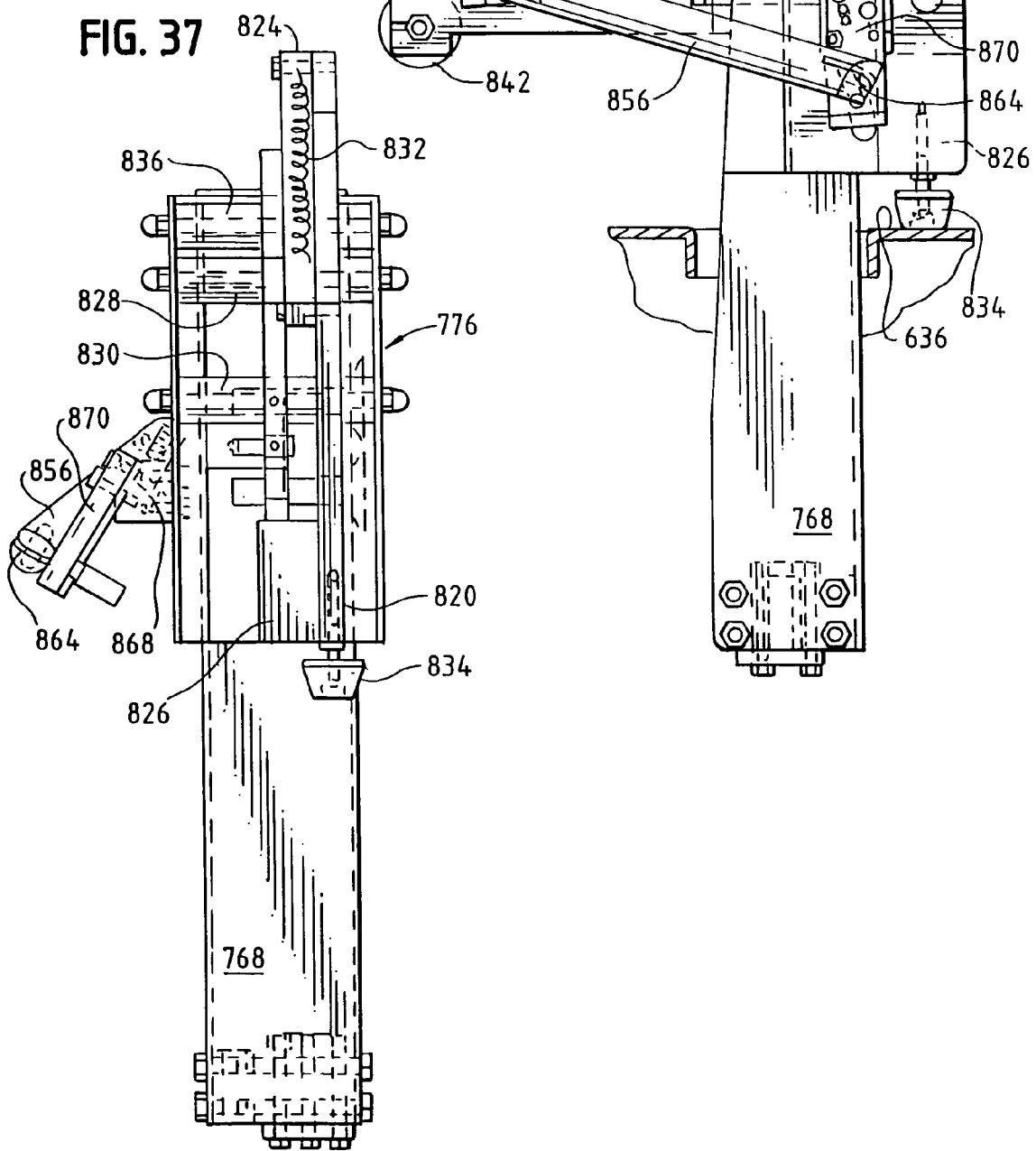

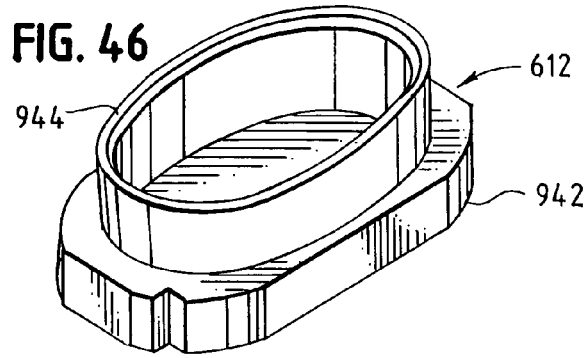
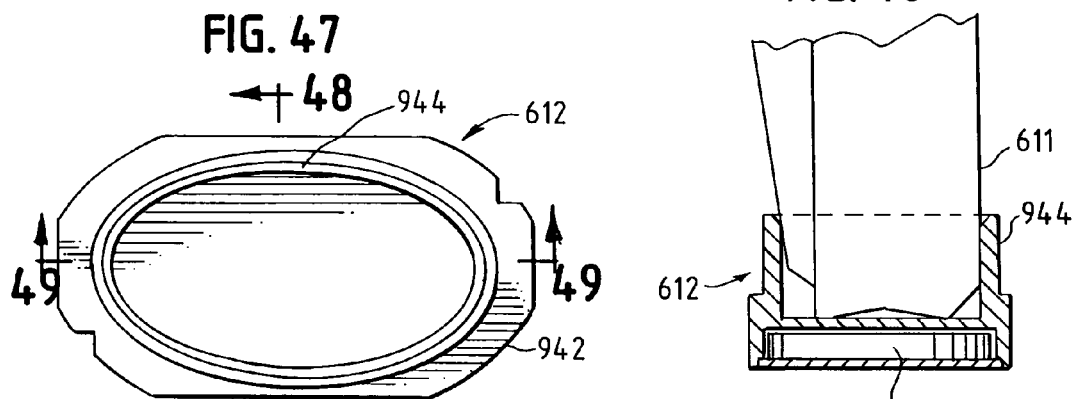
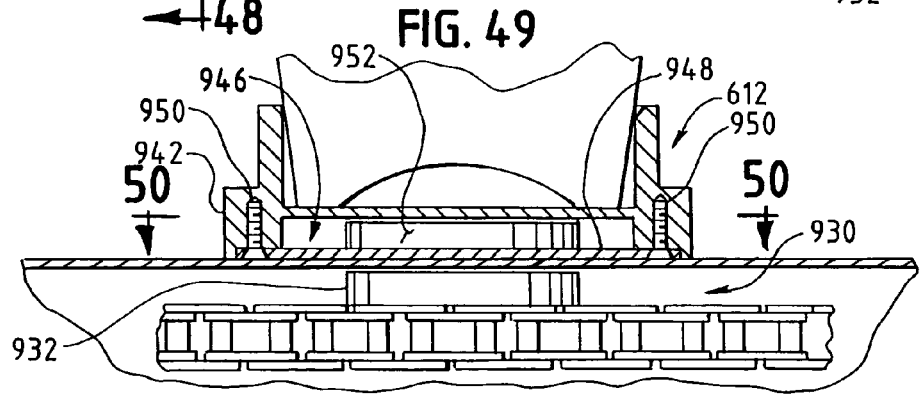
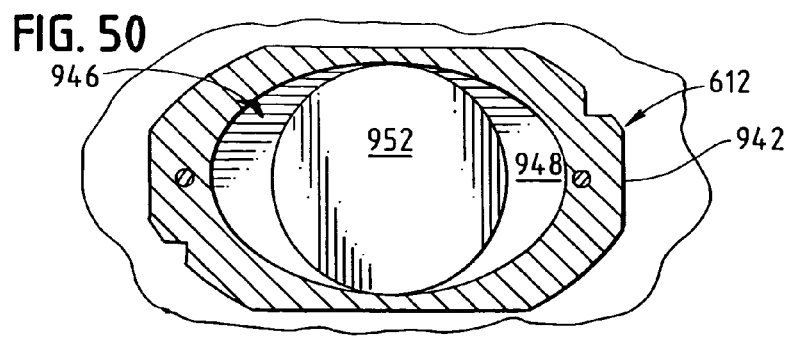

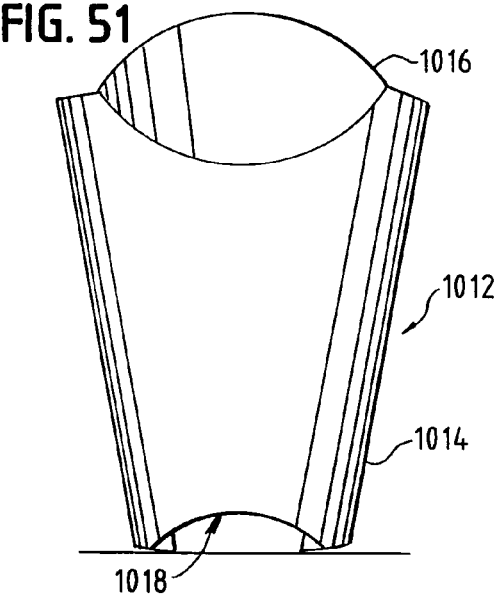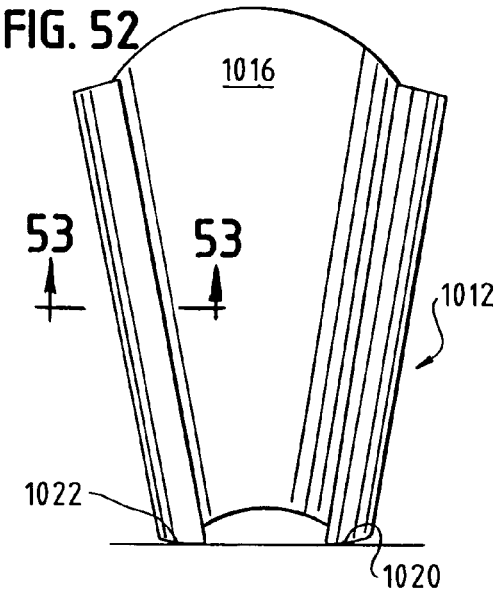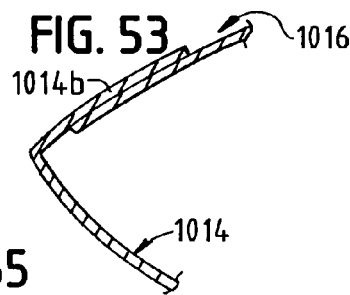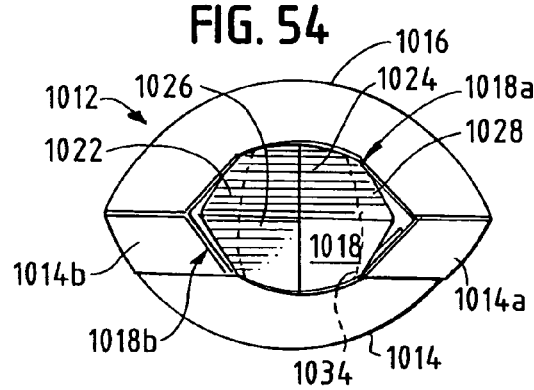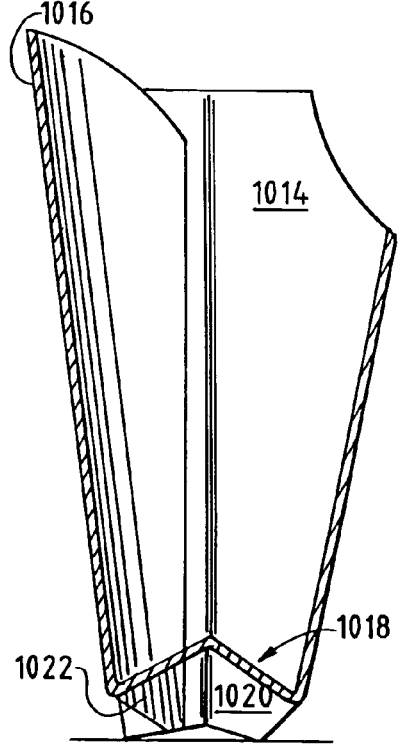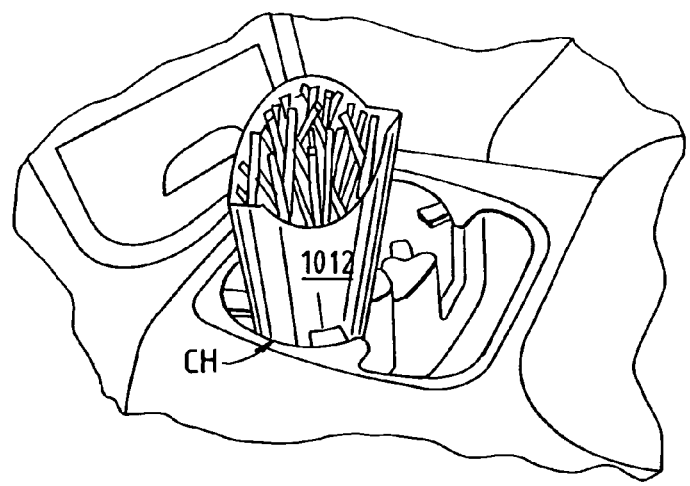

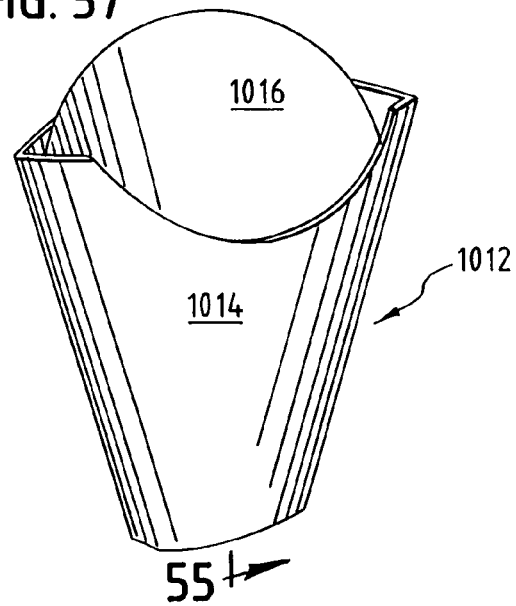
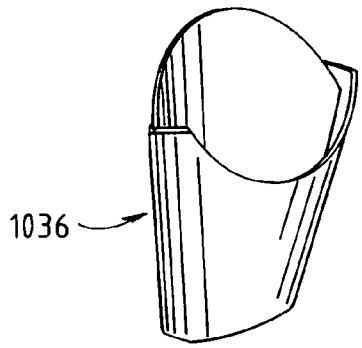
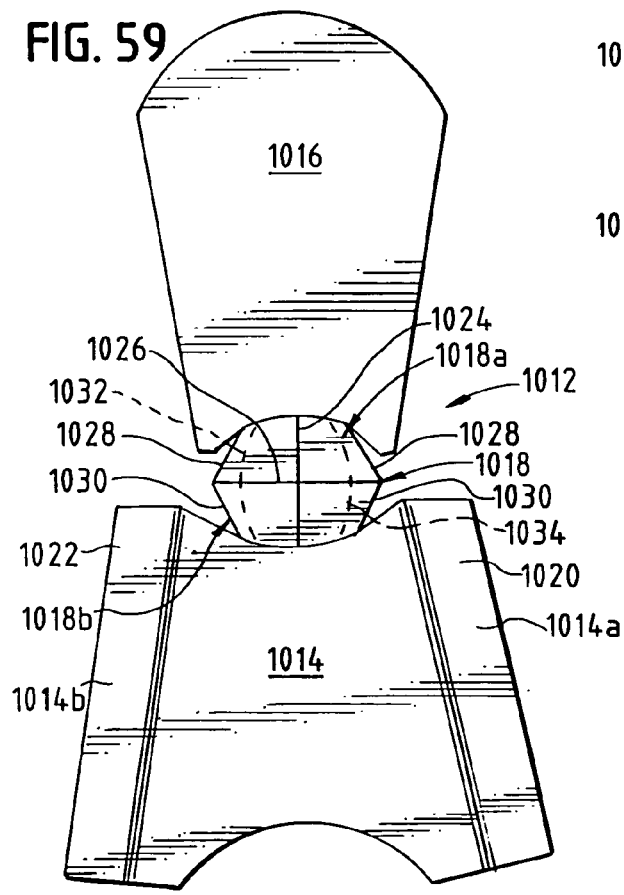
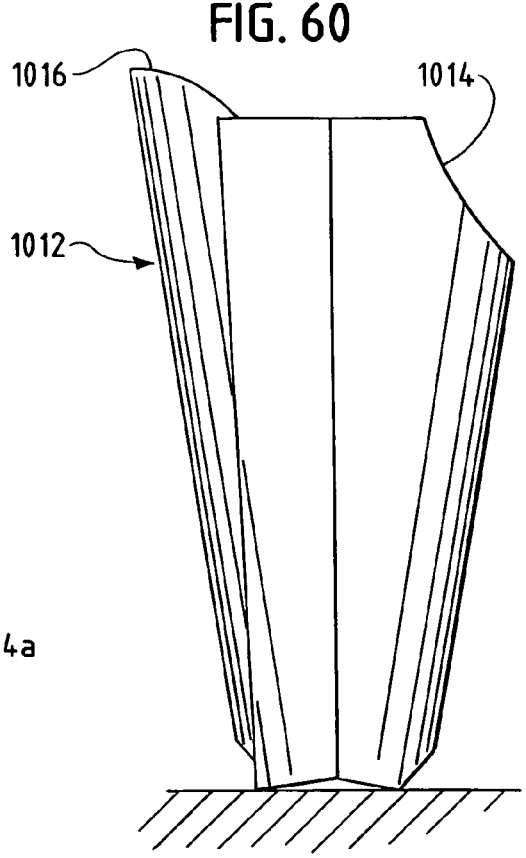

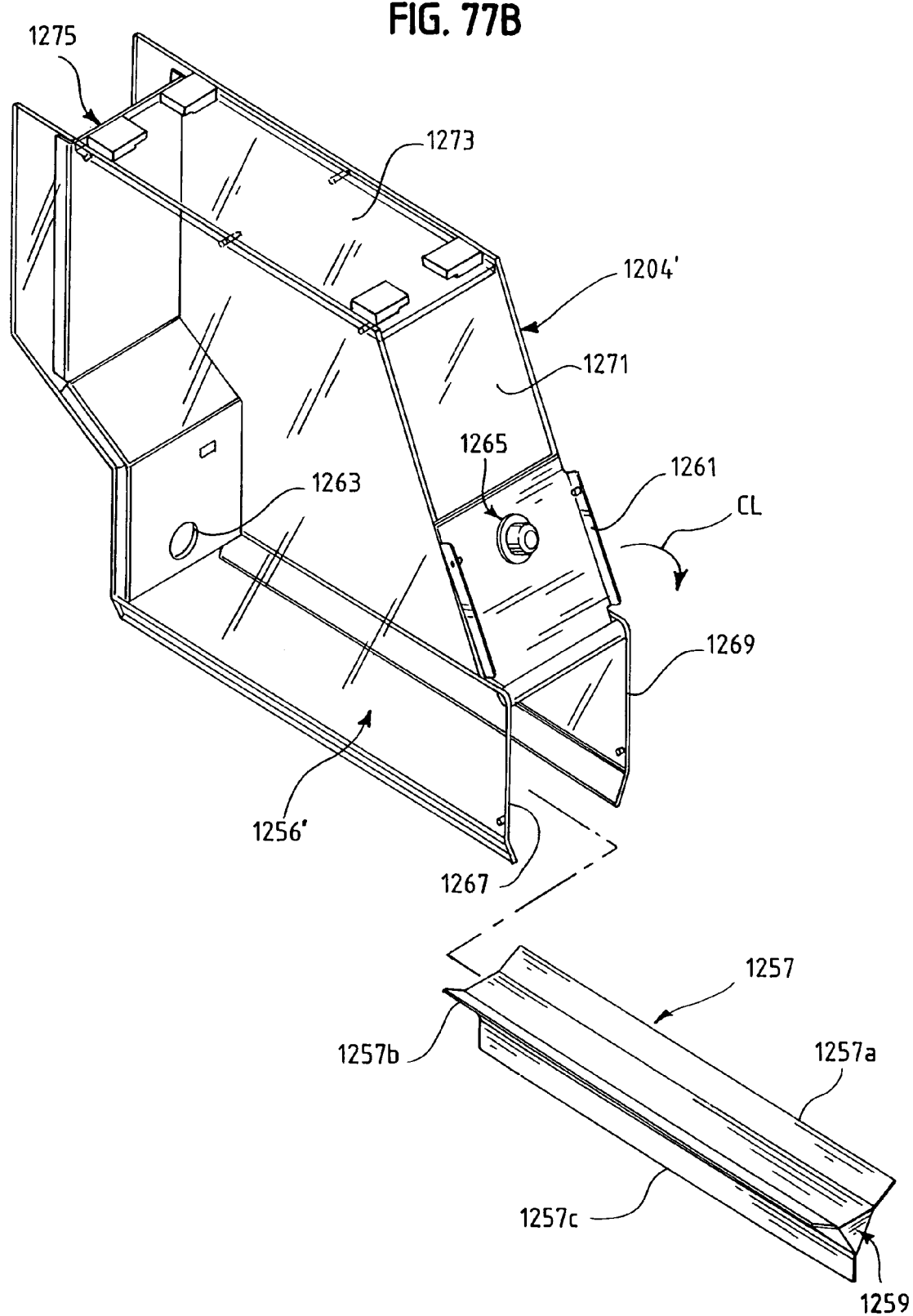

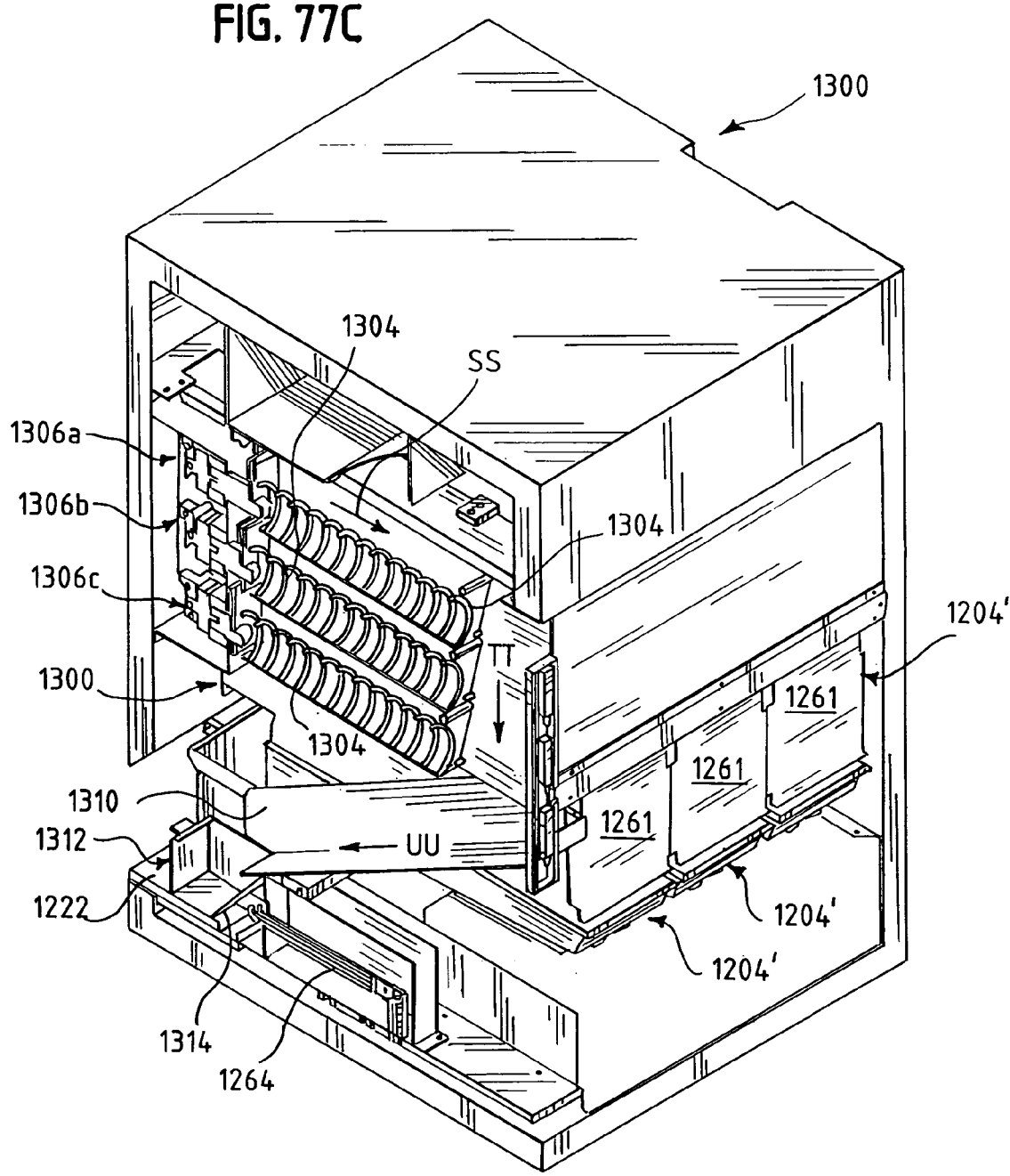

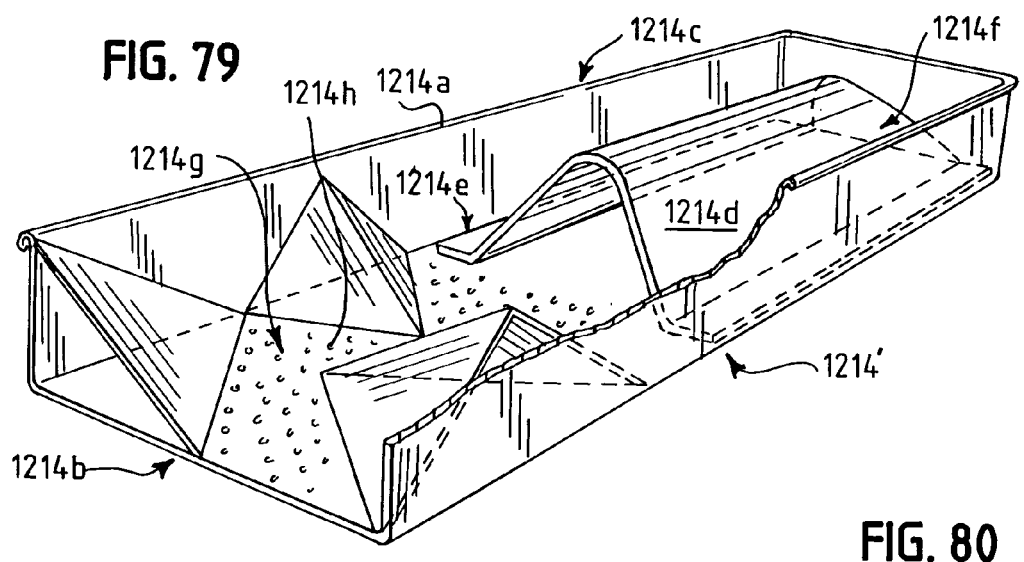
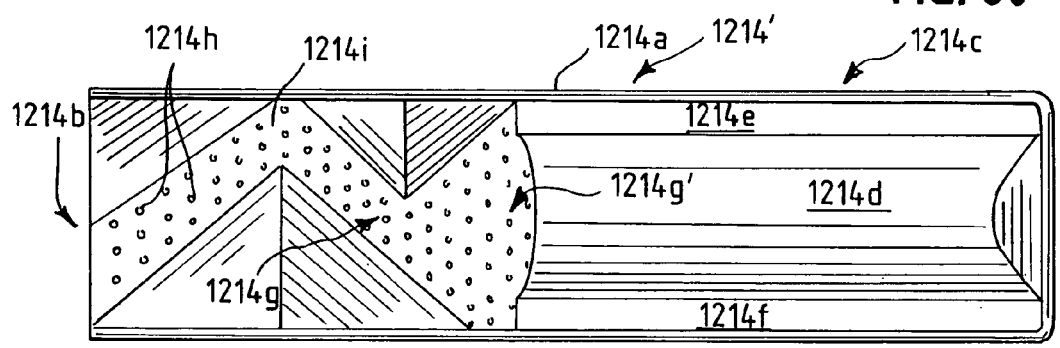
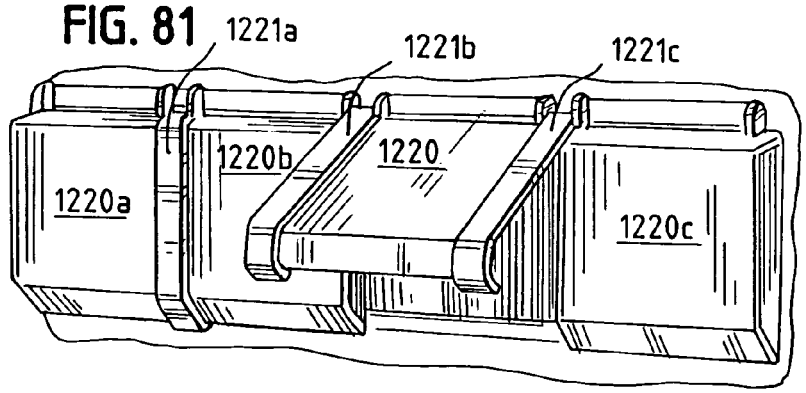
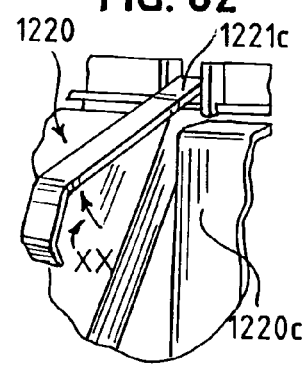
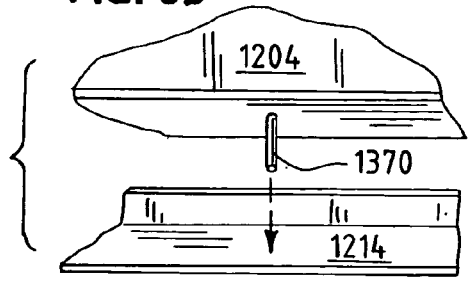
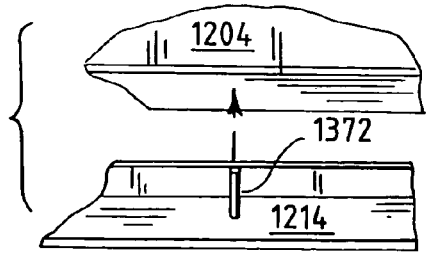

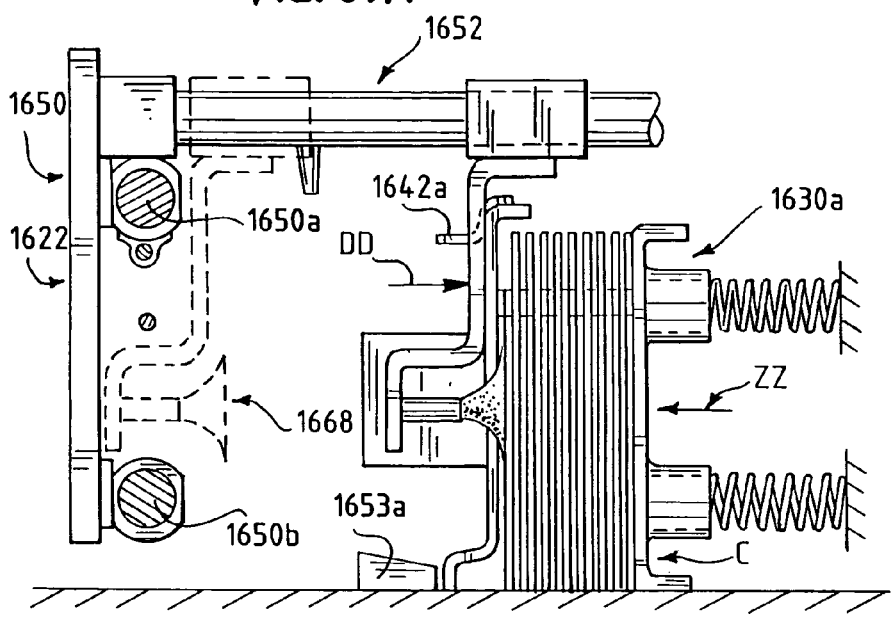
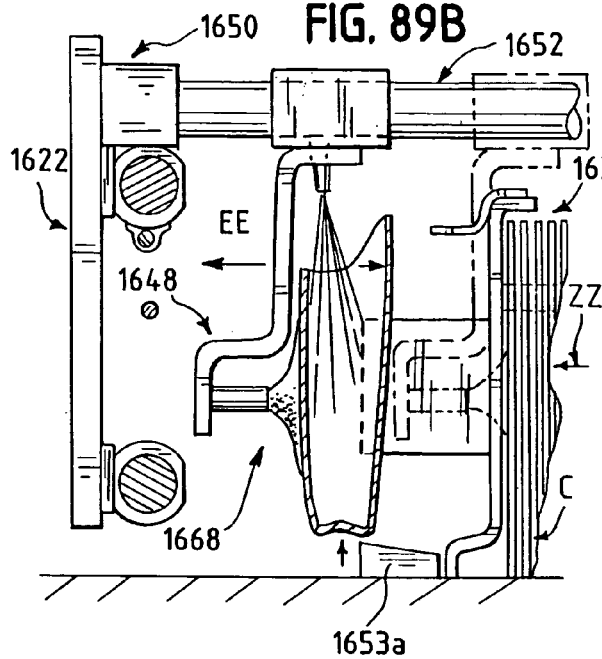
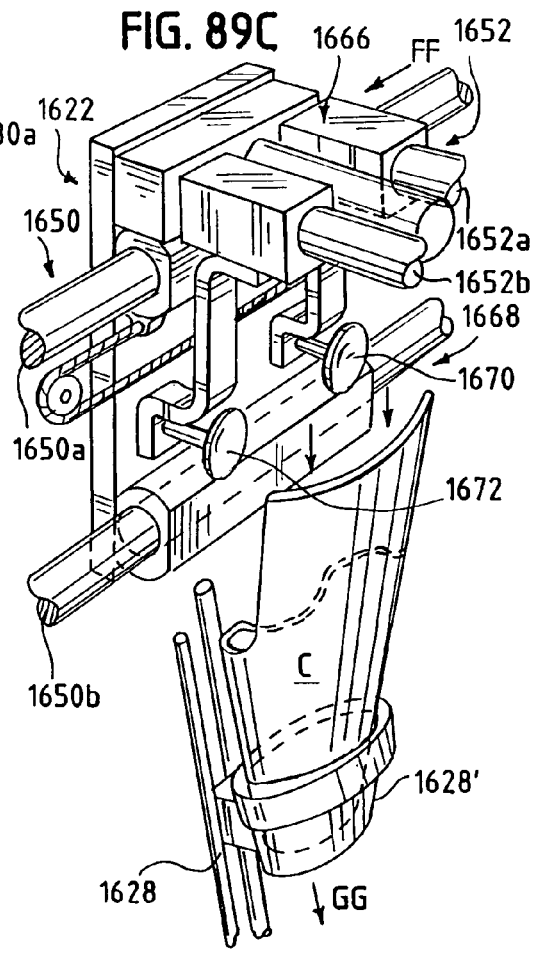

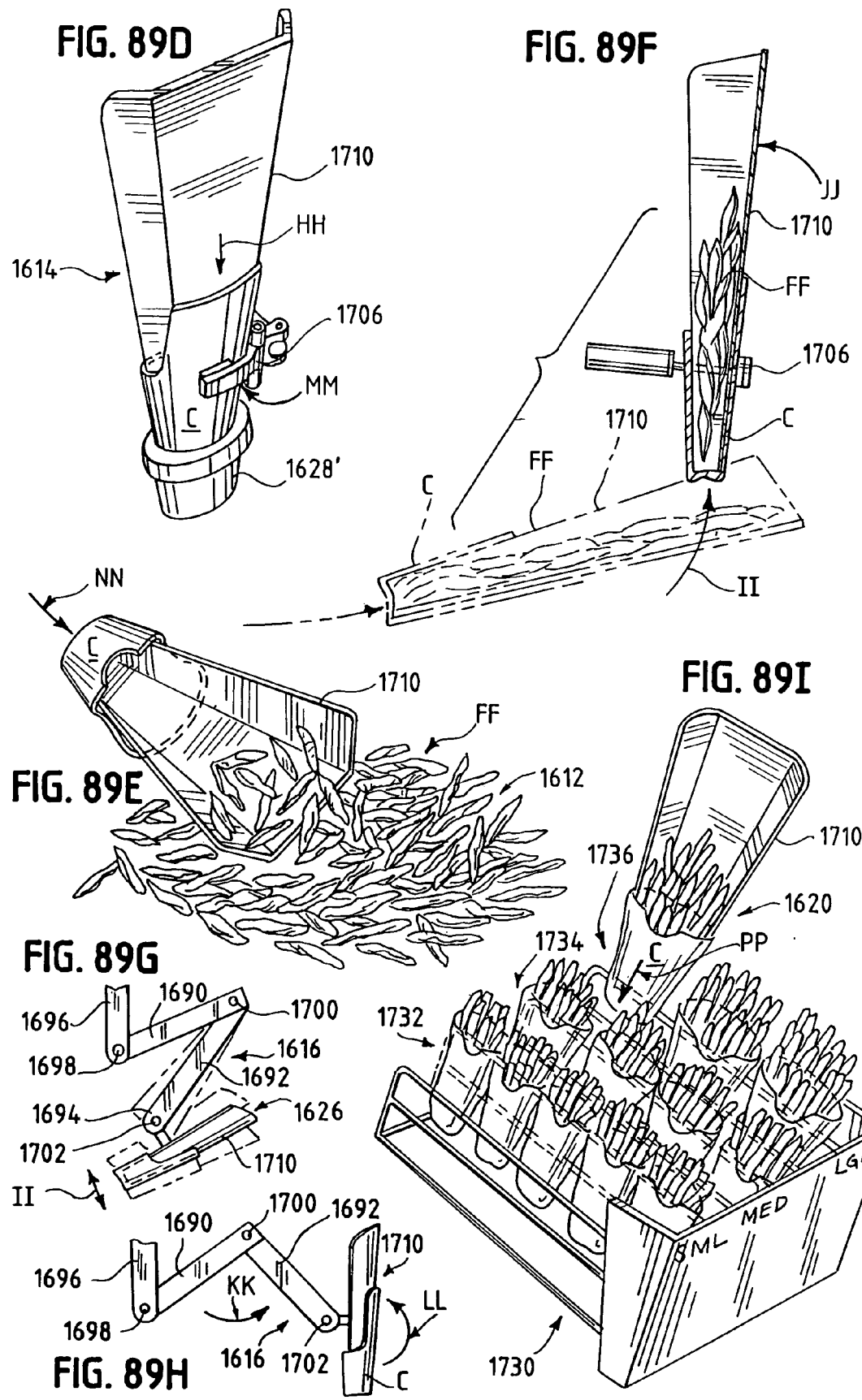

AUTOMATED FOOD PROCESSING SYSTEM AND METHOD

CROSS-REFERENCE TO RELATED APPLICATIONS

This application is a continuation-in-part of U.S. application Ser. No. 10/127,202, now pending, Ser. No. 10/127,203, issued on Mar. 22, 2005 as U.S. Pat. No. 6,869,633, Ser. No. 10/127,309, issued on Nov. 1, 2005 as U.S. Pat. No. 6,960,157, Ser. No. 10/127,311, now abandoned, Ser. No. 10/127,369, Ser. No. 10/127,390, now abandoned, Ser. No. 10/127,398, issued on Mar. 29, 2005 as U.S. Pat. No. 6,871,676, and Ser. No. 10/127,400, now pending, all the prior applications having been filed on Apr. 22, 2002.

FIELD OF THE INVENTION

The invention relates to automated food processing. More particularly, the invention relates to automated food dispensing, frying and packaging into individual portion-sized containers such as at a quick-service type restaurant.

BACKGROUND OF THE INVENTION

In restaurants, especially quick service (fast food) restaurants, fast, consistent, efficient and safe food preparation is essential for a successful operation. The quality of the prepared food depends in large part on the consistency of food preparation. The food must be cooked under correct conditions for the proper time.

Consistency in food preparation can vary as a result of many factors. For example, people engaged in food preparation often must perform multiple tasks at frequencies that vary with time because of constantly varying customer demand throughout the day. For example, lunchtime and dinnertime may be extremely busy while other periods may be relatively slow. The product mix can vary from hour to hour and day to day. As a result, the consistency and quality of food may vary. Difficulties in proper scheduling of food production during peak and non-peak periods can cause customer delays and/or stale, wasted or unusable food.

Food preparation can be labor intensive, and thus, the labor cost can be a large portion of the total cost of the prepared food. An additional problem is that in sparsely populated and other areas where quick service restaurants are located, such as along interstate highways, for example, recruiting sufficient numbers of suitable employees is difficult.

Quick service restaurants must be able to effectively meet a variable customer demand that is time dependent and not subject to precise prediction. As a result, stores relying totally on human operators will at times be overstaffed and at other times be under-staffed. Also, problems and potential problems can exist in restaurants where people directly prepare food. Health and safety concerns can also be present where food is prepared directly by people. By reducing or minimizing human contact with food and food cooking equipment, health and safety concerns can also be reduced or minimized. For example, in the frying of foods, some type of hot fluid, such as cooking oil or shortening must be utilized. The cooking temperatures required can present a concern for health and safety.

Although quick service restaurants have existed for many years and now number in the tens of thousands, such establishments utilize manual labor to prepare and process food. While there have been various improvements in commercial equipment used for cooking food in quick service restaurants, such restaurants are believed to be substantially all manually operated and relatively labor intensive.

Accordingly, a need exists for an automated, commercially suitable food dispensing, cooking and packaging device, system and method for fried foods that can be operated with a minimum of human intervention, control and maintenance. More particularly, a need exists for an automated device, system and method that is capable of, without human labor, frying various food products in desired quantities, such as French fries, seasoning the cooked food and packaging the cooked food in individual portion-sized containers.

SUMMARY OF THE INVENTION

In accordance with the present invention, an automated food processing system and method is provided. The automated food processing system and method in accordance with the invention allows food to be dispensed, fried and packaged in a suitable container or alternatively dispensed to a food holding area for subsequent processing by a human operator.

In accordance with one aspect of the present invention, an automated module system for dispensing, frying and packaging food into individual portion-sized containers is provided. In one embodiment, any suitable automated dispensing device can be used. In another embodiment, the system includes an automated dispensing module capable of dispensing a desired quantity of food to be fried, an automated fry module adjacent the dispensing module to receive and fry the quantity of food dispensed from the dispensing module and to produce and dispense a quantity of fried food and an automated packaging module adjacent the fry module to receive and package the fried food from the fry module into an individual portion-sized container.

Advantageously, in one embodiment, the three modules are independent from each other and can be operated independently. Plus, in one embodiment, any one of the modules can be deactivated and a human operator can manually perform the function of the deactivated module with manually operated equipment.

In accordance with another aspect of the invention, optionally an automated seasoning device is present to apply seasoning to the food.

Typically, the automated dispensing module in accordance with the invention in one embodiment is capable of dispensing one or more of uncooked or unheated French fries, chicken nuggets, hash browns, chicken patties and fish filets or similar types of food items to be cooked and/or heated.

In accordance with another aspect of the invention, the automated dispensing module includes a freezer, a storage container located in the freezer for containing food to be dispensed, structure for dispensing a predetermined quantity of food from the storage container into a secondary or dump container, with the structure for dispensing and the secondary or dump container being located in the freezer, and structure for dispensing the quantity of food from the secondary or dump container to a location outside of the freezer.

In accordance with another aspect of the present invention, the fry module of the automated modular system includes a fry vat for containing and heating cooking oil, at least one circular fry wheel having a generally circular perimeter in a plurality of compartments, each compartment having an opening towards the perimeter, the fry wheel mounted for rotational movement relative to the radial axis of the fry wheel, which radial axis is disposed above the normal operating level of the frying oil or the cooking oil in the fry vat. A drive mechanism is provided for rotating the fry wheel. In one aspect of the invention, any suitable type of automated fry device can be utilized.

In accordance with another aspect of the present invention, a control system is provided for causing the drive mechanism to periodically rotate the fry wheel back and forth through a relatively small amount of angular rotation (such as about 2-10°, for example) to simulate shaking of a fry basket. Such control can be accomplished electronically by devices known to those skilled in the art.

In another embodiment, food is delivered from the fry module to a cooked food holding device, which can comprise a heated holding bin or bins.

In accordance with still another aspect of the present invention, the automated packaging module includes a rotatable food dispensing member having an inlet location to receive a quantity of cooked food at a discharge location to discharge cooked food, the packaging module also including a food dispensing chute position to receive cooked food from the discharge location of the rotatable food dispenser, the food dispensing chute having a discharge location.

In accordance with another embodiment of the invention, the automated modular system further includes a carton holding device for holding the individual portion-sized carton or container in position to receive food from the discharge location of the dispensing chute. The packaging module may further include a rotatable food collecting member disposed to collect food from the discharge location of a dispensing chute that is not deposited into the individual portion-sized food container. The so collected food may be subsequently deposited into the food dispensing chute for delivery to a container or alternatively to the rotatable food dispensing member or to a waste receptacle or chute.

In accordance with another aspect of the invention, the automated packaging device includes a conveyor system for transporting filled individual portion-sized food containers from adjacent the filling location to a filled food container holding area, for subsequent pick-up by a human operator, for example. In one embodiment, any suitable automated packaging device can be utilized.

In accordance with another aspect of the present invention, an automated food carton-retrieving device is provided for retrieving and grasping individual portion-sized food containers. The automated retrieving device comprises a movable member for selectively grasping and releasing the food container. In one embodiment, the retrieving device is capable of grasping and releasing an unerected food container on one side and the device further includes a second device for selectively grasping the unerected food container on the other side with structure for moving the retrieving device and the second device relatively apart when grasping the sides of the container to erect or partially erect the container.

In another embodiment, an automated urging structure is provided for urging the container bottom upwardly relative to the sides of the container when the sides of the container are moved relatively apart.

In accordance with another aspect of the invention, the automated modular system includes an electronic control system that receives current customer order information and the electronic control system causes the selection of a container from a plurality of different container sizes and further causes filling of food with the size of food container in response to a customer order. In one aspect, the electronic control system can receive customer order information and controls the dispensing rate of food dispensed from the food dispensing module to the fry module which dispensing automatically determines the amount of food being fried without further intervention by the electronic control. In one aspect, the control system can include a separate control system for each of the dispensing, fry and packaging systems or modules, each of which interface with a central control system, which in turn optionally interfaces with a POS (point-of-sale) system.

In accordance with another aspect of the invention, the automated modular system is suitable for dispensing, frying and packaging French fries into individual portion-sized containers.

In accordance with another aspect of the present invention, an automated method of dispensing, frying and packaging food into individual portion-sized containers is provided that includes dispensing a desired quantity portion of food to be fried from an automated dispensing module to an automated fry module and thereafter frying the portion of food dispensed from the dispensing module in the automated fry module adjacent the dispensing module to produce a quantity of fried food. Thereafter, the quantity of fried food is dispensed from the fry module to a packaging module where the fried food dispensed from the fry module is packaged into individual portion-sized containers with an automated packaging module.

In another aspect of the invention, the automated method further comprises seasoning the quantity of fried food with a seasoning device.

In accordance with another aspect of the invention, the dispensing includes dispensing a predetermined quantity of food from the storage container into a secondary container located in a freezer and dispensing the quantity of food from the secondary container to a location outside of the freezer.

In accordance with another aspect of the method of the present invention, the frying comprises a rotating fry wheel having at least a generally circular perimeter and a plurality of compartments, each compartment having an opening towards the perimeter, the food being contained in at least one of the compartments during the frying, the fry wheel being mounted for rotational movement relative to the radial axis of the fry wheel in a fry vat with the radial axis being disposed above a normal operating level of the cooking oil in the fry vat. In accordance with this aspect of the invention, the automated method further includes containing a drive mechanism to periodically rotate the fry wheel back and forth through a relatively small amount of angular rotation to simulate shaking of a fry basket during frying.

In accordance with another aspect of the invention, the packaging includes rotating a rotatable food dispensing member having an inlet location to receive a quantity of cooked food in a discharge location to discharge cooked food, the food dispensing member being rotated to dispense food into a food dispensing chute position to receive cooked food from the discharge location of the rotatable food dispenser and thereafter dispensing said food from the dispensing chute to a container to be filled.

In accordance with another aspect of the invention, the method further includes holding an individual portion-sized carton or container positioned to receive food from the dispensing chute with an automated carton holding device.

In accordance with still another aspect of the invention, the method further includes collecting food dispensed from the discharge location of the dispensing chute that is not deposited into the individual portion-sized food container with a rotatable food collecting member disposed to collect such not deposited food.

In accordance with another aspect of the method, the method includes electronically coordinating the operation of the three modules or devices within an electronic control system. In one embodiment, the method further includes electronically receiving current customer order information by the electronic control system which causes selection of a container from a plurality of different sized containers and filling the container with food of the ordered size of food container in response to a customer order by the packaging module. In accordance with another aspect of the method, customer order information is electronically received and the dispensing rate of food dispensed from the food dispensing module to the fry module is controlled, which dispensing automatically determines the amount food being fried without further intervention by the electronic control system.

In accordance with another aspect of the present invention, an automated dispensing device for dispensing a quantity of food to be subsequently cooked is provided. In one embodiment, the automated dispensing device includes a freezer or refrigerated compartment, a storage container located in the freezer for containing food to be dispensed, structure for dispensing a predetermined quantity of food from the storage container into a secondary or dump container, the structure for dispensing the predetermined quantity of food being located in the freezer, and structure is provided for dispensing the quantity of food from the secondary or dump container in the freezer to a location outside of the freezer.

In one embodiment, the structure for dispensing a predetermined quantity of food includes a vibratory conveyor typically located in the freezer below the storage container. The structure for dispensing may further include a device for determining or sensing the quantity of food that has been deposited in the secondary container and structure is provided for terminating the operation of the structure for dispensing when a predetermined quantity of food is sensed in the secondary container.

In accordance with another aspect of the present invention, the secondary container has a bottom that is at least partially open and the secondary container is movable laterally between a filling position located within the freezer and a dispensing position for dispensing food through the container open bottom and out of the freezer. The secondary container may include a floor member that is located below the container having the at least partially open bottom. The floor member and the container are movable relative to each other between the first and second positions wherein in the first position the floor member is adjacent the open bottom and prevents food from being dispensed from the container and when in the second position food is free to fall through the open bottom of the container.

In one embodiment, a device for determining the quantity of food located in the second container is provided with structure for terminating the operation of the structure for dispensing food into the second container when a predetermined quantity of food is sensed in the secondary container. The device for determining the quantity may be on a volume or weight basis and thus can be a weighing mechanism, which can be a load cell. In one embodiment, a device is provided for moving the second container laterally sufficiently to the dispensing position so that food contained therein is dispensed. Such a device may be, for example, a suitable actuator, which can be an air or hydraulic cylinder, for example. In one embodiment, the automated dispensing device further includes a door that is located over an opening in the freezer compartment and positioned relative to the secondary container so that when the secondary container is moved laterally to the dispensing position, the food in the secondary container exits the freezer compartment through the open bottom and through the freezer compartment opening. Typically, the dispensed food will then be directed into the fry module.

In accordance with another aspect of the present invention, a vibratory conveyor is provided for conveying food items to the secondary container. The vibratory conveyor in one embodiment may have a serpentine or a zigzag food travel pathway.

In accordance with another aspect of the invention, the tray for vibratory conveying of food articles from a hopper may include a tray body, a food inlet portion and a food outlet portion, the food inlet including an upwardly extending dividing member for dividing the tray into at least two food inlet conveyor passageways, the inlet conveyor passageways merging into a single food passageway that extends to the food outlet portion after which the food passing therethrough is dispensed into the secondary container. In one embodiment, the single food passageway may be nonlinear and may have a zigzag or a serpentine pathway or configuration. In one aspect of the invention, the dividing member of the tray for vibratory conveying of food articles is saddle-shaped. The tray for vibratory conveyance of food articles can be configured and dimensioned so that the single food passageway causes food of a particular size, such as the size of chicken nuggets, for example, to be conveyed in a single file arrangement. This allows for a precise vibratory dispensing of the food articles permitting them to be dispensed one at a time from the vibratory conveyor to the secondary container. Such an arrangement permits accurate metering of the food articles and precise control of the batch sizes that are cooked and subsequently packaged and served to customers. This permits more economical and efficient and reproducible operations.

In accordance with another aspect of the present invention, the vibratory conveyor includes a tray that has a bottom portion with a plurality of spaced apart holes to permit relatively small undesirable particles, such as ice particles and small particles of food to pass therethrough so that such material is not dispensed into the secondary container. To accomplish this, typically the holes will be less than about 0.25 inches in diameter and can be located in a suitable array as desired.

In accordance with another aspect of the invention, a generally vertically extending declumping member is provided that can interact with food contained in the vibrating conveyor. Preferably, the declumping member is in the form of a cylindrical member or pin that extends generally vertically towards the vibrating conveyor from a position located above the vibrating conveyor. Typically, the declumping member will be stationary relative to the vibrating conveyor so that as food, in particular, such as French fries, pass the declumping member as they travel along the vibrating conveyor clumps of French fries can be separated into smaller clumps or individual French fries. This facilitates the subsequent frying of such food materials.

In accordance with another aspect of the present invention, the automated dispensing device includes structure for dispensing a predetermined quantity of food that comprises a food magazine capable of dispensing individual pieces of food on a piece by piece basis. In accordance with a more specific aspect of this embodiment, the magazine comprises dual rotatable spiral flights with the spiral flights having a spacing therebetween to allow placement of a food item, such as a chicken patty, for example, to be supported by both spiral flights.

In accordance with another aspect of the invention, the magazine dispenser is suspended from a slide mechanism permitting removal of the magazine from the freezer or refrigerated compartment. A plurality of the magazines can be located on a single slide mechanism. An array of the magazines may be located in the freezer, such as a 3×5 array or a 3×4 array, for example.

In one embodiment, a separate drive motor is associated with each food dispensing magazine for selectively rotating spiral flights of a magazine dispenser for dispensing a desired number of the food items. The drive motor may also be located in the freezer.

In accordance with another aspect of the invention, an automated method of dispensing a quantity of food to be cooked is provided. The method includes storing food items in a storage container located in the freezer, dispensing food items from the storage container to a conveyor, conveying the food items on the conveyor to a secondary or dump container located in the freezer, monitoring the amount of food items delivered to the secondary container, terminating delivery of the food items to the secondary container when a desired amount of food items are determined to be present in the secondary container as determined by the monitoring, and dispensing the food items from the secondary container and out of the freezer by at least partially inverting the secondary container. In accordance with another aspect of this embodiment, a freezer or refrigerated compartment is not utilized.

In accordance with another aspect of the present invention, the method includes storing food items in a storage container, dispensing food items from the storage container to a conveyor, conveying the food items on the conveyor to a secondary container having at least a partially open bottom with a floor member adjacent the open bottom, monitoring the amount of food items delivered to the secondary container, terminating delivery of the food items to the secondary container when a desired amount of food items are determined to be present in the secondary container as determined by said monitoring and dispensing the food items from the secondary container and through the open bottom of the secondary container by relative movement of the floor member to the open bottom of the container.

The conveying may comprise vibratory conveying, as desired.

In one embodiment, the secondary container with the at least partially open bottom moves relative to the floor member that remains stationary.

In accordance with another aspect of the present invention, a device for the automated frying of foods is provided. The device in one embodiment includes a fry vat for containing and heating cooking oil, at least one circular fry wheel having at least a generally circular perimeter and a plurality of compartments with each compartment having an opening towards the perimeter, the fry wheel mounted for rotational movement relative to the radial axis of the fry wheel which radial axis is disposed above the normal operating level of the frying oil in the fry vat. A drive mechanism is provided for rotating the fry wheel and a control system is included for causing the drive mechanism to periodically rotate the fry wheel back and forth through a relatively small amount of rotation (such as about 2-10°, for example) to simulate shaking of a fry basket. Such control can be accomplished electronically by devices known to those skilled in the art.

In accordance with another aspect of the present invention, the small amount of rotation is-in the range of from about 2° to about 20°. The back and forth rotation in one direction may be of a larger angle or amount of rotation than of the rotation in the other direction.

In one embodiment, a control system is provided that causes periodic incremental rotation of the fry wheel in one direction to cause food deposited into one of the compartments to travel through the cooking oil in the fry vat over a period of time to fry the food and to move the compartments out of the cooking oil for subsequent discharge of the food from the compartment. In one embodiment, the periodic incremental rotation is based on 360° divided by the number of compartments in the fry wheel.

In accordance with another aspect of the present invention, a control system is provided for operating the drive mechanism to rotate the fry wheel in one direction to cause food deposited into one of the compartments to travel through the cooking oil in the fry vat over a period of time to fry the food and out of the cooking oil for subsequent discharge of the food from the compartment, wherein the control system adjusts the speed of rotation based on the level of cooking oil in the fry vat. In one embodiment, the control system causes incremental periodic rotation of the fry wheel and the control system adjusts the period of time between incremental rotations based on the level of cooking oil sensed in the fry vat. The period of time between incremental rotations can also be based on the temperature of the cooking oil in the fry vat.

In accordance with another aspect of the invention, a curved baffle is provided that is disposed in the fry vat adjacent the axial periphery of the portion of the fry wheel that is disposed in the cooking oil for preventing food contained in one or more of the fry wheel compartments from falling out of the compartments.

In accordance with another aspect of the invention, a device for the automated frying of food is provided that includes a fry vat for containing and heating cooking oil, at least one circular fry wheel having at least a generally circular perimeter and a plurality of compartments each having an opening towards the perimeter, the fry wheel mounted for rotational movement relative to the radial axis of the wheel which radial axis is disposed above the normal operating level of the frying oil in the fry vat, a drive mechanism for rotating the fry wheel and an overflow passageway having an inlet that is located above the normal operating level of the frying oil in the fry vat. Preferably, the overflow passageway is located in a foam deck that is adjacent a side of the fry vat. The foam deck has a surface located above the normal operating level of the frying oil in the fry vat. In one embodiment, the overflow passageway comprises an elongated slot in the foam deck. The foam deck is preferably located adjacent or in proximity to the food inlet location for supplying a quantity of food to be fried in the fry wheel.

In accordance with another aspect of the present invention, an automated method of frying food in a fry vat having a heated cooking oil contained therein is provided. The method includes placing food in a fry wheel compartment, each of the compartments having an opening towards the perimeter of the fry wheel, rotating the fry wheel so that the compartment containing the food travels submerged in the heated cooking oil and periodically rotating the fry wheel back and forth in a relatively small amount of rotation to simulate shaking of the fry basket while the food is submerged in the cooking oil. In accordance with another aspect of the method of the present invention, the method comprises rotating the fry wheel in one direction to cause the food deposited into one of the compartments to travel through the cooking oil in the fry vat over a period of time to fry the food and to move the food out of the cooking oil for subsequent discharge of the food from the compartment, wherein the speed of said rotating is related to the level of cooking oil in the fry vat. In accordance with this aspect of the present invention, the rotating may comprise incremental periodic rotation with the period of time between incremental periodic rotations being based on the level of cooking oil sensed in the fry vat. The period of time between incremental periodic rotations may also be based on the temperature of the cooking oil in the fry vat.

In accordance with another aspect of the invention, an automated method of frying food is provided that includes placing food to be fried in a fry wheel compartment of a fry wheel having at least a generally circular perimeter and a plurality of compartments, each having an opening towards the perimeter, the fry wheel mounted for rotational movement relative to the radial axis of the wheel which radial axis is disposed above the normal operating level of the frying oil in a fry vat having heated cooking oil therein, providing an overflow passageway having an inlet that is located above the normal operating level of the frying oil in the fry vat, collecting in the overflow passageway at least some of the water containing foam that results when food to be fried and placed in the fry wheel contacts the frying oil and rotating the fry wheel so that the compartment containing the food travels submerged in the heated cooking oil. The method may further include periodically rotating the fry wheel back and forth with a relatively small amount of rotation to simulate shaking of a fry basket while food is submerged in the cooking oil.

In accordance with another aspect of the present invention, an automated method of packaging cooked food, which may be food such as French fries, chicken nuggets and other types of food, in an individual portion-sized container is provided. The method includes delivering a quantity of a cooked food to a rotatable dispensing member, rotating the dispensing member to cause the food items to fall from one or more compartments of the dispensing member into a food dispensing chute and thereafter dispensing the food from the chute and depositing the food into the individual portion-sized food container.

In accordance with one aspect, the method may further include weighing the food in the chute before dispensing the food to the container.

In accordance with another aspect of the invention, the method includes applying seasoning to the food and may further include applying the seasoning by using gravity to cause the seasoning to travel through a nozzle and onto the food.

In accordance with another aspect of the invention, the method further includes shaking the individual portion-sized food container after the dispensing. The shaking may be automated and can include back and forth movement of the container through an arc as desired, and may be in a generally vertical axis. The arc may be a generally circular arc and the rotating back and forth may encompass an arc in the range of from about 3° to about 20°. In addition, the container may be raised and lowered before, during or after the rotating to further simulate shaking or in connection with further container handling.

In accordance with another aspect of the invention, when dispensing food from the chute to the individual portion-sized container, some of the dispensed food is not deposited into the individual portion-sized container and the method further includes collecting the not deposited food. Typically, the not deposited food will be collected in a collection device that returns the not deposited food to the chute for subsequent dispensing. In one embodiment, the collection member is rotatable and can be rotated to deposit the collected food to the chute. This helps to ensure that the not deposited food is subsequently deposited into a container on a first-in, first-out or a generally first-in, first-out basis.

In accordance with another aspect of the present invention, an automated method of packaging food, including food such as French fries, in an individual portion-sized container is provided that includes delivering a quantity of food to a food dispensing chute, selecting and holding with an automated device an individual portion-sized container of a desired size from a plurality of different sizes of individual portion-sized containers that can be selected and held by the automated device. The selected individual portion-sized container is moved by the automated device to a location for receiving food from the dispensing chute and food is dispensed from the chute and into the container. The method may further include depositing the filled food container onto a conveyor by operation of the automated device and transporting the deposited container by the conveyor to a human operator food pickup location.

In accordance with another aspect of the foregoing method, the individual portion-sized food container is unerected and the method further includes after the selecting, erecting the selected individual portion-sized food container by the automated device. In one embodiment, the automated device includes a partial vacuum suction device for holding the individual portion-sized food container and the holding includes applying a partial vacuum through a suction device to the food container. The food container can be released by reducing or eliminating the vacuum applied by the suction device to the food container sufficiently to cause the food container to be disengaged from the automated device.

In accordance with another embodiment of the method, the filled food container is placed in an upright position on a transportable member or container-receiving receptacle which in one embodiment contains a single food container and is maintained in an upright position on the transportable member by cooperation of the recessed volume of the transportable member and the food container.

In accordance with another aspect of the invention, the transporting is performed by a magnetic conveyor.

In accordance with another aspect of the invention, an automated method of packaging cooked French fries in individual portion-sized French fry containers is provided. The method includes delivering with a mechanical device cooked French fries to a French fry holding bin and mechanically scooping with a mechanical device an open French fry container into the cooked French fries in the holding bin to fill the French fry container with French fries. After filling the French fry container, the method further includes mechanically depositing the filled French fry container at a drop-off location. Typically, the drop-off location will include a location that is convenient for a human operator to access the filled French fry containers for subsequent service to a customer.

In accordance with this aspect of the invention, typically the delivering of cooked French fries to a French fry holding bin will be accomplished by receiving the French fries from an inlet chute which chute is traversed by the French fries prior to entering the French fry holding bin. When used with a fry module in accordance with the invention or some other type of fry apparatus including a manual fry operation, the French fries enter the inlet chute after being dispensed from the fry module or other arrangement.

The automated method of packaging cooked French fries may further include applying seasoning to the French fries which may occur while on the inlet chute. The application of seasoning is preferably done by an automated system which may include a seasoning device or a salting device as hereafter described in detail.

In accordance with another aspect of the invention, the inlet chute includes structure for vibrating the inlet chute to facilitate transport of French fries down the inlet chute.

In one embodiment, the inlet chute includes a first gate that is movable to a position that restrains the French fries from travelling down the chute. This provides a convenient time during which to apply the desired seasoning to the French fries. The gate may include a plurality of reciprocable fingers that are configured for up and down movement. The fingers may be configured such that in a retracted position the fingers do not extend above the surface of the inlet chute and in an extended position the fingers extend outwardly above the surface of the inlet chute sufficiently to prevent the passage of French fries. In addition, in one embodiment, the fingers are periodically reciprocable in an up and down direction so that the fingers have a declumping action on French fries passing through the chute at the location of the reciprocable fingers.

In accordance with another embodiment of the invention, the method includes further restraining the French fries from exiting the inlet chute at a location downstream of the gate after passing the first gate. The further restraining can be performed by a second gate located downstream of the first gate. Preferably, when utilized, the second gate will be located downstream of the first gate a sufficient distance so that a desired quantity of French fries can be stored on the chute between the first and second gates. The second gate can be moved to a position that does not restrain the French fries so that the French fries are free to travel into the holding bin.

In accordance with another aspect of the automated method of packaging cooked French fries, the method further includes mechanically shaking the filled individual portion-sized French fry container prior to the depositing. The shaking may include back and forth movement through an arc in which the end-of-arm tool of the mechanical device travels, thereby causing the filled individual portion-sized French fry container to travel in that arc which can be any generally vertical axis. In accordance with one embodiment, the mechanical device is a mechanical arm which can perform the mechanical scooping, shaking and depositing steps as desired. In addition, the method may further include holding the individual portion-sized French fry container with a mechanical arm of the mechanical device while performing the scooping, shaking and/or depositing. The shaking may be accomplished by up and down vertical movement of the mechanical arm.

In accordance with another aspect of the invention, the method further includes mechanically obtaining an unerected individual portion-sized French fry container to be filled from a stack of unerected individual portion-sized French fry containers. The method can still further include mechanically erecting the unerected individual portion-sized French fry container prior to the scooping. The method may further include, before the obtaining of the unerected carton, selecting and holding with the mechanical device an individual portion-sized container of a desired size from a plurality of different sizes of individual portion-sized containers that can be selected and held by the automated device.

In accordance with another aspect of the present invention, a method of erecting a collapsed, individual portion-sized French fry container of the type having opposed sidewalls connected by a collapsible container bottom is provided. The method includes grasping the unerected French fry container, pulling the container against a restraining member and mechanically dragging the bottom of the container so that it traverses up an inclined ramp to urge up the container bottom to urge the container to an erected position. The method may further include injecting a stream of compressed air into the open end of the container and towards the container bottom for assisting in the erecting.

As used herein, the term "fill" or "filled" is not limited to completely filling or a completely filled container and thus includes partially filling or partially filled containers.

In accordance with still another aspect of the invention, an automated device for packaging cooked food into a desired container, which may be an individual portion-sized food container is provided. The device includes a rotatable food dispensing member having an inlet location to receive a quantity of the cooked food and a discharge location to discharge the cooked food. A food dispensing chute is positioned to receive the cooked food from the discharge location of the rotatable food dispenser and the dispensing chute has a discharge location. In one embodiment, the dispensing chute has a food holding area for holding a quantity of the cooked food deposited therein. A suitable weighing device can be associated with the dispensing chute to weigh the food that is contained in the chute or in the holding area of the chute. In one embodiment, the weighing device is a load cell.

In accordance with another aspect of the invention, the automated device includes a food carton or container holding device for holding the food carton in position to receive food from the discharge location of the dispensing chute. The carton holding device can include an axially rotatable generally vertically extending elongated first member and a second member that extends from the elongated member, the second member having a gripping member for gripping a food container, which may be an individual portion-sized food container. In one embodiment, the gripping member comprises a suction cup. A vacuum source may be supplied to the suction cup to create at least a partial vacuum, allowing the container to be held. In one embodiment, the carton holding device is capable of moving the food container through an arc of about or of at least about 180° and in which the carton holding device is capable of moving the food container up and down.

In accordance with another aspect of the present invention, the automated device comprises a conveyor system for transporting filled individual portion-sized food containers from adjacent the filling location to a filled container holding area. The conveyor system may comprise in one embodiment a continuous loop raceway and a plurality of discrete movable food container receptacles that are movable along the raceway. The conveyor system may include a continuous movable loop having at least one magnetic element capable of magnetically attracting one of the movable receptacles at a time for causing movement of the receptacle corresponding to movement of the magnetic element. A plurality of the magnetic elements may be spaced apart along the movable loop.

In one embodiment, structure is provided for preventing movement of the discrete receptacles when the structure for moving the discrete receptacles along the raceway is activated. The structure for preventing movement can be a barrier that is disposed across the raceway. In one embodiment, the barrier is selectively movable and in another embodiment the barrier is fixed. In one embodiment, the barrier prevents movement of the receptacles only for a receptacle that has a food carton or container disposed thereon. In this embodiment, the barrier may be located at a height that is above the top of the receptacles located on the conveyor system adjacent the barrier.

In accordance with another aspect of the invention, an automated device is provided to retrieve and grasp a food container, which may be an individual portion-sized food or French fry container or carton. The automated retrieving device includes a member for selectively grasping and releasing the food container and for moving the movable member horizontally and linearly.

In accordance with another aspect of the invention, a magazine is provided for holding a plurality of food containers in an unerected state.

In accordance with another aspect of the invention, the automated device includes a retrieving device that is capable of grasping and releasing an unerected food container on one side and further includes a second device for selectively grasping the unerected food container on the other side. A structure for moving the retrieving device and the second device relatively apart when grasping the sides of the container is provided. The automated device may further include an automated urging means for urging the container bottom upwardly relative to the sides of the container when the retrieving device and the second device are moved relatively apart when grasping the container.

In accordance with another aspect of the invention, the food dispensing member is a rotatable wheel having an open central area and an outer at least generally circular rim. The rotatable wheel has a plurality of open compartments spaced apart about the circular rim that extend inwardly from the circular rim and open interiorly of the circular rim. A baffle may be provided to prevent food contained in the one or more of the open compartments from falling out of the compartments when the wheel is rotated until the compartment is in position over the food dispensing chute. The baffle may be curved to follow the curvature of the inner part of the wheel and may also be perforated. The automated device may further include a rotatable food collecting member that is disposed to collect food dispensed from the discharge location of the dispensing chute which food is not deposited into a container held in position at the discharge location. Typically, the collection member will have a discharge location to discharge collected food. In one embodiment, the discharge location is the food dispensing chute. The collecting member may be a rotatable food collecting wheel having an open central area and an outer circular rim having a plurality of open compartments spaced apart about the circular rim that extend inwardly from the circular rim and that are open towards the rim interior. The rotatable food dispensing member and the rotatable food collecting member can be rotatable in one direction to discharge food at a discharge location and into a food dispensing chute and can be rotatable in an opposite direction to discharge the food at a second discharge location which may be to a waste chute. The discharge to the waste chute feature can be activated, for example, when the food is held in the dispensing device for too long a period of time.

The packaging device may also include an automated seasoning device for depositing a predetermined quantity of seasoning to food contained in the packaging device.

In accordance with another aspect of the invention, the device for applying seasoning includes a seasoning delivery tube having an inlet and a discharge location. A seasoning delivery head is positioned to deliver seasoning to the food to be seasoned with the head in communication with the outlet of the delivery tube and located below the inlet of the delivery tube. Structure is provided for depositing a predetermined quantity of seasoning into the inlet of the delivery tube so that the quantity of seasoning falls by gravity through the delivery tube and into and through the seasoning head and onto the food to be seasoned. Typically, the structure for depositing the predetermined quantity of seasoning will receive seasoning from a bulk hopper by gravity feed. The quantity of seasoning to be dispensed can be determined volumetrically, for example.

In accordance with still another aspect of the invention, an automated device for packaging cooked French fries into an individual portion-sized French fry container is provided. The device includes a mechanical arm having an end-of-arm tool capable of picking up and grasping an erected individual portion-sized French fry carton from an erected carton pick-up location, and scooping the erected carton while held by the end-of-arm tool into a quantity of cooked French fries located at a filling location to fill the French fry carton and thereafter depositing the filled French fry carton at a drop-off location spaced from the filling location. The automated device may further include a French fry holding bin for holding a bulk quantity of French fries at the filling location and a French fry inlet chute for receiving a bulk amount of French fries. In one embodiment, the automated device further includes structure for vibrating the French fry inlet chute. In accordance with another aspect of the invention, the automated device further includes structure for retaining French fries on the French fry chute and may further include structure for applying seasoning to the French fries contained on the inlet chute.

In accordance with another aspect of the invention, the structure for retaining French fries on the chute is composed of a plurality of vertically reciprocable fingers movable between an extended position for retaining French fries on the inlet chute and a retracted position for permitting French fries to travel on at least a portion of the chute. In one aspect, the movable gate may comprise a plurality of spaced apart fingers reciprocable in up and down directions to restrain French fries from sliding down the inlet chute when in an up position and for declumping French fries when the fingers are reciprocated up and down when French fries are travelling past the reciprocating fingers.

In accordance with another aspect of the invention, the automated packaging device may include a movable gate located between the discharge end of the inlet chute and the holding bin and movable between a raised position for retaining French fries on the inlet chute and a lowered position for permitting French fries to travel from the inlet chute to the holding bin.

In accordance with another aspect of the invention, the French fry holding bin may have a sensing device associated therewith for determining whether a desired quantity of French fries are contained in the French fry holding bin. The sensing device can be any suitable device that may be known in the art, such as a weighing device and can be a load cell, for example.

In accordance with still another aspect of the invention, a French fry carton storage and erection device is provided that includes an automated, unerected French fry carton retrieving device for retrieving and grasping an unerected individual portion-sized French fry container. The automated retrieving device includes a grasping member for selectively grasping and releasing a French fry container. The automated retrieving device may further include structure for linearly moving the movable member in two dimensions. The two dimensions may be generally horizontal dimensions and may be composed of one or more carriages, one for each of the dimensions.

In accordance with another aspect of the invention, a magazine for holding a plurality of individual portion-sized French fry containers in an unerected state is provided. In one embodiment, the magazine is capable of holding a plurality of segregated groups of individual portion-sized unerected French fry containers, each group in the plurality being of a different size container. In one embodiment, the magazine holds each group of unerected containers in a stack, which may be in either a generally horizontal or a vertical stack. The container retrieving device can be positionable to retrieve containers from the front of each stack.

In accordance with another aspect of the invention, the grasping member comprises a suction device for selectively grasping and releasing a French fry container. The suction device may comprise a suction cup located on the grasping member that is capable of grasping and releasing the French fry container by applying and releasing a vacuum, respectively, that communicates with the interior of the suction cup.

In accordance with another aspect of the invention, the retrieving device is capable of grasping and releasing a French fry container on one side thereof and the automated erecting device further includes structure for erecting an unerected French fry container of the type having opposed sidewalls connected by a collapsible container bottom. The automated device for erecting the container includes structure for urging the container from an unerected to an erected position and for urging the container bottom upwardly relative to the sides of the container which will occur typically when the retrieving device grasps the container and retrieves the container from the stack of containers. In one embodiment, the structure for urging comprises an inclined ramp while in another embodiment, the structure for urging includes an automated retrieving and container grasping device for grasping one of the opposed sidewalls of the unerected container and a restraining member for restraining from relative movement the other of the opposed sidewalls when the one sidewall is grasped by the grasping device and moved in a desired direction. In addition, structure may be provided for injecting a stream of compressed air into the open end of the container when the opposed sidewalls are at least partially moved apart from each other to help urge the opposed sidewalls apart to erect the container.

In accordance with another aspect of the present invention, the automated device further includes an elevator for moving an erected French fry container from a first location proximate the unerected container retrieving device to a second location. The elevator may comprise a rodless cylinder configured to carry a receptacle or other suitable structure for holding an erected French fry container with the receptacle being movable between first and second locations by the rodless cylinder. In one embodiment, the second location is proximate the mechanical arm so that a French fry container in the second position can be grasped by the end-of-arm tool.

In another embodiment of the invention, the mechanical arm of the packaging module is mounted to a carriage for providing lateral movement of the mechanical arm. The mechanical arm can be configured so that it can move the end-of-arm tool through a generally vertical compound arc as well as for selectively moving the end-of-arm tool linearly up and down. In one embodiment, the end-of-arm tool comprises a French fry scoop and further includes a gripping mechanism actuable between clamping and non-clamping positions wherein the gripping mechanism can grasp a French fry container when in the clamping position and release the previously grasped French fry container when the gripping mechanism is in the non-clamping position. The gripping mechanism can be capable of grasping one of the opposed sidewalls of an erected French fry container. In one embodiment, the gripping mechanism includes a finger-type structure with an actuator device for moving the finger structure between the clamping and non-clamping positions. The gripping mechanism can be configured to clamp an upper end of an erected French fry container between the finger structure of the gripping mechanism and the French fry scoop of the end-of-arm tool.

In another embodiment of the invention, the mechanical arm of the packaging module includes a plurality of pivotable links connected in series. In one embodiment, the mechanical arm includes at least two pivotable links and in another embodiment the mechanical arm includes three pivotable links. The mechanical arm can be configured so that each of the links is pivotable in the same or in parallel planes. In one embodiment, the mechanical arm is mounted to a carriage or other suitable structure for providing lateral movement of the mechanical arm. Typically, the lateral movement will be in a generally horizontal direction.

In accordance with another embodiment, the mechanical arm includes first, second and third links wherein the first link is connected to a generally horizontally movable carriage, the third link is connected to the end-of-arm tool and the second link is connected to the first and third links. A connection of one of each of the links to another link may comprise a pivot connection and an actuator may be provided for each pivot connection for pivoting the respective one of said links about the pivot connection which connects that link to another of the links to cause selective rotation of one link with respect to another of said links.

In accordance with another embodiment of the invention, the automated device further includes a structure for containing a plurality of French fry cartons that are filled with French fries, the structure having at least a portion that is in communication with the drop-off location of the mechanical arm. In one embodiment, the structure is a rack that can be constructed of any suitable material and configuration. In one embodiment, the rack is inclined in a direction away from the mechanical arm so that when the mechanical arm drops off a container filled with French fries, the container slides down the rack to a convenient location for pick-up by a human operator. In another embodiment, the structure comprises a rotatable carousel. In accordance with another aspect of the invention, the mechanical arm is configured to mimic the motion of a person's arm, wrist and hand action in scooping French fries into a French fry container while grasping the French fry container in one hand and moving the French fry container in a vertical arc and scooping the open end of the French fry container through a quantity of French fries and thereafter moving the French fry container to a generally upright position and shaking it sufficiently to cause loosely contained French fries to fall from the container. Typically, this action occurs with a French fry scoop attached to an upper end of the open French fry container as is commonly known in the art.

BRIEF DESCRIPTION OF THE DRAWINGS

FIG. 9 is a perspective view of a magazine-type dispenser array that can be utilized in the dispenser of the present invention;

FIG. 10 is a fragmentary view of the device of FIG. 9;

FIG. 13 is a partial fragment sectional view along line 13-13 of FIG. 11;

FIG. 14 is a fragmentary sectional view of a portion of the food frying device of FIG. 11;

FIG. 15 is a sectional view along line 15-15 of FIG. 14;

FIG. 16 is a perspective view of a drive mechanism for the food frying device of FIG. 11;

FIG. 20 is an alternate view along line 13-13 of FIG. 11;

FIG. 21 is a sectional view along line 21-21 of FIG. 20;

FIG. 22 is an enlarged fragmentary view of a portion of FIG. 21;

FIG. 23 is an alternate embodiment of a fry wheel in accordance with the present invention;

FIG. 24 is another alternate embodiment fry wheel in accordance with the present invention;

FIG. 32 is a side elevation view, partially broken away of the automated container handling system of FIG. 30;

FIG. 33 is a rear elevation view of the container handling system of FIG. 30;

FIG. 34 is a front perspective view of the container handling system of FIG. 30 shown in another operative position;

FIG. 35 is a top plan view of the container handling system of FIG. 34;

FIG. 36 is a side elevation view, partially broken away of the container handling system of FIG. 34;

FIG. 37 is a rear elevation view of the container handling system of FIG. 34;

FIG. 46 is a perspective view of a container-receiving receptacle in accordance with the present invention;

FIG. 47 is a top plan view of the device of FIG. 47;

FIG. 48 is a sectional view along line 48-48 of FIG. 47;

FIG. 49 is a cross-sectional view along line 49-49 of FIG. 47 and further including a portion of a conveyor system in accordance with the present invention;

FIG. 50 is a sectional view along line 50-50 of FIG. 49;

FIG. 51 is a front elevation view of a carton useful in accordance with the present invention;

FIG. 52 is a rear elevation view of a carton useful in accordance with the present invention;

FIG. 53 is a sectional view along line 53-53 of FIG. 52;

FIG. 54 is a bottom plan view of the container of FIG. 51;

FIG. 55 is a sectional view along line 55-55 of FIG. 57;

FIG. 56 is a perspective view showing use of the food container of FIG. 51;

FIG. 57 is a perspective view of a food container useful in accordance with the present invention;

FIG. 58 is an alternate embodiment perspective view of a container useful in accordance with the invention;

FIG. 59 is a development view of the carton of FIG. 51;

FIG. 60 is a side elevation view of the carton of FIG. 51;

FIGS. 77A and 77B are perspective views of an alternative embodiment of a bulk dispensing device in accordance with the present invention;

FIGS. 77C and 77D are perspective and side elevation fragmentary views, partly in section, of an alternate food dispensing device in accordance with the present invention;

FIG. 79 is a partial fragmentary perspective view of a conveyor body in accordance with the present invention;

FIG. 80 is a top plan view of the conveyor body of FIG. 79;

FIG. 81 is a perspective view of a portion of the food dispensing device of FIG. 74;

FIG. 82 is a fragmentary perspective view of a portion of the door assembly illustrated in FIG. 81;

FIG. 83 is a fragmentary perspective view of a portion of one embodiment of a food dispensing device in accordance with the present invention, partly in section;

FIG. 84 is a fragmentary perspective view of a portion of another embodiment of a food dispensing device in accordance with the present invention, partly in section;

FIG. 89A is a fragmentary side elevation view, partly in section, illustrating various stages of operation of one embodiment of a carton erection device in accordance with one embodiment of the invention;

FIG. 89B is a fragmentary elevation view, partly in section, of the device shown in FIG. 89A illustrating various stages of erecting a carton in accordance with the present invention;

FIG. 89C is a fragmentary perspective view of portions of one embodiment of a container handling apparatus in accordance with the present invention;

FIG. 89D is a fragmentary perspective view illustrating a portion of the operation of the automated packaging device in accordance with one embodiment of the present invention;

FIG. 89E is a fragmentary perspective view illustrating part of the operation of the packaging device in accordance with one embodiment of the present invention;

FIG. 89F illustrates a side elevation sectional view of various operations of a portion of the packaging device in accordance with one embodiment of the present invention;

FIGS. 89G and 89H are fragmentary side elevation views showing a portion of the operation of one embodiment of a packaging device in accordance with the present invention;

FIG. 89I is a fragmentary perspective view of a portion of a packaging device in accordance with one embodiment of the invention illustrating a portion of the operation of that device;

DETAILED DESCRIPTION OF THE INVENTION

General

Figure 1:
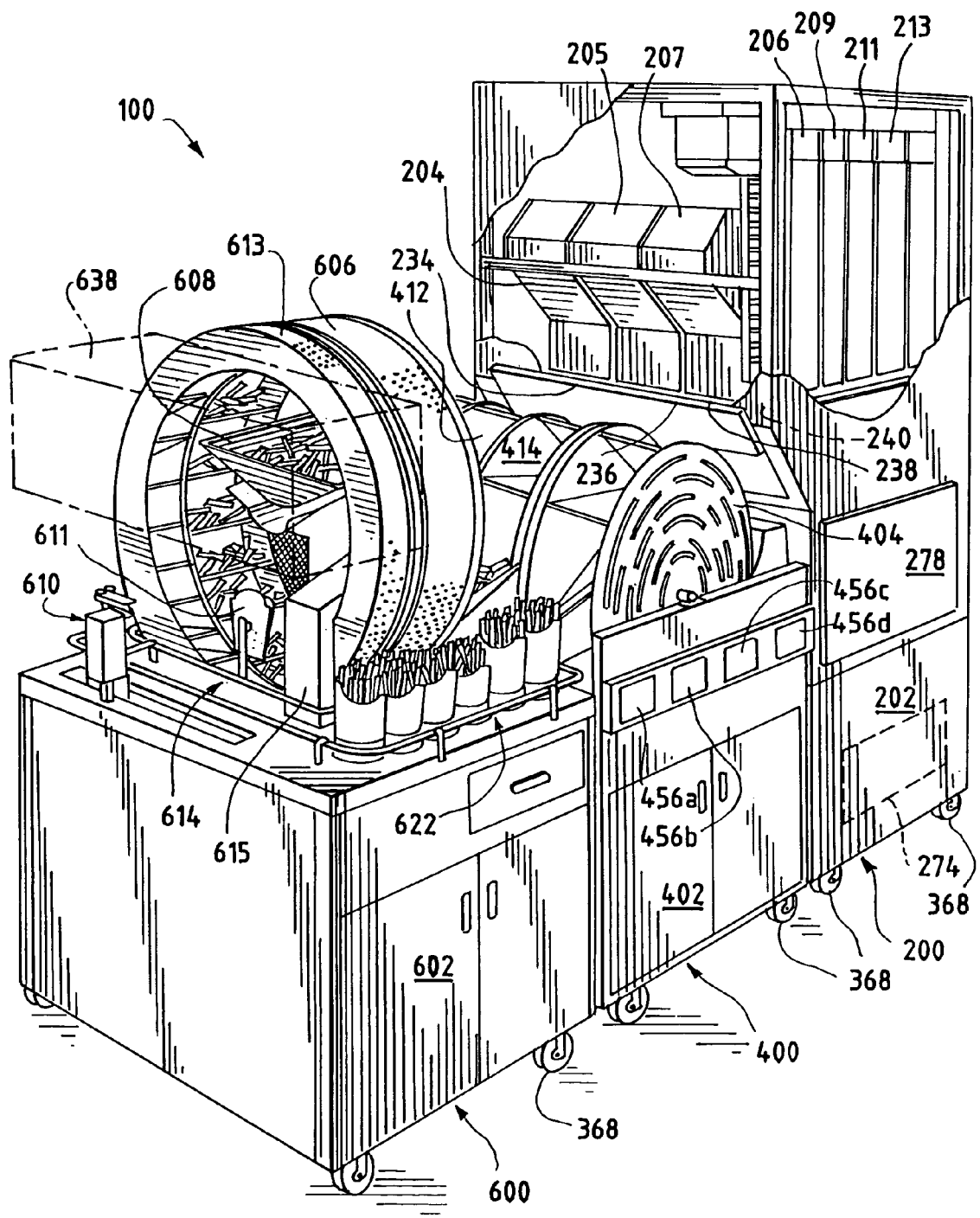
FIG. 1 is a perspective view of an automated food processing system in accordance with the invention.

In accordance with the present invention, an automated food processing system and method is provided. The automated food processing system and method in accordance with the invention allows food to be dispensed, fried and packaged in a suitable container or alternatively dispensed to a food holding area for subsequent processing by a human operator.

Referring to the Figures generally, where like reference numerals refer to like elements, and in particular to FIGS. 1 and 3 and 74 and 76, there is illustrated an automated food processing system 100 in accordance with the invention and an automated food processing system 1100 in accordance with the invention. Automated food processing systems 100 and 1100 include a food dispensing device 200, 1200, a fry device 400, 1400 and a food packaging device 600, 1600, respectively. In accordance with one embodiment of the present invention, each of dispensing, fry and packaging devices 200, 400 and 600, and 1200, 1400 and 1600, respectively, can be constructed and are sometimes illustrated in "modular" construction or form. By "modular" construction or form it is meant that dispensing, fry and packaging devices 200, 400 and 600, and 1200, 1400 and 1600, respectively, can exist and be contained in separate cabinets, for example, and also operate independently of the other devices. Thus, if one of dispensing, fry and packaging devices 200, 400 and 600, or 1200, 1400 and 1600, respectively, are inoperative or are otherwise deactivated, the function of the deactivated or inoperative device can be performed manually. For example, food to be fried could be manually dispensed in place of dispensing device 200 or 1200. Alternatively, food to be fried could be fried in a conventional fry vat after being dispensed from dispensing device 200 or 1200 in place of using fry device 400 or 1400 and food that is dispensed and fried in dispensing and fry devices 200 and 400, respectively, could, in turn, be packaged manually, for example.

Figure 74:
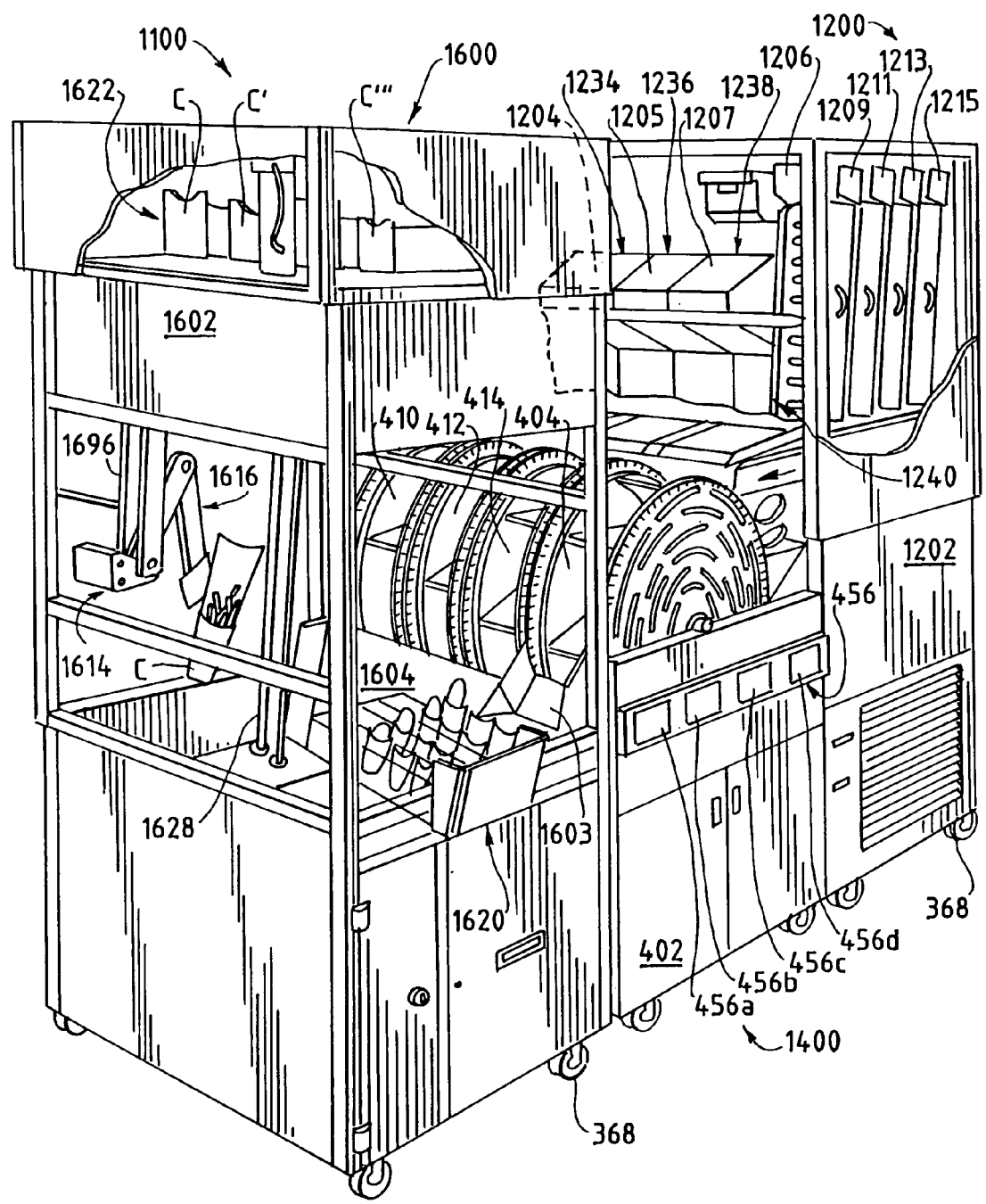
FIG. 74 is a perspective view of another automated food processing system in accordance with the invention.

To facilitate such modular construction and use, each of dispensing, fry and packaging devices 200, 400 and 600, and 1200, 1400 and 1600, respectively, can be contained in a separate wheeled cabinet, 202, 402 and 602, and 1202, 1402 and 1602, respectively, as illustrated in FIGS. 1 and 74. Alternatively, dispensing, fry and packaging devices 200, 400 and 600, and 1200, 1400 and 1600, respectively, could be mounted as a single unit or in a single cabinet or in "non-modular form," as desired, or more than one of such devices 200, 400 and 600 or 1200, 1400 and 1600, could be so mounted or combined.

A suitable control system for the dispensing, fry and packaging devices is also provided. As will be described more completely hereafter, in one embodiment, the control system includes a central control system 110 or 1110 that can interface with a point-of-sale system 112 or 1112, respectively. The central control system will communicate with separate subcontrol systems 114, 116 and 118 or 1114, 1116 and 1118, respectively, one for each of the dispensing, fry and packaging devices 200, 400 and 600 and 1200, 1400 and 1600, respectively. Alternatively, a single central control system (not shown) could be utilized in place of individual control systems for each of devices 200, 400 and 600 or devices 1200, 1400 and 1600. Similarly, as another alternative, a single central control system could be utilized to control the overall operation of automated food processing system 100 or 1100 as well as controlling the individual functions and aspects of dispensing, fry and packaging devices 200, 400 and 600 or 1200, 1400 and 1600, respectively.

The basic operations of dispensing devices 200 and 1200, fry devices 400 and 1400 and food packaging devices 600 and 1600 will now be briefly discussed and discussed in detail hereafter.

Briefly, dispensing devices 200 and 1200 each function to dispense a quantity of food to be fried to fry device 400 or 1400. In one aspect of the invention, any suitable food dispensing device can be utilized. Dispensing devices 200 and 1200 can include a cabinet 202 or 1202, respectively, to house the components of dispensing device 200 or 1200. In one embodiment, cabinet 202 or 1202 will be refrigerated, preferably below 32° F. so that the food contents therein will remain frozen. This allows the food stored in dispensing devices 200 or 1200 to remain therein for a long period of time, much longer than if the contents were merely refrigerated (above freezing) or merely at room temperature.

In the illustrated embodiments, dispensing devices 200 and 1200 include an uncooked bulk food dispensing container 204 and 1204, respectively. Uncooked bulk food dispensing containers 204 and 1204 may be utilized for food such as French fries or chicken nuggets, for example. Other types of food may also be contained in a dispenser such as uncooked bulk food dispensing containers 204 and 1204. Typically, those types of food would be in the form of relatively small pieces compared to relatively large food pieces such as chicken patties, for example.

For relatively large food pieces, a large food dispensing container is utilized. In one embodiment, the large food dispensing container is in the form of magazine food dispensers 206 and 1206.

Food dispensed from a dispenser of dispensing devices 200 and 1200 is deposited on a conveyor 208 or 1208, respectively, that, in turn, directs the deposited food to a secondary or dump container 210 or bottomless container 1210 for subsequent discharge from dispensing device 200 or 1200, respectively.

In the illustrated embodiments, uncooked bulk food dispensing containers 204 and 1204, magazine food dispensers 206 and 1206, conveyors 208 and 1208 and secondary containers 210 and 1210 are contained in cabinet 202 or 1202, respectively, which is a refrigerated environment, preferably maintained below freezing (32° F. or lower).

While any suitable conveyor can be utilized in one aspect, conveyors 208 and 1208 are each preferably a vibratory conveyor, vibrated by a suitable vibratory mechanism that vibrates conveyor bodies 214 and 1214, respectively. Conveyor bodies 214 and 1214 may each take the form of a suitably shaped tray, for example.

By containing the foregoing components in a refrigerated and preferably frozen environment, consistency in food preparation and dispensing is achieved, thereby contributing to the overall efficient, effective and uniform performance of automated food processing systems 100 and 1100.

Secondary containers 210 and 1210 can be of a form as desired and includes suitable weighing mechanisms 216 and 1216, respectively, to permit a determination of the quantity of food contained in secondary containers 210 and 1210. Weighing mechanisms 216 and 1216 can each be any suitable device to weigh the contents or otherwise determine the amount of food in secondary container 210 or 1210. Weighing mechanisms 216 and 1216 may comprise a load cell or a mechanism for determining the volume of food deposited into the respective one of secondary containers 210 and 1210, for example. In this manner, the amount of food that is charged to one of fry devices 400 and 1400 at a particular time can be determined. In addition, weighing mechanisms 216 and 1216 can be operated during operation of conveyors 208 and 1208, respectively, and the operation of conveyors 208 and 1208 continued until a desired amount of food is deposited in secondary container 210 or 1210. In this manner, a precise amount of food can be delivered to a respective one of secondary containers 210 and 1210, thereby permitting consistency and uniformity in the portion of food that is delivered to fry device 400 or 1400. This is also important to ensure that a sufficient quantity of food is being cooked by automated food processing systems 100 and 1100.

Prior to activation of dumping mechanisms 218 or 1218, discharge doors 220 or 1220 of cabinets 202 and 1202, respectively, are opened by operation of a door opening device which can be any suitable device as desired and in one illustrated embodiment is a cylinder 222 attached to discharge door 220 and movable up and down in the direction of arrow B. A respective one of discharge doors 1220 of dispensing device 1200 is opened by lateral movement of the associated one of secondary container 1210, as illustrated in, for example, FIG. 76. Cabinets 202 and 1202 are preferably insulated with a suitable insulating material 224 and 1224 that are also provided in discharge doors 220 and 1220. The provision of a suitable insulating material is important, particularly since dispensing devices 200 and 1200 will typically be located proximate or adjacent one of fry devices 400 and 1400 that operate at a substantially elevated temperature, thereby typically generating substantial heat.

In the illustrated embodiments, dispensing devices 200 and 1200 each includes four dispensing lanes from which food is discharged from dispensing devices 200 and 1200, respectively, and to a suitable location such as one of fry devices 400 and 1400. After dispensing through discharge door 220, cylinder 222 is activated to close discharge door 220. Similarly, dumping mechanism 218 of secondary container 210 is activated to return secondary container 210 to its upright position to receive more food.

For dispensing device 1200, after dispensing through one of doors 1220, as the respective one of secondary containers 1210 is retracted, the associated one of doors 1220 closes by gravity, without the need for a separate closing mechanism.

Each of fry devices 400 and 1400 includes, respectively, a fry wheel 404, a fry vat 406 for containing and heating a suitable cooking oil and a drive mechanism 408 for suitably rotating fry wheel 404. It is to be understood that in accordance with one aspect of the invention any suitable frying device can be utilized.

In the illustrated embodiment of FIGS. 3, 11-16 and 74, fry devices 400 and 1400 include a plurality of, in this case four, separate fry wheels 404, 410, 412 and 414, as well as four separate fry vats 416, 406, 420 and 418 and a separate drive mechanism 408 for each fry wheel, each dedicated to a particular one of fry wheels 404, 410, 412 and 414.

In various embodiments, a separate drive mechanism is provided for each of fry wheels 404, 410, 412 and 414 and can be suitably located in cabinet 402 or 1402, preferably in a location that is above the level of cooking oil present in the associated one of fry vats 416, 406, 420 and 418, respectively. Fry module 1400 is similar to fry module 400, except that fry module 1400 includes a foam deck and overflow arrangement as hereafter described.

The suitable rotation of each of fry wheels 404, 410, 412 and 414 can be as desired to direct food articles loaded therein down and through the fry vat until reaching the other side of the fry vat whereupon the food articles are discharged. The rotation can be either continuous or a periodic incremental rotation. For example, a suitable drive mechanism can be provided to periodically rotate fry wheel 410 in a desired rotational increment, which may be based on the number of compartments contained in fry wheel 410. In the illustrated embodiments of FIG. 13, for example, fry wheel 410 comprises eight food compartments 422, 424, 426, 428, 430, 432, 434, and 436. Each of food compartments 422-436 is a perimeter food compartment and open to the perimeter or exterior of fry wheel 410. Each of fry wheels 404, 412 and 414 can be similarly configured.

As described in more detail hereafter, each of compartments 422-436 is formed from a perforated curved compartment forming member 510.

In the rotation of fry wheel 410, a periodic incremental rotation can be based upon 360° divided by the number of compartments. Thus, for example, in the illustrated embodiments of FIG. 13 and FIG. 76, each periodic rotation would consist of a rotation of 360° divided by eight compartments or a periodic rotation increment of 45°. Thus, as illustrated in FIG. 13, the food contained, in this case French fries, in compartments 424-430 would remain in cooking oil 454 contained in fry vat 406 for all or part of four incremental rotations, after which the food would be discharged from fry wheel 410 in the next incremental rotation thereof. For example, as illustrated in FIG. 13, compartment 422 is ready to receive a charge of food to be fried, compartment 424 has a charge of food that has been just immersed in cooking oil 454. Cooking oil 454 is at a level H as illustrated in FIG. 13, which is dependent upon the amount of food contained in compartments 422-436 that are submerged in cooking oil 454.

Similarly, compartment 426 has food contained therein that has gone through two incremental 45° rotations of fry wheel 410, compartment 428 has food contained therein that has undergone three incremental rotations and food compartment 430 has food contained therein that has undergone four incremental rotations of fry wheel 410 and compartment 432, which is now empty, has discharged the food contained therein upon the last incremental rotation of fry wheel 410. Thus, upon the next incremental rotation of fry wheel 410, which is in the clockwise direction as shown by arrow B of FIG. 13, the food contained in food compartment 430, which in this case is a quantity of French fries 455, will be discharged from compartment 430 to the food packaging device which is hereafter briefly described.

Figure 3:
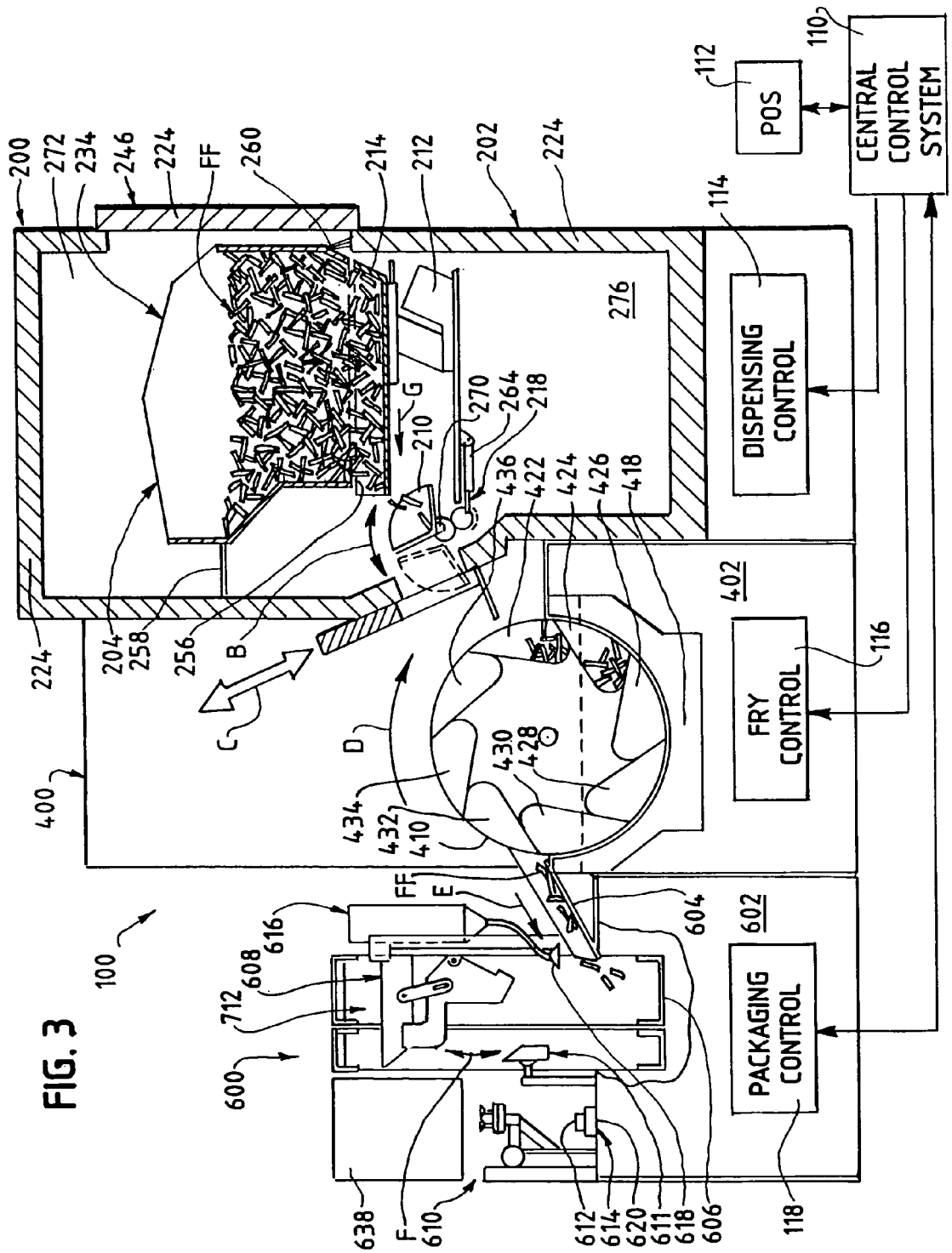
FIG. 3 is a schematic view, partly in section, of the food processing system of FIG. 1.
Figure 76:
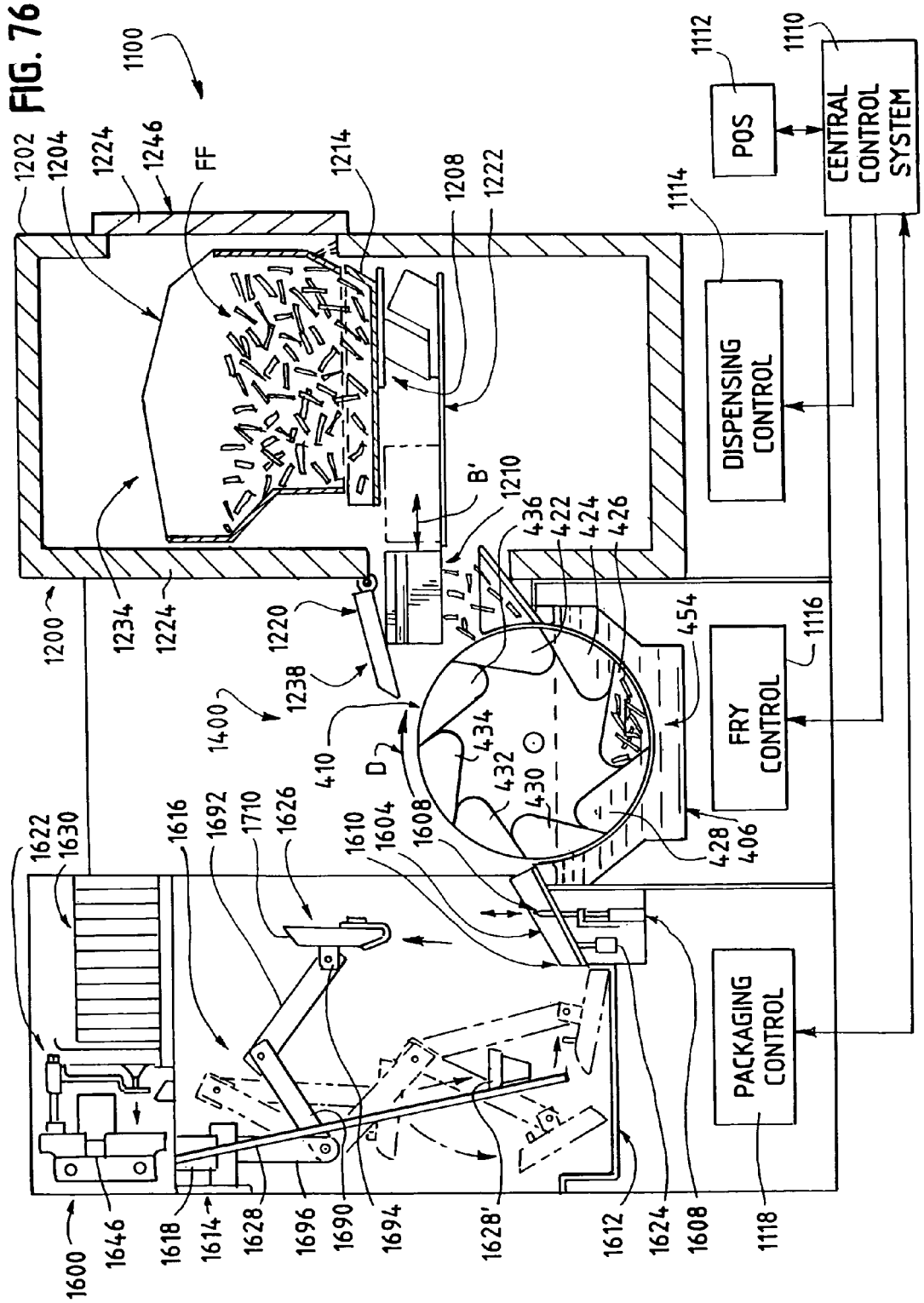
FIG. 76 is a schematic view, partly in section, of the food processing system of FIG. 74.

Upon discharge of food, which in this case is a quantity of French fries from one of compartments 422-436 of a fry wheel, such as fry wheel 410 as illustrated in FIGS. 3 and 76, the food is deposited onto a respective one of inlet chutes 604 or 1604 of food packaging devices 600 and 1600.

For packaging module or device 600, from inlet chute 604, the food from inlet chute 604 and previously received from fry wheel 410 is deposited into dispensing member 606. Typically, dispensing member 606 will be compartmented into a plurality of compartments that are arrayed along the periphery of rotatable food dispensing member 606.

Rotatable food dispensing member 606 has a discharge location to discharge the food deposited therein. The discharge location is generally located towards an upper portion of rotatable food dispensing member 606. A food dispensing chute mechanism 608 is positioned to receive cooked food from the discharge location of rotatable food dispensing member 606. In a preferred embodiment, food dispensing chute mechanism 608 incorporates a device for weighing or otherwise determining the quantity of food that has been deposited into food dispensing chute mechanism 608. This ensures that when food is dispensed from food dispensing chute mechanism 608 a minimum quantity of food will be dispensed, thereby ensuring that a container 611 or other package that is to receive the food from mechanism 608 will receive a desired charge.

Food packaging device 600 preferably also includes a suitable automated container handling system 610. Automated container handling system 610 is capable of, in a preferred embodiment, selecting container 611 of a desired size, retrieving and grasping container 611, erecting unerected container 611 into an erected form and holding the erected container 611 in position to receive food dispensed from food dispensing chute mechanism 608.

After food container 611 receives food from food dispensing chute mechanism 608, automated container handling system 610 is capable of moving container 611 having food deposited therein to a container receiving receptacle 612 which receptacle 612 can be transported via a conveyor system 614 to a desired location for subsequent pickup of container 611 having food contained therein by a human operator, for example.

Preferably, a food overflow collection member is provided to collect any food dispensed by food dispensing chute mechanism 608 that is not deposited into container 611. In one embodiment, the overflow food collection device is a rotatable food collection member 613. Overflow food collection member 613 functions to collect food dispensed by food dispensing chute mechanism 608 that is not received in container 611 and to recycle food collected by overflow food collection member 613 into food dispensing chute mechanism 608 for subsequent dispensing to a container in a first-in, first-out manner so that overflow food is promptly recycled to dispensing chute 608 for dispensing to a container.

Preferably, food packaging device 600 is configured to include a provision by which food contained in dispensing device 600 is routed to waste where it is not desired to dispense such food into a food container. Such a condition could arise, for example, if food is held for too long a period in food packaging device 600. This function may be accomplished, for example, by providing a waste discharge location which can be in the form of a waste chute 615 to which food from rotatable food dispensing member 606 and overflow food collection member 613 can be directed. In one embodiment, chute mechanism 608 is lowered and member 606 is rotated to dispense food to chute mechanism 608, which in turn dispenses into member 613. Member 613 is rotated counterclockwise to deliver food to waste chute 615. This process can be continued until all of the food in device 600 is so emptied, if desired.

Preferably, a suitable structure for applying a desired quantity of seasoning to food contained in food packaging device 600 is provided. In the embodiment illustrated in FIG. 3, a food seasoning device 616 is provided. Food seasoning device 616 can be any suitable seasoning device as desired. In one embodiment, food seasoning device 616 dispenses a desired quantity of seasoning from a bulk storage container through a delivery tube and onto food located in rotatable food dispensing member 606.

Preferably, and in the embodiment illustrated in FIG. 3, a food seasoning device 616 is provided that directs a desired quantity of seasoning onto food that is contained in a bottom portion of rotatable food dispensing member 606 and inlet chute 604 via a seasoning dispensing head 618.

Preferably, conveyor system 614 is composed of a raceway 620 that is an endless loop around the periphery of the top surface of cabinet 602 of food packaging device 600, which in one embodiment can be a modular, wheeled cabinet. Conveyor system 614 causes container receiving receptacle 612 to travel around raceway 620 to a food container pickup location 622 where a human operator can pickup food containers having food therein. Preferably, conveyor system 614 includes structure for stopping movement of a container/receiving receptacle 612 at a predetermined location when carrying a food container, such as at food container pickup location 622. Such structure in one embodiment may comprise a gate structure 928 or 928' of FIG. 45 and FIGS. 25-27, respectively, that extends across at least a portion of raceway 620 in the vicinity of the predetermined location. Any suitable type of barrier structure can be utilized to prevent the desired movement. Most preferably, gate structure 928 or 928' will be located at a height that is above the top of the receptacle when located on conveyor system 614 so that movement of container/receiving receptacle 612 is prevented or stopped only for a receptacle 612 that has a food container 611 disposed thereon. Note that the pickup location can be configured as desired and slightly different configurations 622 and 622' are shown in FIG. 45 and FIGS. 25-27, respectively.

The basic elements of food packaging device 1600 may include an inlet chute 1604, preferably a salting device 1606, preferably gates 1608 and 1610 operatively associated with inlet chute 1604, a holding bin 1612 for French fries, an automated French fry container filling device 1614 that includes an automated mechanical arm 1616 and a carriage 1618, a filled French fry container drop-off location and holding structure 1620 and preferably, a container handling system 1622 typically for carton storage, carton erection and handling, suitable for use with French fry container filling device 1614, as hereafter described in further detail. As shown in FIG. 74, an inlet chute 1603 is provided to feed cooked food products into holding bin 1603' received from fry wheel 404, typically for food items such as chicken filets, fish filets or chicken nuggets, for example, received from lane 1240. Bin 1602' may be heated, if desired.

Briefly, the operation of packaging device or module 1600 is as follows.

Food from fry module 400 or 1400, such as from fry wheel 410 is deposited onto the inlet portion of inlet chute 1604. Typically, gate 1608 will be positioned to prevent the passage of French fries past gate 1608. Salting device 1606 then operates to apply a desired quantity of salt or other seasoning to the bulk amount of French fries on inlet chute 1604 contained upstream of gate 1608. Salting device 1606 can be laterally moved along a carriage 1606' during dispersing of the salt or other seasoning to help ensure seasoning coverage over the entire quantity of French fries in inlet chute 1604 that are upstream of gate 1608. Alternatively, one or more salter devices 1606 can be mounted in a desirable stationary position above inlet chute 1604 or some other desirable location without a carriage. Salter device 1606 is similar to food seasoning device 616 described in detail hereafter.

Gate 1608 preferably is composed of reciprocable fingers that can be raised and lowered relatively rapidly so that as the bulk amount of French fries travel past gate 1608, the fingers provide a declumping action on the French fries. Gate 1610 can be in a position to retain the French fries at a lower portion of inlet chute 1604, such as if additional French fries are not needed in holding bin 1612. When gate 1610 is in an open or lowered position, French fries in the low portion of chute 1604 are free to travel into holding bin 1612.

A vibratory mechanism 1624 as shown in FIG. 76 may also be associated with inlet chute 1604 so that inlet chute 1604 vibrates to facilitate the passage of fries along inlet chute 1604 and into holding bin 1612.

French fry container filling device 1614 operates to fill erected French fry containers that typically will be individual portion-sized French fry containers, and is composed of a multilink mechanical arm 1616. Mechanical arm 1616 has an end-of-arm tool 1626 that is capable of grasping a French fry container, scooping it into French fries contained in holding bin 1612 to fill the French fry container with French fries, relatively gently shaking the filled French fry container to seat the French fries in the container and to dislodge any loosely contained French fries and depositing the filled French fry container at a drop-off location. Preferably, the filled French fry container is shaken over the holding bin so that French fries that are shaken from the container fall into holding bin 1612 and so that French fries become more firmly seated in the French fry container.

In one embodiment, automated mechanical arm 1616 can be configured and operated to mimic the arm, wrist and hand action of a human operator in scooping French fries into a French fry container to fill the container and shaking the filled French fry container to remove loosely contained French fries and to more firmly seat French fries contained in the container.

Food packaging device 1600 preferably also includes a suitable container handling system 1622. Container handling system 1622 is capable of, in a preferred embodiment, selecting a container 611 of a desired size, retrieving and grasping container 611, erecting unerected container 611 into an erected form and delivering erected container 611 to French fry container filling device 1614.

Figure 2:
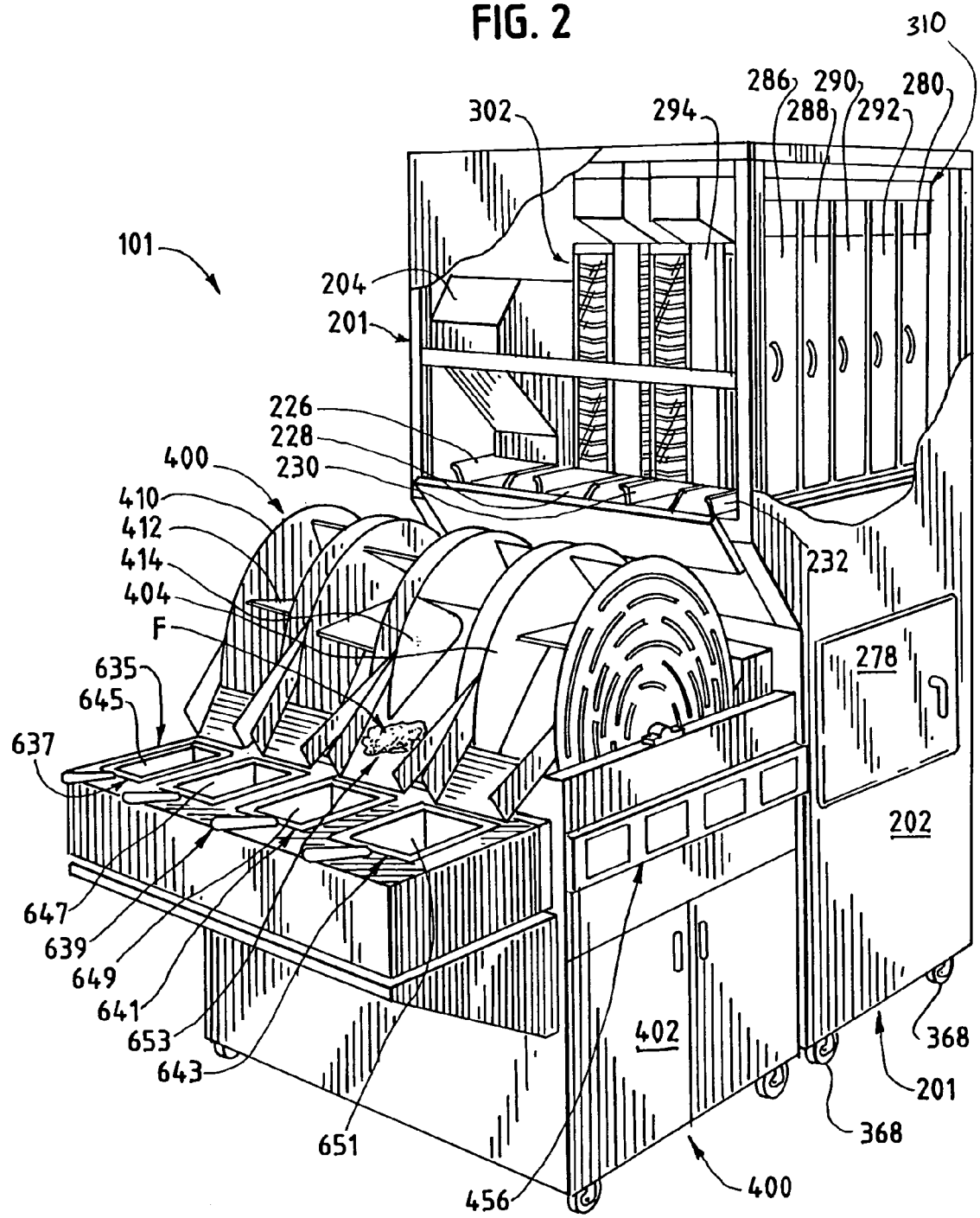
FIG. 2 is a perspective view of an alternate embodiment of a food processing system in accordance with the present invention.
Figure 75:
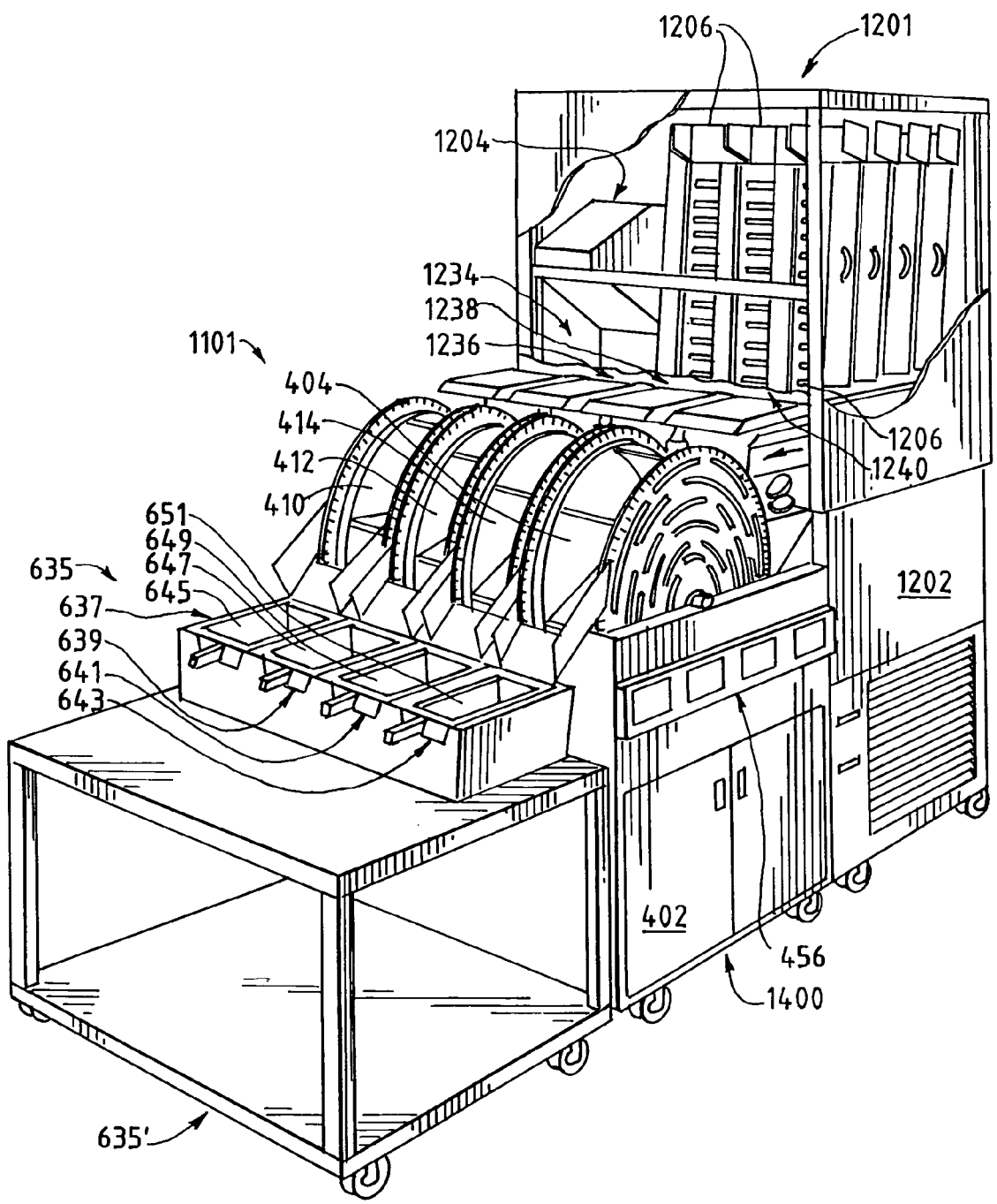
FIG. 75 is a perspective view of another embodiment of a food processing system in accordance with the present invention.

Referring to FIGS. 2 and 75, there are illustrated various alternate embodiments of automated food processing systems 101 and 1101 in accordance with the invention. Automated food processing systems 101 and 1101 include, respectively, a food dispensing device 201, 1201 which is similar to food dispensing devices 200 and 1200, previously briefly described, where like reference numerals represent like elements. Food dispensing devices 201 and 1201 include fewer uncooked bulk food dispensing containers 204, 1204 and additional magazine food dispensers that are similar to magazine food dispensers 206 and 1206, previously referred to. Otherwise, dispensing devices 201 and 1201 are similar to dispensing devices 200 and 1200, previously described, respectively.

Automated food processing systems 101 and 1101 also include fry devices 400 and 1400, respectively, which have been described.

One primary distinction between automated food processing systems 100 and 1100 and automated food processing systems 101 and 1101 is that automated food processing systems 101 and 1101 do not include an automated packaging device such as automated packaging devices 600 or 1600. In place of food packaging devices 600 or 1600, a food storage device 635 is provided, which may be contained on a movable cart 635'. Food storage device 635 allows food cooked by food frying devices 400 or 1400 to be stored in a heated environment for subsequent manual processing. As configured in FIGS. 2 and 75, food storage device 635 includes separate heated product receiving receptacles 637, 639, 641 and 643. Each receptacle 637, 639, 641 and 643 is dedicated to receiving food from a respective one of fry wheels 410, 412, 414 and 404, respectively. In addition, each receptacle 637-643 can have placed therein a suitable container to receive food, such as handled trays 645, 647, 649 and 651.

As illustrated in FIG. 2, a food item F is being discharged from fry wheel 414 down a chute 653 and into handled tray 649 contained within heated receptacle 641. Food item F can be stored therein for a period of time until it is ready for subsequent processing.

It is to be understood that other devices or modules can be used in place of any of food dispensing device 200, fry device 400 and food packaging device 600. For example, referring to FIGS. 74-91, there are illustrated alternate embodiments, namely, dispensing device or module 1200, fry device or module 1400 and packaging device or module 1600.

Food Dispensing Device

Referring to the Figures generally and in particular to FIGS. 1-10 and 74-84, there are illustrated various embodiments of food dispensing devices and portions thereof in accordance with the invention.

In two embodiments, food dispensing devices 200 and 1200 are illustrated or partially illustrated in each of FIGS. 1 and 3-8 and 74 and 76-84. Food dispensing device 200 includes a cabinet 202, bulk uncooked food dispensing containers 204, 205 and 207, magazine food dispensers 206, 209, 211 and 213, and a suitable conveyor system for each lane 234, 236, 238 and 240 of food dispensing device 200. Similarly, food dispensing device 1200 includes a cabinet 1202, bulk uncooked food dispensing containers 1204, 1205 and 1207, magazine food dispenser 1206, 1209, 1211, 1213 and 1215, and a suitable conveyor system for each lane 1234, 1236, 1238 and 1240 of food dispensing device 1200. Any suitable number of magazine dispensers can be used for a particular lane, such as one, two, three, four, five or more, and the illustrated embodiment of five is merely an example. As configured in FIGS. 1 and 74, for example, lanes 234, 1234 receive material from bulk hoppers 204, 1204, lanes 236, 1236 receive food material from bulk hoppers 205, 1205, lanes 238, 1238 receive food material from bulk hoppers 207, 1207 and lanes 240, 1240 receive dispensed food from magazine food dispensers 206, 209, 211 and 213, and 1206, 1209, 1211, 1213 and 1215, respectively, as will be described hereinafter in greater detail, particularly with respect to food dispensing device 201 of FIG. 2, for example. Food dispensing device 1200 is similar to food dispensing device 200, except that device 1200 has a different secondary container, exterior doors and differences in the conveyor apparatus, as hereafter described.

Each lane 234, 236, 238 and 240 or 1234, 1236, 1238 and 1240 dispenses food that is subsequently directed to fry wheels 410, 412, 414 and 404, respectively.

The components of lane 238 will now be described in detail and it is to be understood that the components of lanes 234 and 236 are similar. Lane 238 includes uncooked bulk food dispensing container 207 and a food handling system 242 which in this embodiment is identical for each lane 234, 236, 238 and 240 as well as for each lane of food dispensing device 201. It should be noted that food handling system 242, as for example, illustrated in FIGS. 3-6 is depicted with respect to lane 240 and that food handling system 242 is the same for each lane 234, 236, 238 and 240.

Food handling system 242 includes conveyor system 208, secondary container 210, weighing mechanism 216 and dumping mechanism 218. Conveyor system 208 includes vibratory mechanism 212 and conveyor body 214.

Uncooked bulk food dispensing container 204 can be of a shape and dimension generally as desired. Preferably, uncooked bulk food dispensing container 204 has an upper opening to permit a supply of food to be placed in uncooked bulk food dispensing container 204. Upper opening 244 as illustrated is located in an upper rear portion of uncooked bulk food dispensing container 204 and can be conveniently accessed via a rear door 246 of cabinet 202. Rear door 246 preferably is insulated with suitable insulation material 224.

Uncooked bulk food dispensing container 204 is composed of a pair of opposed upper sidewalls 248, a pair of generally opposed lower sidewalls 250 and front and rear walls 252 and 254, respectively, which connect together upper sidewalls 248 and lower sidewalls 250 to provide uncooked bulk food dispensing container 204. Front wall 252 includes a lower portion 252' that extends inwardly from top to bottom to further facilitate discharge of food contained in uncooked bulk food dispensing container 204. Preferably, lower generally opposed sidewalls 250 are slightly indented from top to bottom to facilitate the discharge of food that may be contained therein.

Uncooked bulk food dispensing container 204 includes a bottom opening 256 that permits the discharge of food contained therein. Bottom opening 256 can be configured as desired and in the illustrated embodiment the entire bottom of uncooked bulk food dispensing container 204 is open. In the illustrated embodiment, uncooked bulk food dispensing container 204 is particularly suited for use with food such as French fries and chicken nuggets as well as other types of food of relatively small size.

Uncooked bulk food dispensing container 204 is suitably mounted within cabinet 202. While a suitable mounting structure can be utilized, it is preferred to utilize a structure that will minimize heat transfer from the exterior and through cabinet 202 to uncooked bulk food dispensing container 204, particularly where cabinet 202 is refrigerated, especially where temperatures below freezing are utilized. In that regard, front mounting bracket 258 and rear mounting bracket 260 each are configured to minimize heat transfer from cabinet 202 to uncooked bulk food dispensing container 204. In that regard, front mounting bracket 258 and rear mounting bracket 260 include openings, 258' and 260', respectively, to minimize such heat transfer and to maximize airflow around the containers 204, 205, 207 and dispensers 206, 209, 211 and 213. Similarly, materials of low thermal conductivity can also be utilized, if desired, for brackets 258 and 260. Generally, to minimize heat transfer and to maximize airflow, the surface area contact and cross-sectional area of mounting brackets 258 and 260 should be minimized to reduce heat transfer and "hot spots" on uncooked bulk food dispensing container 204.

Figure 4:
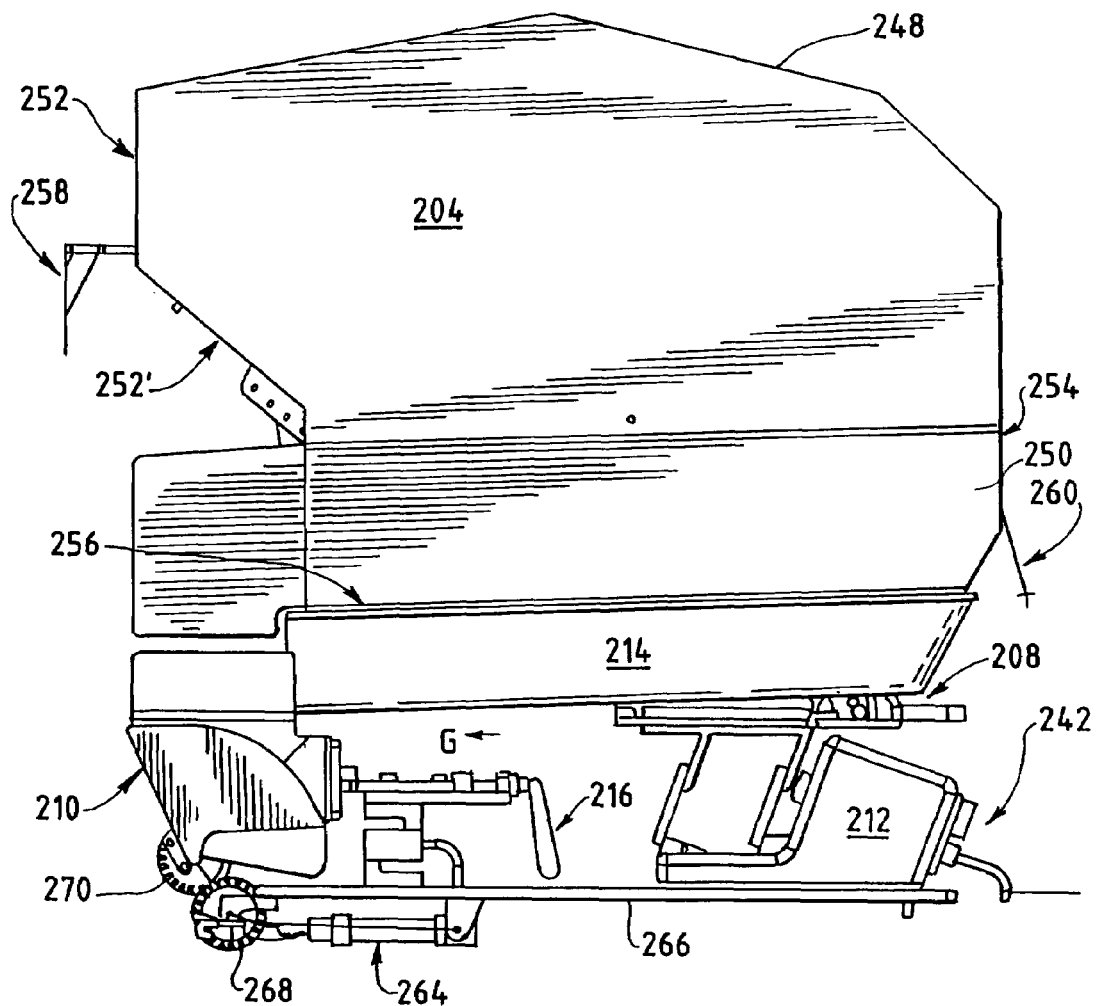
FIG. 4 is a side elevation view of a portion of a bulk food dispensing device in accordance with the present invention.

As illustrated in FIGS. 3 and 4, for example, food contained in uncooked bulk food dispensing container 204 passes through bottom opening 256 and onto conveyor body 214 which in the illustrated embodiment is a suitably dimensioned pan. Conveyor body 214 is suitably mounted to vibratory mechanism 212 to effect vibration of conveyor body 214 as well as food contained therein and food contained in uncooked bulk food dispensing container 204, and in particular the lower portion of container 204. This vibration facilitates the discharge of food from uncooked bulk food dispensing container 204 and causes food contained in conveyor body 214 to travel in the direction of arrow G. Any suitable conveyor system can be used in accordance with one aspect of the invention.

A preferred type of vibratory mechanism is available from FMC Technologies, Inc. of Chicago, Ill. marketed under the model F-010-B and DF-010-B. Vibratory mechanism 212 is preferably an electromagnetic vibrating mechanism. Vibratory mechanism 212 in one embodiment produces a vibrating stroke at the surface of conveyor body 214. The stroke results from the action of an electromagnet that pulls conveyor body 214 sharply down and backward and then allows it to spring up and forward. Typical vibratory mechanisms of this type run at about 3,600 vibrations/minute at 60 Hz power. The power of the vibrating stroke can be controlled by a suitable drive module as is known in the art. In one embodiment, vibratory mechanism 212 can be operated at about 85% of full power during filling of secondary container 210 with food. For the first part of a fill cycle of secondary container 210, vibratory mechanism 212 can be run continuously, then pulsed by turning its power on and off periodically so that vibratory mechanism 212 operates about 50% of the time to finish filling secondary container 210 with a desired quantity of food, thereby providing better control on the last part of the food charged to secondary container 210.

Food dispensing device 200 preferably includes a suitable mechanism to determine the weight or volume of a charge of food delivered by conveyor 208 to secondary container 210. The amount may be determined either by weight or volume, for example. In the illustrated embodiment, weighing mechanism 216 is operatively interfaced with secondary container 210 to provide an indication of the weight of food contained in secondary container 210. The weight sensed in secondary container 210 by weighing mechanism 216 is communicated with subcontrol system 114 of food dispensing device 200. Subcontrol system 114 monitors and controls the operative functions of food dispensing device 200 as hereinafter described in greater detail.

Optionally, a level sensor can be employed in uncooked bulk food dispensing container 204 to provide an indication of the amount of food stored therein that is available for dispensing. Any suitable level indicator known in the art can be utilized in accordance with the invention such as photoelectric, weight, turning fork and others, for example.

Secondary container 210 can be considered as a dump container and has associated therewith, dumping mechanism 218 for rotating secondary container 210 through an arc as indicated by arrow B sufficiently to dump the contents of secondary container 210. Any suitable dumping mechanism can be utilized.

Illustrated dumping mechanism 218 includes a dump cylinder 264 that is secured to a base 266. Dump cylinder 264 can selectively rotate a drive gear or wheel 268 that, in turn, is operatively associated with a follower gear or wheel 270 to cause rotation of follower gear or wheel 270. Secondary container 210 is rigidly secured to follower gear or wheel 270 so that when follower gear or wheel 270 is rotated by drive gear or wheel 268 secondary container 210 is rotated through an arc that causes secondary container 210 to rotate forward to a dumping position as illustrated in phantom lines in FIG. 3 indicated by reference numeral 210'. Such movement is caused by extension of dump cylinder 264. Similarly, retraction of dump cylinder 264 moves secondary container 210 from the dump position indicated by reference numeral 210' to the upright position indicated by reference numeral 210 in FIG. 3 where secondary container 210 is ready to receive a charge of food from conveyor 208, which in the illustrated embodiment the food is French fries FF.

Figure 4A:
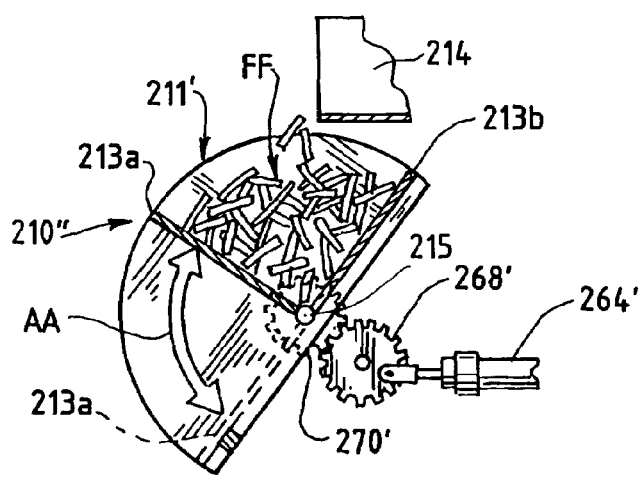
FIG. 4A is a side elevation view, partly in section, of an alternative embodiment for a portion of the dispensing device illustrated in FIG. 4.
Figure 5:
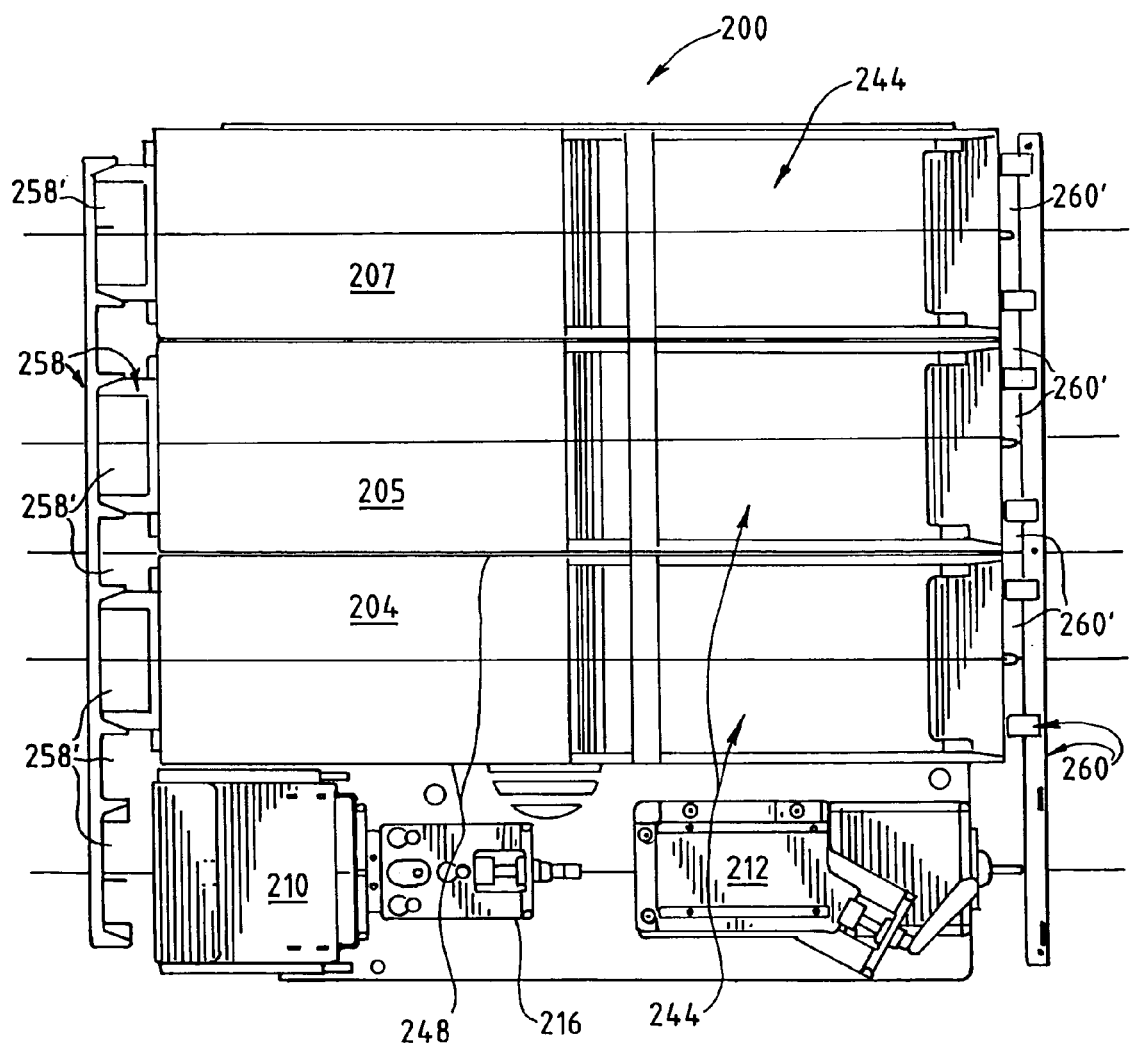
FIG. 5 is a top plan view of a portion of the bulk food dispensing device in accordance with the present invention.

An alternative embodiment for secondary container 210 is illustrated in FIG. 4A. Secondary container 210" is composed of a pair of opposed spaced apart sidewalls 211' (only one sidewall 211' is illustrated and is depicted in a half-moon configuration) and a pair of sidewalls 213a and 213b, oriented in a V-shaped relationship when container 210' is configured to receive food from conveyor body 214. Sidewall 213a is mounted for pivotal movement about apex 215 of sidewalls 213a and 213b. Such movement is accomplished by a drive mechanism similar to cylinder 264, drive gear 268 and driven gear 270, which in this embodiment are cylinder 264', drive gear 268' and driven gear 270', which gear 270' is attached to sidewall 213a. When cylinder 264' is extended, sidewall 213a is caused to pivot downwardly as indicated by arrow AA to the position of sidewall 213a shown in phantom, thereby causing the contents (French fries FF) of container 210" to be dumped. Sidewalls 211' act as sidewall guides for sidewalls 213a and 213b when sidewall 213a is in a lowered position, in which case sidewalls 213a and 213b act as a chute or slide.

The components of lane 1234 will now be described in detail and it is to be understood that the components of lanes 1236 and 1238 are similar. Lane 1234 includes uncooked bulk food dispensing container 1204 and a food handling system 1242 which in this embodiment is identical for each lane 1234, 1236, 1238 and 1240 as well as for each lane of food dispensing device 1201. It should be noted that food handling system 1242 and components thereof, as for example, illustrated in FIGS. 76-84 is depicted with respect to lane 1234 and that food handling system 1242 is generally the same for each lane 1234, 1236, 1238 and 1240 unless otherwise noted.

Food handling system 1242 includes conveyor 1208, secondary container 1210, weighing mechanism 1216 and dumping mechanism 1218. Conveyor system 1208 includes vibratory mechanism 1212 and conveyor body 1214.

Uncooked bulk food dispensing container 1204 can be of a shape and dimension generally as desired and can be similar to container 204 previously described. Preferably, uncooked bulk food dispensing container 1204 has an upper opening to permit a supply of food to be placed in uncooked bulk food dispensing container 1204. Upper opening 1244 as illustrated is located in an upper rear portion of uncooked bulk food dispensing container 1204 and can be conveniently accessed via a rear door 1246 of cabinet 1202. Rear door 1246 preferably is insulated with suitable insulation material 1224.

Uncooked bulk food dispensing container 1204 is similar to container 204 previously described.

Uncooked bulk food dispensing container 1204 includes a bottom opening 1256 that permits the discharge of food contained therein. Bottom opening 1256 can be configured as desired and in the illustrated embodiment the entire bottom of uncooked bulk food dispensing container 1204 above conveyor body 1214 is open. In the illustrated embodiment, uncooked bulk food dispensing container 1204 is particularly suited for use with food such as French fries and chicken nuggets as well as other types of food of relatively small size.

Uncooked bulk food dispensing container 1204 is suitably mounted within cabinet 1202, such as described with respect to food dispensing container 204.

Figure 77:
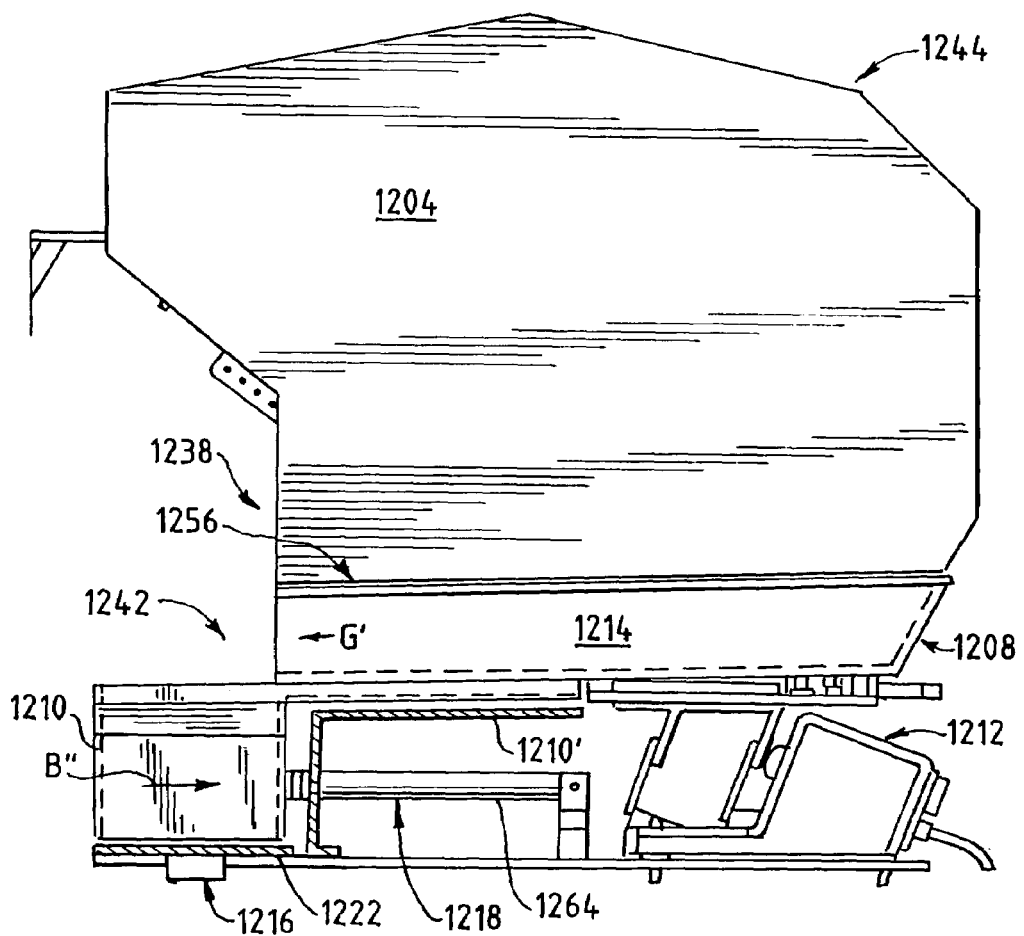
FIG. 77 is a side elevation view of a portion of a bulk dispensing device in accordance with the present invention, partly in section.

As illustrated in FIGS. 76 and 77, for example, food contained in uncooked bulk food dispensing container 1204 passes through bottom opening 1256 and onto conveyor body 1214 which in the illustrated embodiment is a suitably dimensioned pan. Conveyor body 1214 may have a plurality of spaced apart holes in a bottom portion thereof (shown in FIG. 79 with respect to conveyor 1214') to permit ice crystals or unwanted small particles of food to pass therethrough so that such material is not dispensed to fry module 1400. Any suitable or desired array of holes or apertures can be utilized as desired. Typically, the hole size will be about 0.25 inches or less and may be about 0.125 inches or less. Below and at the downstream bottom end of conveyor body 1214 is located secondary container 1210, which is positioned to receive food items from conveyor body 1214 of conveyor 1208. Conveyor body 1214 is suitably mounted to vibratory mechanism 1212 to effect vibration of conveyor body 1214 as well as food contained therein and food contained in uncooked bulk food dispensing container 1204, and in particular the lower portion of container 1204. This vibration facilitates the discharge of food from uncooked bulk food dispensing container 1204 and causes food contained in conveyor body 1214 to travel in the direction of arrow G'. Any suitable conveyor system can be used in accordance with one aspect of the invention. The same type of vibratory mechanism can be used as previously described with respect to vibratory mechanism 212.

Figure 77A:
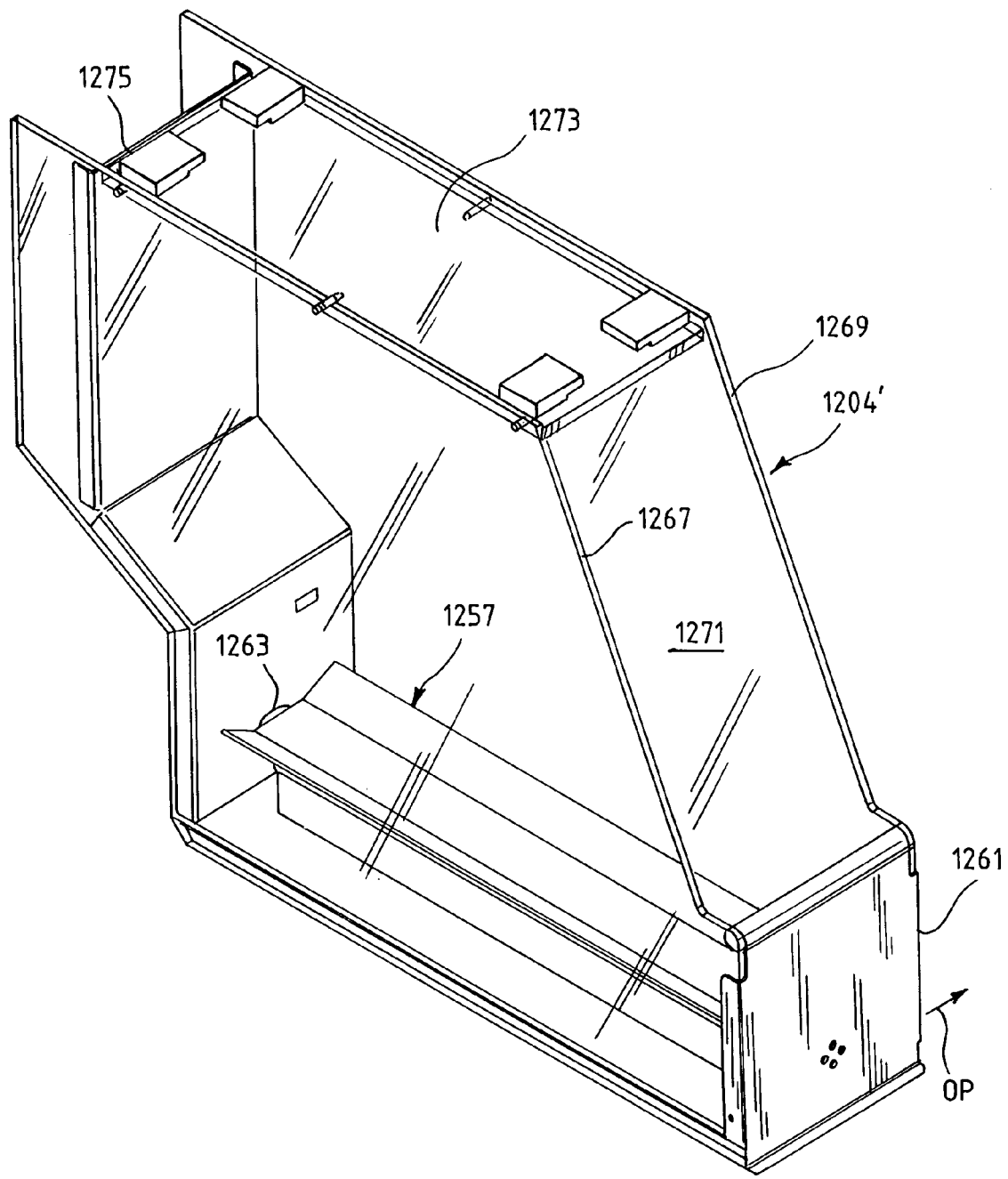

In accordance with another embodiment of the invention, a regulating device which may be an elongated rotatable device, may be provided at a lower portion of bulk food dispensing container 207 or 1204, or otherwise located between the bottom or a bottom portion of container 207 or 1204 and above or along an upper portion of conveyor 214 or 1214. The regulating device limits the quantity of French fries or other food that is delivered to conveyor 214 or 1214 so that conveyor 214 or 1214 does not get overloaded or jammed with food items. Such a device is illustrated in FIGS. 77A and 77B and includes an elongated vane device 1257, rotatable by a suitable motor device (not shown). In one embodiment, vane device 1257 can be rotated about 120° in either direction and after rotating, food (e.g., French fries) is caused to be dispensed into conveyor 214 or 1214. When additional food is needed for conveyor 214 or 1214, which can be determined by a suitable sensor, which can be an optical sensor or a load cell associated with conveyor 214 or 1214, vane device 1257 is rotated 120° in the motor drive in the opposite direction. The 120° rotation typically is accomplished in about 2 seconds, for example.

As illustrated in FIGS. 77A and 77B, vane device 1257 is composed of three equally spaced apart vanes or paddles 1257a-c, mounted to a central triangular section 1259. Vane device 1257 can be conveniently removed from bulk food dispensing container 1204 through hinged access door 1261, as illustrated in FIGS. 77A and 77B, which can be opened and closed by rotation in the direction of arrows OP and CL, respectively. A support 1265 for one end of vane device 1257 is provided on an interior portion of door 1261 as shown in FIG. 77B. A suitable aperture 1263 is provided through container 1204 for the motor device for vane device 1257, as shown in FIG. 77B with vane device 1257 removed.

Container 1204 can be otherwise similar to container 1204 and can be constructed of, for example, transparent walls 1267, 1269, 1271 and 1273 as illustrated in FIGS. 77A and 77B, with front wall 1275 being metal or another suitable material.

Food dispensing device 1200 preferably includes a suitable mechanism to determine the weight or volume of a charge of food delivered by conveyor 1208 to secondary container 1210. The amount may be determined either by weight or volume, for example. In the illustrated embodiment, weighing mechanism 1216 is operatively interfaced with secondary container 1210 to provide an indication of the weight of food contained in secondary container 1210. The weight sensed in secondary container 1210 by weighing mechanism 1216 is communicated with subcontrol system 1114 of food dispensing device 1200. Subcontrol system 1114 is similar to subcontrol system 114 and monitors and controls the operative functions of food dispensing device 1200 as hereinafter described in greater detail.

Optionally, a level sensor can be employed in uncooked bulk food dispensing container 1204 to provide an indication of the amount of food stored therein that is available for dispensing. Any suitable level indicator known in the art can be utilized in accordance with the invention such as photoelectric, weight, turning fork and others, for example.

Secondary container 1210 is a bottomless box-like container having an open top and is composed of generally upstanding sidewalls. A floor or platform 1222 is stationary and is located beneath container 1210 when in the retracted or home position as shown in FIG. 77. In this position, container 1210 is able to receive food items from associated conveyor 1208. An elongated lip or tray 1210' extends from back wall 1210a of container 1210 so that when container 1210 is in the dump position, lip or tray 1210' is located below the discharge end of conveyor body 1214 so that any articles of food that may fall from the end of conveyor body 1214 will be collected on lip or tray 1210' and those items will be deposited into container 1210 as it is retracted to the home or filling position. When holes are present in the bottom of conveyor 1214 or 1214', a suitably removable catch pan (not shown) is located between the bottom of conveyor 1214 or 1214' and the top of lip 1210' so that food particles or ice crystals falling through holes in the bottom of conveyor 1214 or 1214' do not land on lip 1210'.

Figure 78:
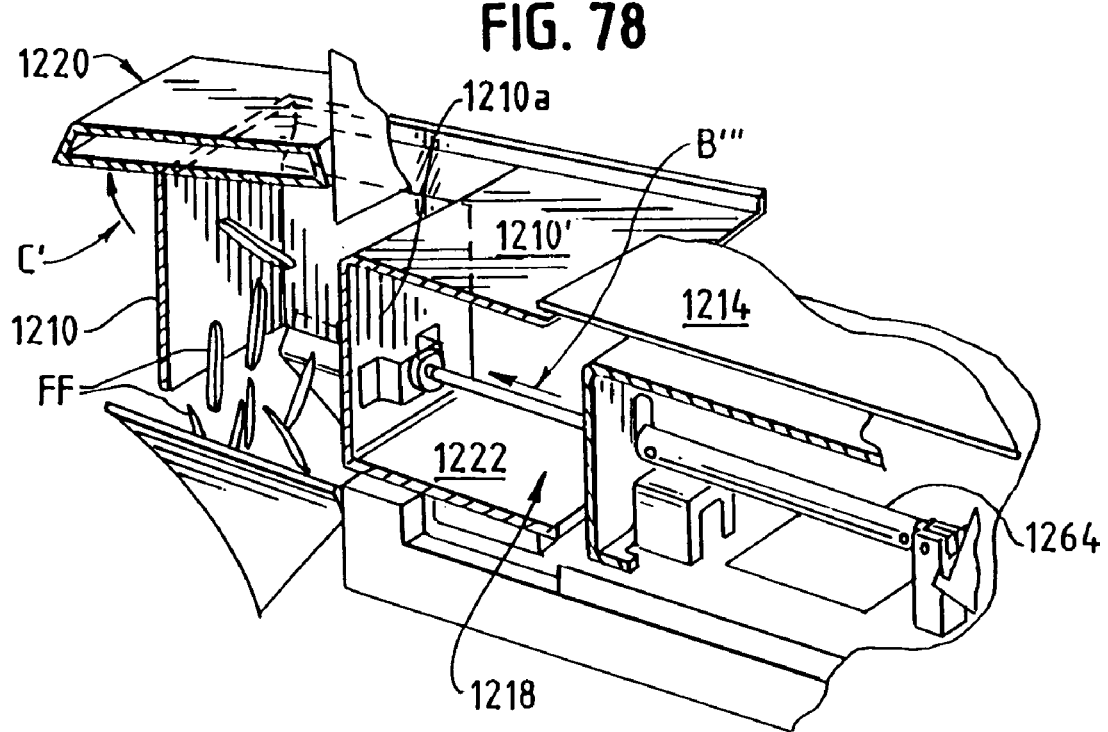
FIG. 78 is a side perspective view of a portion of a bulk dispensing device in accordance with the present invention, partly in section.

Secondary container 1210 can be considered as a dump container and has associated therewith dumping mechanism 1218 for laterally moving secondary container 1210 to retracted and extended positions relative to stationary floor or platform 1222 as indicated by arrows B', B" and B'" in FIGS. 76-78, respectively, sufficiently to open door 1220 and to dump the contents of secondary container 1210. Any suitable mechanism can be utilized to effect the desired lateral movement of container 1210 and as illustrated, dumping mechanism 1218 includes a dump cylinder or actuator 1264 that is secured to a base 1266. Dump cylinder 1264 can selectively laterally translate secondary container 1210 which is secured to dump cylinder 1264 so that when secondary container 1210 is laterally moved or translated to the left, as illustrated in FIG. 78, secondary container 1210 moves forward to a dumping position. Such movement is caused by extension of dump cylinder 1264. Similarly, retraction of dump cylinder 1264 laterally moves secondary container 1210 from the dump position to the home or filling position as shown in FIG. 77 where secondary container 1210 is ready to receive a charge of food from conveyor 1208, which in the illustrated embodiment the food is French fries FF.

An alternative embodiment for conveyor body 1214, conveyor body 1214', is illustrated in FIGS. 79 and 80. Conveyor body 1214' is particularly suitable for conveying chicken nuggets and similarly shaped types of food items. Conveyor body 1214' has a tray-like body 1214a and a discharge end 1214b and an inlet portion 1214c. Inlet portion 1214c includes an upwardly extending dividing member 1214d that divides conveyor body 1214' into two food inlet passageways 1214e and 1214f. As illustrated, dividing member 1214d is saddle-shaped. Inlet passageways 1214e and 1214f merge into a single passageway 1214g which initially is relatively wide at portion 1214g' and subsequently narrows as passageway 1214g progresses towards discharge end 1214b. Such arrangement promotes declumping of the chicken nuggets contained in bulk container 204 or 1204 and permits the chicken nuggets to be conveyed in a single file orientation towards discharge end 1214b. This permits effective dispensing and metering of chicken nuggets into either secondary container 210 or 1210. The width of passageway 1214g after narrowing is about the width of a single chicken nugget and may slightly increase if desired towards discharge end 1214b if desired. Preferably, passageway 1214g has a non-linear path and may be serpentine or zigzag as illustrated, which further promotes accurate dispensing of chicken nuggets or other similarly shaped food articles, which could include, as non-limiting examples, breaded shrimp, cheese nuggets and jalapeno poppers.

Passageway 1214g may include a plurality of holes 1214h or perforations through bottom 1214i of conveyor body 1214' to permit small unwanted ice crystals or food particles to pass therethrough so that such items are not dispensed to fry module 400 or 1400.

Referring to FIGS. 81 and 82 there is illustrated the dispensing door arrangement in accordance with one embodiment of the present invention. As illustrated, one door 1220, 1220a, 1220b and 1220c is provided for each respective product dispensing lane 1238, 1234, 1236 and 1240, respectively. Each of doors 1220, 1220a, 1220b and 1220c are hinged at the top to close by gravity and are opened when container 1210 associated with a particular one of doors 1220, 1220a, 1220b and 1220c is laterally translated by cylinder 1264 to a dumping position as shown in FIG. 78 with respect to door 1220 which has been opened in the direction of arrow C'.

Door edge overlapping members 1221a, 1221b and 1221c are hinged to swing open in a manner similar to doors 1220, 1220a, 1220b and 1220c. Door edge overlapping members 1221a, 1221b and 1221c are each associated with the respective adjacent doors 1220, 1220a, 1220b and 1220c as illustrated in FIGS. 81 and 82 and are hinged for movement similar to that independent of doors 1220, 1220a, 1220b and 1220c, such as in the direction of arrow XX in FIG. 82. The door edge overlapping members provide a more complete seal between the sides of doors 1220, 1220a, 1220b and 1220c that are not adjacent the ends of dispensing device 1200, thereby restricting entry of water vapor to the interior of dispensing device 1200 when doors 1220, 1220a, 1220b and 1220c are in a closed position. When one of doors 1220, 1220a, 1220b and 1220c open, the adjacent door edge overlapping members 1221a, 1221b and 1221c also open as shown in FIG. 81, where the opening of door 1220 causes door edge overlapping members 1221b and 1221c to open, which can be moved independently of doors 1220, 1220a, 1220b or 1220c as shown in FIG. 82.

Referring to FIGS. 83 and 84, there are illustrated various embodiments of a declumping member in accordance with the present invention.

As illustrated in FIG. 83, which is a partial fragmentary exploded view of dispensing device 1200 showing generally vertically extending declumping member 1370 comprises a downwardly depending pin that is attached to a lower portion of bulk dispensing container 1204 or to some other suitable structure. Member 1370 is stationary and extends downwardly to a position just above the bottom of conveyor body 1214. Thus, when French fries or other food items are conveyed along conveyor body 1214 which vibrates, member 1370 is stationary and tends to declump or break apart a frozen clump or mass of French fries as they vibrate and travel past member 1370.

Referring to FIG. 84, which is a partial fragmentary exploded view of dispensing device 1200 showing an alternate embodiment declumping member 1372 that is attached to the bottom of conveyor body 1214 and extends upwardly therefrom. French fries or other food items conveyed along conveyor body 1214 will encounter member 1372 which will tend to declump or break apart a clump or mass of French fries as they travel past member 1372.

Other configurations of declumping members may be used in place of members 1370 and 1372. Any structure that tends to declump or break apart a mass or frozen clump of French fries or similar food can be used.

Figure 6:
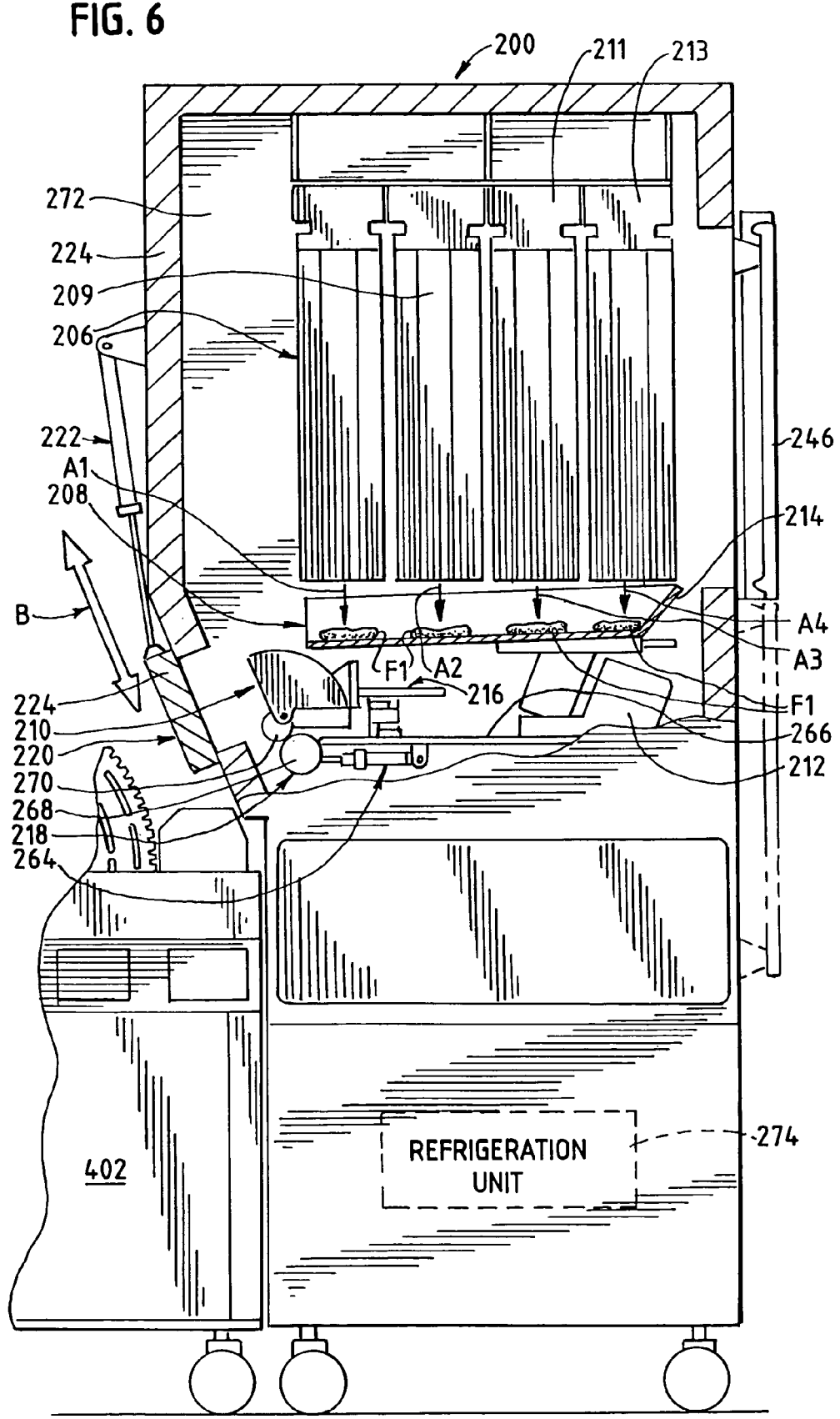
FIG. 6 is a side elevation view, partly in section, of a bulk food dispensing device in accordance with the present invention and also illustrating a portion of a device for frying food in accordance with the present invention.

Subcontrol system 114 coordinates the operation of the various functions of food dispensing device 200 and/or food dispensing device 1200. For example, when food dispensing device 200 or 1200 is ready to dump a charge of food from secondary container 210 or 1210 out of food dispensing device 200 or 1200, subcontrol system 114 activates cylinder 222 (only for device 200) to open discharge door 220 thereby permitting the food charge in secondary container 210 to be dumped by dumping mechanism 218 through open discharge door 220. Dump cylinder 264 or 1264 is extended causing secondary container 1210 of device 1200 to open door 1220 and dump the contents therein to fry device 1400. After dumping of the food charge is completed, subcontrol system 114 causes dump cylinder 264 or 1264 to be retracted thereby returning secondary container 210 or 1210 to a position ready to accept a further charge of food from conveyor system 208 or 1208. For device 200, cylinder 222 has one end rigidly secured to cabinet 202 or some other suitable location and the other end of cylinder 222 is attached to discharge door 220. Typically, discharge door 220 will have a suitable guide mechanism, which may be tracks, slots or other suitable apparatus to guide discharge door 220 to its open and closed positions. Cylinder 222 is operable to move door 220 up and down as indicated by arrow B in FIG. 6 to thereby open and close discharge door 220 as desired. In the illustrated embodiment, discharge door 220 extends across all four dispensing lanes 226, 228, 230 and 232. If desired, a separate discharge door could be provided for each of dispensing lanes 226, 228, 230 and 232 such as doors 1220, 1220a, 1220b and 1220c previously described. In addition, subcontrol system 114 causes activation of cylinder 222, when present, to close discharge door 220 to prevent heat from entering into cavity 272 of food dispensing device 200 in which the food and various dispensing mechanisms are contained as illustrated in FIGS. 3 and 6, for example.

Food dispensing devices 200 and 1200 can contain suitable refrigeration components 274 such as within a lower portion of cabinet 202 as shown schematically in FIG. 1. In accordance with the preferred embodiment of food dispensing devices 200 and 1200, refrigeration components 274 provide sufficient cooling to provide a below freezing temperature environment in cavity 272. Alternatively, suitable refrigeration components can be provided exteriorly of cabinet 202 and even at a remote location as desired. In addition, a storage compartment 276 and a storage compartment door 278 may also be provided in cabinet 202. An upper side access door may also be provided to permit operator access to the interior of cavity 272 where uncooked bulk food dispensing containers 204 and/or magazine food dispensers 206 and/or 209, 211 and 213 are located.

Referring to FIGS. 2 and 7-10, there is illustrated another embodiment of food dispensing device 201 in accordance with the present invention.

Food dispensing device 201 has many similarities to food dispensing device 200 previously described where like reference numerals represent like elements. Thus, food dispensing device 201 includes cabinet 202, four product dispensing lanes 226, 228, 230 and 232 with each such lane incorporating conveyor 208, secondary container 210, vibratory mechanism 212, conveyor body 214, weighing mechanism 216, dumping mechanism 218, discharge door 220, cylinder 222, insulating material 224, food handling system 242, upper opening 244, rear door 246, uncooked bulk food dispensing container 204 which is associated with product dispensing lane 234, a dump cylinder 264 for each product dispensing lane, cavity 272, refrigeration components 274, storage compartment 276 and a storage compartment door 278. Product dispensing lanes 228, 230 and 232 each have associated therewith a plurality of magazine food dispensers 280-308 arrayed to provide in the embodiment illustrated in FIG. 9 five magazine food dispensers per product dispensing lane in which there are three product dispensing lanes serviced by the foregoing magazine food dispensers. Consequently, magazine food dispensers are configured in a three-by-five array and are suspended from a magazine food dispenser support 310 as shown in FIG. 9. Each row of three magazine food dispensers depends from magazine food dispenser support 310 via a slide assembly 312. Slide assembly 312 is similar to a drawer slide including a pair of first and second elongated telescoping left and right slides 314 and 316, respectively. Suitable upper rollers 318 are mounted to magazine food dispenser support 310 and lower rollers 320 depend from magazine food dispensers 280-308 for traversing left and right elongated telescoping slides 314 and 316.

Suitable mounting brackets 322 are provided which depend upwardly from magazine food dispenser support 310 for mounting to cabinet 202.

In addition, suitable mounting brackets 324 are provided which depend downwardly from magazine food dispenser support 310 for mounting slide assembly 312 thereto allowing magazine food dispensers 280-308 to depend therefrom.

Magazine food dispenser support 310 has a series of holes 326 and 328 therein. Holes 326 can be provided to allow increased airflow and cooling. Holes 328 can also be provided to provide increased airflow and cooling for magazine food dispensers 280-308.

Each of magazine food dispensers 280-308 and 206, 209, 211 and 213 briefly discussed with respect to food dispensing device 200 are similar in construction. Magazine food dispenser 206 will be discussed with respect to FIGS. 7 and 8 and it is to be understood that the other magazine food dispensers are of similar construction.

Magazine food dispenser 206 includes a body or housing 330 that includes sidewalls 332 and 334, front walls 336 and 338 and corresponding rear walls (not shown) and can be attached in a removable manner if desired, including in a snap-on arrangement to facilitate cleaning. Magazine food dispenser 206 also includes a top member or cover 340 having mounted thereover a drive mechanism 342. Drive mechanism 342 includes a drive gear or wheel 344 and a driven wheel or gear 346. Depending from each of drive wheel or gear 344 and driven wheel or gear 346 is a spiral flight that is vertically or generally vertically oriented relative to the longitudinal axis of spiral flights 348 and 350. If desired, a single spiral flight dispenser (not shown) could also be utilized.

Body 330 of magazine food dispenser 206 can include substantial open portions such as front open portion 352 and a corresponding rear open portion (not shown). Such open portions may have a cover or access door thereover (not shown). Such open portions can be desirable to permit airflow through magazine food dispenser 206 since generally such dispenser will be contained in a refrigerated environment and such openings help ensure that food contained therein remains frozen or chilled as desired. A vertical divider (not shown) can be provided between spiral flights 348 and 350 if desired.

A plurality of generally vertically disposed and spaced apart rods 354, 356 and 358 may be provided at the front of magazine food dispenser 206 adjacent spiral flights 348 and 350 and similar rods can be provided at the back of magazine food dispenser 206. Rods 354, 356 and 358 prevent food pieces from falling out of spiral flights 348 and 350 and to maintain spiral flights 348 and 350 in a vertical orientation.

Magazine food dispenser 206 has an open bottom 360 through which food pieces can be dispensed during operation.

During operation, drive wheel 344 can be driven by a suitable electric motor, such as an electric motor 362, 364 and 366 shown with respect to magazine food dispensers 280, 282 and 284 in FIG. 9. Alternatively, other drive devices could be used, including, for example, a rotary air or hydraulic cylinder. Rotation of drive wheel 344 in a clockwise direction causes driven wheel 346 to rotate in a counterclockwise direction by virtue of the intermeshing or contact between drive wheel or gear 344 and driven wheel or gear 346. Such rotation causes corresponding rotation of spiral flights 348 and 350, respectively. Food contained by spiral flights 348 and/or 350 is moved downwardly by virtue of such rotation. When such food reaches the bottom of spiral flights 348 and/or 350, respectively, such food is discharged from magazine food dispenser 206 through open bottom 360 and onto conveyor 208 for handling as previously described or onto conveyor 1208, for example. A single motor could be used to drive a plurality of dispensers 280, 282 and 284, etc. through a suitable drive mechanism (not shown).

Figure 7:
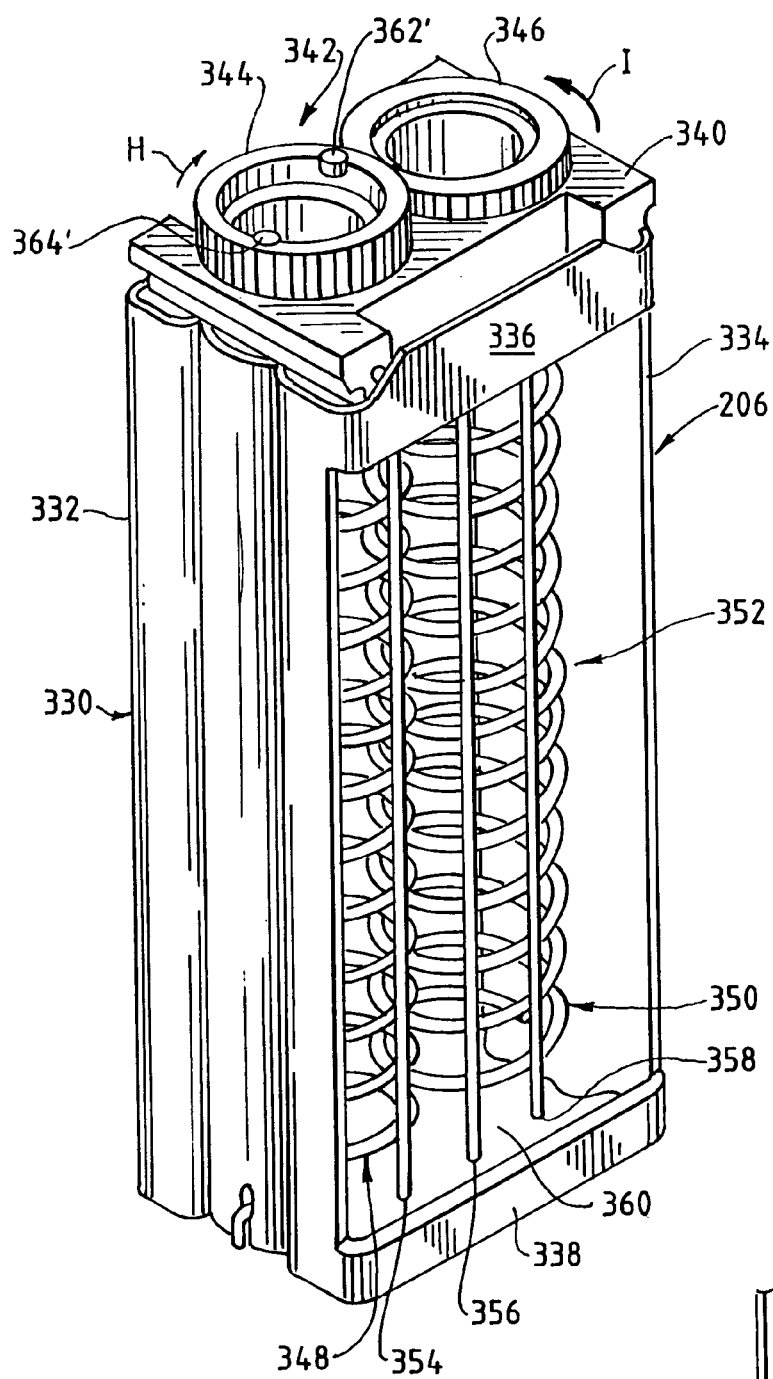
FIG. 7 is a perspective view of a magazine-type dispenser that can form part of the food dispensing device of the present invention.
Figure 8:
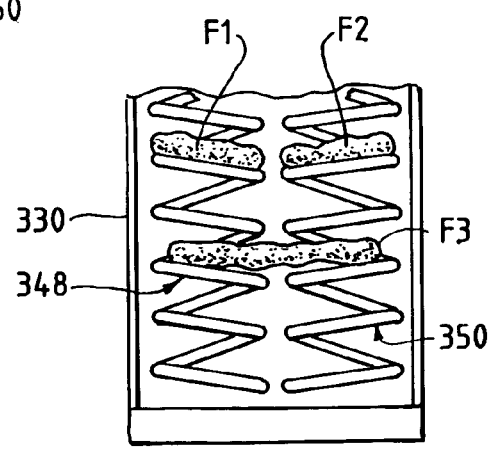
FIG. 8 is a partial side elevation view of the magazine dispenser of FIG. 7.
Figure 11:
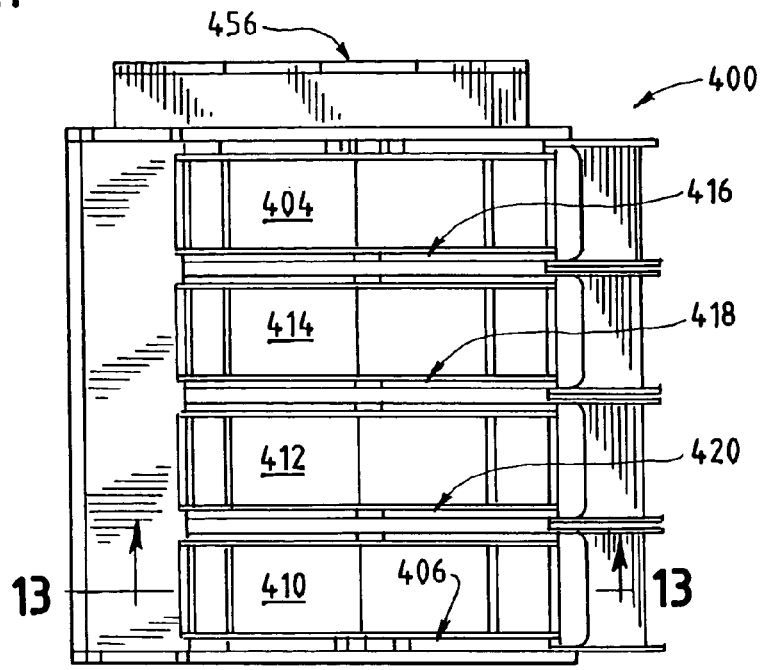
FIG. 11 is a top plan view of a food frying device in accordance with the present invention.

As shown in FIG. 8, pieces of food can be contained by magazine food dispenser 206 in two different ways. For example, individual pieces of food may each be contained by a single elongated spiral flight 348 or 350 as shown with respect to food pieces F1 and F2, respectively. Food pieces F1 and F2 can be any type of desired food and may be a food item such as a hash brown, an individual portion pie, rectangular food patty, or other type of food as desired. Chicken nuggets and other food can also be dispensed with the bulk dispenser previously described. Larger items of food can span across portions of both elongated spiral flights 348 and 350 as illustrated with respect to food item F3, which may be a larger food item, such as a chicken patty, or other type of food article as desired. Spiral flights 348 and 350 can be of a desired radial diameter so that the food piece or pieces that are to be contained and dispensed in magazine food dispenser 206 can be accommodated as illustrated in FIG. 8. Each spiral can contain a food piece so that as illustrated in FIG. 7, the illustrated spirals of spiral flights 348 and 350 could each accommodate twelve food pieces such as food pieces F1 or F2 for a total of twenty-four food pieces or twelve food pieces such as food piece F3 of FIG. 8. As will be appreciated, spiral flights having a greater or lesser number of flights can be used if desired to hold a greater or lesser number of food pieces, respectively.

A suitable home position sensor 362' can be utilized to indicate a home or start position of each of spiral flights 348 and 350. As illustrated in FIG. 7, a pair of position indicating sensors 362' and 364' are utilized and mounted on drive wheel 344 180° apart for more precise locating of the position of spiral flights 348 and 350. Sensors 362' and 364' can be proximity sensors that align with corresponding sensor pickups on the respective drive gear or motor for magazine food dispenser 206 (not shown).

Preferably, spiral flights 348 and 350 are offset by one rotation so that a single food item such as food item F1 or F2 in FIG. 8 will be dispensed from one of either spiral flight 348 or 350 for each one-half rotation of spiral flights 348 and 350.

Food dispensing devices 1200 and 1201 may incorporate magazine dispensers such as magazine dispensers 280-308 as previously described. Thus, dispensing device 1200 has a one-by-five array of magazine dispensers, such as magazine dispenser 206 and dispensing device 1201 incorporates magazine dispensers 280-308 as previously described for dispensing device 201. Food dispensing devices 1200 and 1201 utilize the conveyor system and food dump mechanism as previously described with respect to dispensing device 1200.

Preferably, food dispensing devices 200 and 1200 and food dispensing devices 201 and 1201 are constructed in modular form, an example of which is illustrated in FIGS. 1 and 74 and 2 and 75, respectively. Wheels 368 can be provided to permit cabinets 202, 402 and 602 to be suitably transported across a relatively flat surface, such as a restaurant work area floor.

Figure 12:
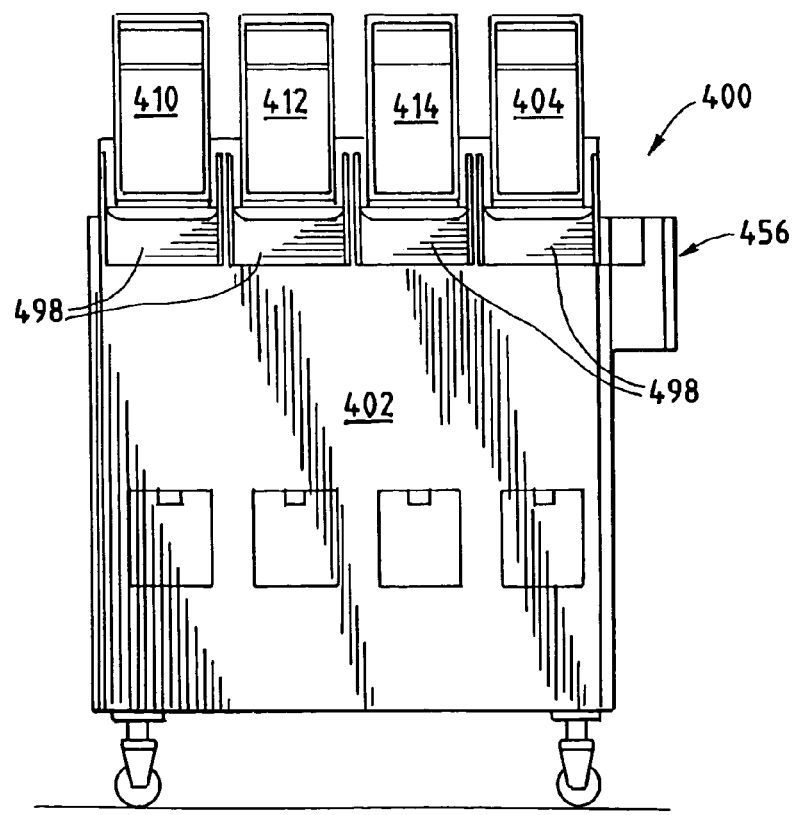
FIG. 12 is a front elevation view of the food frying device of FIG. 11.
Figure 85:
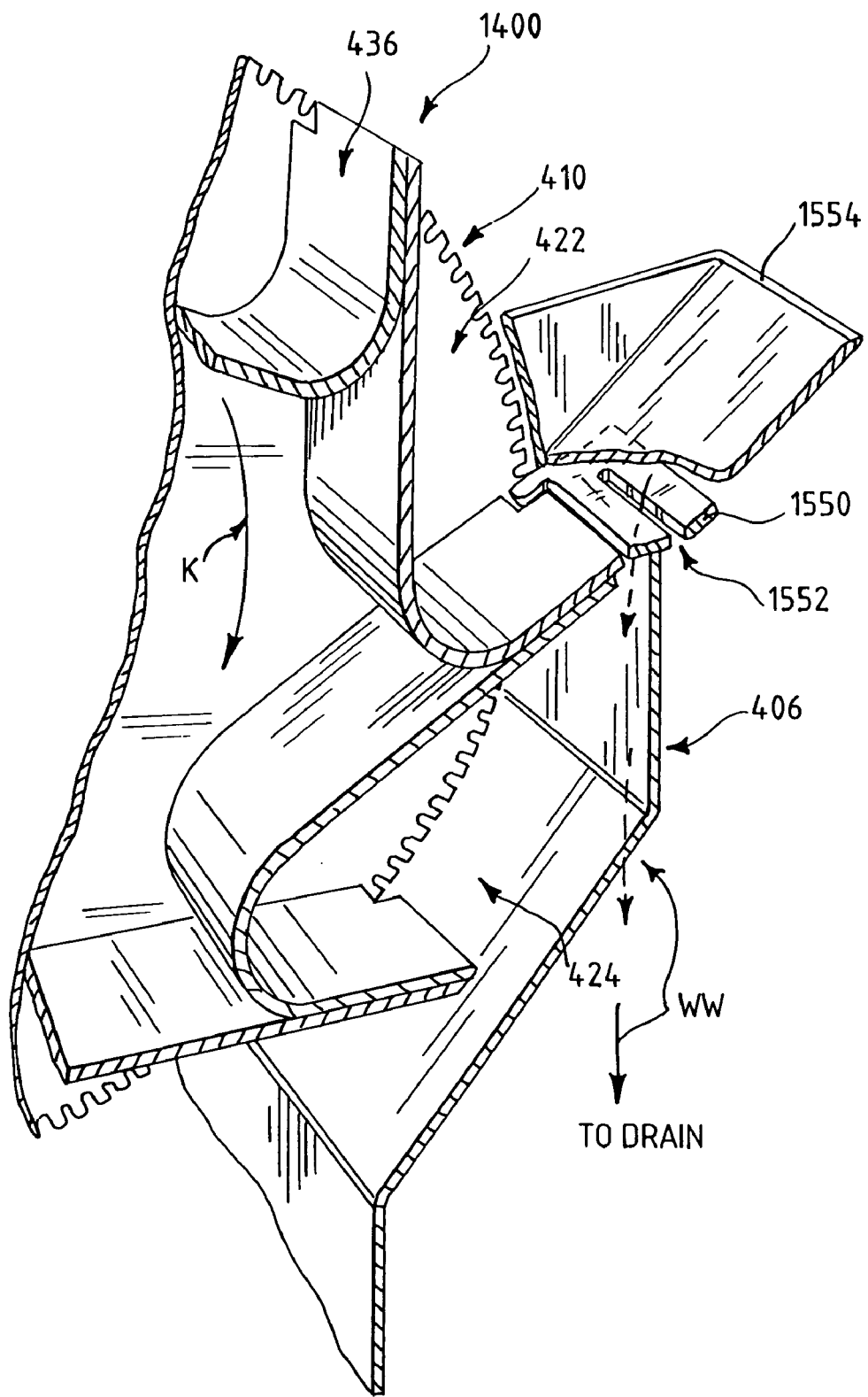
FIG. 85 is a fragmentary perspective view, partly in section, of a fry module in accordance with one embodiment of the present invention.

In accordance with another embodiment of the invention for dispensing modules 200 and 1200, a magazine dispenser, such as magazine food dispenser 1206 can be oriented horizontally instead of vertically. Such a horizontally oriented magazine dispenser can be configured to discharge food items onto an inclined chute contained within the freezer compartment or cavity of dispenser 200 or 1200 (for example cavity 272 of device 200) to receive dispensed food items, which chute is positioned with a discharge end oriented to deposit the food items directly into secondary container 210 of dispensing device 200 or secondary container 1210 of dispensing device 1200. Thus, the vibrating conveyor need not be used. The chute may be constructed in any suitable configuration, such as, for example, as non-limiting examples, chute 498, 1603 or 1554, as illustrated in FIGS. 12, 74 and 85, respectively. In addition, a single spiral flight, such as spiral flight 348, may be used in the horizontal orientation instead of two spiral flights.

Figure 77D:
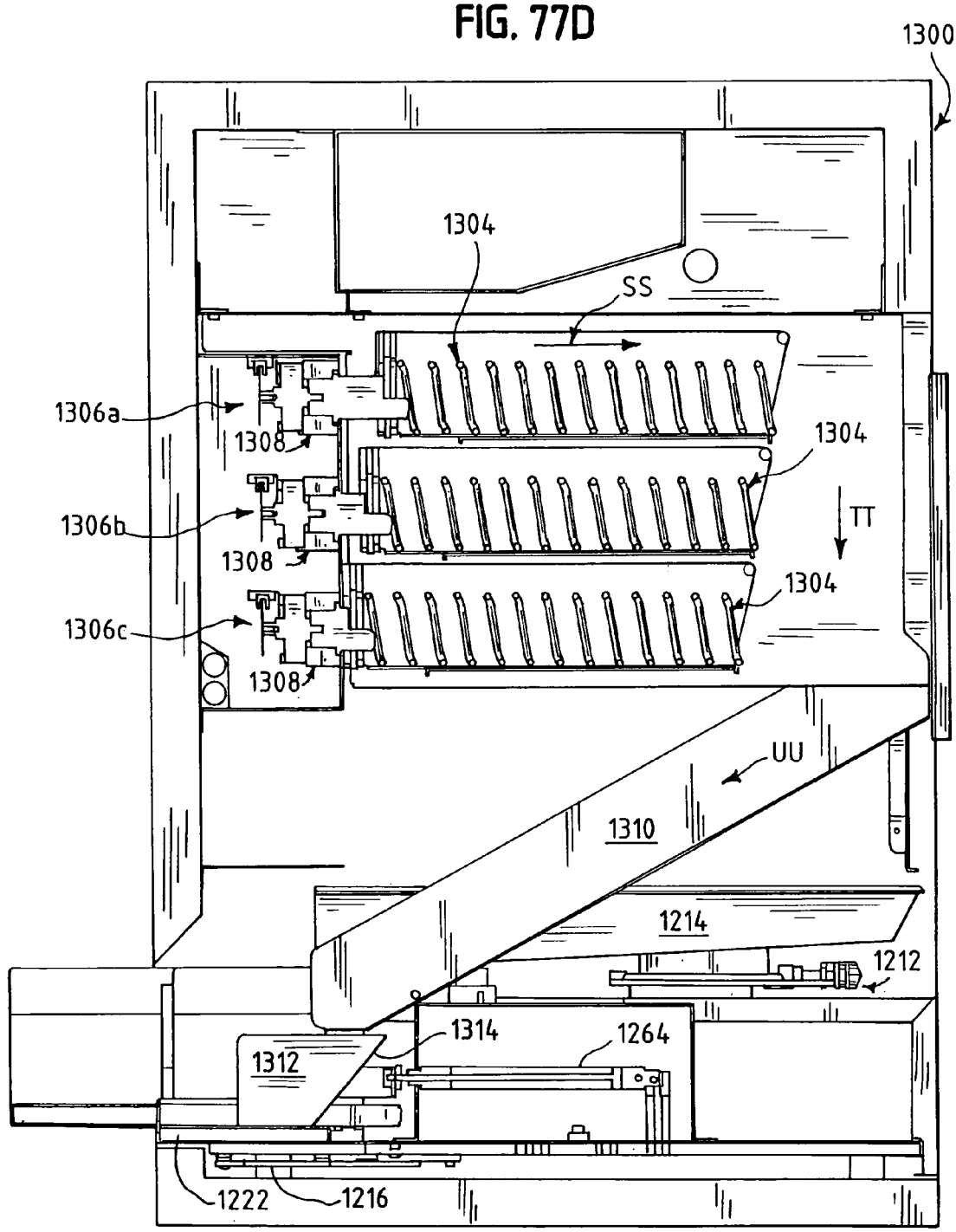

An example of the foregoing embodiment is illustrated in FIGS. 77C and 77D. As illustrated therein, a magazine dispensing device 1300 is provided for the dispensing of individual food items, and is oriented horizontally, forming part of food dispensing module 1302. Food items are conveyed by a single spiral conveyor 1304 for each spiral magazine 1306a-c in the direction of arrow SS. Each spiral magazine 1306a-c is driven by a suitable motor 1308 or other suitable drive mechanism. After a food item is dispensed from one of spiral magazines 1306a-c, the food item falls in the direction of arrow TT and onto inclined chute 1310. The food item then travels down chute 1310 in the direction of arrow UU and into secondary container 1312, which is similar to secondary container 1210, except rear wall 1314 is slightly inclined. The other indicated elements are similar to dispensing module 1210 or other elements previously described, as indicated by the reference numerals therein. Thus, no vibrating conveyor is used in this embodiment for the dispensing of food items from the spiral conveyor, as the food items travel to secondary container 1312 by gravity after being dispensed from one of spiral magazines 1306a-c.

In addition, a suitable sensor (not shown) may be utilized to sense or count the number of food articles being dispensed from the spiral flight or flights. The sensor can be any suitable type including, as non-limiting examples, either an ultrasonic or an optical sensor, which are well known in the art, or by weighing, such as a load cell.

Food Frying Device

Referring to the Figures generally, and in particular to FIGS. 1-2 and 11-24, there is illustrated fry device 400 and various components and alternative components thereof in accordance with the invention.

In one embodiment, fry device 400 includes cabinet 402, four fry wheels 404, 410, 412 and 414, four fry vats 406, 416, 418 and 420, four drive mechanisms 408, one for each of fry wheels 404, 410, 412 and 414. Each fry vat 406, 416, 418 and 420 is dimensioned to contain a desired volume of a suitable cooking oil. Each fry vat 406, 416, 418 and 420 is dedicated to one of fry wheels 404, 410, 412 and 414, respectively.

In operation in the preferred embodiment, fry device 400 is positioned to receive the food dispensed from a food dispensing device, such as food dispensing device 200 and food dispensing device 201. Consequently, it is advantageous to position fry device 400 adjacent food dispensing device 200 or 201 as illustrated in FIGS. 1 and 2, respectively. A suitable control panel 456 can be provided and located in a suitable location, such as on the side of cabinet 402. In the illustrated embodiment, control panel 456 contains a separate display for each of fry wheels 404, 410, 412 and 414 referred to by reference numerals 456a-d, respectively. Control panels and displays 456a-d can include information such as set cycle time, oil temperature, oil level as well as controls to adjust cycle time and oil temperature, for example.

Referring to FIG. 13, there is illustrated fry wheel 410. Fry wheel 410 includes two opposed circular spaced apart circular disks 458a and 458b. Disks 458a and 458b can include a plurality of apertures 460 as desired to reduce wheel weight and to provide circulation of cooking oil and to permit passage of water vapor therethrough, such as during frying food products, for example. A fry wheel axle 462 is provided to which disks 458a and 458b are mounted. Axle 462 is suitably mounted, typically and preferably for rotation with respect to fry vat 406 at a location above the normal level of cooking oil or range of levels of cooking oil that will be encountered in fry vat 406 during operation.

In one embodiment, outer peripheral edge 464 of each of disks 458a and 458b include a plurality of teeth 466.

Teeth 466 can be utilized to drive fry wheel 410 in a manner as hereinafter described. Referring to FIGS. 14-16, there is illustrated in sectional view of disk 458a of fry wheel 410, a portion of which is located within fry vat 406. A drive wheel 468 is associated in operative position relative to teeth 466 located on outer peripheral edge 464 of disk 458a. Drive wheel 468 can be formed from a disk of material of a suitable thickness having a circumferential groove 470 therein. Circumferential groove 470 is typically at least or slightly greater than the thickness of disk 458a in the area where drive wheel 468 and disk 458a are juxtaposed as illustrated in FIGS. 14 and 15. A series of spaced apart pins 472 extend across circumferential groove 470 and are radially arrayed and spaced from the center of drive wheel 468. Drive wheel 468 includes a central aperture 474 through which a drive axle 476 can be mounted. In operation, drive wheel 468 is rotated by drive axle 476 with drive wheel 468 being positioned a fixed distance from disk 458a so that pins 472 mesh with teeth 466 when rotated as illustrated in FIG. 14 thereby causing rotation of disk 458a and consequently fry wheel 410 in a direction of rotation opposite to the rotation of drive wheel 468, as indicated by arrows K and L of FIG. 14.

It is to be understood that any suitable drive wheel and drive arrangement can be utilized. For example, in place of drive wheel 468 with pins 472, a drive arrangement could be utilized in which a drive gear is utilized to mesh with a corresponding gear located around the periphery of disk 458a and/or 458b, for example. Alternatively, a friction drive system could be utilized in which a friction drive wheel would contact the edge of one or both of circular disks 458 which could be of a design having no teeth therealong, such as illustrated in alternative embodiment wheels 479 and 481 described hereafter. Since the wheel will have cooking oil thereon, the coefficient of friction between the drive wheel and fry wheel will be decreased. Care should be taken to assure that when using a friction drive, sufficient pressure is maintained between the driving wheel and the fry wheel.

Referring to FIG. 16, there is illustrated a drive mechanism for driving drive wheel 468. The drive mechanism includes an electric motor 478, a gear reduction drive 480, an output shaft 482, a drive pulley wheel 484, a driven pulley wheel 486 and a drive belt 488 extending around drive pulley wheel 484 and driven pulley wheel 486 to drive axle 476 which thereby drives drive wheel 468 since the end 476a of axle 476 is fixed in aperture 474 with respect to drive wheel 468. A shear pin 490 can be located in a shear pin aperture 492 of drive wheel 468 to retain axle 476 in a fixed position relative to drive wheel 468. Axle 476 is suitably contained within an axle journal 494 which, in turn, is mounted to frame 496 to permit movement of axle 476 relative to axle journal 494 and frame 496. Similarly, motor 478 and gear reduction drive 480 are suitably mounted to frame 496. If desired, motor 478 may be a stepper motor.

Typically, it is important that the fry wheel is rotated in periodic increments for a compartment to be aligned with a respective discharge slide 498 of fry device 400 or other slide, ramp or discharge location after a periodic rotation. Typically, the leading edge 500 of a compartment bottom, such as compartment bottom 432' of compartment 432 as shown in FIG. 13 is aligned with the upper edge of fry vat 406 or the top edge of discharge chute 498 associated therewith to allow the contents of compartment 432 to be discharged therefrom. As illustrated in FIG. 13, the contents of compartment 432 have already been discharged from fry wheel 410. This is particularly important where incremental rotation of fry wheel 410 is utilized as opposed to a continuously moving fry wheel. Thus, for incremental rotation it is desirable for leading edge 500 of compartment 432 to be aligned with discharge 498 or the upper edge 406' of fry vat 406. In order to accomplish this, a stepper motor can be utilized to drive fry wheel 410. Alternatively, or in addition, the position of the baskets can be sensed and their position adjusted accordingly to assure that all baskets are in the correct position for loading and discharge during operation. Also, utilizing location sensors allows use of a simple DC or AC motor, as opposed to a stepper or servo motor. Any suitable sensor can be utilized in conjunction with a control system to control operation of the fry wheel drive motor. Suitable sensors include proximity, magnetic reed, Hall Effect, photoelectric and capacitive sensors. Such sensors are well known in the art and consequently a detailed description of those sensors is not included herein.

In accordance with another aspect of the invention, it should be understood that the height of cooking oil in one of fry vats 406, 416, 418 and 420, such as the level of cooking oil indicated by reference letter H in FIG. 13 in fry vat 406 will increase or decrease depending upon the amount of food that is submerged underneath the surface of cooking oil contained in fry vat 406. Thus, as illustrated in FIG. 13, compartments 424, 426, 428 and 430 each have a charge of food, in this case French fries 455 contained therein. Each compartment contains approximately one pound of French fries 455. Consequently, there are about four pounds of French fries that are beneath the surface level H of cooking oil contained in fry vat 406. This quantity of submerged food raises the level H of cooking oil in fry vat 406. This increase in the level of cooking oil can cause the food to be submerged and therefore cooked for a longer of period of time in the cooking oil. For example, contrast the level of cooking oil depicted in FIG. 13 with the level of cooking oil depicted in FIG. 20 in which a charge of French fries 455 is contained only within compartment 426. This results in a substantially reduced level of cooking oil H' as indicated in FIG. 20. Thus, the control system for fry device 400 can be adjusted to take into account for different levels of cooking oil which can be sensed by a suitable sensor as is known by those skilled in the art (not shown). Where rotation of fry wheel 410 is done incrementally after a period of time elapses, the period between incremental rotations can be increased or decreased as desired based on the level of cooking oil present in fry vat 406. For example, in the situation illustrated in FIG. 13, the duration between incremental rotation of fry wheel 410 could be decreased compared to the situation depicted in FIG. 20 where the level H' of cooking oil is significantly lower than the level H of cooking oil in FIG. 13. This assumes that the temperature of cooking oil in each of the situations depicted in FIGS. 13 and 20 is substantially the same. Similarly, if a constant rotation fry wheel operation is utilized, such as where fry wheel 410 would rotate constantly, the rotational speed could be increased to handle the situation depicted in FIG. 13 compared to the speed of the wheel that would be utilized for the situation in FIG. 20, where the level H' of cooking oil in FIG. 20 is significantly less than the level H of cooking oil in FIG. 13.

Referring to FIGS. 13 and 20, frying device 400 can also include a fry wheel follower "or fry wheel liner" 502 which is supported by a fry wheel follower support 504. Fry wheel follower 502 is a curved perforated circular segment having a width approximately equal to the width of fry wheel 410. Fry wheel follower 502 is supported by a pair of fry wheel follower supports 504 that are spaced apart and connected by lateral supports 506. Fry wheel follower 502 prevents food pieces that are larger than the perforations in fry wheel follower 502 from falling from fry wheel compartments 422-436 during operation. Preferably, the perforations in fry wheel follower 502 are composed of circular holes having a diameter of about 0.187 inches that are in staggered rows having a center-to-center hole distance of about 0.312 inches. Fry vat 406 includes a suitable heating element 505, illustrated in FIGS. 13, 20 and 21.

Figure 17:
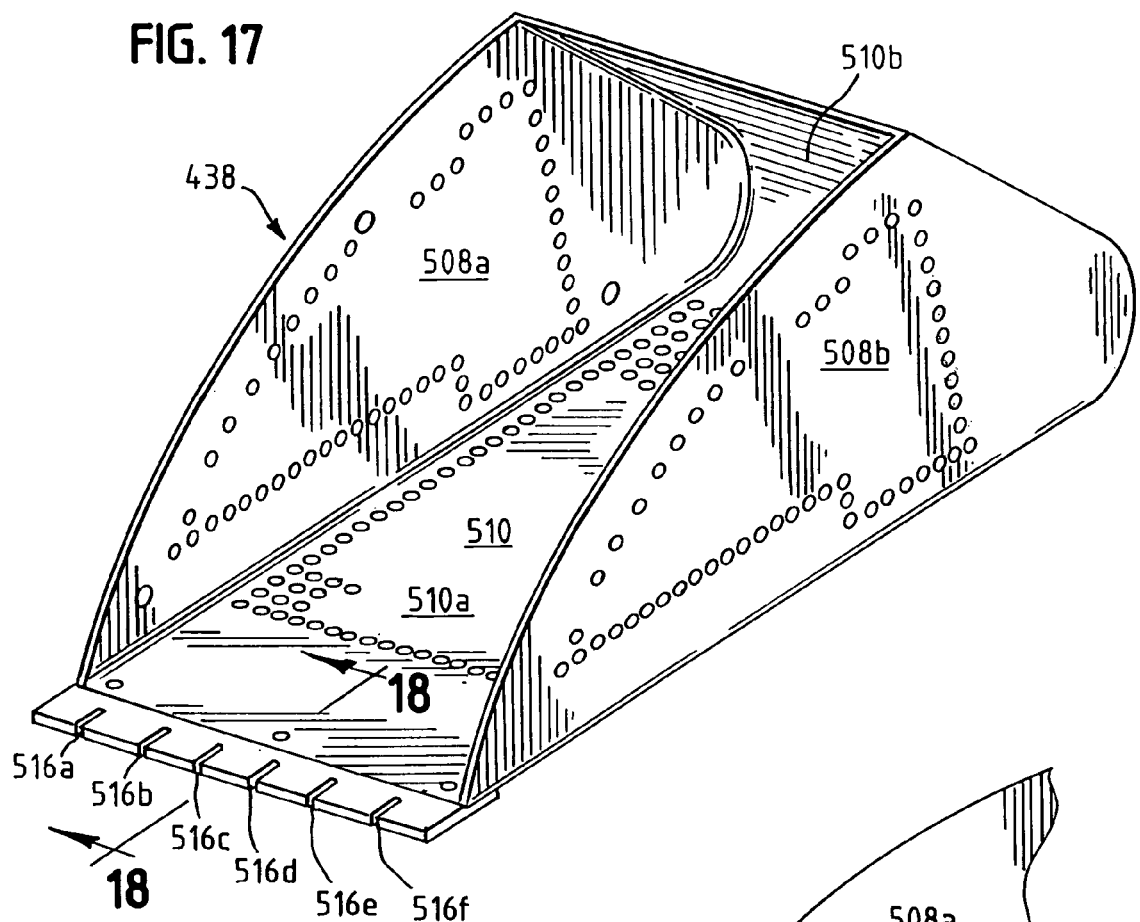
FIG. 17 is a fry basket for use in the frying device of FIG. 11.
Figure 18:
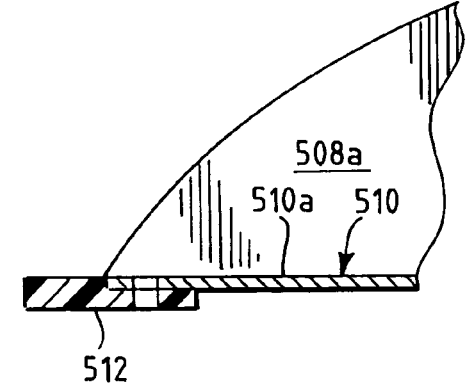
FIG. 18 is a fragmentary sectional view along line 18-18 of FIG. 17.
Figure 19:
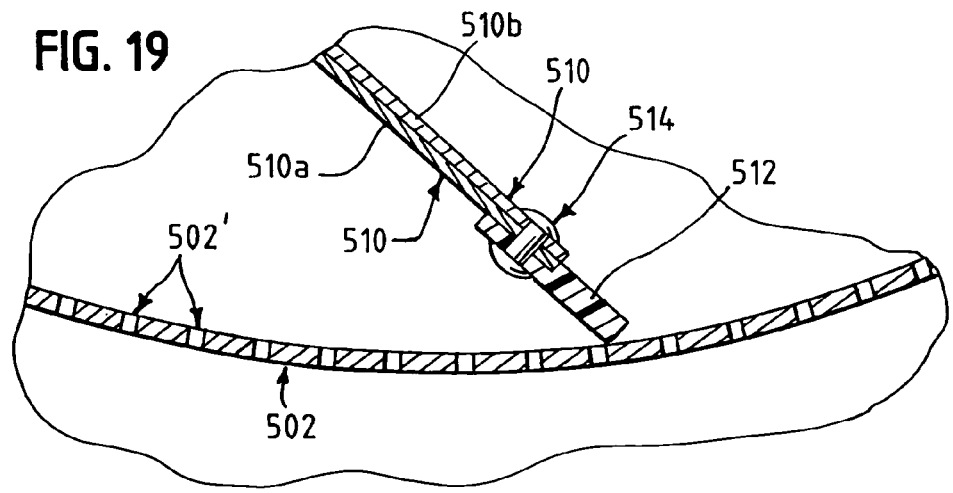
FIG. 19 is an enlarged, fragmentary elevation sectional view of a portion of FIG. 13.

Referring to FIGS. 17-19 there is illustrated a curved compartment forming member 438 which is composed of two opposed sidewalls 508a and 508b that are interconnected by a perforated curved compartment forming member 510 that forms compartment bottom 510a and compartment top 510b. Preferably, a wiper 512 is suitably mounted to compartment forming member 510.

A plurality of compartment forming members 438 are mounted together in fry wheel 410 to provide a plurality of adjacent peripheral food compartments 422-436 as illustrated in FIG. 13. As illustrated in FIG. 13, the top of one compartment forming member 510 abuts the bottom of adjacent compartment forming member 510. Thus, advantageously, a fastening member 514, which can be a rivet, for example, that secures wiper 512 to compartment bottom 510a of one compartment forming member 510 will also pass through the compartment top 510b of the adjacent compartment forming member 510. Preferably, wiper 512 has a plurality of transversely extending grooves 516a-f that permit drainage of cooking oil therethrough as wiper 512 exits the cooking oil in fry vat 406, for example.

Referring to FIG. 17, opposed sidewalls 508a,b and compartment forming member 510 are perforated to permit the flow of cooking oil therethrough thereby promoting good heat transfer between the cooking oil contained in fry vat 406 and food contained in one of compartments 422-436 when immersed in cooking oil. A suitable hole size is about 0.156 inches spaced center-to-center about 0.250 inches. Wiper 512 also ensures that close contact is maintained between the interface of fry wheel follower 502 and the top and bottom ends of each food compartment 422-436 which in each case will be bounded by one of wipers 512. Any suitable material can be used for wiper 512 such as rubber or Teflon®, for example. A magnet may be incorporated into wiper 512 for use in conjunction with a reed switch to determine compartment location. Alternatively, a ferrous edge on compartment bottom 510, for example, for use with a modified reed switch that is fitted with a magnet As an alternative construction, compartments 422-436 could be constructed from compartment forming members 510 without opposed sidewalls 508a and 508b, in which case the compartment sidewalls could be formed from opposed circular disks 458a and 458b. In addition, it should be appreciated by one skilled in the art that any desired compartment shape can be utilized in accordance with the invention as long as the food can be loaded into the compartment, kept within the compartment during immersion in the cooking oil and which compartment shape discharges the food from the fry wheel.

Referring to FIGS. 21 and 22, there are illustrated further aspects of fry device 400. FIG. 21 is a sectional view along line 21-21 of FIG. 20. FIG. 21 illustrates the elements previously described and in addition shows the interface of adjacent fry vats 406 and 420 and in enlarged form in FIG. 22. Disposed between fry vats 406 and 420 is a banking strip 518 that bridges the gap between fry vats 406 and 420. Banking strip 518 can be in a shape as desired and in the illustrated embodiment is a generally inverted V-shaped strip that spans the gap between fry vats 406 and 420. Banking strip 518 prevents any material that is discharged between fry wheels 410 and 412 from falling between fry vats 406 and 420 and causing such material to fall into one of fry vats 406 and 420.

Referring to FIGS. 23 and 24, there are illustrated alternate embodiments of a fry wheel for use in accordance with the invention. It is to be understood that the fry wheel is capable of numerous changes and rearrangements, and the fry wheel, as well as other components and embodiments of the present invention, is not intended to be limited to the specific embodiments described herein.

Referring to FIGS. 23 and 24, there are illustrated wire form wheels 479 and 481. Each of wheels 479 and 481 has a rim 520 and 522, respectively, constructed of tubing, which can be smooth tubing. Such a wheel could be driven by a friction wheel, if desired. In each of wheels 479 and 481 a plurality of individual tubular spokes 524 extend from each rim to a corresponding hub assembly 526. An axle 528 connects hubs 526 together in each of wheels 479 and 481. Wheel 479 includes a slotted member 530 that bridges each pair of spokes 524. Each slotted member 530 includes a centrally disposed slot 532 and a pair of tabs 534 on either side of slot 532. A plurality of fry baskets 536, one for each slotted member 530 or pair of spokes 524 is mounted in a snap-lock relationship to each slotted member 530. Fry baskets 536 have perforated sides and a perforated bottom and top and can be of a similar configuration as previously described with respect to fry wheel 410. Each basket 536 can have a spring tab member 538 that interlocks with slotted member 530 to secure fry basket 536 to fry wheel 479 resulting in a finished fry wheel 481 as shown in FIG. 24. It is to be understood that the embodiment illustrated in FIGS. 23 and 24 is not limited to snap-in baskets and that other baskets can be used with the wheel arrangement depicted in FIG. 23 with or without slotted members 530. For example, baskets could be welded or otherwise affixed to rim 520 and spokes 524. Each of fry baskets 536 includes perforations 540 on the sides, top and bottom thereof, such as previously described with respect to compartment forming member 438.

Referring to FIG. 24, there is illustrated an alternative drive mechanism 535 to rotate fry wheel 481. Drive mechanism 535 includes a motor 537, a shaft 539 and drive rollers 541 and structure for supplying a force in the direction of arrow FW. Drive rollers 541 are mounted on shaft 539 which can be rotated by motor 537 to cause rollers 541, each aligned with one of rims 522, to rotate, thereby rotating fry wheel 481. A force FW is supplied in the direction of arrow FW to ensure that rollers 541 impart a sufficient tractive force to cause rotation of fry wheel 481. Force FW can be supplied by any suitable structure, including a spring, a weight or an electromagnet, for example. For example, motor 537, shaft 539 and rollers 541 could be mounted on a platform (not shown) that is movable in the direction of arrow FW and a force could be applied to urge the platform in the direction of arrow FW to ensure proper traction of rollers 541. Rollers 541 may be constructed of any suitable material, including rubber, for example. Motor 537 can be controlled by subcontrol system 116, for example.

Fry wheel 410 can be rotated as desired so that food deposited in one of compartments 422-436 travels through and out of the cooking oil 454 until that compartment reaches a discharge location. Thus, in the embodiment illustrated in FIGS. 13 and 20, the rotation is in a clockwise direction as indicated by arrow K in FIG. 13 and arrow K in FIG. 20. The rotation of fry wheel 410 can be either continuous or periodic. In a periodic rotation, the rotation will typically be incremental, that is, the wheel is rotated to some degree and then stops. Thereafter, after a set period of time, the wheel undergoes another periodic rotation. This process continues as each fry basket is rotated through and out of the cooking oil vat and to the discharge location. Preferably, each periodic rotation consists of a rotation of 360° divided by the number of compartments present in the fry wheel or some fraction of that periodic rotation increment so that the position of the wheel can be known without the use of sensors. However, the use of a sensor or sensors to be able to monitor wheel position can also be used either as the primary way of controlling wheel position or as a backup. Also, use of a sensor to determine wheel position allows use of a standard AC or DC motor. Suitable control of wheel 410 can be accomplished by fry control 116, for example.

In accordance with the present invention, a basket shaking simulation can be achieved. Basket shaking simulation can be performed by a relatively slight back and forth rotation of the fry wheel, such as fry wheel 410. Thus, the drive mechanism is activated to rotate the fry wheel clockwise and counterclockwise through a relatively small degree of angular rotation to simulate shaking of a fry basket during frying. The back and forth rotation can occur relatively rapidly and typically the degree of angular rotation will be in the range of from about 2 to about 20 degrees. In addition, the periodic rotation in one direction may be of a larger angle of rotation than the rotation in the other direction.

Preferably, the degree of rotation during simulated basket shaking will be monitored, particularly where the rotation in one direction is greater than the rotation in the other direction so that the position of each basket relative to the discharge location can be monitored by the control system to ensure proper discharge of food from food compartments.

Figure 64:
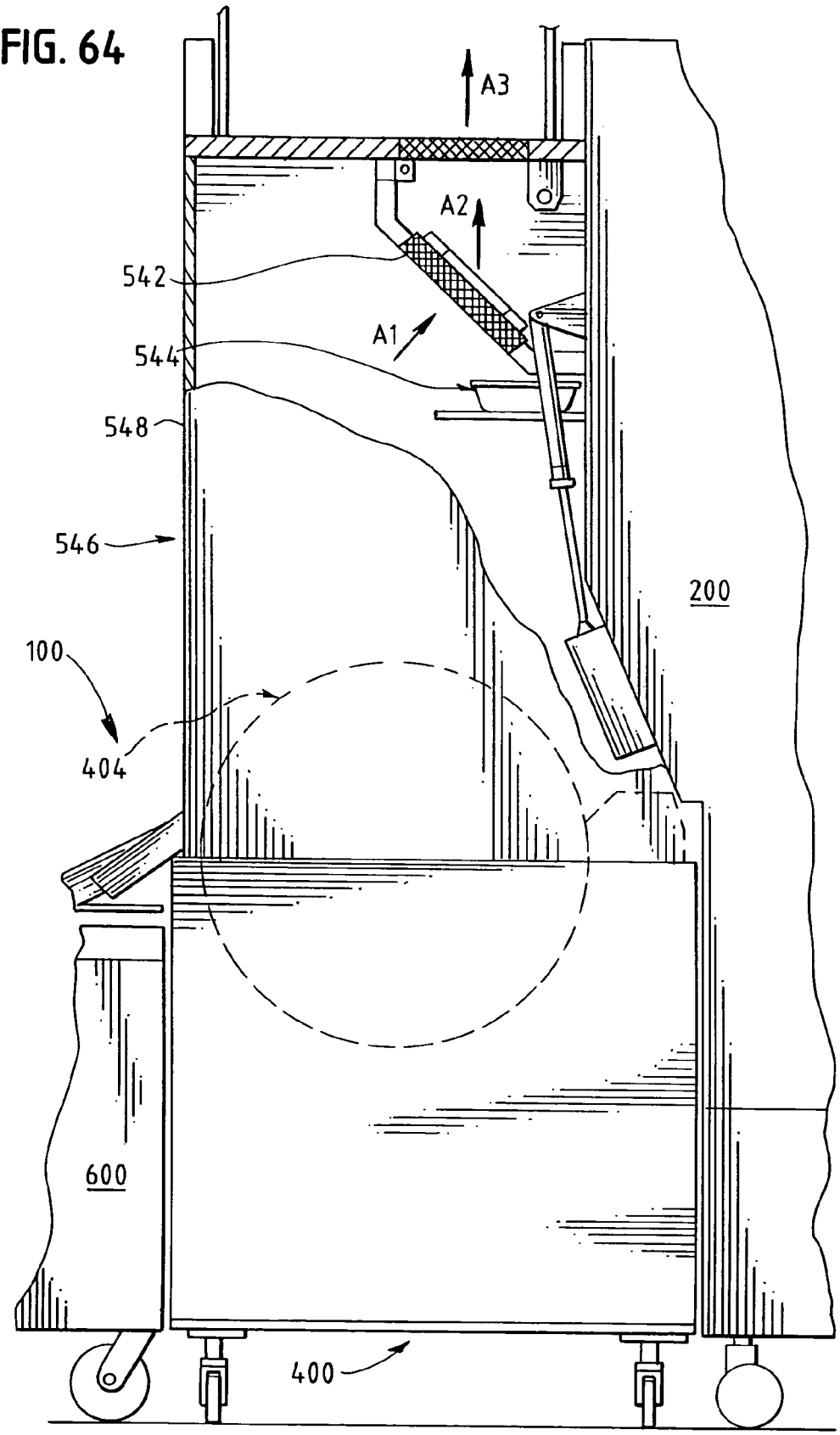
FIG. 64 is a side elevation view, partly in section, a hood system in accordance with the present invention.
Figure 65:
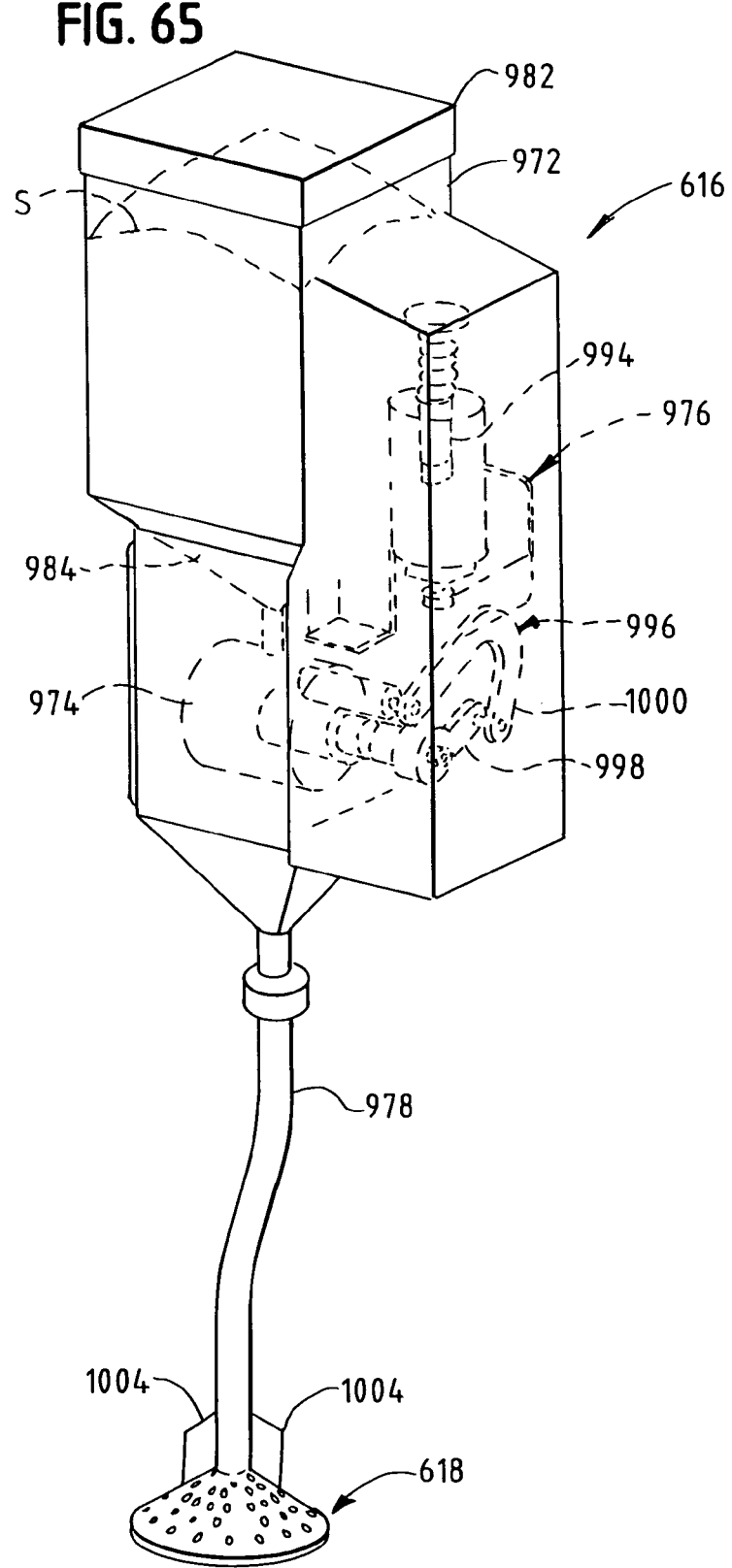
FIG. 65 is a perspective view of an automated seasoning device in accordance with one aspect of the invention.
Figure 66:
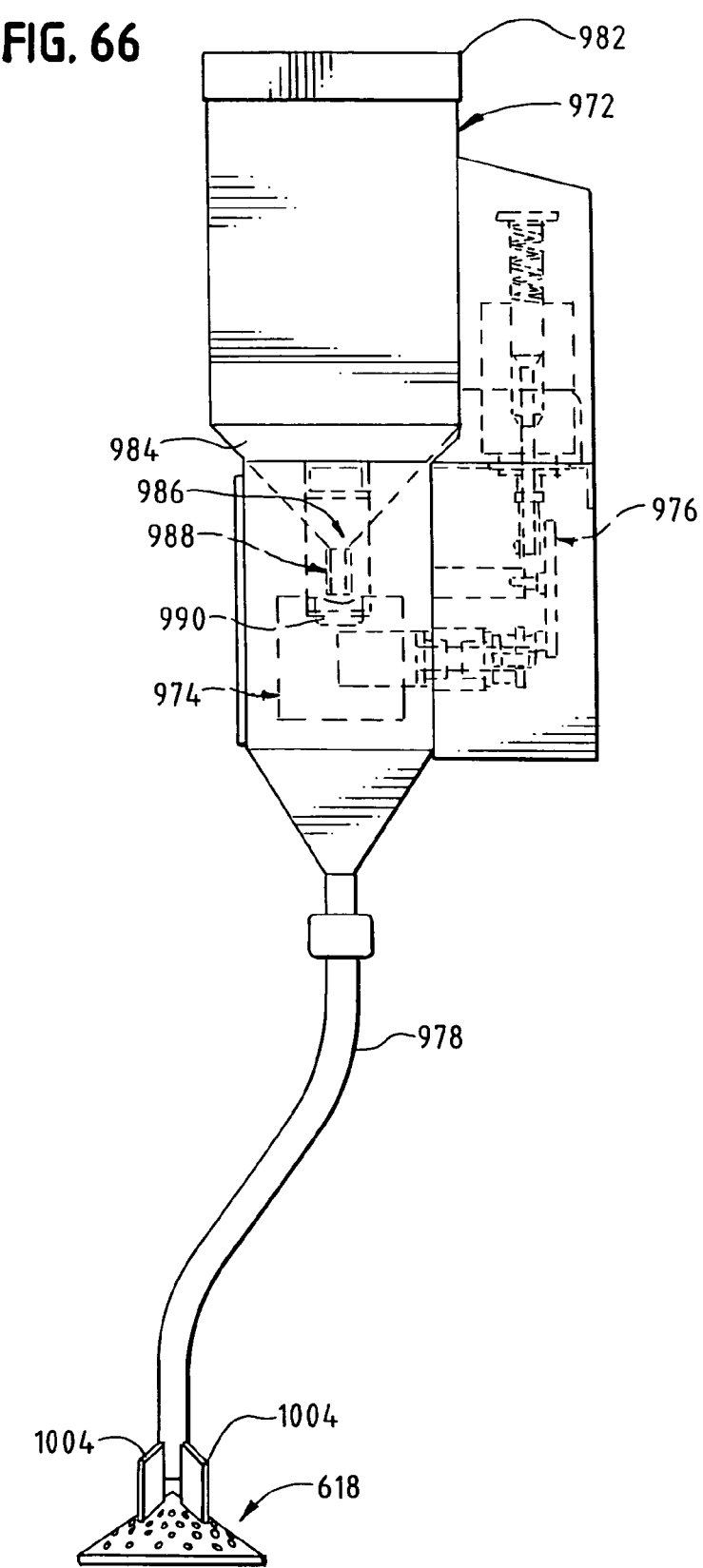
FIG. 66 is a side elevation view of the seasoning device of FIG. 65.
Figure 67:
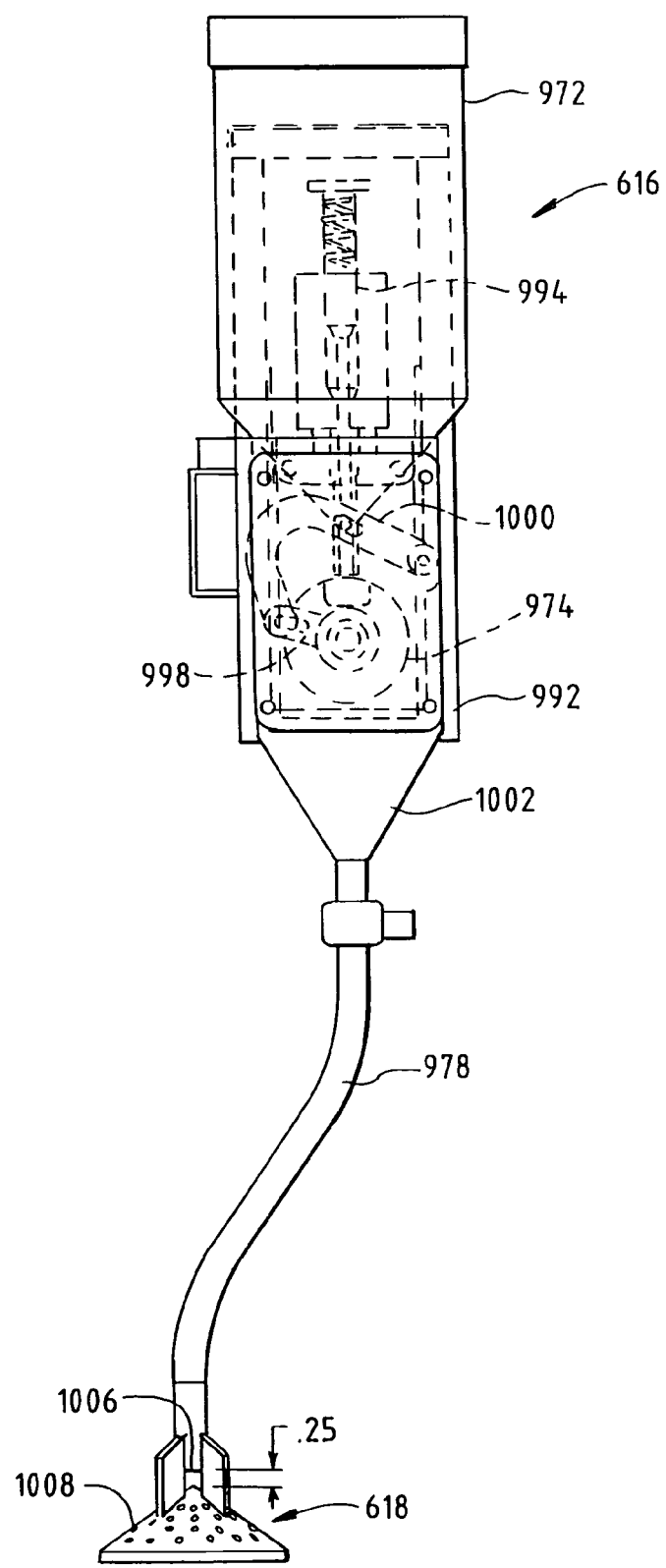
FIG. 67 is a front elevation view of the seasoning device of FIG. 65.
Figure 68:
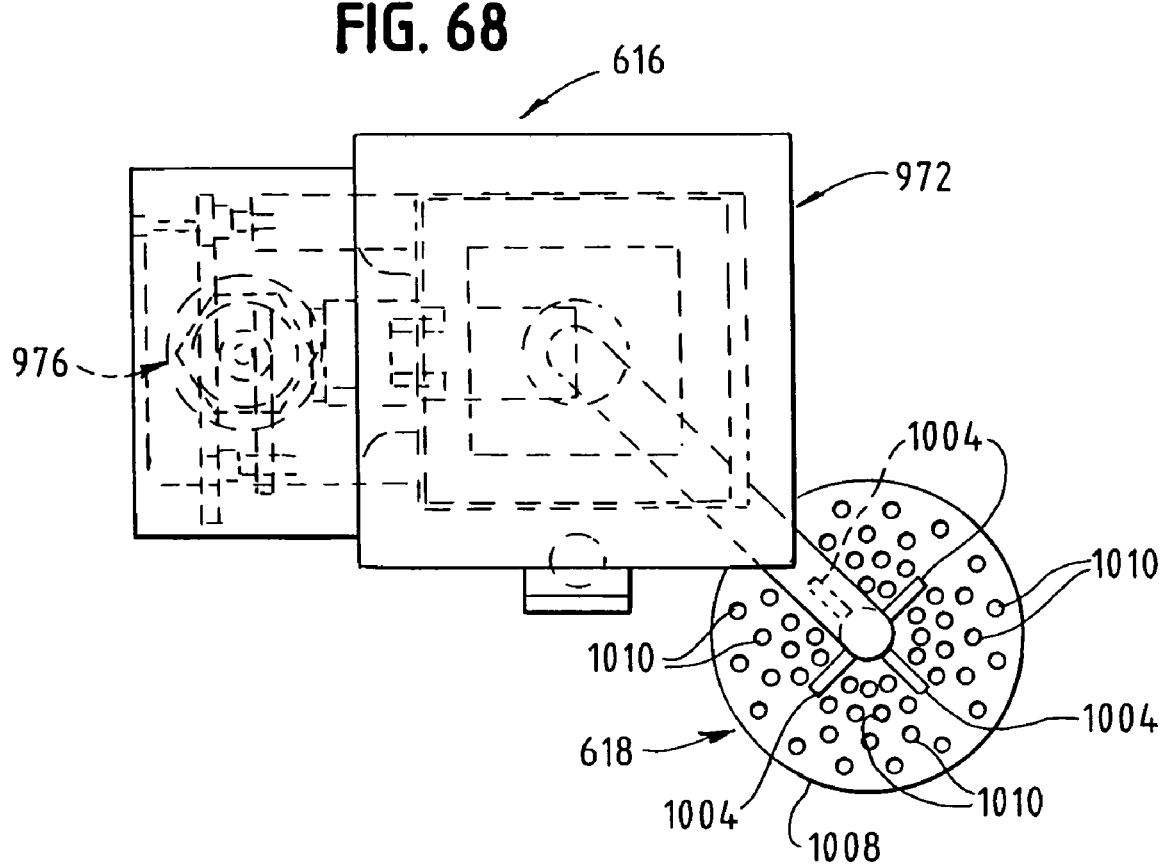
FIG. 68 is a top plan view of the seasoning device of FIG. 65.
Figure 69:
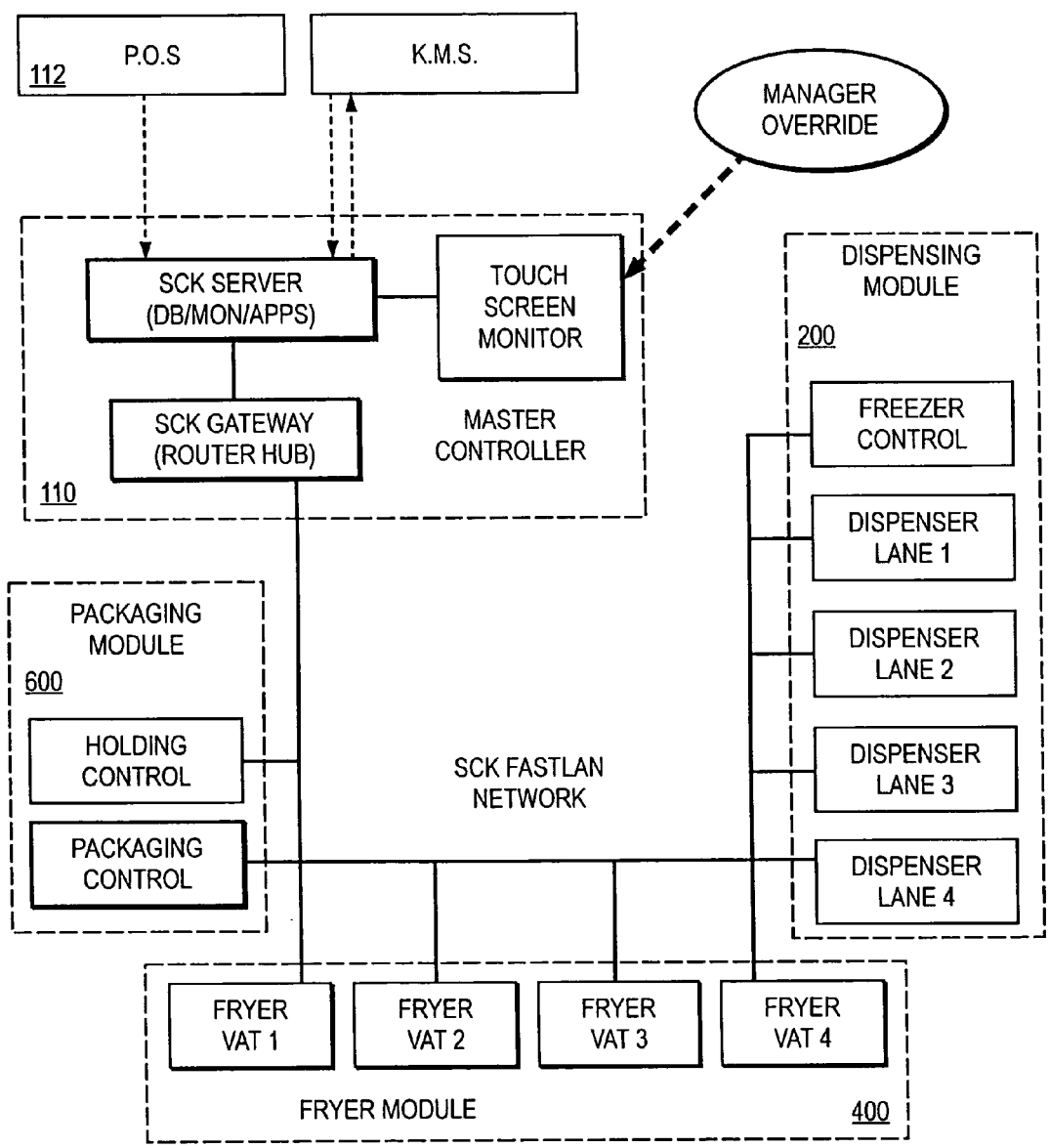
FIG. 69 is a diagrammatic view of a control system in accordance with the present invention.

Referring to FIG. 64, there is illustrated in partially schematic view fry device 400 along with portions of food dispensing device 200 and food packaging device 600. As illustrated in FIG. 64 a hood system 546 is provided. Hood system 546 includes a hood structure 548, a filter 542 and a drip pan 544.

A suitable air blower (not shown) can be provided to cause air flow to move within hood system 546 generally in the direction of arrows A1, A2 and A3. Filter 542 thus filters particulate matter in air flow Al that passes through filter 542. Drip pan 544 catches any matter that drips from filter 542 that is located above drip pan 544. Preferably, hood system 546 substantially completely encloses the area above fry device 400 to reduce waste discharge into the operating environment of automated food processing system 100.

Fry module 1400 is similar to fry module 400 previously described and can be operated and controlled as described with respect to fry module 400. In addition, control system 1116 for fry module 1400 is similar to control system 116 previously described.

FIG. 85 illustrates a fragmentary perspective view of a portion of fry module 1400,which includes a foam deck 1550 and an overflow passageway 1552. Foam deck 1550 is located below food inlet slide or chute 1554 to fry module 1400, which is disposed to receive food items from dispensing module 1200 or 200, for example, and into one of compartments 422-436 of fry wheel 410. Thus, foam deck 1550 is located above the normal operating level of frying oil in fry vat 406 and is on the food inlet side of fry module 1400 adjacent inlet slide or chute 1554. Overflow passageway 1552 is an elongated slot that can be routed to a drain or waste container as indicated by arrow WW. Typically, when a quantity of food, particularly frozen, is placed in a fry vat, foaming occurs in the hot oil that contains water. Some of the foam is collected on the foam deck and drains through the overflow passageway, thereby eliminating some of the foam and water that results from the initial charging of food to fry module 1400.

Food Packaging Device

Referring to the Figures generally, and in particular to FIGS. 1, 25-50, 74, 76 and 86-91, there are illustrated various embodiments of food packaging devices and elements thereof in accordance with the invention.

In one embodiment, food packaging device 600 is illustrated or partially illustrated and elements useful in connection with food packaging device 600 are illustrated in FIGS. 1 and 25-50. Food packaging device 600 includes a cabinet 602 having a countertop surface 636. Food packaging device 600 can be advantageously constructed in modular form so that it can be operated together with previously described food dispensing device 200 and fry device 400 and alternatively operated separately from both or either of those devices.

Food packaging device 600 in the illustrated embodiment includes a food inlet chute 604, rotatable food dispensing member 606, food dispensing chute mechanism 608, automated container handling system 610, container-receiving receptacle 612, overflow food collection member 613, conveyor system 614, waste chute 615, food seasoning system 616 and raceway 620.

In the illustrated embodiment, food packaging device 600 includes a container storage device for containing cartons or containers of various sizes. During operation of packaging device 600, the device selects a container of a desired size from container storage magazine 638, erects the container into an erected form that is unerected while contained in storage magazine 638 and then positions the erected container to receive food dispensed from food dispensing chute mechanism 608. After receiving food from food dispensing chute mechanism 608, automated container handling system 610 is capable of moving the filled or partially filled container to container receiving receptacle 612 which is transported via conveyor system 614 to a desired location for subsequent pickup of the container by a human operator, for example.

In the embodiment illustrated in FIGS. 25-29, food packaging device 600 includes food overflow collection member 613 to collect food dispensed by food dispensing chute mechanism 608 that is not deposited into a container. In the illustrated embodiment, overflow food collection member 613 is a rotatable wheel as hereinafter described in detail. Overflow food collection member 613 functions to collect food dispensed by food dispensing chute mechanism 608 that is not received in a container and to recycle that food into food dispensing chute mechanism 608 for subsequent dispensing to a container. This permits food dispensed by food dispensing chute mechanism 608 but not deposited in a container to be promptly recycled to the dispensing chute in a first-in, first-out manner, so that overflow food is promptly recycled and dispensed to a container.

Figure 25:
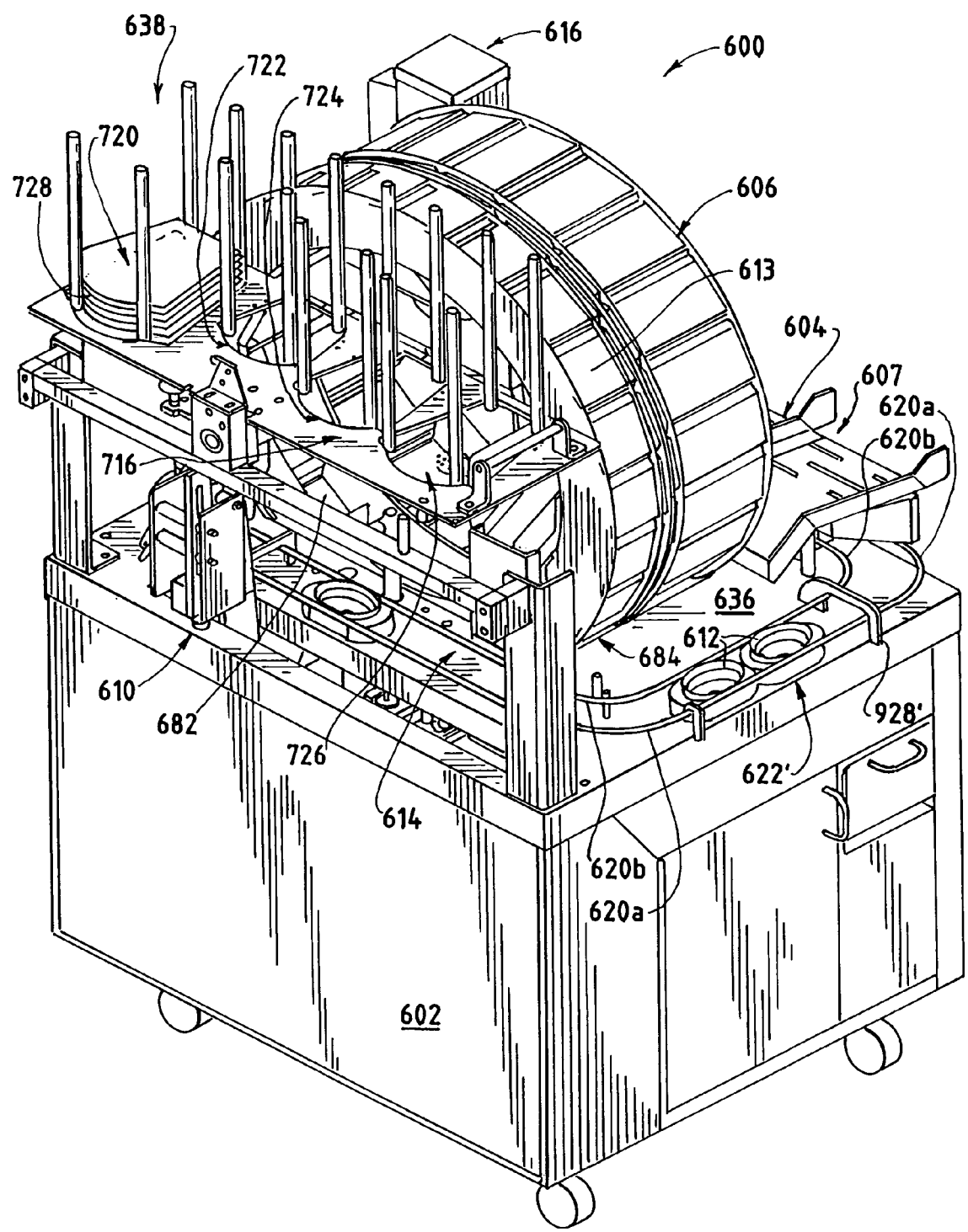
FIG. 25 is a front perspective view of a packaging device in accordance with the invention.
Figure 26:
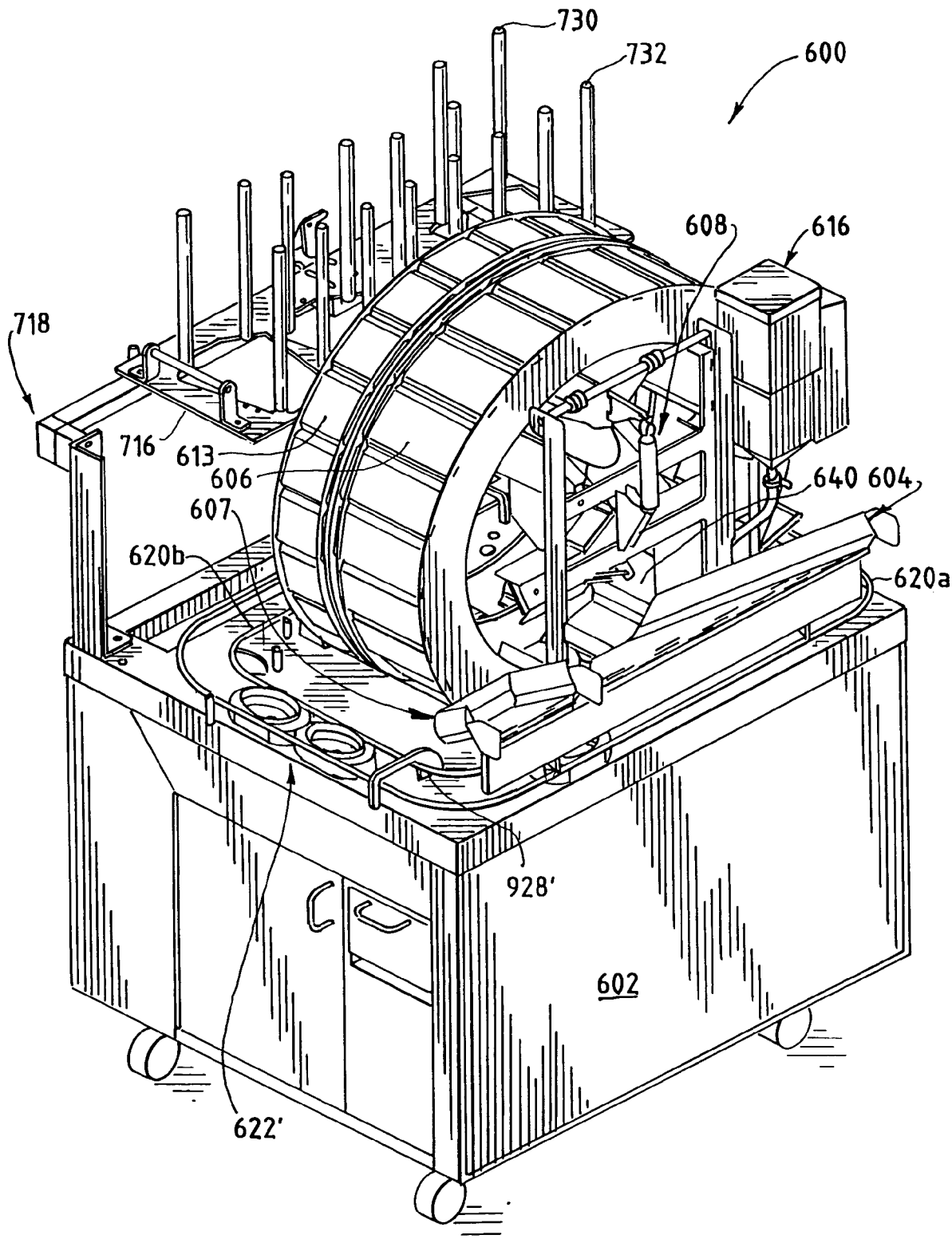
FIG. 26 is a rear perspective view of the device of FIG. 25.
Figure 27:
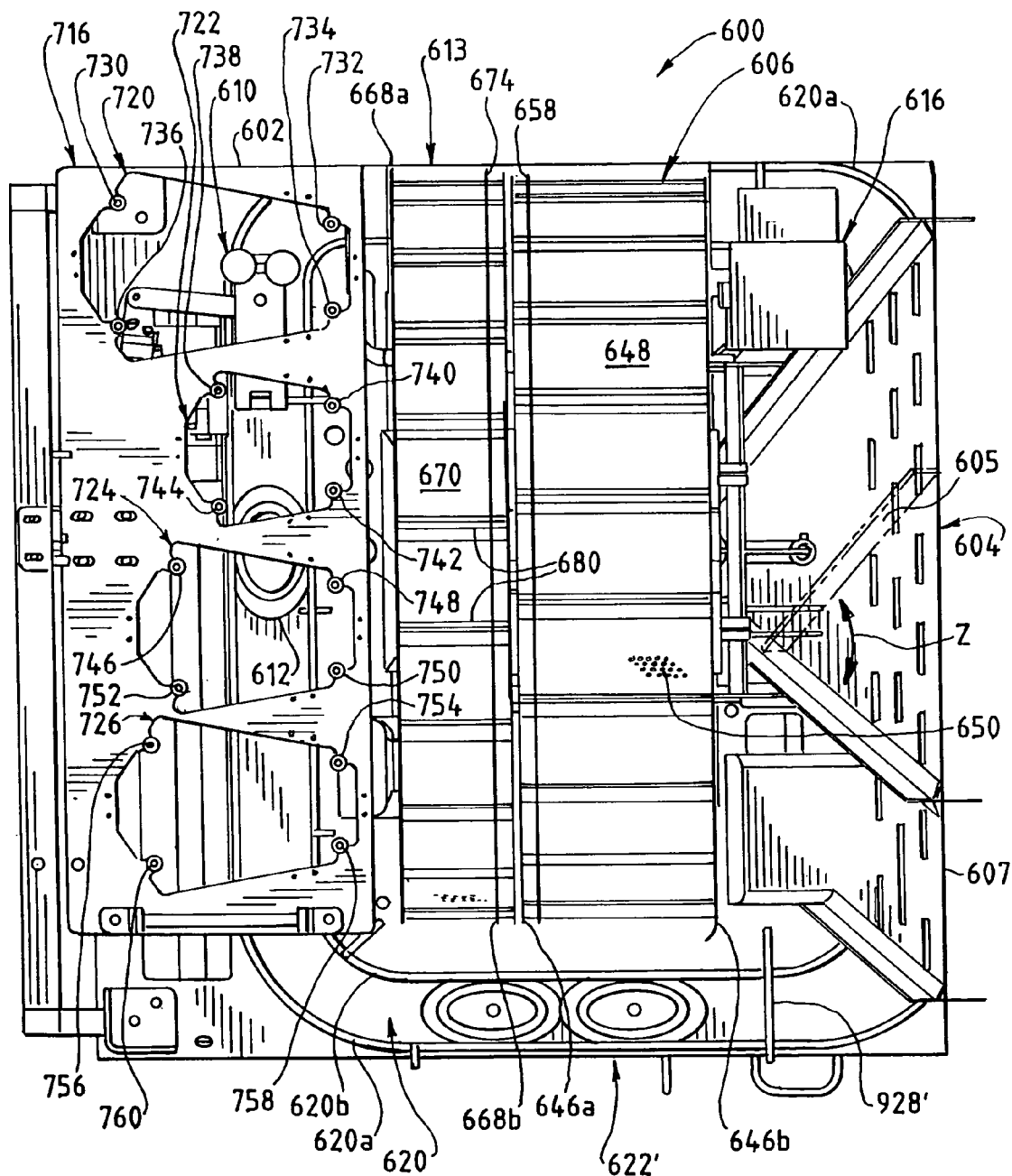
FIG. 27 is a top plan view of the device of FIG. 25.
Figure 28:
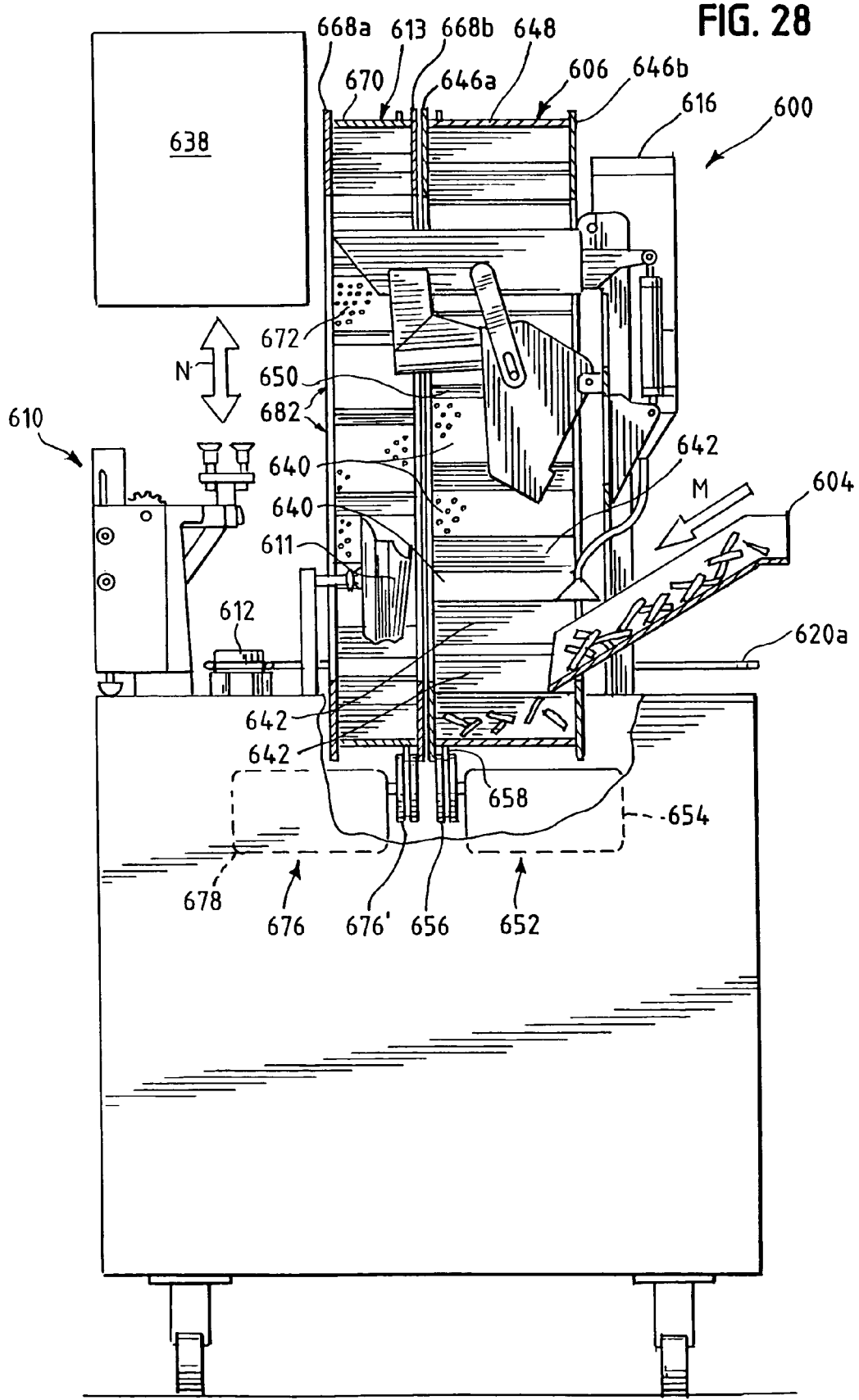
FIG. 28 is a side elevation view, partially in section and partially broken away of the packaging device of FIG. 25.

Referring to FIGS. 26-28, there is illustrated food packaging device 600 in which inlet chute 604 is positioned to receive food, in this case French fries, from food dispensing lanes 234, 236 and 238 of dispensing device 200, which food has been subsequently fried after dispensing in fry wheels 410, 412 and 414 of fry device 400. After frying in any of wheels 410, 412 and 414 of fry device 400, food dispensed therefrom enters inlet chute 604, as illustrated in FIGS. 3 and 28, for example. In inlet chute 604 the food travels downwardly along chute 604 and into rotatable food dispensing member 606 in the direction of arrow AA of FIG. 28 and arrow E of FIG. 3. Inlet chute 604 can be configured as desired and may be configured to accept the product from any one or all of fry wheels 404, 410, 412 and 414. In FIGS. 25-27, a holding area 607 receives product from fry wheel 404 for manual packaging. A manual or automated diverter bar 605 can optionally be provided as shown in FIG. 27 to divert French fries from device 600 to permit filling unsalted fry orders. Bar 605 can be moved between open and closed positions as indicated by arrow Z, such as by a cylinder (not shown).

Figure 29:
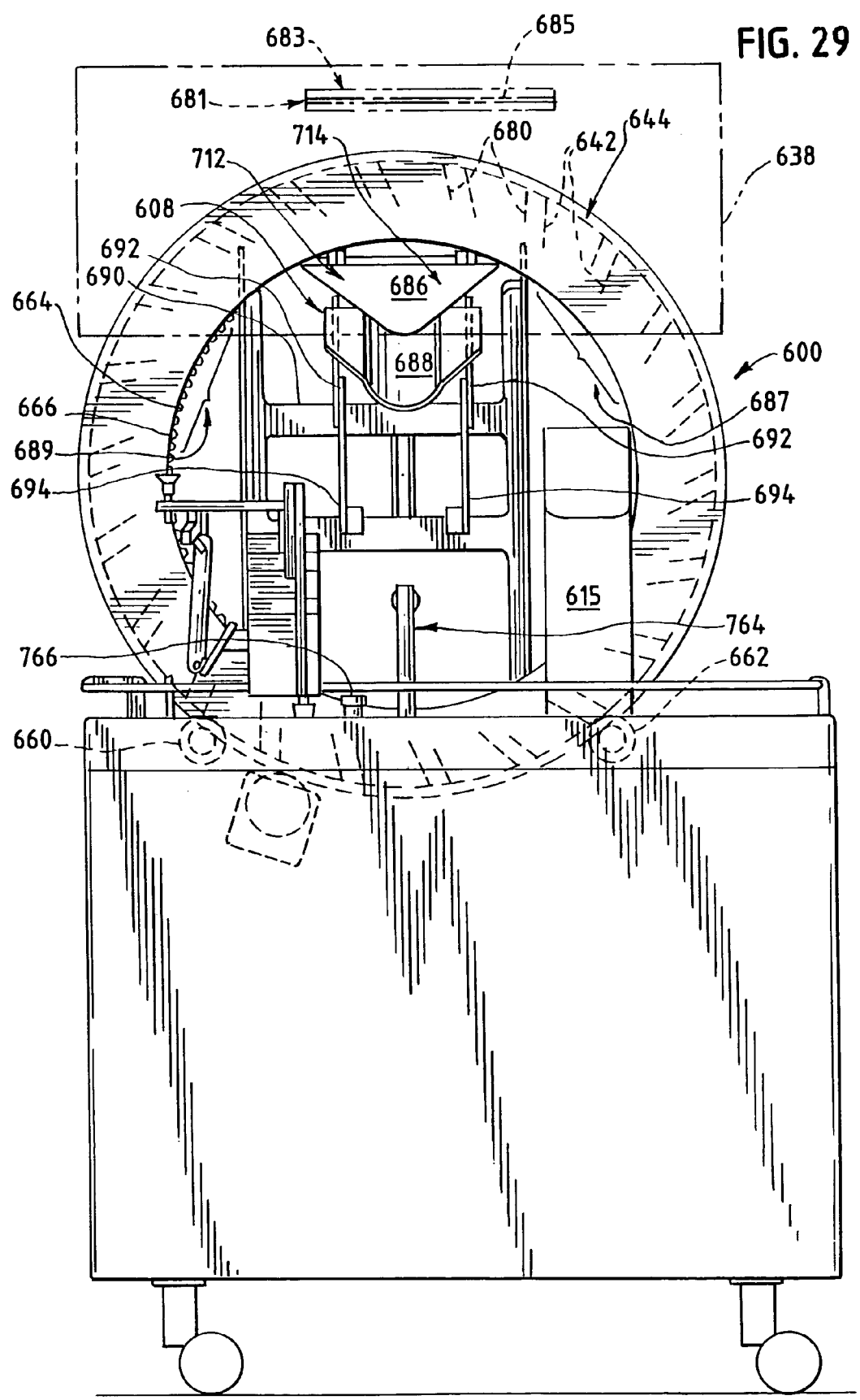
FIG. 29 is a front elevation view of the device of FIG. 25.
Figure 61:
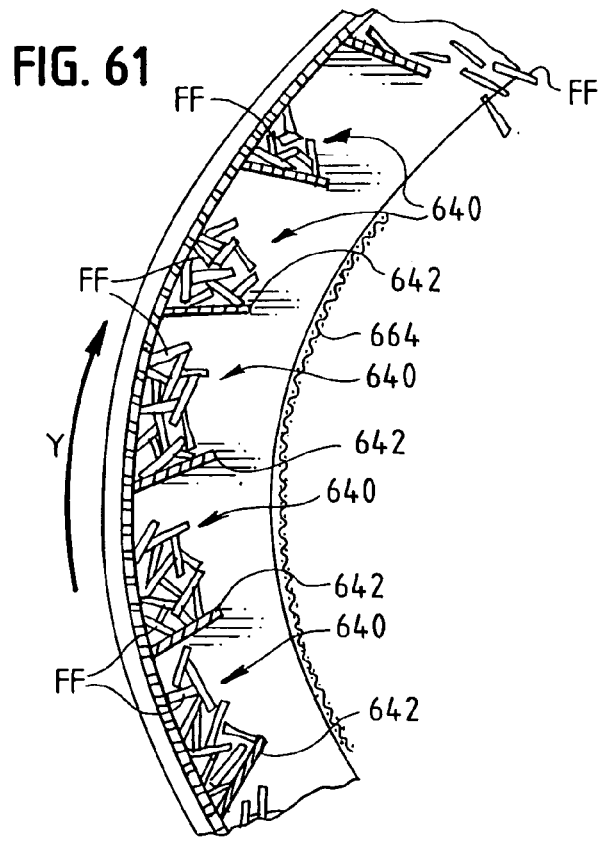
FIG. 61 is a sectional view of a portion of the food packaging device of FIG. 25.

Rotatable food dispensing member 606 in the illustrated embodiment is a dispensing wheel that is mounted for rotation in dispensing device 600. Dispensing member 606 has a plurality of food containing compartments 640 that are arrayed around the periphery of rotatable food dispensing member 606. Each of compartments 640 is divided from another compartment by a compartment wall 642. Preferably, each compartment wall 642 is not normal to peripheral edge 644 of rotatable food dispensing member 606 but at a slight angle such as, for example, as illustrated in FIG. 29 and FIG. 61.

Wheel 606 includes a pair of opposed rim portions 646a and 646b and a circular ring portion 648 that interconnects opposed rims 646a and 646b. Circular ring 648 is disposed close to the peripheral edges of rims 646a and 646b and defines peripheral edge 644. Preferably, circular ring 648 is constructed of a perforated metal material so that circular rims 646a and 646b have perforations 650 therethrough as illustrated in FIG. 28, for example.

In accordance with the illustrated embodiment, rotatable dispensing member 606 is configured as a rotatable wheel although other embodiments are within the scope of the invention. For example, a rotatable dispensing member in accordance with the invention could be a portion of a wheel, such as a semicircular or other configuration.

In the illustrated embodiment, rotatable food dispensing member 606 is rotated by a drive mechanism 652. Drive mechanism 652 consists of a motor 654 that drives a drive wheel 656. Drive mechanism 652 is controlled by a suitable control mechanism to cause rotation of drive wheel 656 and hence moves rotatable food dispensing member 606 in a desired direction and at a desired rate of speed. Drive wheel 656 can be a pressure roller or alternatively can be a drive wheel like or similar to drive wheel 468 previously described with respect to FIG. 14. Rotatable food dispensing member 606 can be driven via one or both of opposed rims 646a and 646b. Alternatively, and as illustrated in FIG. 28, rotatable food dispensing member 606 is driven through a drive rim 658. Each of rotatable food dispensing members 606 and overflow food collection member 613 rest on spaced apart rollers 660 and 662. Each of rollers 660 and 662 are constructed to bear the weight of rotatable food dispensing member 606 and overflow food collection member 613 and have a length that spans both. Alternatively, separate rollers or some other supporting structure could be used to support rotatable food dispensing member 606 and overflow food collection member 613. An inner curved fender or baffle member 664 as illustrated in FIG. 29 is provided to ensure that food contained in compartment 640 of rotatable food dispensing member 606 does not prematurely discharge. Preferably, fender 664 follows the inner curvature of rotatable food dispensing member 606 and has perforations 666, which can be similar to perforations 650 of circular ring 648. Fender 664 is suitably mounted so that it is stationary relative to rotatable food dispensing member 606. A similar fender could also be provided for overflow food collection member 613, if desired (not shown).

Referring to FIG. 61, there is illustrated an elevation view of a portion of rotatable food dispensing member 606 which is typically rotated in the direction of arrow Y when viewed from the front of food packaging device 600. Fender 664 prevents food, in this case French fries FF, from falling from compartments 640 prematurely.

Overflow food collection member 613 is configured to collect food deposited from food dispensing chute mechanism 608 that is intended to be received into container 611 when held in position to receive food from food dispensing chute mechanism 608 which food does not stay in container 611. This can occur since oftentimes it is desirable to overfill container 611 so that food is mounded up above the top surface of container 611. Also, for food such as French fries, such food material fills container 611 somewhat randomly and it is typical for French fries to dangle over the sides of container 611. In the illustrated embodiment, overflow food collection member 613 is configured in a manner similar to rotatable food dispensing member 606 previously described. Thus, food collection member 613 includes opposed rims 668a and 668b and circular ring 670 having perforations 672. Circular ring 670 connects opposed rims 668a and 668b in a manner as previously described with respect to member 606. In addition, food collection member 613 has a plurality of inner compartments that are similar in construction to compartment 640 previously described with respect to member 606. Member 613 also has a drive rim 674 and is driven by a drive mechanism 676 that is similar to drive mechanism 652 previously described including a drive wheel 676' and a motor 678. Drive mechanism 676 is configured to rotate food collection member 613 in either a clockwise or counterclockwise direction as hereinafter described in more detail.

Food collection member 613 also includes a plurality of compartment walls 680 that are similar to compartment walls 642 previously described with respect to rotatable food dispensing member 606, providing a plurality of food containing compartments 682.

Each of food dispensing member 606 and food collection member 613 has bottom portions that are disposed through an opening 684 in countertop surface 636 of cabinet 602.

The construction of the illustrated embodiment permits food dispensing member 606 and overflow food collection member 613 to be readily removed from food packaging device 600 such as for cleaning and/or repair.

A heating system as described can be incorporated into food packaging device 600 to supply heat to food contained therein. For example, a heating system 681 can be provided, which is illustrated in FIG. 29. Heating system 681 includes a heating device 683 having a heating element 685, located above dispenser 606 as desired. Heating devices 687 and 689 may also be included within dispenser 606 and/or 613 as desired. The heating devices may comprise radiant heaters and can be ceramic heaters, for example. Any suitable type of heating device or system can be used in accordance with the invention. Heating system 681 can be controlled by subcontrol system 118, for example. In addition, a heating device can be provided to direct heat to food container pick up location 622, if desired to keep food contained thereat warm.

Referring to FIGS. 1, 3, 25-26, 28-29 and 43-44, various aspects of the configuration and operation of food dispensing chute mechanism 608 are illustrated and will be described. Food dispensing chute mechanism 608 includes an upper chute 686, a lower chute 688, a chute support member 690, a connecting link 692, a stop member 694, a rotatable link 696 connecting stop member 694 to chute support member 690, a rotatable link 698 connecting upper chute 686 to support member 690, a cylinder 700 for operating food dispensing chute mechanism 608, a load cell 702 for weighing the contents of food contained in food dispensing chute mechanism 608 and a rotatable link 704 connecting cylinder rod 706 to upper chute 686.

Figure 43:
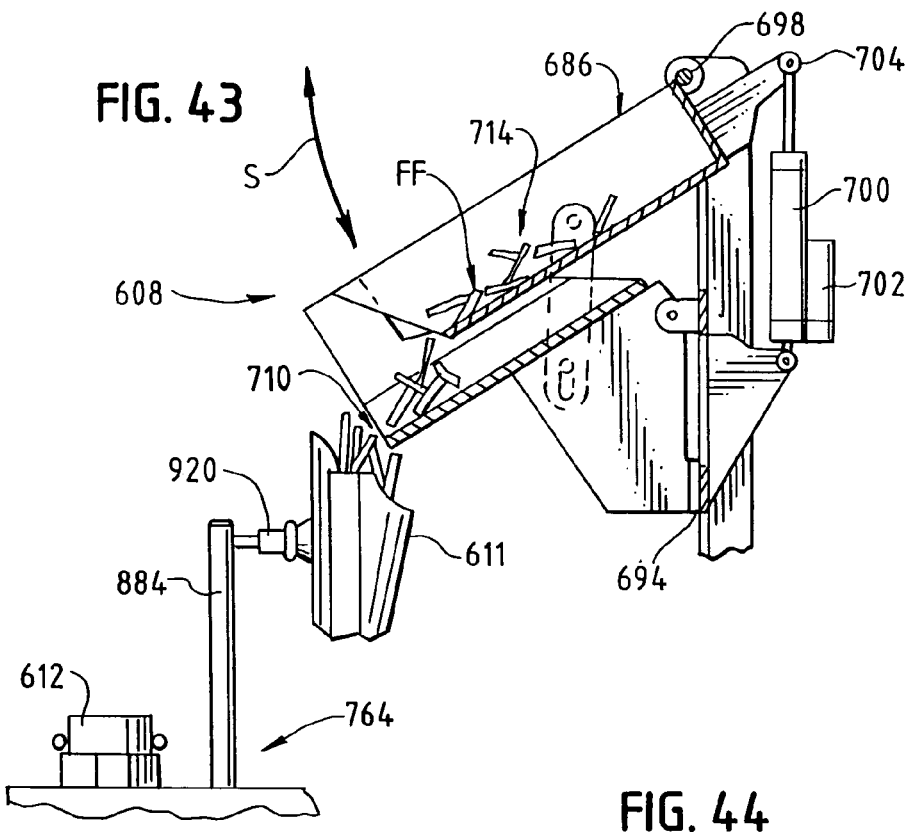
FIGS. 43-44 illustrate a side elevation view, partly in section, of a portion of the food packaging apparatus in accordance with the invention.

Upper chute 686 preferably and as illustrated in the referenced figures, forms part of food dispensing chute mechanism 608, and has an inlet location 708 for receiving food dispensed from rotatable food dispensing member 606 and a discharge location 710 for dispensing food contained in food dispensing chute mechanism 608 and into a container, such as container 611 as illustrated in FIG. 43, for example.

Upper chute 686 of food dispensing chute mechanism 608 is positioned to receive pieces of food from a discharge location 712 of rotatable food dispensing member 606. Upper chute 686 has a food holding area 714 for holding food received from rotatable food dispensing member 606. A weighing device is associated with food dispensing chute mechanism 608 so that the amount of food contained therein, such as in food holding area 714, can be determined. Any suitable device can be utilized to determine the amount of food contained in food dispensing chute mechanism 608. In the illustrated embodiment, a load cell 702 is provided to determine the weight of food contained in food dispensing chute mechanism 608 and is illustrated schematically in FIGS. 43 and 44, for example.

Figure 44:
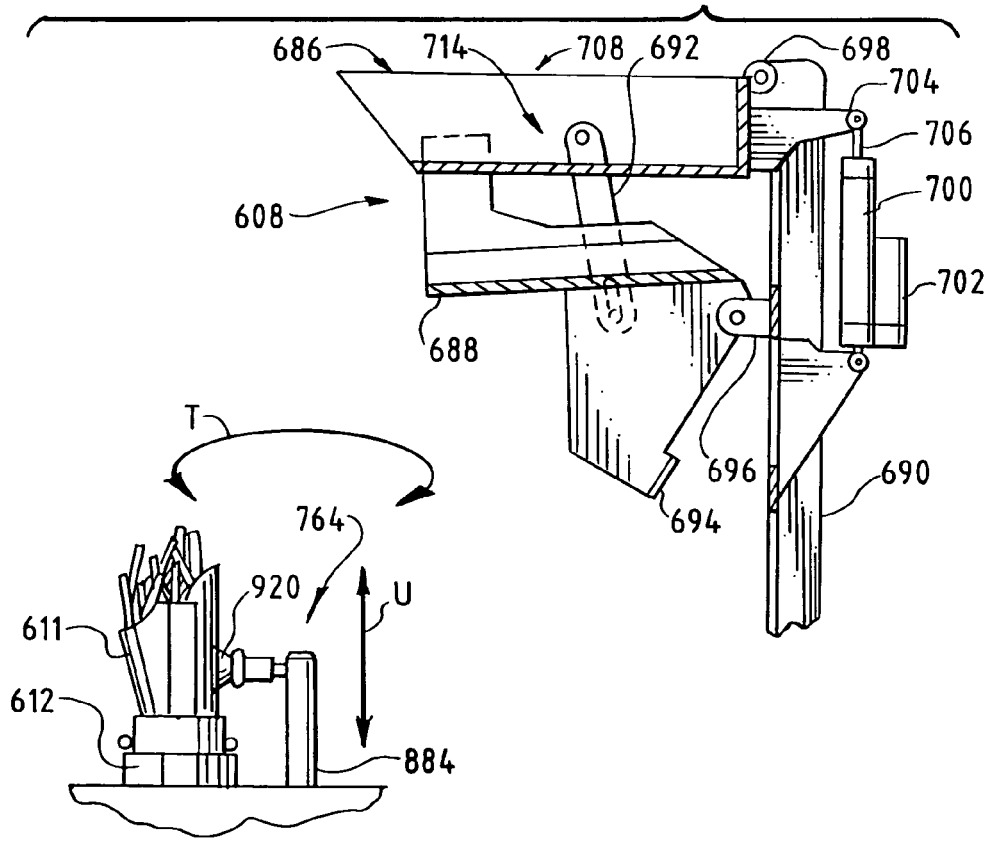

FIG. 44 illustrates food dispensing chute mechanism 608 in the upper position ready to receive food from rotatable food dispensing member 606. In that configuration, cylinder 700 is retracted and upper chute 686 is generally horizontal. This configuration allows a quantity of food to be dispensed into upper chute 686 and into food holding area 714 without being dispensed therefrom. When a sufficient quantity of food is deposited in upper chute 686, such as French fries FF, as determined by load cell 702 which communicates with the control system of food packaging device 600, the food contained therein is ready to be dispensed. Typically, the amount of food contained in chute 686 will be sufficient to adequately fill container 611. Since container 611 is of a known size, rotatable food dispensing member 606 can be operated to supply food to chute 686 until a desired quantity is contained therein for dispensing to container 611.

To dispense food from food dispensing chute mechanism 608, cylinder 700 is activated to extend cylinder rod 706 upwardly thereby causing upper chute 686 to drop. Since lower chute 688 is connected to upper chute 686 via connecting link 692, lower chute 688 also drops to the discharge position as illustrated in FIG. 43 which movement is indicated by arrow S. Stop 694 which is connected to lower chute 688 and pivotally mounted via rotatable link 696 to chute support member 690, engages chute support member 690 as illustrated in FIG. 43 and prevents further downward movement of upper chute 686 and lower chute 688. In addition, stop member 694 engaging chute support member 690 defines the lowermost position of upper chute 686 and lower chute 688 which is also the dispensing position of food dispensing chute mechanism 608, as illustrated in FIG. 43. This position also provides discharge location 710 of dispensing chute mechanism 608.

Referring to FIGS. 25-28, there is illustrated container storage magazine 638, which can form part of food packaging device 600. Container storage magazine 638 is configured to store a plurality of different sized food containers in an unerected form. Typically, container storage magazine 638 will be configured to hold a variety of different sized containers. In the illustrated embodiment, container storage magazine 638 can contain four different sizes of French fry containers or cartons. Container storage magazine 638 includes a base 716 that is suitably mounted with mounting structure 718 to cabinet 602. Preferably, mounting structure 718 permits container storage magazine 638 to be readily removed to permit access to rotatable food dispensing member 606 and overflow food collection member 613.

Base 716 typically can be in the form of a base plate and includes four apertures 720, 722, 724 and 726, each of said apertures corresponding to the profile of a different size collapsed carton. Apertures 720, 722, 724 and 726 are dimensioned to be able to retain a stack of cartons in a collapsed or unerected condition as illustrated in FIG. 25 in which a plurality of unerected cartons 728 are stacked therein.

Each aperture 720, 722, 724 and 726 and base 716 has associated therewith a plurality of guide members 730-760. In the illustrated embodiment, guides 730-760 are in the form of post or tubular-type members. Each set of four guide members is associated with a specific one of apertures 720, 722, 724 and 726 to define and permit stacking of a plurality of unerected French fry cartons or containers that generally correspond in size to the size of apertures 720, 722, 724 and 726, respectively. It is to be understood that other arrangements to define a container stack can be utilized in accordance with the invention. For example, in place of guides 730-760 other structure could be utilized, such as upstanding walls or partial walls or other types of guides.

Container storage magazine 638 may also include a suitable removable cover (not shown) to enclose base 716 and the volume defined over apertures 720-726 by guides 730-760.

Container storage magazine 638 is preferably positioned to permit ready access to the bottom of each container stack through the bottom of each of apertures 720-726 by automated container handling system 610, which is hereinafter described in detail.

Food packaging device 600 includes automated container handling system 610. Automated container handling system 610 is capable of retrieving an unerected container through any of apertures 720, 722, 724 and 726 of unerected container storage magazine 638, erecting the unerected carton, holding the erected carton in position at discharge location 710 of food dispensing chute mechanism 608 and depositing the filled container onto conveyor system 614, which conveyor system 614 subsequently transports the filled container to a desired location.

Referring to FIGS. 1, 25, 27-28 and 30-44, there is illustrated automated container handling system 610 and elements and features thereof. Automated container handling system 610 includes a container retrieving and grasping device 762, a container grasping device 764 and a container bottom urging device 766.

Automated container handling system 610 is controlled by a suitable control system for food packaging device 600.

Container retrieving and grasping device 762 and portions thereof are best illustrated in FIGS. 30-39. Container retrieving and grasping device 762 includes a mast 768, which is mounted to a carriage system 770, a movable rack member 772, a pinion 774, a frame 776, a container grasping member 778 and a linkage assembly 780.

Mast 768 is carried by carriage system 770 which carriage system 770 allows for lateral translation of mast 768 and the components associated therewith, including movable rack member 772, pinion 774, frame 776, container grasping member 778 and linkage assembly 780. Carriage system 770 includes a guide member 782, a worm gear 784, a drive mechanism 786 and a carriage follower 788. Carriage follower 788 supports a vertical translation mechanism 790 that, in turn, carries mast 768.

Carriage guide 782 is an elongated guide that defines the lateral translation movement direction of carriage follower 788 and is secured within cabinet 602. Worm gear 784 is disposed parallel to carriage guide 782 and when rotated moves carriage follower 788 along carriage guide 782.

Worm gear 784 is driven by drive mechanism 786 which can include a drive motor 792, a drive gear or pulley 794 and a driven gear or pulley 796. Where drive and driven pulleys are used, typically a belt 798 will impart rotation from one pulley to another.

Drive motor 792 drives driven pulley 796 and causes worm gear 784, which is mounted for rotation, to be rotated by rotation of driven pulley or gear 796 in either direction. Drive motor 792 can be an AC or DC motor or a stepper or servo motor as desired. Suitable sensors can be employed (not shown) to determine the position of carriage follower 788 which determines the lateral position of container grasping member 778.

Figure 39:
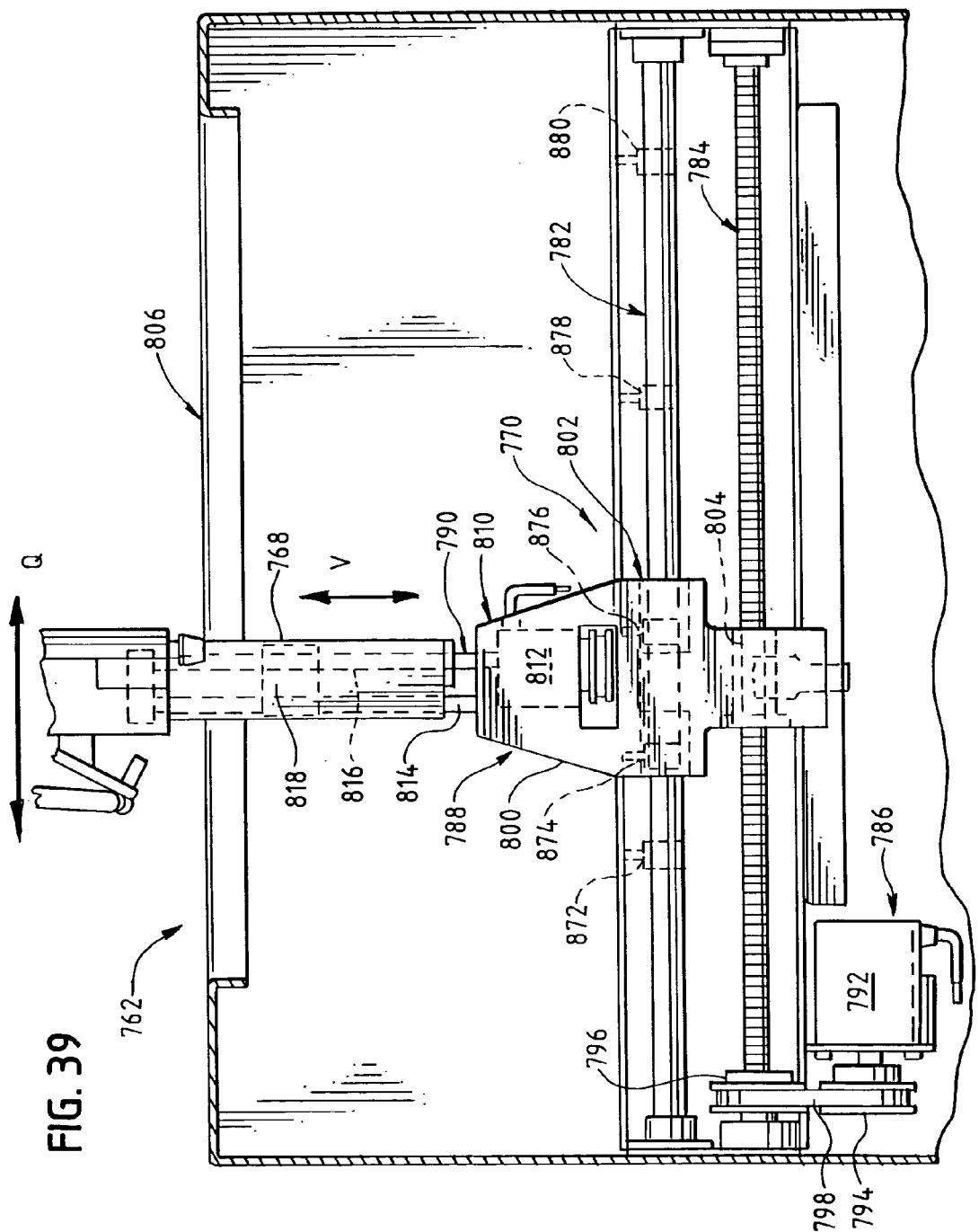
FIG. 39 is a front elevation view of another portion of the container handling apparatus of FIG. 34.

Carriage follower 788 is composed of a frame 800 having a guide aperture or slot 802 in which carriage guide 782 is disposed and a threaded aperture or slot 804 in which elongated worm gear 784 is disposed to impart lateral motion to carriage follower 788 by rotation of worm gear 784. Thus, carriage system 770 provides lateral movement in the direction of arrows Q as shown in FIG. 39. In this manner, carriage follower 788 and thus mast 768 can be laterally translated as desired.

A suitable opening 806 is located in countertop surface 636 of cabinet 602 to permit mast 768 to extend therethrough.

Mast 768 can be raised and lowered in a vertical direction as indicated by arrow V in FIG. 39.

Mast 768 can be vertically raised and lowered in the directions indicated by arrow V in FIG. 39 by operation of a drive mechanism 810 that forms part of vertical translation mechanism 790. Vertical translation mechanism 790 is a vertically extending carriage system similar to that described with respect to carriage system 770 and includes a drive mechanism 810 which is composed of a motor 812 which is carried by carriage follower 788, a vertically disposed carriage guide 814, a vertically disposed worm gear 816 which is driven in a suitable manner by motor 812 such as previously described with respect to drive mechanism 786 of carriage system 770, which can be controlled in a similar manner. Vertical translation mechanism 790 also includes a vertical carriage follower 818 having a threaded aperture or slot and a guide aperture or slot (not shown) which vertical carriage follower 818 is secured to mast 768.

Mast 768 has mounted thereto frame 776, typically at an upper end thereof. Linkage assembly 780 is secured to frame 776 as well as pinion 774 and movable rack member 772.

Movable rack member 772 includes a frame 820 having a guide slot 822 vertically disposed therein and a rack 824 which meshes with pinion 774. Movable rack member 772 may also include extra mass in the form of a weight block 826 to help urge movable rack member 772 downwardly when not restrained.

A pair of guides 828 and 830 are rigidly secured to frame 776 and are disposed within slot 822 of movable rack 772. A spring 832 can be connected between an upper end of movable rack member 772 and guide 828 or 830 to urge movable rack member 772 to a lower position as illustrated in FIG. 30 compared with the upper position as illustrated in FIGS. 34-37.

In a preferred embodiment, movable rack member 772 includes a stop 834 which stop can be vertically adjustable. While stop 834 is located at the bottom of movable rack member 772 it is to be understood that a stop could be provided at another location provided that a suitable engaging surface at a proper location is provided.

Mounted to frame 776 is an axle 836 that is mounted for rotation relative to frame 776. Axle 836 has pinion gear 774 rigidly secured thereto as well as one end 838 of linkage 780. The other end 840' of linkage 780 is securely mounted to frame 776 as illustrated in FIGS. 30-37, for example.

Figure 30:
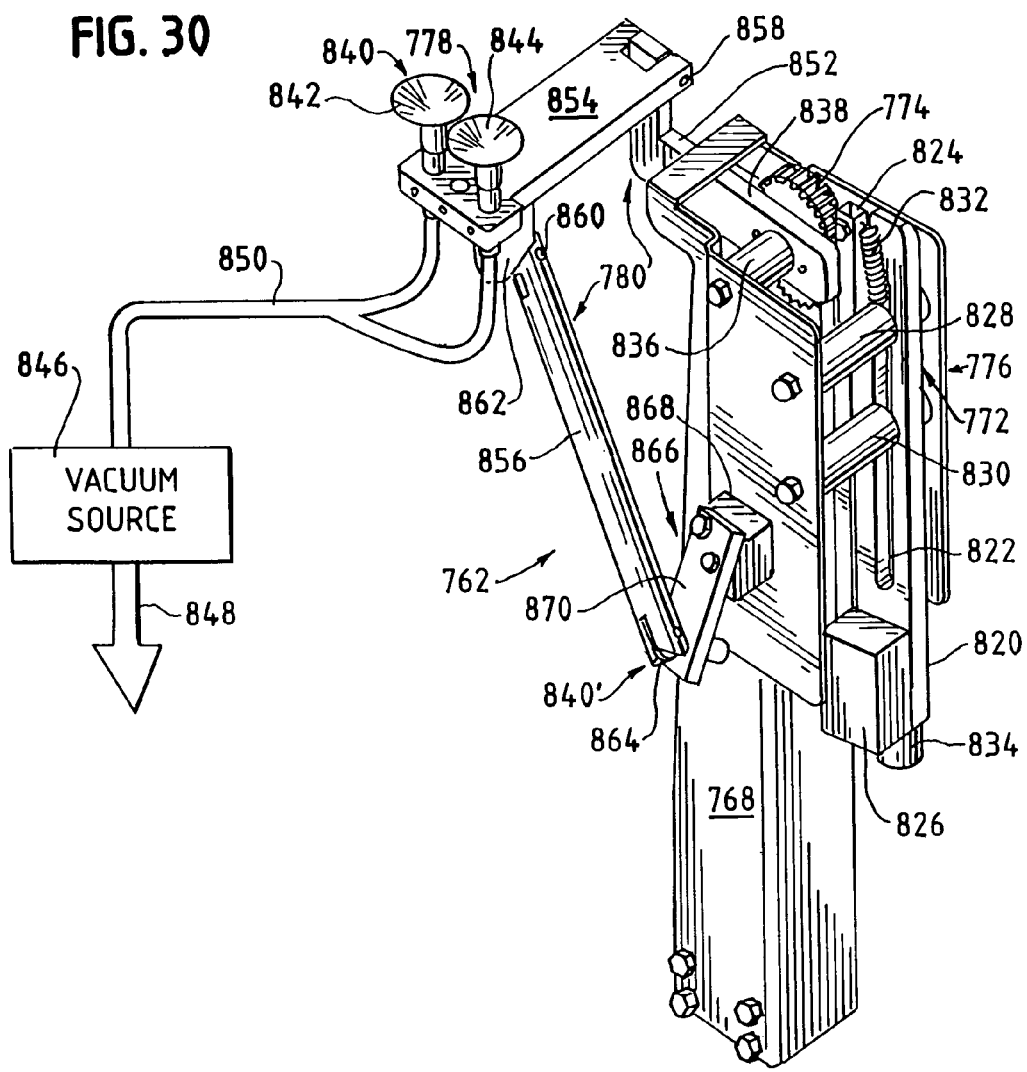
FIG. 30 is a front perspective view of a portion of an automated container handling system in accordance with the invention.
Figure 31:
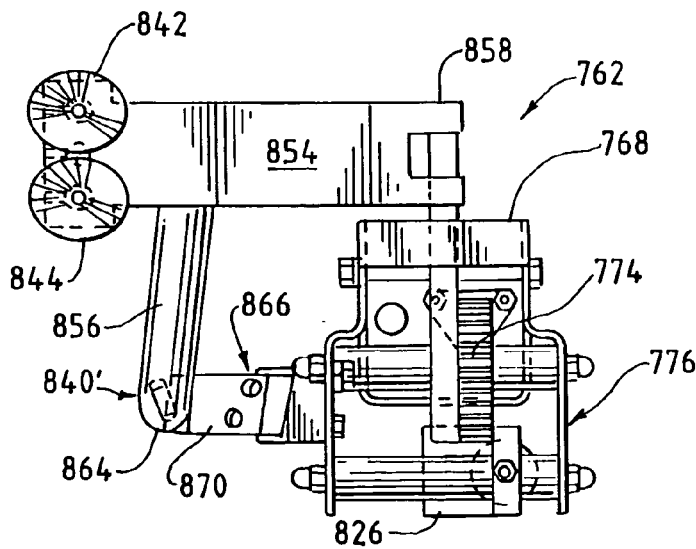
FIG. 31 is a top plan view of the container handling system of FIG. 30.
Figure 38:
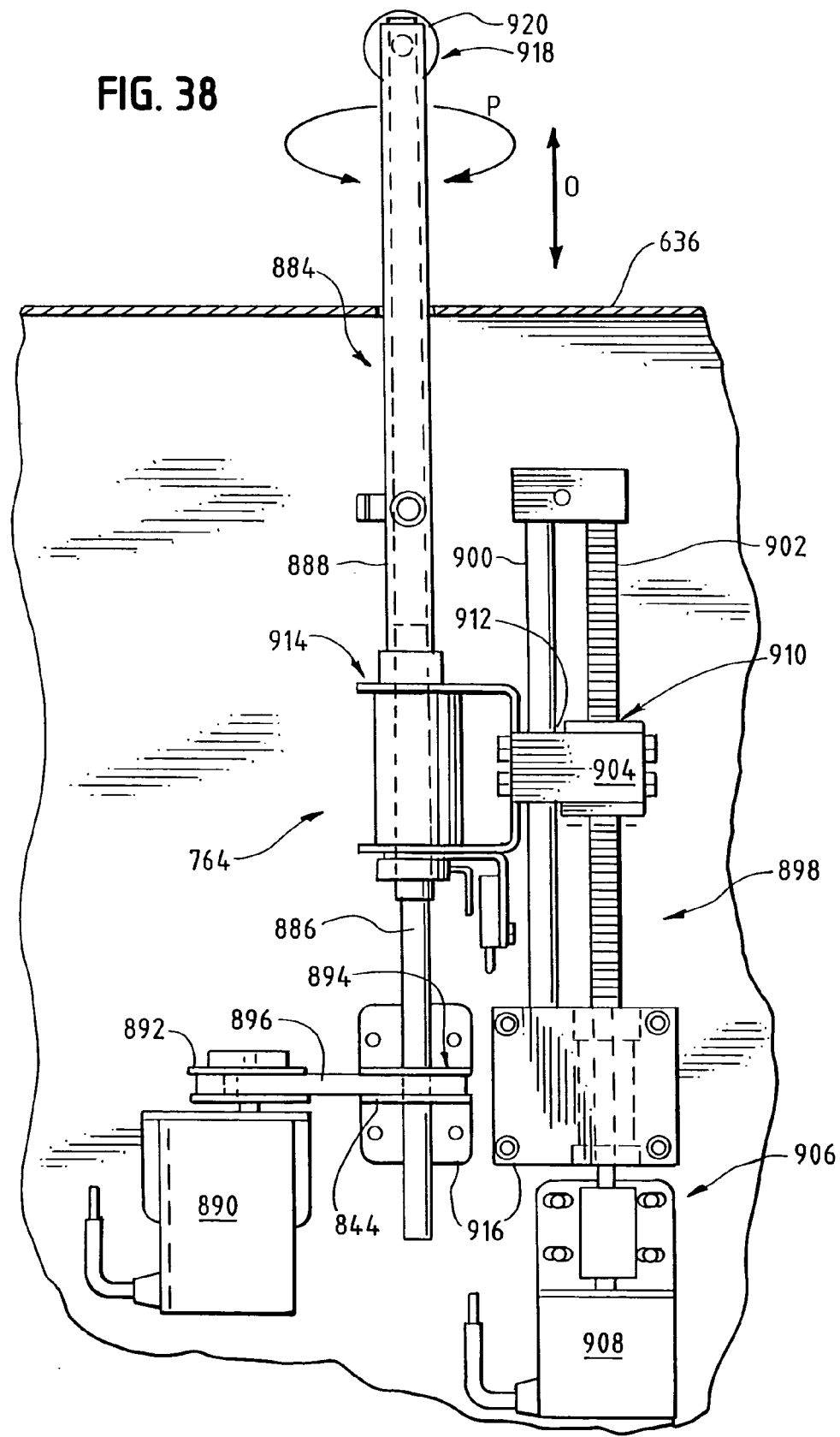
FIG. 38 is a front elevation view of a portion of a container handling apparatus in accordance with the invention.

Linkage 780 which carries container grasping member 778 is composed of a plurality of links so that container grasping member 778 is movable from a horizontal position as illustrated in FIGS. 30-32 to a vertical position as illustrated in FIGS. 34-37. When container grasping member 778 is in the horizontal position it is utilized to grasp and retrieve a desired size of container from one of the apertures 720, 722, 724 and 726 from container storage magazine 638. For this purpose, container grasping member 778 includes a suction cup device 840 which includes at least one suction cup 842 and in the illustrated embodiment two suction cups 842 and 844 arrayed in substantially the same plane for grasping a container having a surface to be grasped by both suction cups 842 and 844 in the same plane. Suction cup device 840 also includes a vacuum source 846, a release valve 848 and a suitable vacuum line 850 which connects suction cups 842 and 844 to vacuum source 846, as illustrated in FIG. 30, for example. In operation, when suction cups 842 and/or 844 engage a container or other member to be grasped, vacuum source 846 is activated to supply vacuum to suction cups 842 and 844, such as to grasp and retain a container from one of apertures 720, 722, 724 and 726 of container storage magazine 638.

Linkage assembly 780 includes, in the illustrated embodiment, a first link 852, a second link 854 and third link 856.

First link 852 is rigidly secure to axle 836 and pinion 774. First link 852 is configured in an L-shape with the end of first link 852 opposite the portion connected to axle 836 pivotally connected to second link 854 having one end being pivotally connected to first link 852 via pivot connection 858.

Second link 854 is connected to third link 856 via a universal joint connection 860 a location spaced apart from pivot connection 858 as illustrated in, for example, FIGS. 30-37. Section cups 842 and 844 are mounted to second link 854. An offset member 862 which depends from second link 854 provides a desired offset for universal joint connection 860 which connects second link 854 to third link 856.

Third link 856 is, in turn, connected to frame 776 via a universal joint connection 864 which is at a distance removed from universal joint connection 860 which connects third link 856 to second link 854. An offset member assembly 866 is rigidly secured to frame 776 and includes an angled block 868 and an offset extension 870 to provide the desired angled and clearance for universal joint 864 and third link 856.

Figure 40:
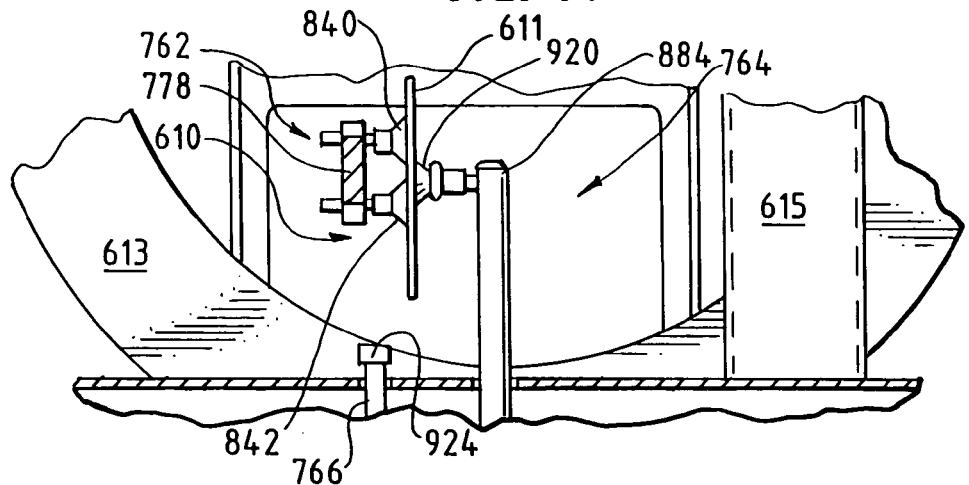
FIGS. 40-42 illustrate a front diagrammatic elevation view illustrating a portion of the container handling apparatus in accordance with the invention.

In operation, when movable rack member 772 is moved relative to mast 768, such as when stop 834 contacts a surface, such as in the illustrated embodiment, countertop surface 636 as illustrated in FIG. 36, continued downward vertical movement of mast 768 causes rack member 772 to move upwardly relative to mast 768. This causes rotation of pinion 774 which meshes with rack 824 mounted to rack member 772. Rotation of pinion 774 in a counter-clockwise direction in FIG. 30 causes rotation of first link 852. Such rotation causes downward movement of that portion of first link 852 that is pivotally connected to second link 854 via pivot connection 858. Such movement, in turn, causes second link 854 to pivot upwardly about pivot connection 858 in a clockwise direction as viewed in FIG. 30 to cause suction cups 842 and 844 to move to a vertically oriented position as depicted in FIGS. 34-37 from the horizontally oriented position depicted in FIGS. 30-33. In addition, such movement of first link 852 causes movement in rotation of third link 856 and universal joint connection 860 and 864 to the position indicated in FIGS. 34-37. When container grasping member 778 is in the position indicated in FIGS. 34-37, an unerected container held by suction cups 842 and/or 844 will be vertically oriented when suction cups 842 and/or 844 are attached to the container sidewall, as illustrated in FIG. 40, for example.

In a typical operation, container retrieving and grasping device 762 will be operated to position suction cups 842 and 844 below a container to be selected from container storage magazine 638. Mast 768 will be raised by operation of vertical translation mechanism 790 to a desired height so that suction cups 842 and 844 engage a container contained at the bottom of container storage magazine 638. Vacuum source 846 is activated and mast 768 can be lowered to remove a container from a desired one of apertures 720, 722, 724 and 726 of container storage magazine 638. Carriage system 770 can be activated to move container retrieving and grasping device 762 laterally to a desired location. Such lateral movement can be controlled by properly positioned sensors 872, 874, 876, 878 and 880, for example. For example, sensor 872 can define the position to retrieve a container from aperture 720, sensor 876 to retrieve a container from aperture 722, sensor 878 to retrieve a container from aperture 724 and sensor 880 to retrieve from aperture 726. Sensor 874 can be positioned to define the proper location of container grasping member 778 to erect the container that has been retrieved from one of apertures 720, 722, 724 or 726 of container storage magazine 638, as hereafter described. After erecting the container, the vacuum applied to suction cups 842 and 844 is released by operation of release valve 848 which permits suction cups 842 and 844 to disengage and release the container that had been grasped. Mast 768 can then be raised causing stop 834 to be removed from countertop surface 636 and by action of weight 826 and operationally spring 832, causing rack member 772 to move downwardly relative to mast 768 thereby rotating pinion gear 774 clockwise relative to the position shown in FIG. 34, thereby moving linkage assembly 780 to cause movement of container grasping member 778 from the position illustrated in FIGS. 34-37 to the position indicated in FIGS. 30-33, where container grasping member 778 is in position to retrieve a desired carton from container storage magazine 638 in a manner previously described, which includes lateral translation of container grasping member 778 by carriage system 770.

It is to be understood that any suitable automated device or system for retrieving, grasping and moving a container to a desired location as desired herein can be utilized in accordance with various aspects of the present invention. Thus, various aspects of the present invention are not limited by the particular embodiment of container retrieving and grasping device 762 and components thereof described herein. For example, an automated or robotic arm could be utilized to select, grasp and retrieve erected or unerected containers from a source as desired and then erect the carton or container in a suitable manner, followed by holding the erected container at discharge location 710 and after filling placing the filled container, such as container 611 on to a suitable conveyor to move the filled container to a desired location.

Container grasping device 764 of container retrieving and grasping device 762 will now be described, and in particular with reference to FIGS. 38 and 40-44.

Container grasping device 764 includes a rotatable and vertically translatable mast 884. Mast 884 can be rotated as illustrated by arrow P in FIG. 38 and vertically translated up and down as indicated by arrow O also in FIG. 38. Mast 884 is connected to a shaft 886 via a slot and key arrangement between mast 884 and shaft 886 permitting mast 884 to be rotated by shaft 886 which, in turn, can be rotated by a stepper motor 890 or other suitable motor or device to rotate shaft 886 a desired degree. Motor 890 drives a drive pulley or gear 892 which, in turn, drives a driven pulley or gear 894. In the case where pulleys are utilized, a belt 896 is used to transmit rotation from pulley 892 to pulley 894. Motor 890 can be a stepper motor or a servo motor as desired. Alternatively, an AC or DC motor can be utilized provided that a suitable control is provided so that the orientation of mast 884 can be determined. A carriage system 898 is utilized to provide the desired vertical movement of mast 884 in up and down directions. Carriage system 898 is similar to carriage system 770 previously described and includes a carriage guide 900, a worm gear 902, a carriage follower 904, a drive mechanism 906 which includes a motor 908 (which can be a servo motor or an AC or DC motor) suitably controlled to drive worm gear 902. Carriage follower 904 includes a threaded aperture or slot 910 which communicates with worm gear 902 and a threaded aperture or slot 912 in which guide 900 is disposed. A carriage follower interface 914 connects carriage follower 904 to mast 884 and permits shaft 886 to rotate with respect to carriage follower interface 914. Thus, in operation, rotation of motor 908 rotates worm gear 902 thereby translating carriage follower 904 up or down depending on the direction of rotation. A suitable sensor (not shown) can be employed to determine the height of mast 884 for control by subcontrol system 118 for packaging device 600.

Suitable mounting structure 916 is provided to mount container grasping device 764 to a desired location, such as within cabinet 602. A slot and key arrangement between shaft 886 and mast 884 permits mast 884 to be vertically translated either up or down while shaft 886 is rotated.

Mounted on the upper end of mast 884 is a suction device 918 which includes a suction cup 920, a source of vacuum (not shown) for suction cup 920 and a release valve (not shown) for releasing the vacuum to suction cup 920. Vacuum can be supplied from within mast 884 to suction cup 920 by a suitable connection as is known in the art.

Container bottom urging device 766 consists of a mast 922 that is vertically translatable up and down by suitable apparatus (not shown). Such apparatus can be similar to vertical translation mechanism 790 previously described with respect to container retrieving and grasping device 762. Preferably, mast 922 has a blunt end 924.

In operation, container retrieving and grasping device 762 selects an appropriately sized container from container storage magazine 638 as directed by the control system for food packaging device 600. After retrieving the container, which in this case is container 611, container retrieving and grasping device 762 moves container 611 to a position as indicated in FIG. 40 against suction cup 920 so that opposed sidewalls of container 611 are grasped by suction cups 840 and 842 of container grasping member 778.

Figure 41:
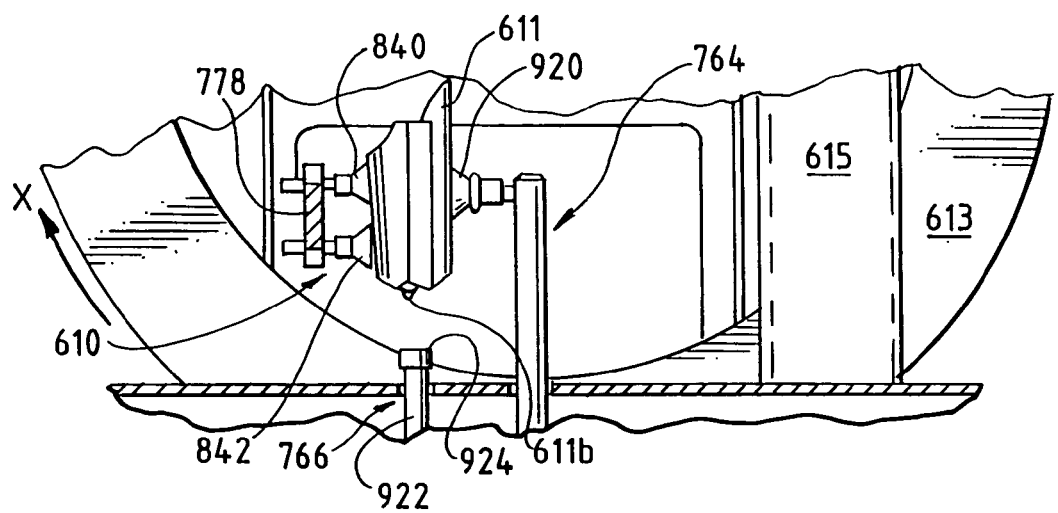
Figure 42:
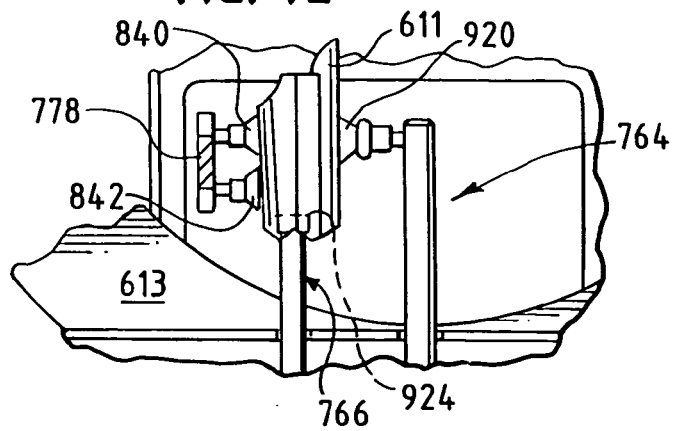

Next, as shown in FIG. 41, container grasping member 778 is moved laterally away from suction cup 920 while maintaining suction on suction cups 840, 842 and 920. Container 611 is partially erected as shown in FIG. 41 with bottom 611b depending downwardly slightly. Container bottom urging device 766 is then activated as illustrated in FIG. 42 to urge bottom 611b of container 611 upwardly into the fully erected position. Container grasping member 778 is released and retracted from container 611 and returned to a horizontal up position to select another unerected container for erection.

Next, mast 884 is rotated approximately 900 by motor 890 to place container 611 in discharge position 710 of food dispensing chute mechanism 608. Food dispensing chute mechanism 608 is then lowered to discharge French fries FF therefrom and into container 611. Any French fries that are not received into container 611 are collected by overflow food collection member 613 which is then rotated clockwise in the direction of arrow X as shown in FIG. 41 to recycle such French fries to upper chute 686 for subsequent delivery to another container. After the French fries are dispensed from food dispensing chute mechanism 608, cylinder 700 is retracted placing food dispensing chute mechanism 608 in the upper position as shown in FIG. 44. Mast 884 can then be rotated back and forth slightly (e.g., such as 2° to 20°, for example) to simulate shaking to dislodge any loose French fries or dangling French fries in container 611 and any dislodged French fries will then fall into overflow food collection member 613 for subsequent recycling. Mast 884 can also be raised and lowered slightly and relatively quickly either before, during or after the angular rotation to further simulate shaking. Thereafter, mast 884 is rotated approximately 180° until container 611 is directly over container-receiving receptacle 612 as indicated by T in FIG. 44. Mast 884 is then lowered by operation of carriage system 898 until the bottom of container 611 rests in container-receiving receptacle 612. Then, the vacuum supplied to suction cup 920 is released and suction cup 920 releases from container 611. Mast 884 can then be rotated 90° so that it is in position to receive another container to be erected.

Container-receiving receptacle 612 is then transported via conveyor system 614 which will now be described in detail.

Conveyor system 614 and portions or elements thereof are illustrated in various figures including FIGS. 1, 25-29 and 45-50.

Conveyor 614 includes, in the illustrated embodiment, raceway 620 which can be formed along the surface of countertop 636 or on some other surface as desired. Raceway 620 is preferably in the form of a continuous loop raceway and is defined by spaced apart guides 620a and 620b mounted to countertop 636 to guide receptacles 612. Conveyor system 614 includes one or more and typically a plurality of container-receiving receptacles 612 which are illustrated in detail in FIGS. 46-50. Gate structure 634 of conveyor system 614 includes a first gate 926 and second gate 928. First gate 926 is movable and typically second gate 928 can be stationary as hereinafter described.

Figure 45:
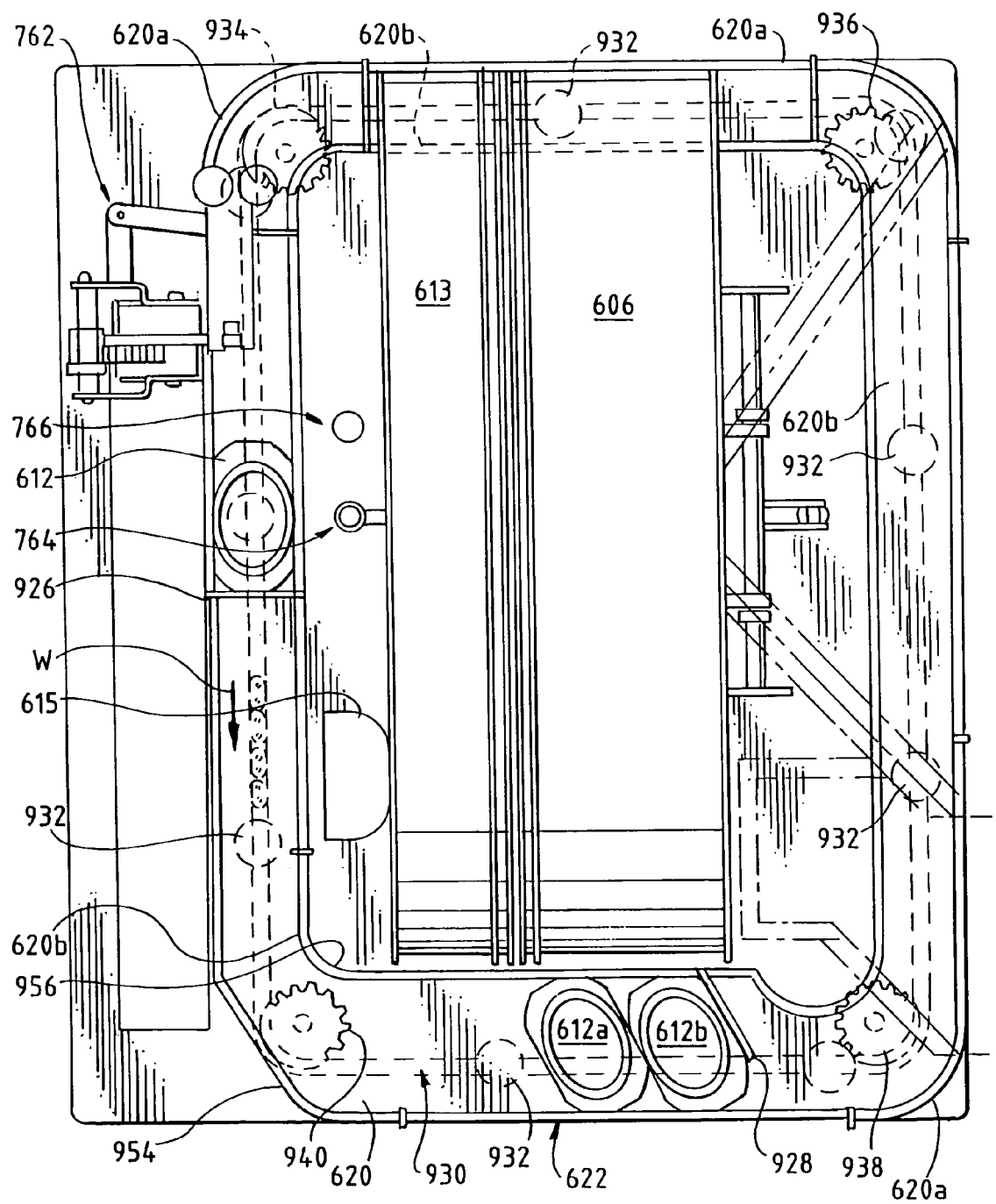
FIG. 45 is a top plan view of a food packaging device in accordance with the present invention.

Conveyor system 614 also includes structure for causing movement of container-receiving receptacle 612. In the illustrated embodiment, container-receiving receptacles 612 are moved via an endless loop 930 that can be located beneath countertop 636. Endless loop 930 carries a plurality of magnets 932 as illustrated in FIGS. 45 and 49, for example. Magnets 932 are spaced along endless loop 930. Endless loop 930 may comprise a chain or other suitable structure that can be driven by a drive system that includes sprockets 934, 936, 938 and 940. One of sprockets 934, 936, 938 and 940 can be a driven sprocket.

Any suitable endless loop 930 can be utilized such as a belt or a chain. Pulleys could be used in place of sprockets 934-940. The route of endless loop 930 follows the route of raceway 620.

Container-receiving receptacle 612 typically includes a base 942 and a container-receiving well 944 located over base 942. Base 942 includes an enclosed compartment 946 which can be conveniently accessed by a base plate 948 located along the bottom of base 942 that is fastened to base 942 by suitable fasteners 950. Contained within enclosed compartment 946 is a magnet 952.

Container-receiving receptacle 612 follows the movement of magnet 932 due to magnetic attraction between magnets 932 and 952 thereby causing movement of container-receiving receptacle 612 along raceway 620.

Enclosed compartment 946 is dimensioned to permit magnet 952 to be free to rotate therein allowing container-receiving receptacle 612 to be readily guided by rails 954 and 956 that are raised above countertop 636.

Movable gate 926 prevents movement of container-receiving receptacle 612 located thereat as illustrated in FIG. 45. This ensures that container-receiving receptacle 612 is in position to receive a loaded container of French fries, such as container 611 from container grasping device 764. After a filled container is placed on container-receiving receptacle 612 adjacent movable gate 926, gate 926 is automatically removed by a suitable mechanism (not shown) to permit container-receiving receptacle 612 thereat to be moved by conveyor system 614 until French fry container 611 contained therein contacts gate 928 or receptacle 612 contacts another receptacle that is located at pick up area 622 as shown in FIG. 45. Once container 611 is moved from receptacle 612b, receptacle 612b is then free to move along raceway 620 and passes underneath second gate 928, which can be a stationary gate. Alternatively, second gate 928 could be a movable gate and could be located at a level that directly prevents movement of receptacle 612b. After receptacle 612b passes underneath second gate 928, receptacle 612a is moved into the position formerly occupied by receptacle 612*b* provided that receptacle 612*a* has a French fry container thereon which would then cause receptacle 612*a* to be stopped at gate 928. Similarly, when that container is removed from receptacle 612*a*, receptacle 612*a* would then be free to pass underneath gate 928 and around that portion of raceway 620 until encountering gate 926 or another receptacle that is stopped by gate 926.

Referring to FIGS. 51-60, there are illustrated various views of French fry cartons that are useful in accordance with the present invention. The French fry cartons depicted in FIGS. 51-60 are particularly suitable for use in conjunction with the present invention since the cartons readily stand upright without assistance and can be erected by automated container handling system 610, previously described.

FIG. 51 illustrates a front elevation view of a carton 1012 that is particularly suitable for containing French fries, for example. Carton 1012 is illustrated in FIG. 51 in an erected or opened position and includes a pair of opposed curved sidewalls 1014 and 1016 and a bottom panel 1018.

Carton 1012 can be stacked in a collapsed configuration and stored in a suitable magazine, such as container storage magazine 638 as previously described. When in a collapsed position, carton 1012 is particularly suited to being opened or erected by pulling sidewalls 1014 and 1016 apart and urging bottom panel 1018 upwardly, as described with respect to the erection or opening of container 611 by automated container handling system 610. Container or carton 611 is of a design that is similar to carton 1012.

Carton 1012 also includes two supporting legs 1020, 1022 that extend downwardly from the lower portions of the overlapping edge portions of sidewall 1014 indicated by reference numerals 1014*a* and 1014*b* in FIG. 59 and FIG. 53.

Carton 1012 is capable of standing on its own because of legs 1020 and 1022 that extend below bottom panel 1018 when carton 1012 is open or erected.

Carton 1012 can be constructed from a single blank of paperboard which is illustrated in FIG. 59. When constructed, sidewall edge portions 1014*a* and 1014*b* form flaps that are glued to the edges of sidewall 1016 as indicated in FIG. 54, for example.

Bottom panel 1018 is specially configured to facilitate opening or erection of carton 1012 by an automated carton handling device such as automated container handling system 610, previously described in detail. Bottom panel 1018 includes intersecting lines 1024 and 1026. Intersecting lines 1024 and 1026 intersect at a generally central location of bottom panel 1018, which panel is generally oval even though it may incorporate straight edges 1028 and 1030, for example. Intersecting lines 1024 and 1026 may be fold lines, lines of weakening, score lines or even perforations. All such structures are referred to herein with respect to intersecting lines 1024 and 1026 of bottom panel 1018 only as "fold lines." Typically, the intersection of fold lines 1024 and 1026 form an angle in the range of from about 60° to about 120°. In one embodiment, the intersecting bottom panel fold lines are oriented such that one of said lines (fold line 1024 in FIG. 59) is normal or at least generally normal to curved sidewalls 1014 and 1016. In such embodiment, the other of the intersecting fold lines (in this case fold line 1026) is at least generally parallel to curved sidewalls 1014 and 1016.

Preferably, fold line 1024 extends from sidewall 1014 to sidewall 1016.

As previously mentioned, carton 1012 is foldable to a collapsed position with sidewalls 1014 and 1016 being planar and in contacting overlying relation to each other with bottom panel 1018 being divided into two overlying panels 1018*a* and 1018*b* by intersecting fold line 1026.

Preferably, bottom panel 1018 includes two additional fold lines 1032 and 1034 on either side of fold line 1024 that extend from one carton sidewall to the other, in this case from sidewall 1014 to sidewall 1016. Secondary fold lines 1032 and 1034 further facilitate the opening or erection of container 1012 with an automated device such as automated container handling system 610.

FIG. 58 illustrates a carton 1036 that is similar in construction to carton 1012 previously described except that carton 1036 is of a different size. Preferably, carton 1012 is configured such that the width of the base is relatively narrow and the sidewalls 1014 and 1016 flare outwardly so that container 1012 is substantially wider at the top (from about 1.6 to 2 or more times the base width). This allows relatively large and tall containers to be placed in an automobile cup holder CH as depicted in FIG. 56.

Referring to FIG. 2, there is illustrated an alternate embodiment of an automated food processing system 101 in accordance with the invention. Automated food processing system 101 includes a food dispensing device 201 which is similar to food dispensing system 200, previously briefly described, where like reference numerals represent like elements. Food dispensing device 201 includes fewer uncooked bulk food dispensing containers 204 and additional magazine food dispensers that are similar to magazine food dispenser 206, previously referred to. Otherwise, dispensing device 201 is similar to dispensing device 200 previously described.

Automated food processing system 101 also includes fry device 400 which has been described.

One primary distinction between automated food processing system 100 and automated food processing system 101 is that automated food processing system 101 does not include an automated packaging device such as automated packaging device 600. In place of food packaging device 600, a food storage device 635 is provided. Food storage device 635 allows food cooked by food frying device 400, to be stored in a heated environment for subsequent manual processing. As configured in FIG. 2, food storage device 635 includes separate product receiving receptacles 637, 639, 641 and 643. Each receptacle 637, 639, 641 and 643 is dedicated to receiving food from a respective one of fry wheels 410, 412, 414 and 404, respectively. In addition, each receptacle 637-643 can have placed therein a suitable container to receive food, such as handled trays 645, 647, 649 and 651.

As illustrated in FIG. 2, a food item F is being discharged from fry wheel 414 down a chute 653 and into handled tray 649 contained within heated receptacle 641. Food item F can be stored therein for a period of time until it is ready for subsequent processing.

Figure 62:
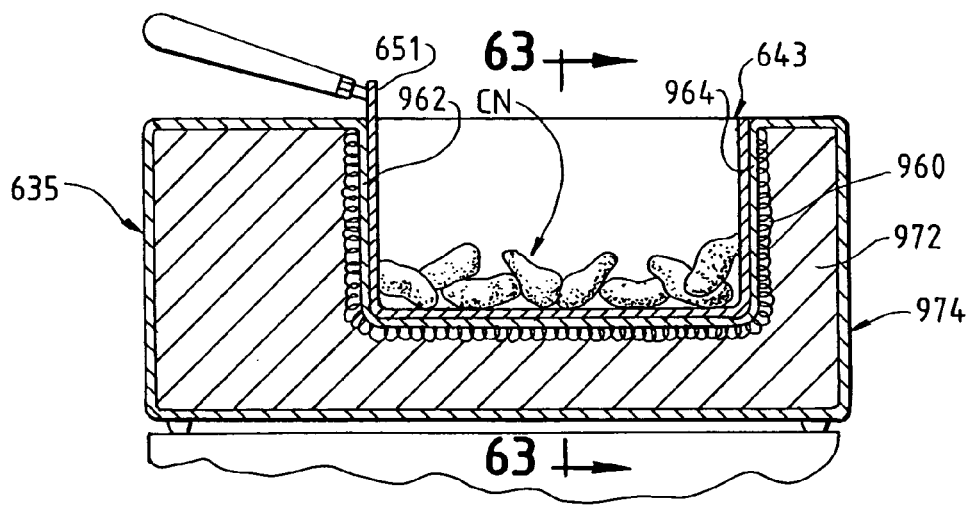
FIG. 62 is a sectional view of a portion of a food storage device in accordance with the present invention.
Figure 63:
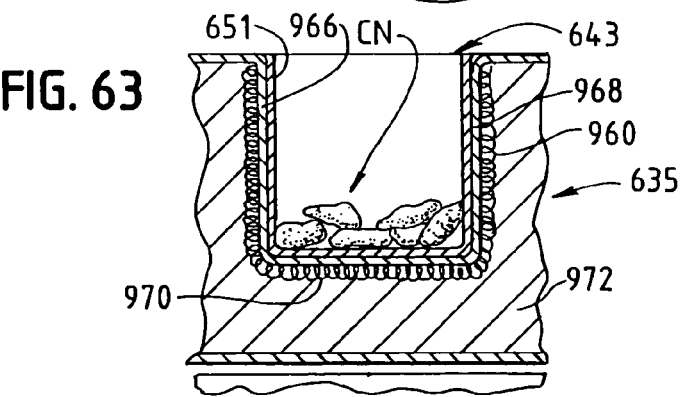
FIG. 63 is a sectional view of the food storage device of FIG. 62.

Referring to FIGS. 62 and 63, there is illustrated heated receptacle 643 in a cross-sectional view and FIG. 63 is a cross-sectional view taken along line 63-63 of FIG. 62 showing the entire width of receptacle 643.

As illustrated in FIGS. 62 and 63, heated receptacle 643 is a heated well having a heating element that heats sidewalls 962, 964, 966 and 968 as well as bottom 970 of heated receptacle 643. Heating element 960 is in close proximity to walls 962, 964, 966 and 968 as well as bottom 970. Heating element 960 may be composed of a single heating element or multiple heating elements as desired. Suitable controls may be provided to adjust the temperature of walls 962-968 as well as bottom 970 of heated receptacle 643. In addition, suitable insulation 972 can be contained within the cavity that is defined by cabinet 974 of food storage device 635, which is partially shown in FIGS. 62 and 63.

Preferably, handled trays 645-651, such as handled tray 651 depicted in FIGS. 62 and 63 are dimensioned such that they are in close proximity to walls 962-968 and bottom 970 when placed in heated receptacle 643.

Tray 651 may be constructed of any suitable material. In addition, a wire basket which can include a handle may be used as an insert for tray 651, in which case food CN is contained in the wire basket and tray 651 functions to collect excess oil from food CN, in which case tray 651 desirably would not include a handle.

Food packaging device 600 may optionally include food seasoning device 616, which is illustrated in detail in FIGS. 65-68. Food seasoning device 616 includes a hopper 972, a metering wheel 974, a wheel drive system 976, a dispensing tube 978 and a dispensing head 618.

Hopper 972 is configured to hold a desired bulk quantity of a seasoning material, such as salt S. Bulk hopper 972 includes a lid 982 that can be removed to replenish the supply of salt S contained therein. Hopper 972 can have a bottom with inwardly extending sidewalls 984 to facilitate the dispensing of material from bottom 986 of hopper 972 which may include a dispensing tube 988.

Metering wheel 974 is located beneath bottom 986 and dispensing tube 988 to receive a charge of salt or other seasoning therefrom. Metering wheel 974 includes a cavity 990 for receiving a charge of salt from dispensing tube 988. Metering wheel 974 is rotatably mounted in a housing 992 and can be rotated about the longitudinal axis of metering wheel 974 to cause cavity 990 to be directed downwardly which thereby causes the seasoning or salt contained in cavity 990 to fall by gravity therefrom.

Metering wheel 974 is suitably rotated by wheel drive system 976. Wheel drive system 976 can be controlled by a suitable electronic control system that can form part of the food packaging device 600. Typically, in operation, when French fries FF are dispensed from one or more of fry wheels 404, 410, 412 and 414 onto chute 604, a suitable sensing device (not shown) senses the presence of French fries and activates wheel drive system 976 of automated food seasoning device 616 to discharge a predetermined quantity of seasoning, such as salt, onto the French fries that traverse chute 604.

Dispensing head 618 can be located in a desired position to apply seasoning to the food traversing chute 604. As illustrated in FIG. 3, for example, dispensing head 618 can be located towards a bottom portion of inlet chute 604 and may extend over a portion of rotatable food dispensing member 606.

Wheel drive system 976 as illustrated in FIGS. 65-68 includes a solenoid plunger 994 for driving a linkage 996 that is connected to metering wheel 974 to impart rotation to metering wheel 974. Linkage 996 includes a crank arm 998, one end of which is connected to a central portion of metering wheel 974 and the other end is connected to a lever arm 1000 which, in turn, is connected to solenoid plunger 994. Lever arm 1000 can be driven by solenoid plunger 994 which, in turn, causes crank arm 998 to be driven, thereby rotating metering wheel 974 sufficiently to cause cavity 990 to be directed downwardly, thereby permitting any seasoning or salt contained therein to be dispensed therefrom.

A collection funnel 1002 is disposed at the discharge end of housing 992 and connects to dispensing tube 978. Dispensing tube 978 is, in turn, connected to dispensing head 618.

Dispensing head 618 can include a plurality of vanes 1004 for facilitating dispersion of seasoning dispensed therefrom. As illustrated, there are four vanes 1004 spaced 90° from each other.

Dispensing tube 978 has a lower end portion 1006 that terminates some distance above dispensing cone 1008 of dispensing head 618. In one embodiment, lower end portion 1006 of dispensing tube 978 may terminate approximately 0.25 inches from the tip of dispensing cone 1008.

Dispensing cone 1008 includes a plurality of holes 1010 that are arrayed through dispensing cone 1008 to facilitate the distribution of seasoning or salt. In operation, as salt or seasoning is dispensed through lower end portion 1006 of dispensing tube 978, the seasoning strikes the top portion of dispensing cone 1008 and is directed into four quadrants via vanes 1004. As the seasoning traverses the surface of dispensing cone 1008, some of the seasoning falls through holes 1010 in dispensing cone 1008. Note that not all of holes 1010 are labeled, for purposes of clarity in the Figures. Other salt or seasoning particles do not fall through holes 1010 but fall off the lower end of dispensing cone 1008. Still other seasoning particles bounce or are otherwise deflected off the top surface of dispensing cone 1008 and fall a lateral distance removed from dispensing cone 1008. In this manner, a good distribution of seasoning is achieved over a relatively large area.

In one embodiment, food packaging device 1600 is illustrated or partially illustrated and elements useful in connection with food packaging device 1600 are illustrated in FIGS. 74, 76 and 86-91. Food packaging device 1600 includes a cabinet 1602, inlet chute 1604, salting device 1606, holding bin 1612, container filling device 1614, container handling system 1622 and elevator 1628. Food packaging device 1600 can be French fry containers or cartons or other containers as desired.

Referring to FIGS. 86-89B, there is illustrated container storage magazine 1630, which can form part of food packaging device 1600. Container storage magazine 1630 is configured to store a plurality of different sized food containers, in this case French fry cartons in an unerected form. Typically, container storage magazine 1630 will be configured to hold a variety of different sized containers. In the illustrated embodiment, the containers are individual portion-sized and are of a type having opposed sidewalls connected by a collapsible container bottom. Typically, the rear sidewall extends higher than the front sidewall. Such containers are well known in the art and various non-limiting examples are illustrated at FIGS. 51-60. In the illustrated embodiment, container storage magazine 1630 can contain four different sizes of containers.

Container storage magazine 1630 of container handling system 1622 includes a base 1632 that is suitably mounted to cabinet 1602. Preferably, container storage magazine 1630 is mounted to be readily removed to permit replacement and/or repair and to otherwise permit access to other portions of packaging device 1600.

Figure 86:
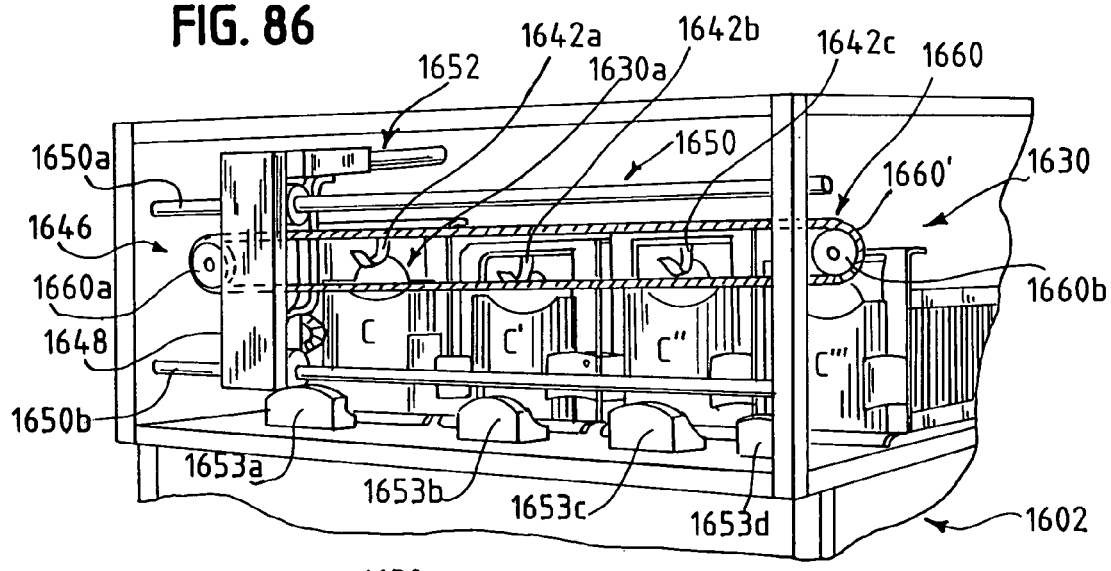
FIG. 86 is a fragmentary perspective view illustrating a portion of a packaging module in accordance with the present invention.
Figure 87:
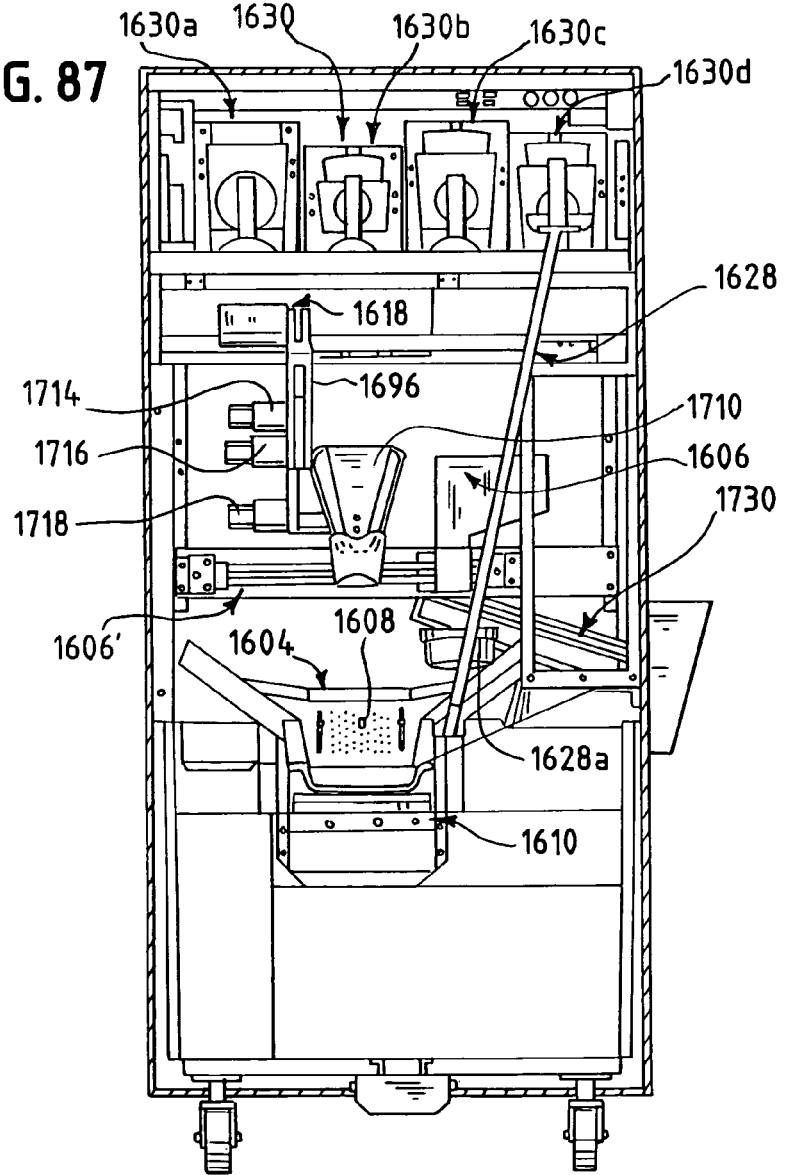
FIG. 87 is a front elevation view of various portions of a food packaging device in accordance with the present invention.
Figure 88:
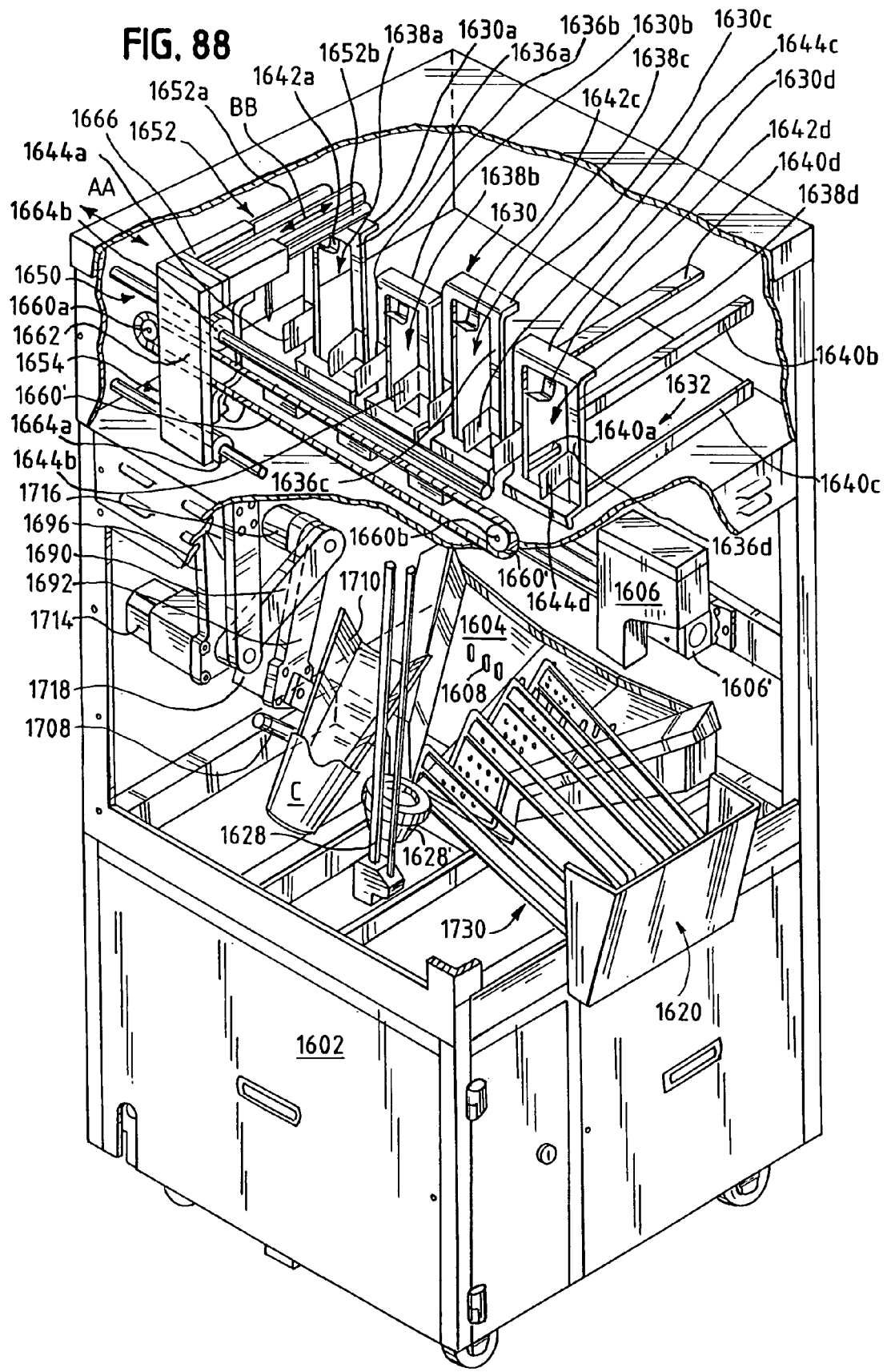
FIG. 88 is a fragmentary perspective view of various portions of a packaging device in accordance with the present invention.

As illustrated, magazine 1630 is composed of four individual magazines 1630a-d, although any desired number can be used. Each magazine 1630a-d includes a face plate 1636a-d defining apertures 1638a-d, respectively, each of said apertures corresponding to the profile of a different size collapsed carton. Apertures 1638a-d are dimensioned to be able to retain a horizontal stack of cartons in a collapsed or unerected condition as illustrated in FIGS. 86-88 in which a plurality of unerected cartons C-C''' are stacked therein.

Each face plate 1636a-d and each aperture 1638a-d has associated therewith a plurality of generally horizontally extending guide members 1640a-d shown with respect to face plate 1636d consisting of four members each, for maintaining uniform stacks of unerected cartons. In the illustrated embodiment, guides 1640a-d are in the form of L-shaped elongated members. Each set of four guide members is associated with a specific one of apertures 1638a-d to define and permit horizontal stacking of a plurality of unerected French fry cartons or containers that generally are slightly larger in size than the size of apertures 1638a-d, respectively. It is to be understood that other arrangements to define a container stack can be utilized in accordance with the invention. For example, in place of guides 1640a-d other structure could be utilized, such as upstanding walls or partial walls or other types of guides.

Container storage magazine 1630 typically will also include a suitable urging device for each magazine 1630a-d to urge the stack of containers contained therein against respective face plates 1636a-d in direction ZZ of FIGS. 89A and 89B, which may be a spring loaded urging device. Each magazine 1630a-d includes a restraining member 1642a-d, respectively, for restraining the rear sidewall from relative movement with respect to the front sidewall. As illustrated, restraining members 1642a-d are in the form of an arcuate spring clip. In addition, a pair of horizontally extending guides 1644a-d are provided adjacent apertures 1638a-d to guide cartons as they are removed from magazine 1630 and erected.

Container storage magazine 1630 is preferably positioned to permit ready access to the front of each container stack through each of apertures 1638a-d by container handling system 1622, which is hereinafter described in detail.

Food packaging device 1600 includes container handling system 1622. Container handling system 1622 is capable of retrieving an unerected container through any of apertures 1638a-d of container storage magazine 1630, erecting the unerected carton and placing the erected carton in position on elevator 1628 for delivery to container filling device 1614.

Referring to FIGS. 74, 86, 88-89, there is illustrated container handling system 1622 and elements and features thereof. Container handling system 1622 includes a container retrieving and grasping device 1646 that includes a container grasping device 1648, X-carriage system 1650, Y-carriage 1652 and container bottom urging devices 1653a-d, which are in the form of inclined ramps located adjacent apertures 1638a-d. Any suitable container handling device that performs the functions of system 1622 can be used, in whole or in part as desired.

Container handling system 1622 is controlled by a suitable control system for food packaging device 1600, similar to the control system for packaging device 600 as hereafter described.

Container retrieving and grasping device 1646 and portions thereof are best illustrated in FIGS. 86-89C. Container grasping device 1648 includes a carriage follower body 1654, which is mounted to X-carriage system 1650, Y-carriage 1652, a Y-carriage follower 1666 and a container grasping member 1648.

Body 1654 is carried by X-carriage system 1650 that includes and is driven in a suitable manner such as a toothed belt 1660' and drive and driven pulley arrangement 1660a and 1660b, which allows for lateral translation of body 1654 and the components associated therewith, including Y-carriage 1652 and movable rack member 1656, container grasping member 1648. Carriage system 1650 includes guide members 1650a,b, a drive mechanism 1660 that includes and is driven in a suitable manner such as a toothed belt 1660' and drive and driven pulley arrangement 1660a and 1660b and carriage follower 1654. Carriage follower 1654 supports Y-carriage 1652, which allows for movement normal to the longitudinal axis of X-carriage 1650 of container grasping device 1648.

Guide members 1650a,b are each an elongated guide that defines the lateral translation movement direction of carriage follower 1654 and is secured within cabinet 1602. A suitable drive motor (not shown) is used to rotate drive pulley 1660a. The drive motor can be an AC or DC motor or a stepper or servo motor as desired. Suitable sensors can be employed (not shown) to determine the position of carriage follower 1654 which determines the lateral position of container grasping member 1648.

Carriage follower 1654 is composed of a frame 1662 having guide apertures 1664a,b in which carriage guides 1650a,b are disposed. Thus, X-carriage system 1650 provides lateral movement in the direction of arrows AA as shown in FIG. 88. In this manner, carriage follower 1654 and thus container grasping device 1648 and Y-carriage 1652 can be laterally translated as desired.

Container grasping device 1648 can be horizontally moved towards and away-from X-carriage 1650 in the directions indicated by arrow BB in FIG. 88 by operation of a carriage follower mechanism 1666 that forms part of container grasping device 1648 and is guided by Y-carriage guides 1652a,b. Y-carriage follower mechanism 1666 can be a horizontally extending carriage system similar to that described with respect to X-carriage system 1650 and can be controlled in a similar manner. Alternatively, Y-carriage movement can be accomplished by an actuator, which could be an air cylinder, for example, not shown. To grasp a container, suction cups are pressed against a surface of the container and the vacuum is activated.

When container grasping device 1648 is in position adjacent container magazine 1630 as shown in FIG. 89A, it is utilized to grasp and retrieve a desired size of container from one of the apertures 1638a-d from container storage magazine 1630. For this purpose, container grasping device 1648 includes a suction cup device 1668 which includes at least one suction cup 1670 and in the illustrated embodiment two suction cups 1670 and 1672 typically arrayed to conform to the erected carton front wall and thus typically will be in substantially the same plane for grasping a container having a surface to be grasped by both suction cups 1670 and 1672 in generally the same plane. Suction cup device 1668 also includes a vacuum source, a release valve and a suitable vacuum line (not shown) which connects suction cups 1670 and 1672 to the vacuum source, which can be similar to that arrangement as illustrated in FIG. 30, for example. In operation, when suction cups 1670 and/or 1672 engage a container or other member to be grasped, the vacuum source is activated to supply vacuum to suction cups 1670 and 1672, such as to grasp and retain a container from one of apertures 1638a-d of container storage magazine 1630.

In a typical operation, container retrieving and grasping device 1648 will be operated to position suction cups 1670 and 1672 adjacent and in operative contact with a container to be selected from container storage magazine 1630 as shown in FIG. 89A. Suction cups 1670 and 1672 are at a desired height so that they engage a container contained at the front of container storage magazine 1630. The vacuum source is activated and container grasping device 1648 is moved away from magazine 1630 to remove a container from a desired one of apertures 1638a-d of container storage magazine 1630 as shown in FIGS. 89A and 89B. Carriage system 1652 can be activated to move container retrieving and grasping device 1648 laterally away from magazine 1630, which causes the selected container to be pulled from the selected magazine, which in this case is magazine 1630a. Guides 1644a maintain container C in proper lateral position as container C is pulled through aperture 1638a in the direction of arrow EE. Restraining member 1642a restrains the rear wall of container C as it is pulled through aperture 1638a and a jet of compressed air from air nozzle 1674 facilitates the separation of the front and rear sidewalls of container C while at the same time the bottom of container C is urged up as it traverses inclined ramp 1653a to cause container C to be erected. Such lateral movement can be controlled by properly positioned sensors as known in the art. For example, one sensor each can define the position to retrieve a container from apertures 1638a-d, respectively. Another sensor can be positioned to define the home or fully retracted location of container grasping device 1648 after erection of the container that has been retrieved from one of apertures 1638a-d of container storage magazine 1630. After erecting the container, X-carriage 1650 moves the erected container C in the direction of arrow FF to elevator 1628 and releases the erected container C by releasing the vacuum to suction cups 1670 and 1672, depositing it in receptacle 1628' of elevator 1628 as shown in FIG. 89C, where container C is then lowered in the direction of arrow GG by elevator 1628 to a suitable position for container filling device 1614. The vacuum applied to suction cups 1670 and 1672 can be released by operation of a release valve (not shown) or other device which permits suction cups 1670 and 1672 to disengage and release the container that had been grasped.

For example, a container bottom urging device similar to container bottom urging device 766 could be used in place of inclined ramps 1653a-d. In addition, the opposed sidewalls of the French fry container could be separated by a device such as container handling system 610, which includes suction devices that attach to each side of an unerected container after the container is removed from a container magazine. For example, see FIGS. 40-42, for example. As a non-limiting example, such a device could be located in front of a portion of container magazine 1630, for example, using container grasping device on one side of the container and a device such as container grasping device 764 (shown in FIGS. 38 and 40, for example) on the other side of the container to be erected.

Elevator 1628 may be constructed in any suitable manner. In the illustrated embodiment, elevator 1628 is a rodless cylinder that carries a receptacle 1628' which is well-shaped and suitable to contain an erected French fry container. Receptacle 1628' is movable by elevator 1628 from a first or raised position as illustrated in FIG. 89C adjacent or otherwise in a suitable position for container handling system 1622 to a second or lowered position suitable to be handled by container filling device 1614 as partially shown in FIG. 89D.

As shown in FIG. 89D, scoop or funnel 1710 of container filling device 1614 is inserted into container C, in the direction of arrow HH and grasps container C from receptacle 1628' when receptacle 1628' is in the second or lowered position. Container filling device 1614 operates to fill erected French fry containers that typically will be individual portion-sized French fry containers. Container filling device 1614 is composed of a multi-link mechanical arm 1616 that includes an end-of-arm tool 1626, that includes scoop or funnel 1710, is capable of grasping a French fry container, moving to an appropriate position via carriage 1618 and mechanical arm 1616 for scooping it into French fries FF contained in holding bin 1612 in the direction of arrow NN (see FIG. 89E) to fill French fry container C with French fries, relatively gently shaking the filled French fry container to seat the French fries in the container and to dislodge any loosely contained French fries while container C is slightly inclined, thereafter moving container C to an upright position as indicated by arrows II and JJ (see FIG. 89F) by moving second link 1692 and third link 1694 in the direction of arrows KK and LL, respectively, as shown in FIG. 89H. Thereafter, arm 1616 deposits and releases the filled French fry container at drop-off location 1620 as shown in FIG. 89I by moving container C in a generally downward direction indicated by arrow PP, which location typically will include a holding structure configured to receive and contain the filled French fry containers from where they can be picked up by a human operator, for example.

Mechanical arm 1616 can be configured and operated to generally mimic the arm, wrist and hand action of a human operator in scooping French fries into a French fry container and to shake the filled French fry container to remove loosely contained French fries and to more firmly seat French fries contained in the container.

In the illustrated embodiment, which is best shown in FIGS. 74, 76, 89G-H and 90A-F, multi-link mechanical arm 1616 includes first, second and third links 1690, 1692 and 1694, respectively, and an end-of-arm tool 1626 that is carried by third link 1694.

First link 1690 is pivotally connected to a mast 1696 via a pivot connection 1698. Mast 1696 is secured to a carriage follower 1712 and can be horizontally translated via carriage 1618. First link 1690 is connected to second link 1692 at adjacent ends thereof via pivot connection 1700 allowing second link 1692 to pivot relative to first link 1690. Adjacent an opposite end of second link 1692 to pivot connection 1700 is connected third link 1694 to second link 1692 via a third pivot connection 1702.

End-of-arm tool 1626 is rigidly connected to third link 1694 by a suitable structure, such as welding or use of a threaded fastener, for example. End-of-arm tool 1626 is configured as a French fry scoop or funnel and is configured to facilitate the filling of French fry containers which are held by end-of-arm tool 1626. End-of-arm tool 1626 includes a French fry container grasping mechanism 1704. French fry container grasping mechanism 1704 is composed of a movable finger 1706 and an actuator 1708 for movable finger 1706. Thus, when French fry scoop or funnel 1710 of end-of-arm tool 1626 is inserted into an erected French fry container C as illustrated in FIG. 90D, actuator 1708 operates to move movable finger 1706 to a closed position in which movable finger 1706 moves in the direction of arrow MM and clamps the rear sidewall C' of container C against French fry scoop 1710 thereby securing container C in a fixed position at the outlet end of French fry scoop or funnel 1710. In this manner, mechanical arm 1616 can grasp a container C that has been placed in receptacle 1628' of elevator 1628 when in the second or lowered position, as illustrated in FIGS. 89D and 90B.

Figure 90A:
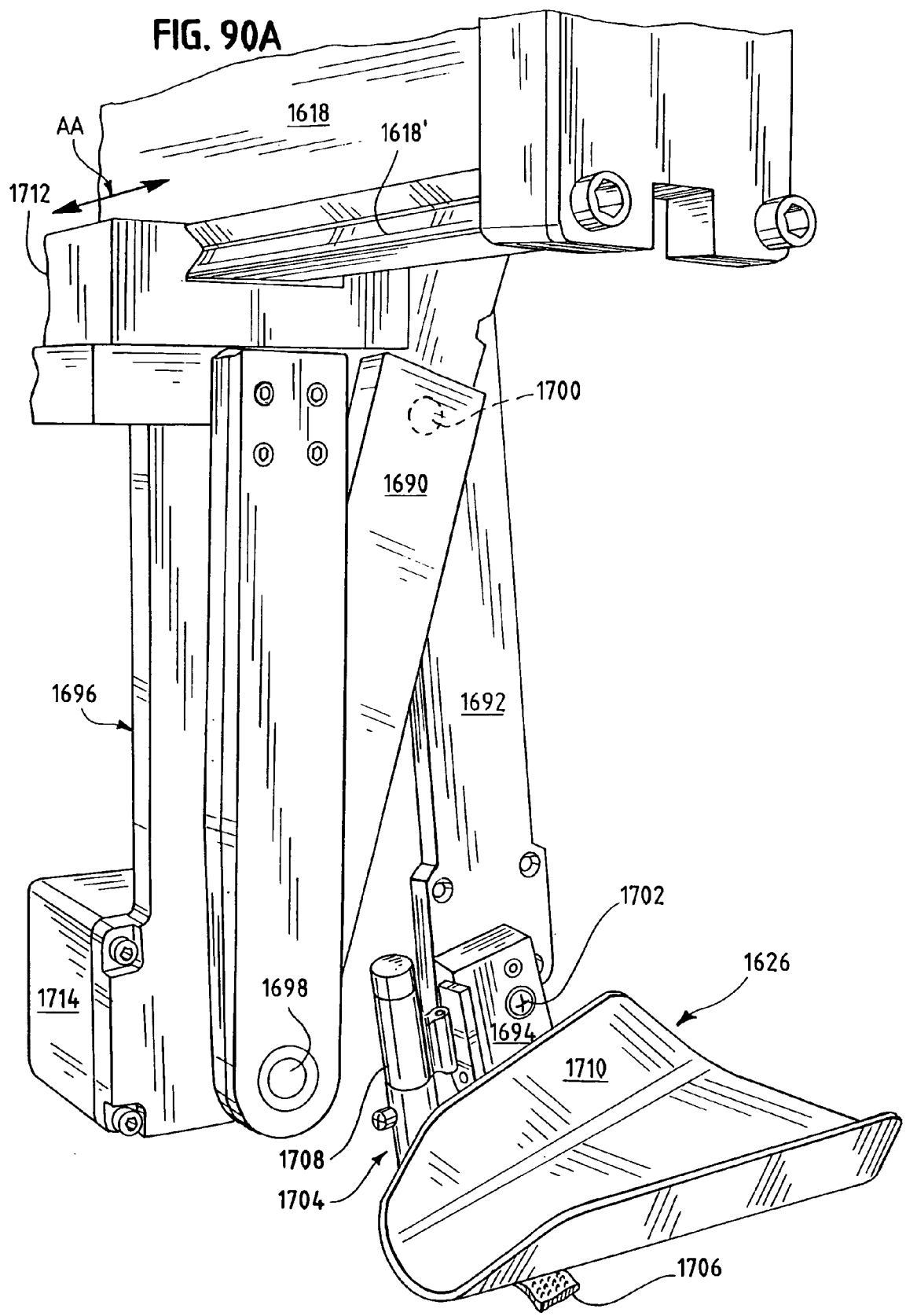
FIG. 90A is a fragmentary perspective view of one embodiment of a mechanical arm assembly for the packaging device in accordance with the present invention.
Figure 90B:
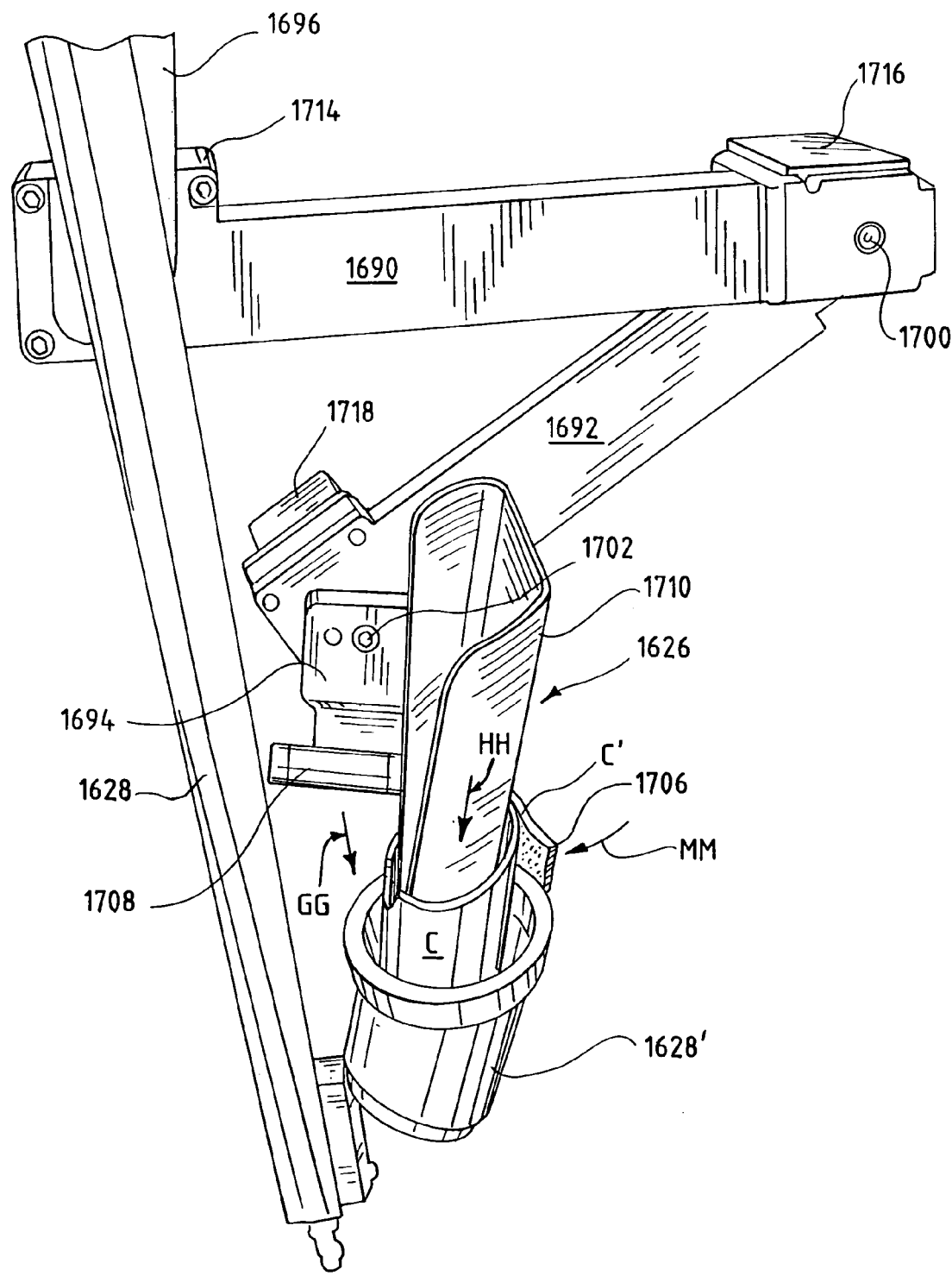
FIG. 90B is a fragmentary perspective view showing portions of the mechanical arm and elevator assembly of a packaging device in accordance with the present invention.
Figure 90C:
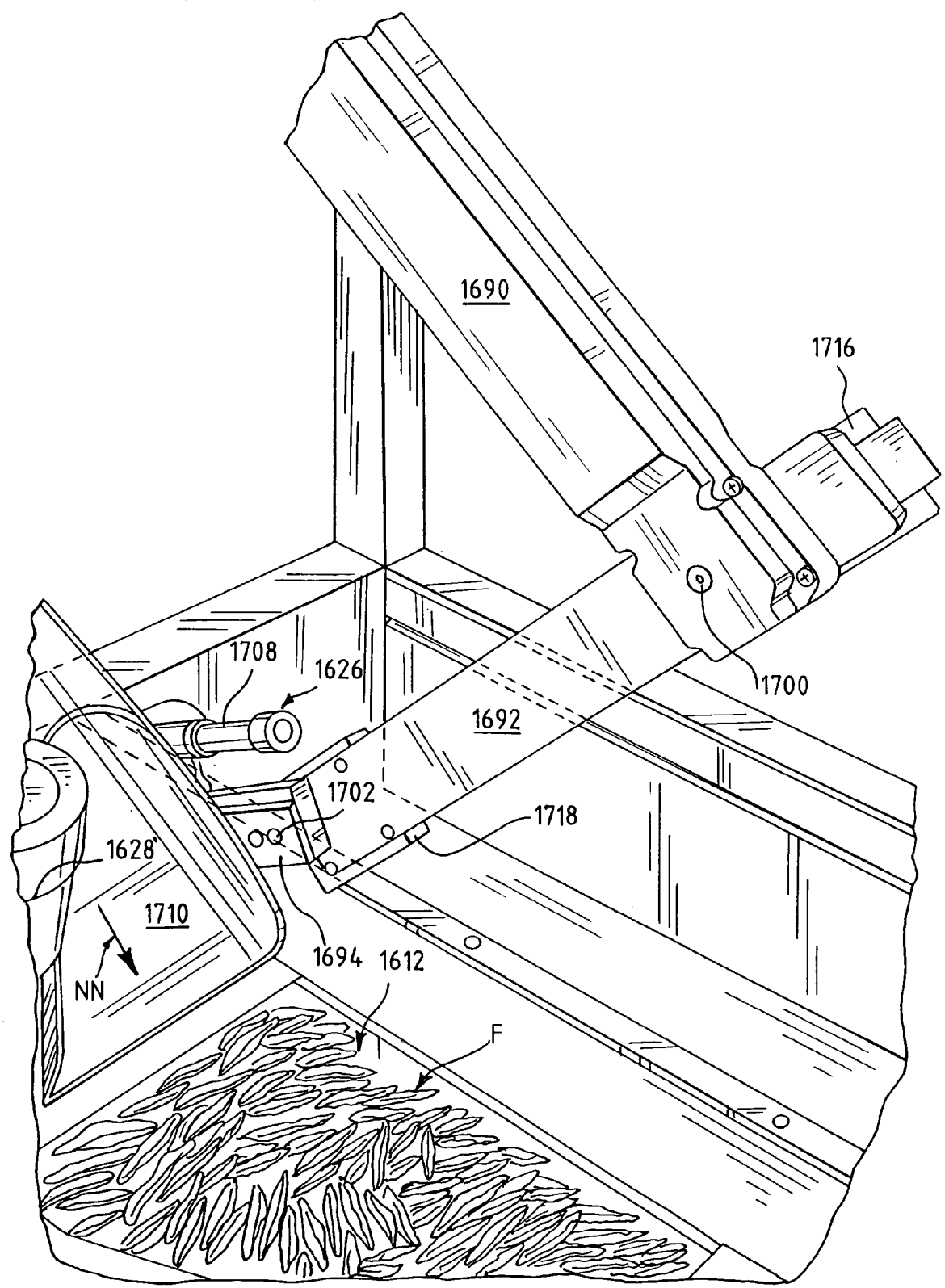
FIG. 90C is a fragmentary perspective view illustrating a portion of the embodiment of FIGS. 74 and 87-90A illustrating a portion of the operation thereof.
Figure 90D:
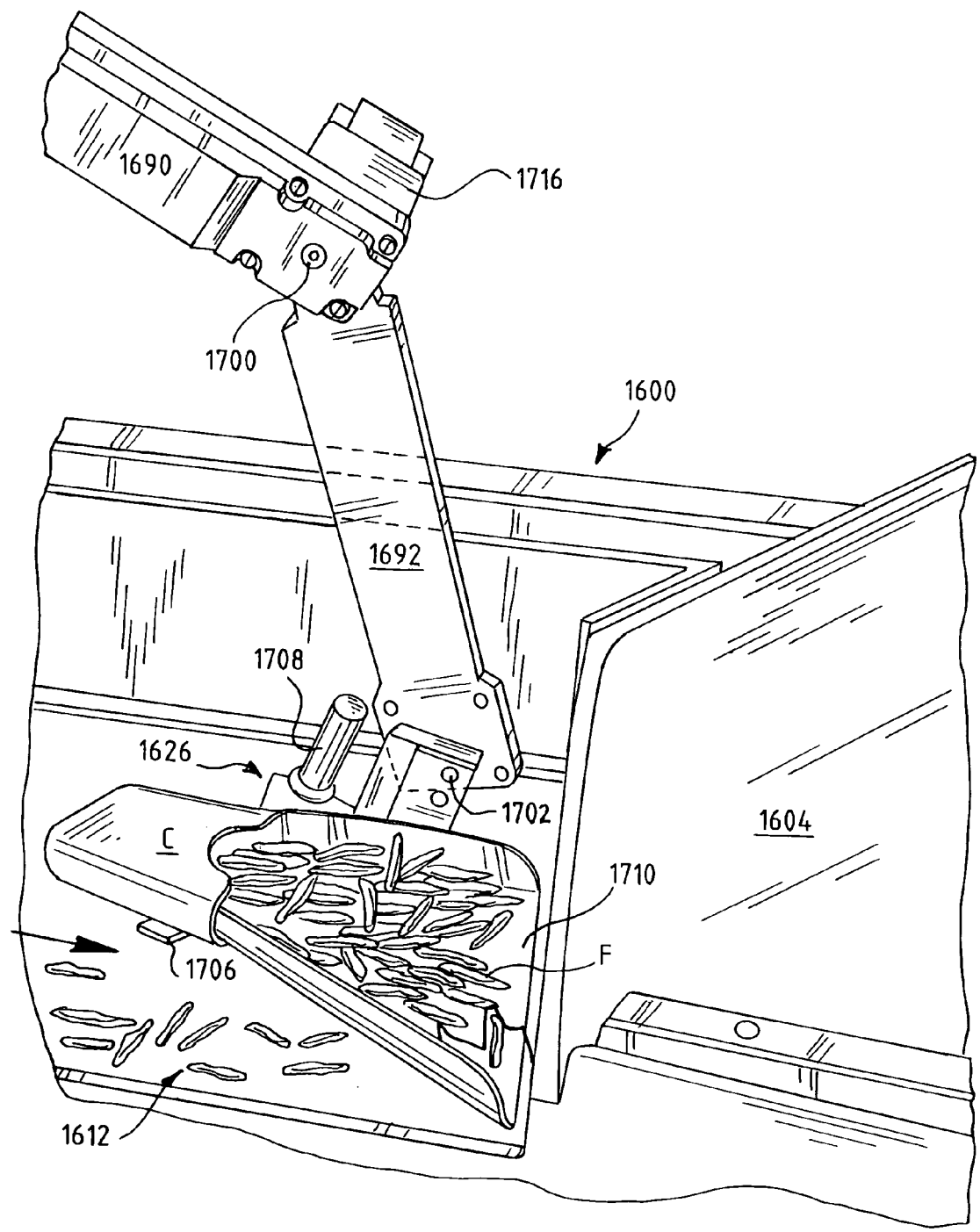
FIG. 90D is a fragmentary perspective view illustrating a portion of the embodiment of FIGS. 74 and 87-90A illustrating a portion of the operation thereof.
Figure 90E:
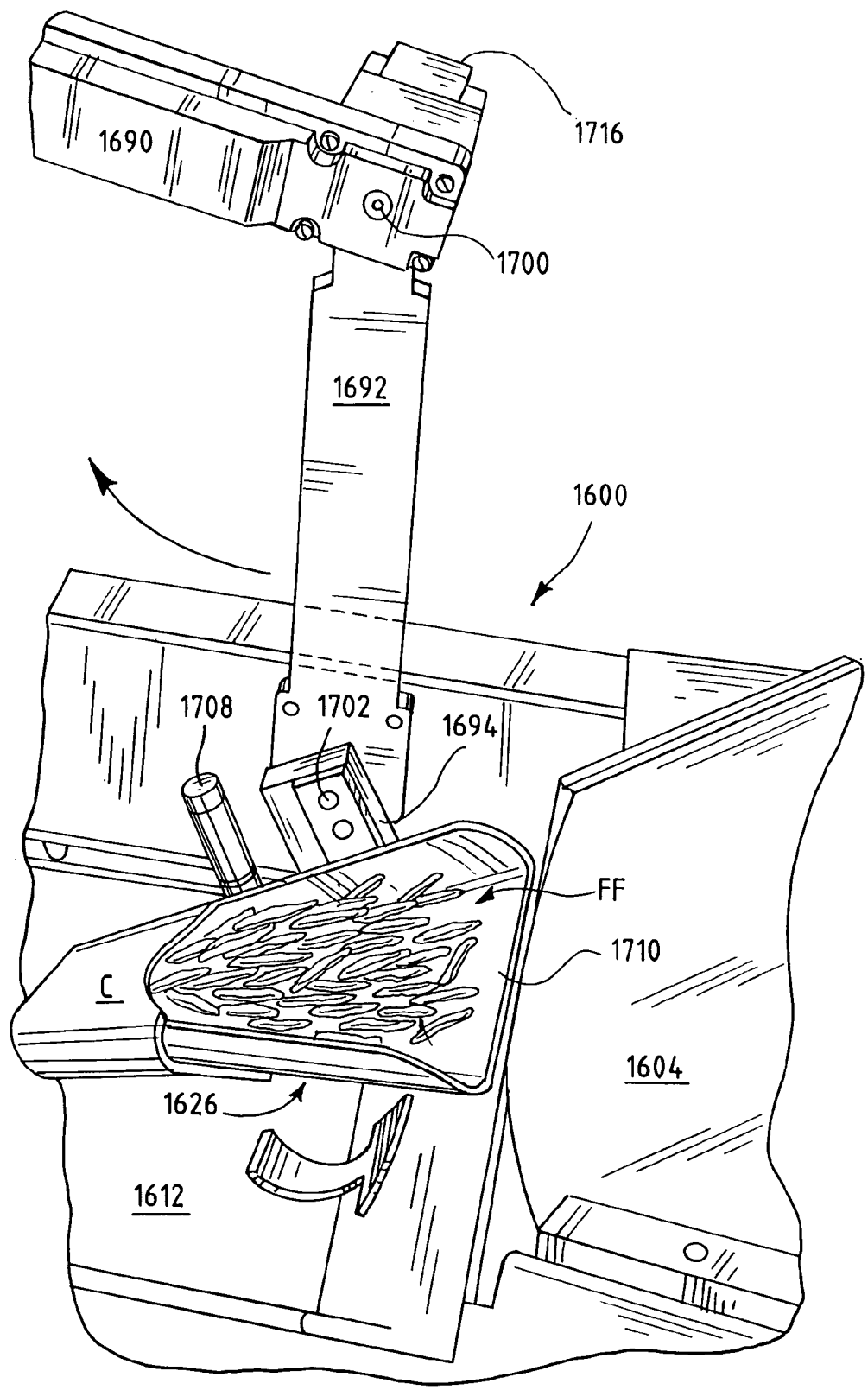
FIG. 90E is a fragmentary perspective view illustrating a portion of the embodiment of FIGS. 74 and 87-90A illustrating a portion of the operation thereof.
Figure 90F:
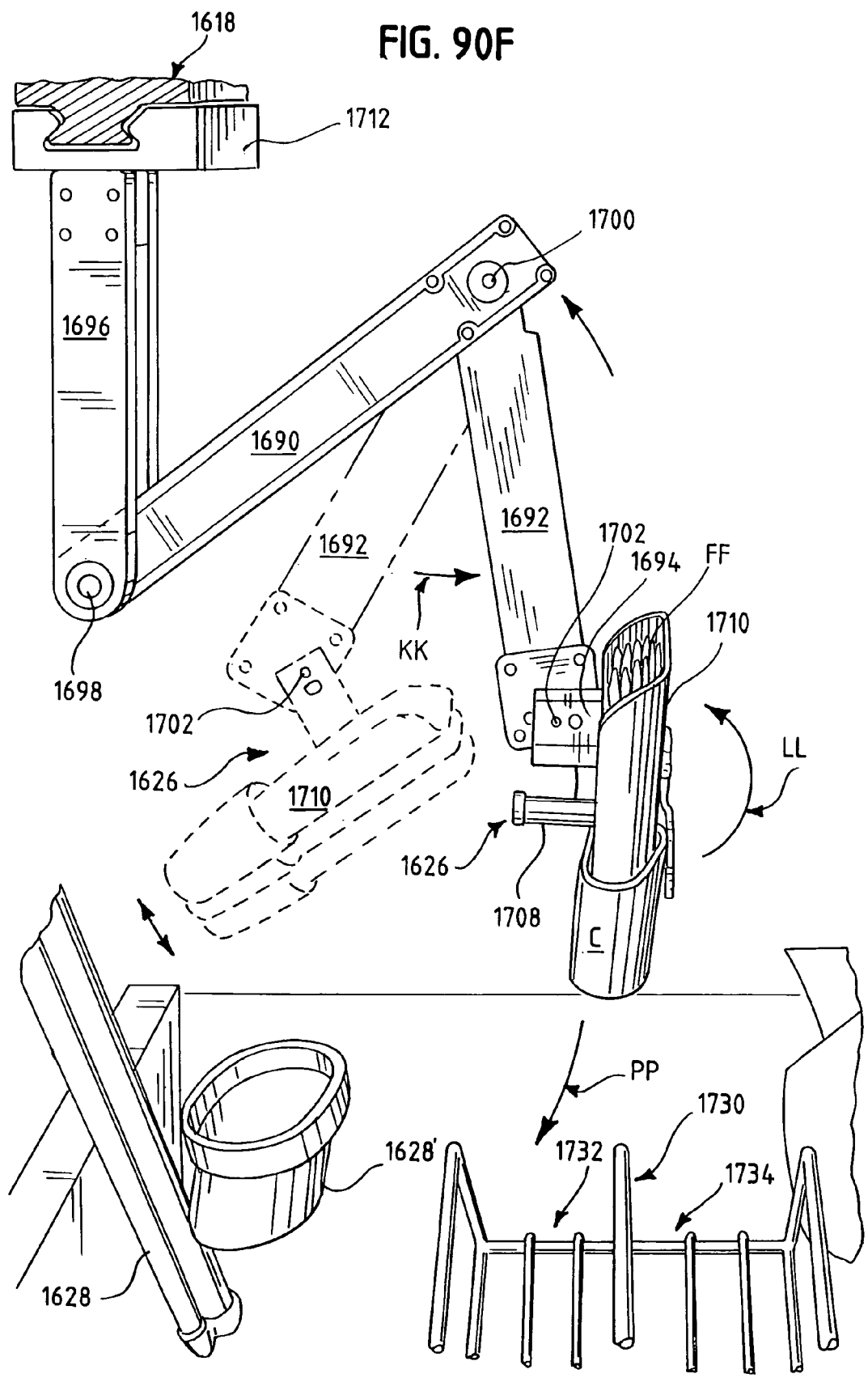
FIG. 90F is a fragmentary perspective view illustrating a portion of the embodiment of FIGS. 74 and 87-90A illustrating a portion of the operation thereof.

Carriage 1618 for mechanical arm 1616 allows mechanical arm 1616 to be laterally moved in the direction of arrow AA to desired locations depending on the task that is to be performed by mechanical arm 1616 as indicated in FIG. 90A, for example. Thus, carriage 1618 allows end-of-arm tool 1626 to be laterally moved from an erected carton pickup location as illustrated in FIG. 90B to a French fry container filling location where end-of-arm tool 1626 can be scooped through a quantity of French fries contained in holding bin 1612 to thereby cause the erected French fry container to be filled with French fries and to transfer the filled French fry container to drop-off location and holding structure 1620, where mechanical arm 1616 releases the filled French fry container for subsequent pickup by a human operator, for example.

Carriage 1618 includes a carriage guide 1618' and a carriage follower 1712 that traverses carriage 1618 and to which is mounted mast 1696. Lateral translation along carriage 1618 of carriage follower 1712 is accomplished by any suitable structure and may be by means of a rodless air cylinder. Carriages 1650, 1652 and 1608' can also be driven by a rodless cylinder or any other suitable device.

Mechanical arm 1616 is composed of three links that are pivotally interconnected permitting movement so that each of the links are pivotable in parallel planes which in the illustrated embodiment are each in a vertical direction. Pivotable movement of each link is accomplished by a suitable actuator 1714, 1716 and 1718, one for each of pivot connections 1698, 1700 and 1702, respectively. Actuators 1714, 1716 and 1718 can be any suitable type of actuator to provide the desired rotational movement including, such as, an electric motor, an air driven motor and a stepper motor, for example. Actuator 1714 causes rotation of first link 1690 relative to mast 1696 about pivot connection 1698. Actuator 1716 causes rotation of second link 1692 in a vertical plane about pivot connection 1700 and actuator 1718 causes rotation of third link 1694 in a vertical plane about pivot connection 1702. Various movements of mechanical arm 1616 of first, second and third links 1690-1694, respectively, are illustrated in FIGS. 76, 89E-H and 90A-F, for example.

In one illustrated embodiment, filled French fry collection drop-off location and holding structure 1620 is configured as an inclined holding rack 1730 as illustrated in FIG. 89I, for example. Inclined holding rack 1730 includes a plurality of separate lanes, namely, first lane 1732, second lane 1734 and third lane 1736, for receiving small, medium and large size filled containers of French fries, as illustrated in FIG. 89I.

Figure 91:
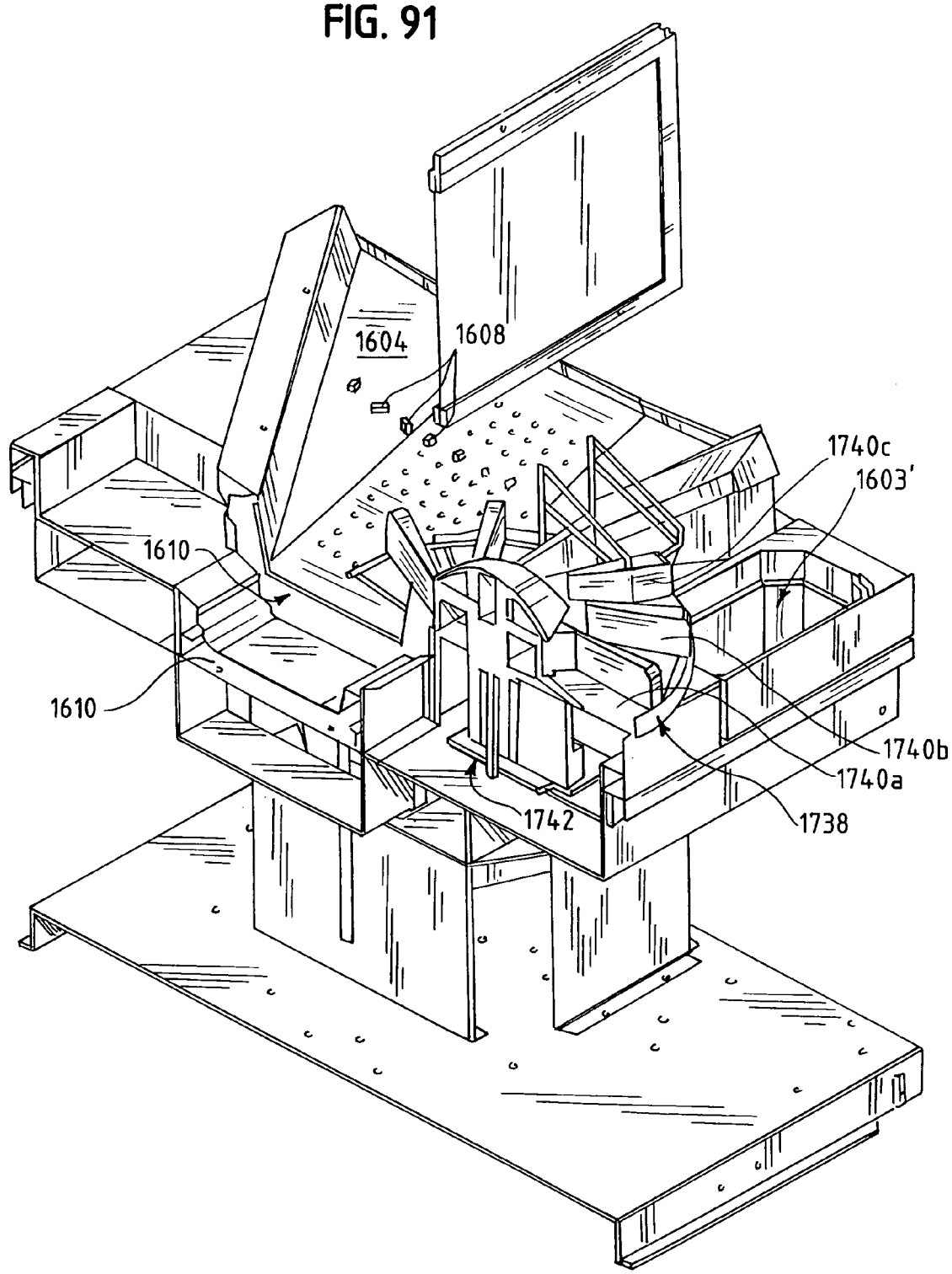
FIG. 91 illustrates a fragmentary perspective sectional view of a packaging device in accordance with the present invention illustrating an alternate embodiment of a filled French fry container holding device in accordance with the present invention.

Alternatively, a carousel-type structure may be provided, namely, holding carousel 1738, as illustrated in FIG. 91. Holding carousel 1738 is composed of a plurality of radially extending individual compartments 1740a-c, the number of compartments being limited by the size of holding carousel 1738 and the desired size for each compartment. A suitable drive mechanism 1742, which may be an electric motor is provided for causing rotation of holding carousel 1738.

The Control System and Method

In one embodiment, the System Master Controller comprises a Server (PC), a router/hub, and a touch-screen monitor (user interface). The Master can utilize existing technology to integrate, to manage, to control, and to coordinate information flow of and through the various subsystems for overall system operation. The network technology is fully compliant with the latest version of the industry's NAFEM Protocol.

Control System Features

Referring to FIGS. 69-73, the primary functions of the Control System are to receive order information from the POS and to connect and coordinate all operating subsystem controllers with the Master Controller so that operational commands and functional information can be communicated and displayed. The result is that all the dispensing, fry and packaging modules function as one integrated fried foods production system.

In one embodiment, the Control System is event and demand driven. That is, nothing happens unless a functional component or subsystem receives a command signal to initiate the action. In a normal operation mode, the POS will provide virtually all of the system order demands. These can take the form of a string of two-bit Order Events. Typically this will be a quantity and an item (for example, 2 each regular size fries). The product description can consist of both the food item and its portion size, treated as one bit of information.

The Control System information can be categorized into Order Events, Inbound Events, and Outbound Events. The Order Events come from primarily the POS system, the historical kitchen management system (KMS) data, or the touch-screen Monitor if a manager wants to override the automatic ordering. KMS is a database of information of, for example, the sales rate of various products versus day and time. The Order Events dictate and demand the operation and performance of the automation control system for production. The Inbound Events information includes messages generated by subsystem controllers other than the POS or KMS. The Outbound Events include typical command messages issued by the Master Controller specifying functions to be performed by individual subsystem controllers.

In one embodiment, the Master Controller is configured to monitor periodically or continuously the network for events to occur. Once an event takes place and a signal is sent on the network, the Master Controller identifies the source of the signal, then compares it to the programmed schedule of events within its memory, and reacts appropriately, either sending out a new command, showing a display, storing information in memory, or all of the above.

An important source of data for the Control System can be the Kitchen Management System (KMS). The KMS is a historical database of operational information. This information can be used to set the workstation configuration, process settings, inventory levels, and set a level of production in advance of actual customer demand orders. This interface can be a two-way connection, so that all operational data from the Fried Foods Workstation can be received and stored in the KMS and/or the Control System, or evaluated, adjusted, and reentered to "fine-tune" the process on a continuing basis.

Figure 70:
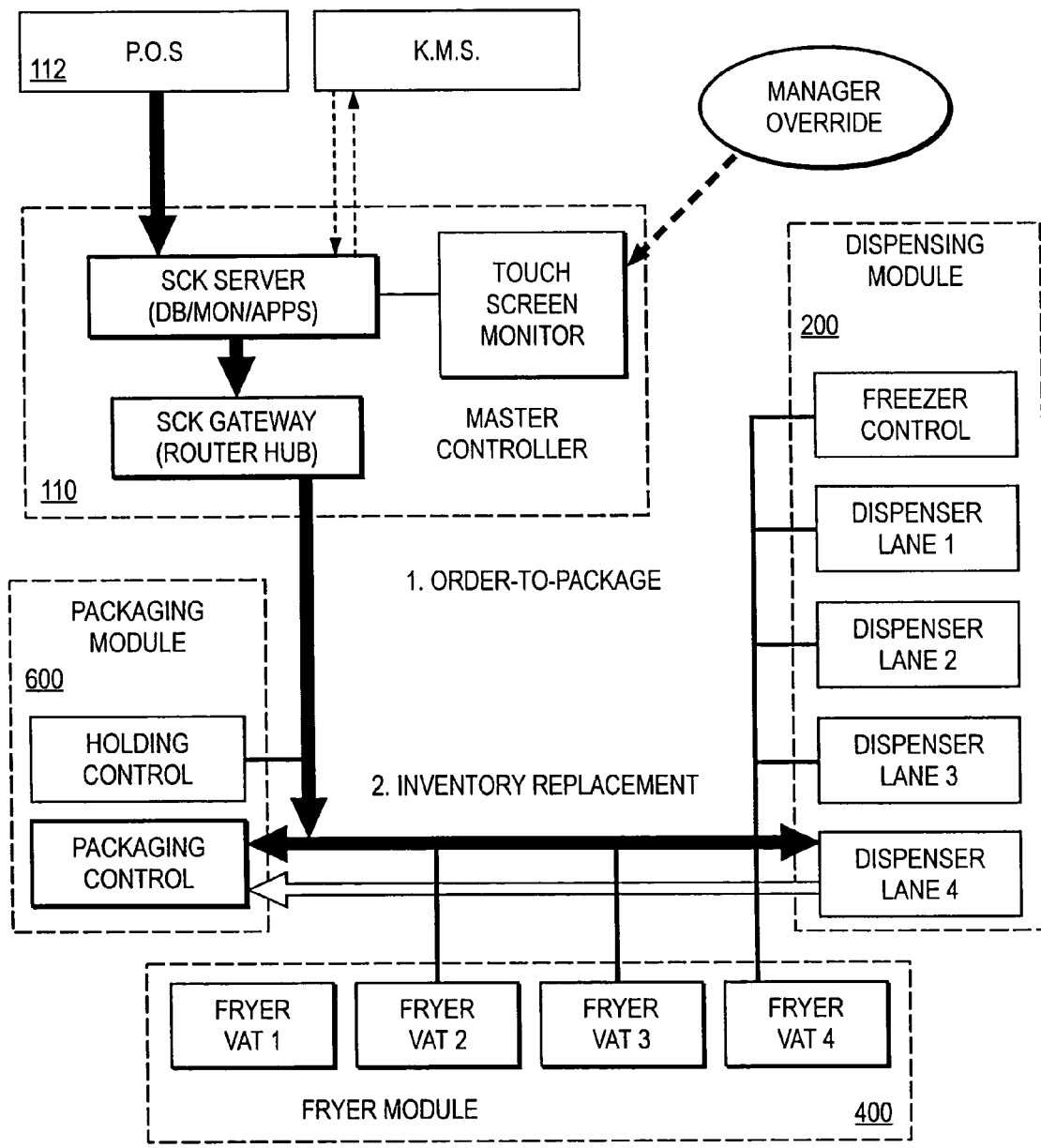
FIG. 70 is a diagrammatic view of a control system in accordance with the present invention.

Generally, the Control System can comprise two loops, shown in FIG. 70. The primary loop is the "Order-to-Package" loop, whereby the Master Control takes an Order Event input from the POS and directs the appropriate Packaging Module subsystem to package and deliver an appropriate portion of product. A secondary loop is the "Buffer Replacement" loop, where the Master Controller receives an Inbound Event signal from the Packaging Module that its buffer inventory of ready-to-package fried product is low and additional product must be dispensed and fried. As currently specified, all products other than salted French fries typically can have a default buffer inventory of zero, meaning that an order for that (other) product will immediately initiate a full dispense-fry-package (if packaged by the System) production routine.

In accordance with one aspect of this embodiment of the Control System, the Fryer Module vat operation is not directly controlled by the production demand cycle. Each fry vat of the fry module will operate continuously and on a pre-set uniform operating cycle. Frozen product is dropped into the fry module when additional inventory is called for. The product is fried according to the pre-set cooking cycle and then is dumped into the Packaging (or Protein) Module receiving apron. None of the cooking cycle is affected by order demands, or inventory conditions. In one embodiment, the Control System can vary the time between incremental rotation and speed of rotation of fry wheel 410 to accommodate for varying conditions, such as the level of cooking oil in the fry vat. The level of cooking oil can vary as a result of the amount of product that is being fried in a particular fry vat, since product present in the fry vat displaces cooking oil, thereby raising the level of cooking oil in the fry vat particularly since the product is held below the cooking oil surface during a cooking cycle. Preferably, to ensure the workstation reliability and system uptime, extensive control redundancy can be provided. As a result, the control subsystems for each Fryer Module vat and each Dispensing Module chute are designed and constructed as individual units that operate even if one or more subsystem fails.

Additionally, the control of the Dispensing Module freezer environment and operation can be an independent subsystem.

Preferably, the Control System includes the capability to operate all modules individually. This allows the operator to disconnect and remove a module from the network and operate the remaining modules in a semi-automatic method, manually performing some of the operations. Preferably, there are controls on each module that permit an operator to operate that module's functions locally.

Orders for product are preferably processed sequentially as they are received, although the specific products within a customer order may be arranged in a logical manner as desired. The Monitor will display all products being processed by the workstation from the time the order is received until it is removed from the workstation. The status of each product that is ordered can be tracked in its various stages including, for example, on order, packaged and ready to pick up, ready to manually package, and held too long.

Preferably, products in the process of being fried can also be tracked, and cooking times for each basket in each wheel will count down to when product is ready to package.

Master Controller

In one embodiment, the Master Controller 110 hardware may suitably comprise, or equivalent:

Intel Pentium III (or higher) with 1.0 GHz (or higher) CPU
Ethernet network interface and hub
256 MB (or more) system RAM
20 GB (or more) hard disk drive
Touch-Screen Monitor Interface
Plug and Play Touch-Screen Monitor
SCK Gateway (Ethernet)
Interconnect cabling (as needed)
Optional Keyboard and pointing device (mouse) for installation and maintenance purposes Typical operating system software requirements are:
Windows 2000 professional (or server) SP4 or higher
A suitable Database Server, such as Fast SCK Version 3.0 (or higher) from Fast, Inc. of Stratford, Conn.
Fast SCK Version 3.0 (or higher) Utility Applications (SCK Editor, SCK Engine, SCK Events, and SCK Site Editor) from Fast, Inc.

The Subsystem Interface Modules provide the functionality to communicate specific control events (information) conditions, and/or commands to and from the Master Controller. These modules typically can be incorporated into the circuitry of controller boards. In cases where the network needs to interface with a control subsystem (such as PLCs, for example), appropriate imbedded memory interface (input-output) circuit cards known in the art can be utilized. All of the foregoing hardware and software or equivalent is readily available or can be produced by those skilled in the art.

Fryer Controller

The frying of the frozen product is controlled by a combination of cooking oil temperature and the time the frozen product is immersed in the cooking oil. Frying is accomplished by moving the frozen product through the heated cooking oil by a rotating fry wheel. As previously described, a programmable stepper or other motor can provide the desired precisely controlled movement of the fry wheel.

The following Table I lists typical control parameters and several optional parameters that can be used, if desired.

TABLE I

Fryer Module Control Signals
(One set for each of 4 Product Lanes)

| Description | Input | Output | Op. Adj. |
|---|---|---|---|
| Set Temperature | X | | X |
| Actual Temperature | | X | |
| "Ready" Band Width | | X | |
| Temperature Offset | X | | |
| C or F | X | | X |
| Probe #1 | X | | |
| Heater Relay #1 | | X | |
| Total Cook Time | X | | X |
| Jog Speed | X | | |
| Jiggle Time | X | | |
| Cleaner Level | | X | |
| Oil Fill | | X | |
| Cleaner Fill | | X | |
| Probe #2 | X | | |
| Heater Relay #2 | | X | |
| Flex Time | X | | |

Figure 71:
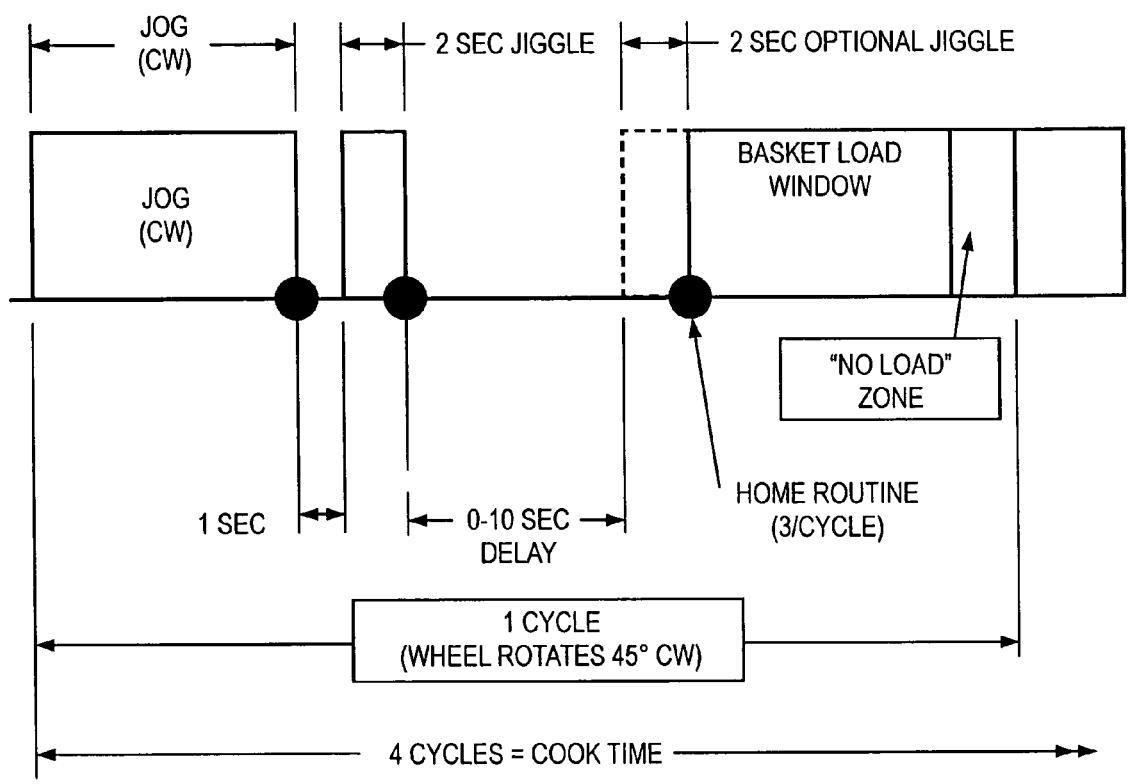
FIG. 71 is a diagrammatic view of a frying cycle in accordance with the present invention.

FIG. 71 depicts a typical motor/fry wheel/basket cycle. Virtually every parameter can be fixed or adjustable as desired. For example, during one typical cycle, which may be for a preset period of time that is one-quarter of the cooking time for food contained in a compartment, fry wheel 410 is rotated clockwise 4520 in the direction of arrow K of FIG. 13. After some period of time after the 45° incremental rotation, a basket shaking simulation of back and forth rotation occurs over a period of about two seconds. After a 0 to 10-second delay, another basket shaking simulation occurs. Thereafter, a period of time ("Basket Load Window") is available for loading another compartment, such as compartment 436 with a charge of French fries or other food to be fried. Thereafter, a "no load zone" or relatively short period of time towards the end of the cycle is set aside just prior to another 45° fry wheel 410 rotation in the direction of arrow K, which commences another cycle. During each cycle, three "home routines" can be employed, one after each rotation of fry wheel 410 to accurately locate fry wheel 410 so that it is properly positioned with the upper end of compartment bottom 510a of one of fry wheel 410 compartments adjacent discharge 498 and another of the compartments properly aligned to receive a charge of French fries or other food to be fried, such as from food dispensing device 200.

To ensure proper operation of the basket/fry wheel, including positioning the unit precisely for smooth loading and complete unloading, the basket/fry wheel position must be constantly synchronized. To do this, a "homing" sensor circuit can be utilized that resets the home position after every move of the wheel. This sensor preferably is electromagnetic and is impervious to dirt and grease build up and has no moving parts although any suitable sensor can be used.

Dispensing Controller

The Dispensing Module control system 114 separates functions by the product delivery lane they support. In one embodiment, where there are four delivery lanes, there are four control subsystems. Each subsystem controls a vibrating product conveyor, a portioning load cell, and a dump actuator. Additionally, there are optional module configurations that affect the controls design. If lanes 1, 2, and/or 3 are configured with bulk food hoppers, a product level sensor can be provided to alert operators to reload frozen product before the hopper is empty. If each of lanes 2, 3 and/or 4 is configured with an array of coil magazines for food items, the controls must sequentially switch power to each of the motors in the lane to maintain a constant flow of frozen product.

Table II lists defined control signal parameters for each of the Dispensing Module Lane controllers:

TABLE II

Dispensing Control Signals
(One set for each of 4 Product Lanes)

| Description | Input | Output |
|---|---|---|
| Load - Small Qty. | X | |
| Load - Large Qty. | X | |
| Load Coil A | X | |
| Load Coil B | X | |
| Load Coil C | X | |
| Load Coil D | X | |
| Load Coil E | X | |
| Ready to Dump | | X |
| Vibrator Frequency | X | |
| Bulk Fill Level | | X |
| Time Out | | X |
| Overweight | | X |
| Clean Out | X | |

Freezer Controller

In addition to properly dispensing products into the Fryer Module, subcontrol system 114 for dispensing device 200 or 1200 must also maintain a proper frozen environment for all products. To accomplish this, another controller subsystem can be provided. Table III lists the applicable control signal parameters for the freezer subsystem. A safety circuit interrupts all dispensing activity when the aisle door is opened.

TABLE III

Freezer Control Signals

| Description | Input | Output | Op. Adj. |
|---|---|---|---|
| Set Temperature | X | | X |
| Actual Temperature | | X | |
| Aisle Door Open | | X | |

The separation of the Dispensing Module controls into these five subsystems, when there are five, makes for a convenient mechanical arrangement in the base of the module, and allows for the required flexibility given the configuration options.

In one embodiment, for manual operation, four "dispense" buttons are provided, one for each lane. One button would cause the release of a pre-set portion of the frozen product for that lane. The controls preferably should be located so the operator could by visual observation determine the appropriate fryer basket to make sure the product dispenses into the proper basket.

Packaging Controller

Packaging Controller 118 for the Packaging Module incorporates several event signal generators for the control system to sense or read. The main Packaging Module or device 600 and 1600 elements are depicted in FIGS. 25-29 and FIGS. 86-90, respectively. In one embodiment, the Packaging Module or device control system includes two subsystems within the Packaging Module, the packaging subsystem and the heated food storage device 635 that can be used in place of packaging device 600 or 1600

The Packaging Subsystem

The packaging control subsystem initially interfaces with the Packaging Module PLC and sends packaging device 600 or 1600 a signal to start the sequential operation of packaging one of an appropriately sized portion of French fries. The actions and reactions of all the electromechanical devices (e.g., for device 600: container handling system 610, dispensing member 606, overflow member 613, load cell 702 and chute mechanism 608 and for device 1600: container handling system 1622, elevator 1628, salting device 1606 and carriage 1606', first and second gates 1608 and 1610, and container filling device 1614) can be, if desired, sequenced and controlled by the local on-board controller (i.e., PLC) and not Master Controller 110.

For device 600, once the container grasping device 764 sets the filled package of fries on conveyor 614 and the receptacle load gate 926 opens to allow receptacle 612 to move to the pick up area, a signal will be sent back to Master Controller 110 indicating that the particular order of fries is ready for pick up. Until that receptacle 612 moves to the return gate 928 (located at the operator right front of the Packaging Module) and the gate permits receptacle 612 to move therepast after receptacle 612 is empty, Master Controller 110 will believe (and display) that the order of fries is waiting to be picked up. Preferably, the crew member will pick up fries from right to left to ensure that the order sequence is followed and that the oldest fries are served first.

Because the number of receptacles 612 that can fit between gate 926 and return gate 928 typically is limited, Master Controller 110 intelligence preferably keeps track of how many orders of fries are in the pick up cue. This allows audible/visual alerts to be triggered on the Monitor to remind the crew that orders have been waiting. Also, even if orders are picked out of sequence, the Master Controller will remember what was on an empty receptacle 612 and clear it when it passes return gate 928.

Preferably, the Master Controller is configured to remember the hold time of each packaged fry order. If the order has not been picked up in time, the Monitor will alert the operator by audible/visual signal to "waste" that order.

For device 1600, once automated mechanical arm 1616 deposits a filled package of fries at drop-off location, Master Controller 110 will believe and display that the order is ready for pick-up from the particular lane of rack 1730 or from a particular compartment of holding carousel 1738, the rotation of which can be controlled by Master Controller 110.

The Secondary Loop

The remainder of control 118 for Packaging Module or device 600 or 1600 functions address the secondary loop, "buffer inventory replacement." Preferably, there are two typical system requirements for the buffer inventory: (1) there must be a minimum amount of fries in member 606 or chute mechanism 608 (for device 1600, in holding bin 1612 and/or on chute 1604) to completely fill the next packaging order (that is, enough French fries to make one portion of a given size given the particular filling efficiencies of the filling device of packaging module 600 or 1600); and (2) the buffer inventory is low and needs to be replenished.

For the first requirement, if there is insufficient buffer inventory to fill the package, chute mechanism 608 or mechanical arm 1614 is disabled or held inactive and an error message alarm is sent. This condition should not happen, but the control intelligence prevents packaging device 600 or 1600 from under filling an order.

During normal operations, the level of fries in the buffer inventory will drop to a level where an inventory replenishment order will be initiated. In that event, Master Controller 110 can signal dispensing device 200 or 1200 to start its fill sequence. This process should typically start soon enough that the replacement product can be fried, salted, and added to the dispensing member 606 or to holding bin 1612 or on inlet chute 1604 before the "out-of-product" condition is reached. The KMS data can be integrated into the Master Control intelligence to help insure that there is replacement product in process before the actual need arises. This capability minimizes order delivery delays while also preventing the dispensing member 606 or in holding bin 1612 or inlet chute 1604 inventory growing beyond actual need.

The dispensing member 606 (or holding bin 1612 and/or inlet chute 1604) inventory can be managed in a number of ways, as desired. For example, any of the following can be utilized and implemented by one of ordinary skill in the art: (a) direct sensors; (b) a load cell that constantly weighs the buffer inventory; and (c) a dynamic empirical calculation.

The dynamic empirical calculation embodiment may use the Master Controller to constantly calculate how much product has been added to dispensing member 606 (or holding bin 1612 and/or inlet chute 1604), and subtract out the portion packaged, any bonus amount, waste, and a safety factor. This empirical total will then be compared to pre-set "reload" levels. The formula may also include how much product is in process. In all cases, the buffer inventory level can be adjusted during the day to reflect actual sales levels.

The controls system design for all other (i.e., non-salted French fries) products is that the same control process would be used, but that the "buffer inventory" for those products may be defaulted to zero. That is, an order for hash browns would immediately signal an "out-of-inventory" condition and launch an "inventory replacement" command to the dispensing device 200 or 1200. Later, if the need arises, controller intelligence would allow the operator to utilize some buffer inventory for these products.

Optionally, a provision can be made for unsalted French fries. Unsalted French fries would be handled like the non-French fries products. When an order for unsalted French fries is received, Master Controller 110 will signal the Packaging Module to move diverter bar 605. The next load of French fries coming from the Fryer Module will then be diverted to a portion of chute 604 of packaging device 600 for manual packaging. The extra unsalted fries can be manually returned to chute 604.

An important feature of the automated system is to maintain product integrity. One facet of that is to dispose of product that has exceeded its authorized holding time. Master Controller 110 will remember when each load of French fries came out of fry device 400. The mechanical design of packaging devices 600 and 1600 assures a substantially "first in-first out" product movement. How long the "oldest" fries have been in dispensing member 606 is tracked by Master Controller 110 or packaging device controller 118, as desired. Whenever the allowable holding time has been reached, Master Controller 110 will signal the Packaging Module subsystem Controller 118 to start the buffer waste cycle (or the packaging device Controller 118 can directly control this function). It is possible that some French fries in the buffer will not have reached their limit, but through control parameter refinement, this can be minimized. Table IV lists the control signals for one embodiment of the packaging control subsystem:

TABLE IV

Packaging Control Signals

| Description | Input | Output | Op. Adj. |
|---|---|---|---|
| Package #1 | X | | |
| Package #2 | X | | |
| Package #3 | X | | |
| Package #4 | X | | |
| Divert Fries | X | | |
| Produce #5 | X | | |
| Produce #6 | X | | |
| Produce #7 | X | | |
| Produce #8 | X | | |
| Produce #9 | X | | |
| Dump Buffer | X | | |
| Buffer Low | | X | |
| Buffer Full | | X | |
| Receptacle Loaded | | X | |
| Receptacle Empty | | X | |
| Time out - System 610 | | X | |
| Product #5-9 Picked | | X | |

Holding Controller

The other control subsystem is that dedicated to holding product at proper temperatures. Generally, a standard temperature controller with timer channels to manage all holding functions can be utilized, as is known in the art.

Table V lists the various control parameters for the holding control subsystem for food holding device 635:

TABLE V

Holding Control Signals

| Description | Input | Output | Op. Adj. |
|---|---|---|---|
| Buffer Temp Set | X | | X |
| Buffer Temp Act | | X | |
| Pick Up Temp Set | X | | X |
| Pick Up Temp Act | | X | |
| Apron Temp Set | X | | X |
| Apron Temp Act | | X | |
| Holding Temp Set | X | | X |
| Holding Temp Act | | X | |
| Holding Time #1 Start | X | | |
| Holding Time #1 End | X | | |
| Holding Time #2 Start | X | | |
| Holding Time #1 End | X | | |

Touch-Screen Monitor

The Touch-Screen Monitor is the primary system user interface and can be considered part of the Master Controller configuration. The Monitor has four main functions: (1) display the status of fried foods orders; (2) allow the operator to manually control the system; (3) alert the operator to any needed manual intervention; and (4) allow the operator to reconfigure the workstation and/or change the individual operating parameters.

Figure 72:
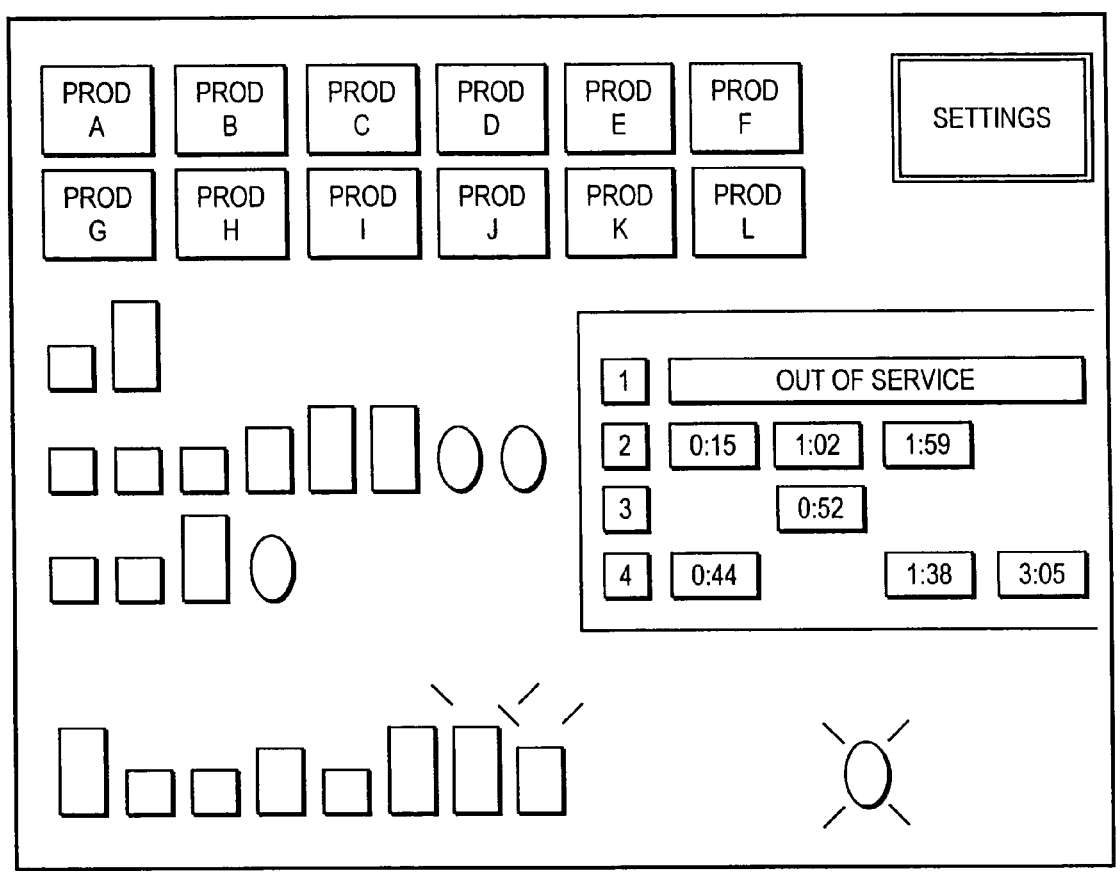
FIG. 72 is a schematic illustration of a sample touch screen monitor useful in accordance with the invention.

The Monitor display can be configured as desired. Preferably, the main display menu is simple, uncluttered and only presents the basic information needed to track ongoing order status. A sample Monitor display layout is shown in FIG. 72.

In the illustrated embodiment, products on order would appear as horizontal rows of the appropriate product (type and portion size) icon, reading from the left edge of the screen. All products from a single POS customer order would appear on a single line. As additional POS orders are entered, the screen would refresh, moving the older orders down a line. Products on order, and not yet ready for pick up would appear as gold icons.

Across the bottom of the screen would appear the same number of locations as there are packaging device 600 receptacles 612 in the pick up zone. As packages of fries are placed on receptacles 612 and the receptacles 612 travel within the pick up zone, the appropriate icon will disappear from the "on order" line and reappear as a green icon in the spot where its receptacle is. When a package is removed from a receptacle and that receptacle passes return gate 928, the display icon will disappear from the screen.

In one embodiment, should the "hold timer" for a packaged product expire before it is picked up, its green icon will change color (i.e., to red) and/or flash. In another embodiment, an audible alarm can be provided as well, indicating clearly that this product should be wasted.

Across the top of the screen is a line of control "buttons." There can be one for each product (again, type and portion size). The system is programmed so that touching the button on the screen will enter an order for one each of that product. There is also a screen button at the upper right corner of the screen that enables the operator to change the screen display to the "Settings" screen.

Figure 73:
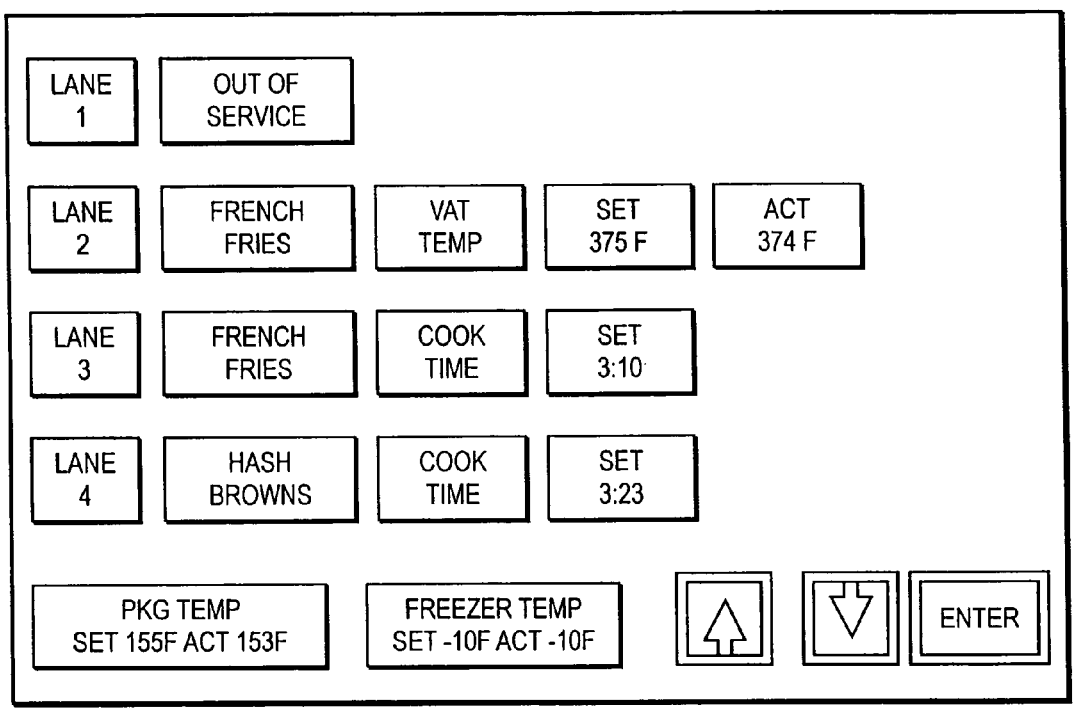
FIG. 73 depicts another touch screen layout in accordance with the present invention.

The "Settings" screen layout is depicted in FIG. 73. From this screen, the operator may now configure all the operating settings for the product to be run in each product lane. The individual settings may include dispensing load size(s), fry vat temperature, cooking cycle time, buffer inventory level, packaging device Module heater setting, and other settings as desired. In this embodiment, all settings for a particular product are linked to that product. The operator can merely scroll in each product lane and signify the product that will be run in it. Master Controller 110 will then set all operating parameters for that product. If it is necessary to check or adjust an individual control setting (such as cook time), the operator can scroll through the items in the "settings" box for that lane and product. Then, using the "up" and "down" keys, readjust the setting and press the "enter" key to reset.

If required, a secure "manager only screen" can be configured to allow someone to adjust and/or reset selected operating parameters. Access to this screen and these settings would require some type of password to prevent any non-authorized store employee from changing basic system parameters.

Operator alert messages or alarms (e.g., bulk product low—refill now: "bridging/time out"—clear lane 2; etc.) will appear as an "error message box" in the center of the screen, along with some type of audible alarm.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

The invention claimed is:

1. A food packaging device comprising an automated device for packaging cooked French fries into an individual portion-sized French fry container, the automated device comprising:

a carriage mounted to the food packaging device, the carriage being movable in at least one linear direction;

a mechanical arm having a first end and a second end, the first end being affixed to the carriage and the second end having an end-of-arm tool;

wherein the end-of-arm tool comprises a scoop and a French fry carton grasping mechanism for picking up and grasping an erected individual portion-sized French fry carton from an erected carton pick-up location, and scooping the erected carton while held by the end-of-arm tool into a quantity of cooked French fries located at a filling location to fill the French fry carton; and the carriage and arm being movable for transporting the filled French fry carton and depositing the filled French fry carton at a drop-off location spaced from the filling location.

2. The food packaging device of claim 1 further comprising a French fry holding bin for holding a bulk quantity of French fries at the filling location and a French fry inlet chute for receiving a bulk amount of French fries.

3. The food packaging device of claim 2 further comprising means for vibrating the French fry inlet chute.

4. The food packaging device of claim 3 further comprising means for retaining French fries on the French fry chute.

5. The food packaging device of claim 4 further comprising means for applying seasoning to French fries contained on the inlet chute.

6. The food packaging device of claim 4 wherein the means for retaining comprises a plurality of vertically reciprocable fingers movable between an extended position for retaining French fries on the inlet chute and a retracted position for permitting French fries to travel down at least a portion of the chute.

7. The food packaging device of claim 5 further comprising a carriage for moving the means for applying seasoning horizontally across the inlet chute.

8. The food packaging device of claim 2 further comprising a movable gate located between the discharge end of the inlet chute and the holding bin and movable between a raised position for retaining French fries on the French fry inlet chute and a lowered position for permitting French fries to travel from the French fry inlet chute to the holding bin.

9. The food packaging device of claim 8 wherein said movable gate comprises a plurality of spaced apart fingers reciprocable in up and down directions to restrain French fries from sliding down the inlet chute when in an up position and for declumping French fries when the fingers are reciprocated up and down when French fries are traveling past the reciprocating fingers.

10. The food packaging device of claim 2 further comprising a sensing device associated with the French fry holding bin for determining whether a desired quantity of French fries are contained in the French fry holding bin.

11. The food packaging device of claim 10 wherein the sensing device is a weighing device.

12. The food packaging device of claim 1 further comprising a French fry carton storage and erection device for open-top individual portion-sized French fry containers.

13. The food packaging device of claim 12 wherein the French fry carton storage and erection device comprises an automated, unerected French fry carton retrieving device for retrieving and grasping an unerected, open-top individual portion-sized French fry container.

14. The food packaging device of claim 13 wherein said automated retrieving device comprises a grasping member for selectively grasping and releasing the French fry container.

15. The food packaging device of claim 14 wherein the automated retrieving device further comprises structure for generally horizontally linearly moving said movable member in two generally horizontal dimensions.

16. The food packaging device of claim 15 wherein said structure for linearly moving comprises a carriage.

17. The food packaging device of claim 15 wherein said structure for linearly moving comprises a carriage for each of said horizontal dimensions.

18. The food packaging device of claim 13 further comprising a magazine for holding a plurality of the individual portion-sized French fry containers in an unerected state.

19. The food packaging device of claim 13 further comprising a magazine for holding a plurality of segregated groups of individual portion-sized unerected French fry containers, each group in the plurality being of a different size container.

20. The food packaging device of claim 19 wherein the magazine holds each group of unerected containers in a horizontal stack.

21. The food packaging device of claim 20 wherein said container retrieving device is positionable to retrieve containers from the front of each stack.

22. The food packaging device of claim 14 wherein said grasping member comprises a suction device for grasping and releasing the French fry container.

23. The food packaging device of claim 22 wherein said suction device comprises a suction cup located on the grasping member that is capable of said grasping and releasing by applying and releasing a vacuum, respectively.

24. The food packaging device of claim 23 wherein said suction device comprises two suction cups that are disposed adjacent each other on the grasping member.

25. The food packaging device of claim 14 wherein said retrieving device is capable of grasping and releasing a French fry container on one side and further comprising means for erecting the unerected French fry container.

26. The food packaging device of claim 25 wherein the container has a bottom and further comprising urging means for urging the container to an erected position and for urging the container bottom upwardly relative to the sides of the container when the retrieving device grasps the container and retrieves the container from the stack.

27. The food packaging device of claim 26 wherein said urging means comprises an inclined ramp.

28. The food packaging device of claim 27 further comprising means for applying a stream of compressed air into the top end of the container and towards the bottom of the container.

29. The food packaging device of claim 26 further comprising an elevator for moving an erected French fry container from a first location proximate said retrieving device to a second location.

30. The food packaging device of claim 29 wherein the elevator comprises a rodless cylinder and a receptacle for holding an erected French fry container, said receptacle being movable between said first and second locations by said rodless cylinder.

31. The food packaging device of claim 30 wherein said second location is proximate said mechanical arm so that a French fry container in said second position can be grasped by said end-of-arm tool.

32. The food packaging device of claim 1 wherein the mechanical arm further comprises structure for selectively and independently moving the end-of-arm tool through a generally vertical compound arc.

33. The food packaging device of claim 32 wherein the mechanical arm further comprises structure for selectively moving the end-of-arm tool linearly up and down.

34. The food packaging device of claim 1 wherein said French fry carton grasping mechanism is actuable between clamping and non-clamping positions wherein the grasping mechanism can grasp a French fry container when in the clamping position and release the previously grasped French fry container when the grasping mechanism is in the non-clamping position.

35. The food packaging device of claim 34 wherein said grasping mechanism comprises a finger.

36. The food packaging device of claim 35 further comprising an actuator device for moving said finger between clamping and non-clamping positions.

37. The food packaging device of claim 35 wherein the grasping mechanism clamps an upper end of the French fry container between the finger and the French fry scoop.

38. The food packaging device of claim 1 wherein said mechanical arm comprises a plurality of pivotable links connected in series.

39. The food packaging device of claim 38 wherein said mechanical arm comprises at least two pivotable links.

40. The food packaging device of claim 38 wherein said mechanical arm comprises three pivotable links.

41. The food packaging device of claim 40 wherein the links are each pivotable in parallel planes.

42. The food packaging device of claim 40 wherein the links comprise first, second and third links, the first link connected to the carriage, the third link connected to the end-of-arm tool and the second link connected to the first and third links.

43. The food packaging device of claim 42 wherein the connection of each of said links to another link comprises a pivot connection.

44. The food packaging device of claim 43 further comprising an actuator for each pivot connection for pivoting the respective one of said links about the pivot connection which connects that link to another of said links.

45. The food packaging device of claim 1 further comprising a structure for containing a plurality of French fry cartons filled with French fries and at least a portion of the structure in communication with said drop-off location.

46. The food packaging device of claim 45 wherein the structure is a stationary rack that is inclined in a direction away from said mechanical arm.

47. The food packaging device of claim 45 wherein said structure comprises a rotatable carousel.

48. The food packaging device of claim 1 wherein said mechanical arm is configured to mimic the motion of a person's arm, wrist and hand action in scooping French fries into a French fry container while grasping the French fry container in one hand and moving the French fry container in a vertical arc, and thereafter, moving the French fry container to a generally upright position and shaking the French fry container sufficiently to settle the French fries in the container and cause loosely contained French fries to fall from the French fry container.

* * * * *

UNITED STATES PATENT AND TRADEMARK OFFICE
CERTIFICATE OF CORRECTION

PATENT NO. : 7,303,776 B2  Page 1 of 1
APPLICATION NO. : 10/419523
DATED : December 4, 2007
INVENTOR(S) : Gerald A. Sus et al.

It is certified that error appears in the above-identified patent and that said Letters Patent is hereby corrected as shown below:

Title page, under "Related U.S. Application Data," change the wording to read:

-- This application is a continuation-in-part of U.S. application Nos. No. 10/127,202, now pending, No. 10/127,203, issued on March 22, 2005 as U.S. Patent No. 6,869,633, No. 10/127,309, issued on November 1, 2005 as U.S. Patent No. 6,960,157, No. 10/127,311, now abandoned, No. 10/127,369, No. 10/127,390, now abandoned, No. 10/127,398, issued on March 29, 2005 as U.S. Patent No. 6,871,676, and No. 10/127,400, now pending, all the prior applications having been filed on April 22, 2002. --

In column 53, line 39, "900" should read -- 90° --.

Signed and Sealed this

Fifth Day of August, 2008

JON W. DUDAS
*Director of the United States Patent and Trademark Office*